United States Patent
Yamada et al.

(10) Patent No.: US 8,514,353 B2
(45) Date of Patent: Aug. 20, 2013

(54) COLOR FILTER AND ELECTRONIC DISPLAY DEVICE

(75) Inventors: Naoyoshi Yamada, Kanagawa (JP); Ryuji Saneto, Kanagawa (JP); Junichi Ito, Kanagawa (JP); Shigekazu Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 249 days.

(21) Appl. No.: 13/052,726

(22) Filed: Mar. 21, 2011

(65) Prior Publication Data

US 2011/0234950 A1  Sep. 29, 2011

(30) Foreign Application Priority Data

Mar. 23, 2010 (JP) ................................. 2010-066652

(51) Int. Cl.
*G02F 1/1335* (2006.01)
(52) U.S. Cl.
USPC ........................... 349/109; 349/104; 349/106
(58) Field of Classification Search
USPC ........................................................ 349/109
See application file for complete search history.

(56) References Cited

U.S. PATENT DOCUMENTS

| | | | | |
|---|---|---|---|---|
| 7,579,625 B2 * | 8/2009 | Kim | .................................. | 257/72 |
| 7,791,659 B2 * | 9/2010 | Yokozawa | ..................... | 348/273 |
| 7,894,023 B2 * | 2/2011 | Ando et al. | ................... | 349/106 |
| 2005/0275769 A1 * | 12/2005 | Roh et al. | ....................... | 349/109 |
| 2006/0007373 A1 * | 1/2006 | Arai et al. | ...................... | 349/113 |
| 2006/0187381 A1 * | 8/2006 | Yokozawa | ..................... | 349/106 |
| 2009/0033844 A1 * | 2/2009 | Ando et al. | ................... | 349/106 |
| 2009/0059138 A1 * | 3/2009 | Matsumoto et al. | ........... | 349/106 |
| 2009/0115952 A1 * | 5/2009 | Nakamura et al. | .............. | 349/143 |
| 2009/0190073 A1 * | 7/2009 | Yoshino et al. | ............... | 349/106 |
| 2010/0039028 A1 * | 2/2010 | Suzuki et al. | ................. | 313/504 |
| 2010/0220268 A1 * | 9/2010 | Ohtani et al. | ................. | 349/106 |
| 2010/0227199 A1 | 9/2010 | Hall-Goulle et al. | | |
| 2011/0234950 A1 * | 9/2011 | Yamada et al. | ............... | 349/109 |

FOREIGN PATENT DOCUMENTS

| | | |
|---|---|---|
| JP | 05-002106 | 1/1993 |
| JP | 2007-041169 | 2/2007 |
| JP | 4156476 | 7/2008 |
| JP | 2009-527014 | 7/2009 |
| JP | 2010-044981 | 2/2010 |
| JP | 2010-171007 | 8/2010 |
| WO | WO 2007/093536 | 8/2007 |

* cited by examiner

*Primary Examiner* — Rhonda Peace
(74) *Attorney, Agent, or Firm* — Young & Thompson

(57) ABSTRACT

A color filter including a red (R) pixel, a green (G) pixel and a blue (B) pixel, wherein at least one of the red (R) pixel, the green (G) pixel and the blue (B) pixel includes one or more kinds of dyes and one or more kinds of pigments and wherein areas of the red (R) pixel, the green (G) pixel and the blue (B) pixel are not the same.

11 Claims, No Drawings

COLOR FILTER AND ELECTRONIC DISPLAY DEVICE

BACKGROUND OF THE INVENTION

1. Field of the Invention

The present invention relates to a color filter and an electronic display device using the color filter.

2. Description of the Related Art

In recent years, the color filter is used as a color separation filter in a liquid crystal display, an organic EL display, an electronic paper, a viewfinder for a video camera, an imaging device such as CCD, etc., and in a color image sensor, a line sensor for color copy, etc., and development of the industrial product using various color filters is progressing. Such a color filter is being required to have high-quality color characteristics in luminance, chromaticity, contrast, etc., and high-quality characteristics such as the reduction in color unevenness and improvement of color separation performance are being demanded and a higher degree of fineness is also being demanded.

It is known that in the color filter, pixels colored with only pigments are generally excellent in heat resistance and light resistance, but are inferior to pixels colored with only dye, because the transmittance of transmitted light is affected by scattering of pigment particles.

In the pigment-based color filter, colors are adjusted in order to make an attempt to improve luminance, but there is a problem of sacrificing a color reproduction range and white balance. In this case, the use of a dye-based color filter is conceivable, but, if a cold cathode tube (CCFL) light source is used, the dye-based color filter is deteriorated, and therefore, there is such a problem that the color filter cannot be used in a liquid crystal device (LCD).

Therefore, a technique of using both dye and pigment in a color filter is being examined. For example, a color filter in which pixels colored with pigment and pixels colored with dye are being laminated is proposed (refer to Japanese Patent Application Laid-Open (JP-A) No. 05-2106). This proposal compensates for the disadvantage of pixels in which the dye and the pigment are used alone, but this proposal eventually halves the advantage and the disadvantage of the case where the dye and the pigment are used alone.

Furthermore, Japanese Patent Application Laid-Open (JP-A) No. 2009-527014 discloses that the color filter containing copper phthalocyanine and anthraquinone can enhance contrast.

Moreover, Japanese Patent (JP-B) No. 4156476 discloses the liquid crystal device in which the areas of red (R), green (G), and blue (B) pixels are different and which uses an LED as a light source.

JP-A Nos. 2010-44981 and 2010-171007 disclose organic EL display devices having a color filter containing a pigment or a dye.

JP-A No. 2007-41169 discloses an electronic paper display device having a color filter and enabling color display.

However, the preceding technical documents do not disclose or suggest a color filter in which at least one of the red (R) pixel, the green (G) pixel, and the blue (B) pixel includes one or more kind of dyes and one or more kind of pigments and the pixel area of each color is different from one another and it is obvious that the significant working effect that the luminance of white can be improved while keeping the same chromaticity of red (R), green (G), and blue (B) as well as the chromaticity of white as before cannot be obtained even by combining the preceding technical documents.

Therefore, in the present circumstances, a technique is being demanded, which can provide a color filer capable of improving the luminance of white while keeping the same chromaticity of red (R), green (G), and blue (B) and the chromaticity of white as before, and an electronic display device using the color filter.

BRIEF SUMMARY OF THE INVENTION

An object of the present invention is to provide a color filter capable of improving the luminance of white while keeping the same chromaticity of red (R), green (G), and blue (B) and chromaticity of white as before, and an electronic display device using the color filter.

Means for solving the above existing problems are as follows.

<1> A color filter including:
a red (R) pixel,
a green (G) pixel, and
a blue (B) pixel,
wherein at least one of the red (R) pixel, the green (G) pixel and the blue (B) pixel includes one or more kinds of dyes and one or more kinds of pigments, and
wherein areas of the red (R) pixel, the green (G) pixel and the blue (B) pixel are not the same.

<2> The color filter according to <1>, wherein the area of the pixel that includes the dye and the pigment is smaller than that of the pixel that includes no dye.

<3> The color filter according to any one of <1> and <2>, wherein the blue (B) pixel includes the dye and the pigment, the red (R) pixel and the green (G) pixel include no dye, and an area of the blue (B) pixel is smaller than that of the red (R) pixel and that of the green (G) pixel.

<4> The color filter according to any one of <1> and <2>, wherein the red (R) pixel includes the dye and the pigment, the blue (B) pixel and the green (G) pixel include no dye, and an area of the red (R) pixel is smaller than that of the blue (B) pixel and that of the green (G) pixel.

<5> The color filter according to any one of <1> and <2>, wherein the green (G) pixel includes the dye and the pigment, the red (R) pixel and the blue (B) pixel include no dye, and an area of the green (G) pixel is smaller than that of the red (R) pixel and that of the blue (B) pixel.

<6> The color filter according to <1>, wherein the blue (B) pixel, the red (R) pixel, and the green (G) pixel each include the dye and the pigment, and an area of the blue (B) pixel is smaller than that of the red (R) pixel and that of the green (G) pixel.

<7> The color filter according to <1>, further including a yellow (Y) pixel.

<8> The color filter according to <7>, wherein an area of the yellow (Y) pixel is smaller than that of the blue (B) pixel, that of the red (R) pixel, and that of the green (G) pixel.

<9> An electronic display device including:
the color filter according to any one of <1> to <8>.

<10> A liquid crystal display device including:
the color filter according to any one of <1> to <8>, and
an LED light source.

<11> An organic EL display device including:
the color filter according to any one of <1> to <8>.

<12> An electronic paper display device including:
the color filter according to any one of <1> to <8>.

According to the present invention, it is possible to provide a color filter capable of solving the conventional problems and of improving the luminance of white while keeping the same chromaticity of red (R), green (G), and blue (B) and the chromaticity of white as before, and a liquid crystal display device using the color filter.

DETAILED DESCRIPTION OF THE INVENTION (Color Filter)

A color filter of the present invention has at least red (R) pixels, green (G) pixels, and blue (B) pixels, preferably has yellow (Y) pixels, and further has other members as necessary.

In the present invention, at least one of the red (R) pixel, the green (G) pixel, and the blue (B) pixel includes one or more kinds of dyes and one or more kinds of pigments, and the pixel area of each color is not the same. Due to this, it is possible to improve the luminance of white while keeping the same chromaticity of red (R), green (G), and blue (B) and the chromaticity of white as before.

Aspects in which at least one of the red (R) pixel, the green (G) pixel, and the blue (B) pixel includes one or more kinds of dyes and one or more kinds of pigments include (1) an aspect in which the red (R) pixel includes dyes and pigments (the blue (B) pixel and the green (G) pixel include no dye), (2) an aspect in which the green (G) pixel includes dyes and pigments (the blue (B) pixel and the red (R) pixel include no dye), (3) an aspect in which the blue (B) pixel includes dyes and pigment (the red (R) pixel and the green (G) pixel include no dye), (4) an aspect in which the red (R) pixel and the green (G) pixel include dyes and pigments (the blue (B) pixel includes no dye), (5) an aspect in which the red (R) pixel and the blue (B) pixel include dyes and pigments (the green (G) pixel includes no dye), (6) an aspect in which the green (G) pixel and the blue (B) pixel include dyes and pigments (the red (R) pixel includes no dye), and (7) an aspect in which the red (R) pixel, the green (G) pixel, and the blue (B) pixel include dyes and pigments.

The wording "pixel areas of the red (R) pixel, the green (G) pixel and the blue (B) pixel are not the same" means that the red (R) pixel area, the green (G) pixel area, and the blue (B) pixel area are not the same at the same time (in other words, two of the three pixel areas may be the same) and includes (1) a case where only the red (R) pixel area is different, (2) a case where only the green (G) pixel area is different, (3) a case where only the blue (B) pixel area is different, (4) a case where the red (R) pixel area and the green (G) pixel area are different, (5) a case where the red (R) pixel area and the blue (B) pixel area are different, (6) a case where the green (G) pixel area and the blue (B) pixel area are different, and (7) a case where the red (R) pixel area, the green (G) pixel area, and the blue (B) pixel area are all different.

In the present invention, it is preferable that the pixel area of the pixel that includes dyes and pigments is smaller than the pixel area of the pixel that does not include dyes. When the pixel area of the pixel that includes pigments and dyes is larger than the pixel area of the pixel that does not include dyes, there may be a case where the display of white is slightly colored.

Furthermore, it is preferable that the blue (B) pixel, the red (R) pixel, and the green (G) pixel each include dyes and pigments, and the area of the blue (B) pixel is smaller than that of the red (R) pixel and smaller than that of the green (G) pixel.

Moreover, when the yellow (Y) pixels are provided, it is preferable that the area of the yellow (Y) pixel is smaller than that of the blue (B) pixel, smaller than that of the red (R) pixel, and smaller than that of the green (G) pixel.

Specifically, mention is made of the following aspects (1) to (8).

(1) When the blue (B) pixel includes dyes and pigments, it is preferable that the area of the blue (B) pixel is smaller than that of the red (R) pixel and smaller than that of the green (G) pixel. When the area of the blue (B) pixel is larger than that of the red (R) pixel and larger than that of the green (G) pixel, there may be a case where the color of white becomes bluish. When the area of the blue (B) pixel is set to be 1, it is preferable that the area of the red (R) pixel is 1.01 to 1.4 and the area of the green (G) pixel is 1.01 to 1.4, and it is more preferable that the area of the red (R) pixel is 1.01 to 1.2 and the area of the green (G) pixel is 1.01 to 1.2.

(2) When the red (R) pixel includes dyes and pigments, it is preferable that the area of the red (R) pixel is smaller than that of the blue (B) pixel and smaller than that of the green (G) pixel. When the area of the red (R) pixel is larger than that of the blue (B) pixel and larger than that of the green (G) pixel, there may be a case where the color of white becomes reddish. When the area of the red (R) pixel is set to be 1, it is preferable that the area of the blue (B) pixel is 1.01 to 1.4 and the area of the green (G) pixel is 1.01 to 1.4, and it is more preferable that the area of the blue (B) pixel is 1.01 to 1.2 and the area of the green (G) pixel is 1.01 to 1.2.

(3) When the green (G) pixel includes dyes and pigments, it is preferable that the area of the green (G) pixel is smaller than that of the blue (B) pixel and smaller than that of the red (R) pixel. When the area of the green (G) pixel is larger than that of the blue (B) pixel and larger than that of the red (R) pixel, there may be a case where the color of white becomes greenish. When the area of the green (G) pixel is set to be 1, it is preferable that the area of the blue (B) pixel is 1.01 to 1.2 and for the area of the red (R) pixel is 1.01 to 1.2, and it is more preferable that the area of the blue (B) pixel is 1.01 to 1.1 and the area of the red (R) pixel is 1.01 to 1.1.

(4) When the red (R) pixel and the green (G) pixel include dyes and pigments, it is preferable that the areas of the red (R) pixel is smaller than that of the blue (B) pixel, and the green (G) pixel is smaller than that of the blue (B) pixel. When at least one of the area of the red (R) pixel and the area of the green (G) pixel is smaller than that of the blue (B) pixel, there may be a case where the color of white becomes reddish, greenish, or yellowish. When the area of the blue (B) pixel is set to be 1, it is preferable that the area of the red (R) pixel is 0.7 to 0.99 and the area of the green (G) pixel is 0.85 to 0.99, and it is more preferable that the area of the red (R) pixel is 0.9 to 0.99 and the area of the green (G) pixel is 0.9 to 0.99.

(5) When the green (G) pixel and the blue (B) pixel include dyes and pigments, it is preferable that the area of the green (G) pixel is smaller than that of the red (R) pixel, and the area of the blue (B) pixel is smaller than that of the red (R) pixel. When at least one of the area of the green (G) pixel and the area of the blue (B) pixel is larger than that of the red (R) pixel, there may be a case where the color of white becomes greenish, bluish, or blue-greenish. When the area of the red (R) pixel is set to be 1, it is preferable that the area of the green (G) pixel is 0.85 to 0.99 and the area of the blue (B) pixel is 0.7 to 0.99, and it is more preferable that the area of the green (G) pixel is 0.9 to 0.99 and the area of the blue (B) pixel is 0.85 to 0.95.

(6) When the red (R) pixel and the blue (B) pixel include dyes and pigments, it is preferable that the area of the red (R) pixel is smaller than that of the green (G) pixel, and the area of the blue (B) pixel is smaller than that of the green (G) pixel. When at least one of the area of the red (R) pixel and the area of the blue (B) pixel is larger than the area of the green (G) pixel, there may be a case where the color of white becomes reddish, bluish, or purplish. When the area of the green (G) pixel is set to be 1, it is preferable that the area of the red (R) pixel is 0.7 to 0.99 and the area of the blue (B) pixel is 0.7 to 0.99, and it is more preferable that the area of the red (R) pixel is 0.9 to 0.99 and the area of the blue (B) pixel is 0.9 to 0.99.

(7) When the red (R) pixel, the green (G) pixel, and the blue (B) pixel include dyes and pigments, it is preferable that the area of the blue (B) pixel is smaller than that of the red (R) pixel and smaller than that of the green (G) pixel. When the area of the blue (B) pixel is larger than that of the red (R) pixel and larger than that of the green (G) pixel, there may be a case where the color of white becomes bluish. When the area of the blue (B) pixel is set to be 1, it is preferable that the area of the red (R) pixel is 1.01 to 1.4 and the area of the green (G) pixel is 1.01 to 1.4, and it is more preferable that the area of the red (R) pixel is 1.01 to 1.2 and the area of the green (G) pixel is 1.01 to 1.2.

(8) When the yellow (Y) pixels are included, it is preferable that the area of the yellow (Y) pixel is smaller than that of the red (R) pixel, is smaller than that of the green (G) pixel, and is smaller than that of the blue (B) pixel, and the area of the blue (B) pixel is larger than that of the yellow (Y) pixel, is larger than that of the red (R) pixel, and is larger than that of the green (G) pixel. When the area of the yellow (Y) pixel is larger than that of the red (R) pixel, is larger than that of the green (G) pixel, and is larger than that of the blue (B) pixel or when the area of the blue (B) pixel is smaller than that of the yellow (Y) pixel, is smaller than that of the red (R) pixel, and is smaller than that of the green (G) pixel, there may be a case where the color of white becomes yellowish. When smaller one of the area of the red (R) pixel and the area of the green (G) pixel is set to be 1, it is preferable that the area of the yellow (Y) pixel is 0.01 to 0.7, more preferably, 0.01 to 0.5. When larger one of the area of the red (R) pixel and the area of the green (G) pixel is set to be 1, it is preferable that the area of the blue (B) pixel is 1.01 to 1.55, more preferably, 1.01 to 1.3.

The adjustment of the area of the blue (B) pixel, the area of the red (R) pixel, the area of the green (G) pixel, and the area of the yellow (Y) pixel in such a color filter described above can be made by using a photomask having a different area of the opening of each pixel in a method of manufacturing a color filter in which, for example, a color resist liquid is hardened by exposure processing via a photomask.

Furthermore, the ratio between the area of the blue (B) pixel, the area of the red (R) pixel, the area of the green (G) pixel, and the area of the yellow (Y) pixel in the color filter can be found by obtaining the area of the opening of each pixel through the observation using, for example, a microscope and comparing the areas obtained with one another.

<Blue Curable Composition Including Dye and Pigment in the Blue (B) Pixel>

The blue curable composition includes at least (A-1) a complex including a compound represented by General Formula (I) and metal atoms or metal compounds, (A-2) phthalocyanine based pigment as the blue pigment, (B) a dispersant, (C) a polymerizable compound, (D) a photochemical polymerization initiator, and (E) an organic solvent and further includes other components as necessary.

[(A-1) Complexes Including Compounds Represented by General Formula (I) and Metal Atoms or Metal Compounds]

The blue curable composition includes a complex including (A-1) the compounds represented by the following General Formula (I) and metal atoms or metal compounds (hereinafter, referred to appropriately as a "specific complex").

—Dipyrromethene-Based Compounds—

First, the compound represented by General Formula (I) constituting the specific complex will be explained.

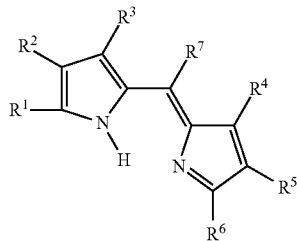

(I)

In General Formula (I), $R^1$ to $R^6$ respectively represent a hydrogen atom or substituent independently. $R^7$ represents a hydrogen atom, halogen atom, alkyl group, aryl group, or heterocyclic group.

In General Formula (I), the substituents represented by $R^1$ to $R^6$ include univalent groups as shown below (hereinafter, the enumerated univalent groups may be collectively referred to as a "substituent R").

Examples of the substituents include a halogen atom (for example, fluorine atom, chlorine atom, bromine atom), alkyl group (preferably, a straight chain, branched chain, or a cyclic alkyl group the number of carbon atoms of which is 1 to 48, more preferably, the number of carbon atoms is 1 to 24, for example, methyl group, ethyl group, propyl group, isopropyl group, butyl group, t-butyl group, pentyl group, hexyl group, heptyl group, octyl group, 2-ethylhexyl group, dodecyl group, hexadecyl group, cyclopropyl group, cyclopentyl group, cyclohexyl group, 1-norbornyl group, 1-adamantyl group), an alkenyl group (preferably, the alkenyl group the number of carbon atoms of which is 2 to 48, more preferably, the number of carbon atoms is 2 to 18, for example, vinyl group, allyl group, 3-butene-1-yl group), an aryl group (preferably, the aryl group the number of carbon atoms of which is 6 to 48, more preferably, the number of carbon atoms is 6 to 24, for example, phenyl group, naphthyl group), a heterocyclic group (preferably, the heterocyclic group the number of carbon atoms of which is 1 to 32, more preferably, the number of carbon atoms is 1 to 18, for example, 2-thienyl group, 4-pyridyl group, 2-furyl group, 2-pyrimidinyl group, 1-pyridyl group, 2-benzothiazolyl group, 1-imidazolyl group, 1-pyrazolyl group, benzotriazole-1-yl group), a silyl group (preferably, the silyl group the number of carbon atoms of which is 3 to 38, more preferably, the number of carbon atoms is 3 to 18, for example, trimethylsilyl group, triethylsilyl group, tributylsilyl group, t-butyldimethylsilyl group, t-hexyldimethylsilyl group), a hydroxyl group, a cyano group, a nitro group, an alkoxyl group (preferably, the alkoxyl group the number of carbon atoms of which is 1 to 48, more preferably, the number of carbon atoms is 1 to 24, for example, methoxy group, ethoxy group, 1-butoxy group, 2-butoxy group, isopropoxy group, t-butoxy group, dodecyloxy group, or as a cycloalkyloxy group, for example, cyclopentyloxy group, cyclohexyloxy group), an aryloxy group (preferably, the aryloxy group the number of carbon atoms of which is 6 to 48, more preferably, the number of carbon atoms is 6 to 24, for example, phenoxy group, 1-naphtoxy group), a heterocyclic oxy group (preferably, the heterocyclic oxy group the number of carbon atoms of which is 1 to 32, more preferably, the number of carbon atoms is 1 to 18, for example, 1-phenyltetrazole-5-oxy group, 2-tetrahydropyranyloxy group), a silyloxy group (preferably, the silyloxy group the number of carbon atoms of which is 1 to 32, more preferably, the number of carbon atoms is 1 to 18, for example, trimethylsilyloxy group, t-butyldimethylsilyloxy group, diphenylmethylsilyloxy group), an acyloxy group (preferably, the acyloxy group the number of carbon atoms of which is 2 to 48, more preferably, the number of carbon atoms is 2 to 24, for example, acetoxy group, pivaloyloxy group, benzoyloxy group, dodecanoyloxy group), an alkoxylcarbonyloxy group (preferably, the alkoxylcarbonyloxy group the number of carbon atoms of which is 2 to 48, more preferably, the number of carbon atoms is 2 to 24, for example, ethoxycarbonyloxy group, t-butoxycarbonyloxy group, or as the cycloalkyloxycarbonyloxy group, for example, cyclohexyloxycarbonyloxy group), an aryloxycarbonyloxy group (preferably, the aryloxycarbonyloxy group the number of carbon atoms of which is 7 to 32, more preferably, the number of carbon atoms is 7 to 24, for example, phenoxycarbonyloxy group), a carbamoyloxy group (preferably, the carbamoyloxy group the number of carbon atoms of which is 1 to 48, more preferably, the number of carbon atoms is 1 to 24, for example, N,N-dimethylcarbamoyloxy group, N-butylcarbamoyloxy group, N-phenylcarbamoyloxy group, N-ethyl-N-phenylcarbamoyloxy group), a sulfamoyloxy group (preferably, the sulfamoyloxy group the number of carbon atoms of which is 1 to 32, more preferably, the number of carbon atoms is 1 to 24, for example, N,N-diethylsulfamoyloxy group, N-propylsulfamoyloxy group), and an alkylsulfonyloxy group (preferably, the alkylsulfonyloxy group the number of carbon atoms of which is 1 to 38, more preferably, the number of carbon atoms is 1 to 24, for example, methylsulfonyloxy group, hexadecylsulfonyloxy group, cyclohexylsulfonyloxy group).

An arylsulfonyloxy group (preferably, the arylsulfonyloxy group the number of carbon atoms of which is 6 to 32, more preferably, the number of carbon atoms is 6 to 24, for example, phenylsulfonyloxy group), an acyl group (preferably, the acyl group the number of carbon atoms of which is 1 to 48, more preferably, the number of carbon atoms is 1 to 24, for example, formyl group, acetyl group, pivaloyl group, benzoyl group, tetradecanoyl group, cyclohexanoyl group), an alkoxycarbonyl group (preferably, the alkoxycarbonyl group the number of carbon atoms of which is 2 to 48, more preferably, the number of carbon atoms is 2 to 24, for example, methoxycarbonyl group, ethoxycarbonyl group, oxtadecyloxycarbonyl group, cyclohexyloxycarbonyl group, 2,6-di-tert-butyl-4-methylcyclohexyloxycarbonyl group), an aryloxycarbonyl group (preferably, the aryloxycarbonyl group the number of carbon atoms of which is 7 to 32, more preferably, the number of carbon atoms is 7 to 24, for example, phenoxycarbonyl group), a carbamoyl (preferably, the carbamoyl group the number of carbon atoms of which is 1 to 48, more preferably, the number of carbon atoms is 1 to 24, for example, carbamoyl group, N,N-diethylcarbamoyl group, N-ethyl-N-octylcarbamoyl group, N,N-dibutylcarbamoyl group, N-propylcarbamoyl group, N-phenylcarbamoyl group, N-methyl-N-phenylcarbamoyl group, N,N-dicyclohexylcarbamoyl group), an amino group (preferably, the amino group the number of carbon atoms of which is 32 or less, more preferably, the number of carbon atoms is 24 or less, for example, amino group, methylamino group, N,N-dibutylamino group, tetradecylamino group, 2-ethylhexylamino group, cyclohexylamino group), an anilino group (preferably, the anilino group the number of carbon atoms of which is 6 to 32, more preferably, 6 to 24, for example, anilino group, N-methylanilino group), a heterocyclic amino group (preferably, the heterocyclic amino group the number of carbon atoms of which is 1 to 32, more preferably, 1 to 18, for example, 4-pyridylamino group), a carbonamide group (preferably, the carbonamide group the number of carbon atoms of which is 2 to 48, more preferably, 2 to 24, for example, acetoamide group, benzamide group, tetradecanamide group, pyvaloylamide group, cyclohexanamide group), an ureide group (preferably, the ureide group the number of carbon atoms of which is 1 to 32, more preferably, the number of carbon atoms is 1 to 24, for example, ureide group, N,N-dimethylureide group, N-phenylureide group), an imide group (preferably, the imide group the number of carbon atoms of which is 36 or less, more preferably, the number of carbon atoms is 24 or less, for example, N-succinimide group, N-phthalimide group), an alkoxycarbonylamino group (preferably, the alkoxycarbonylamino group the number of carbon atoms of which is 2 to 48, more preferably, the number of carbon atoms is 2 to 24, for example, methoxycarbonylamino group, ethoxycarbonylamino group, t-butoxycarbonylamino group, oxtadecyloxycarbonylamino group, cyclohexyloxycarbonylamino group), an aryloxycarbonylamino group (preferably, the aryloxycarbonylamino group the number of carbon atoms of which is 7 to 32, more preferably, the number of carbon atoms is 7 to 24, for example, phenoxycarbonylamino group), a sulfonamide group (preferably, the sulfonamide group the number of carbon atoms of which is 1 to 48, more preferably, the number of carbon atoms is 1 to 24, for example, methane sulfonamide group, butane sulfonamide group, benzene sulfonamide group, hexadecane sulfonamide group, cyclohexane sulfonamide group), a sulfamoylamino group (preferably, the sulfamoylamino group the number of carbon atoms of which is 1 to 48, more preferably, the number of carbon atoms is 1 to 24, for example, N,N-dipropylsulfamoylamino group, N-ethyl-N-dodecylsulfamoylamino group), and an azo group (preferably, the azo group the number of carbon atoms of which is 1 to 32, more preferably, the number of carbon atoms is 1 to 24, for example, phenylazo group, 3-pyrazolylazo group).

An alkylthio group (preferably, the alkylthio group the number of carbon atoms of which is 1 to 48, more preferably, the number of carbon atoms is 1 to 24, for example, methylthio group, ethylthio group, octylthio group, cyclohexylthio group), an arylthio group (preferably, the arylthio group the number of carbon atoms of which is 6 to 48, more preferably, the number of carbon atoms is 6 to 24, for example, phenylthio group), a heterocyclicthio group (preferably, the heterocyclicthio group the number of carbon atoms of which is 1 to 32, more preferably, the number of carbon atoms is 1 to 18, for example, 2-benzothiazolylthio group, 2-pyridylthio group, 1-phenyltetrazolylthio group), an alkylsulfinyl group (preferably, the alkylsulfinyl group the number of carbon atoms of which is 1 to 32, more preferably, the number of carbon atoms is 1 to 24, for example, dodecane sulfinyl group), the arylsulfinyl group (preferably, the arylsulfinyl group the number of carbon atoms of which is 6 to 32, more preferably, the number of carbon atoms is 6 to 24, for example, phenylsulfinyl group), an alkylsulfonyl group (preferably, the alkylsulfonyl group the number of carbon atoms of which is 1 to 48, more preferably, the number of carbon atoms is 1 to 24, for example, methylsulfonyl group, ethylsulfonyl group, propylsulfonyl group, butylsulfonyl group, isopropylsulfonyl group, 2-ethylhexylsulfonyl group, hexadecylsulfonyl group, octylsulfonyl group, cyclohexylsulfonyl group), an arylsulfonyl group (preferably, the arylsulfonyl group the number of carbon atoms of which is 6 to 48, more preferably, the number of carbon atoms is 6 to 24, for example, phenylsulfonyl group, 1-naphthylsulfonyl group), a sulfamoyl group (preferably, the sulfamoyl group the number of carbon atoms of which is 32 or less, more preferably, the number of carbon atoms is 24 or less, for example, sulfamoyl group, N,N-dipropylsulfamoyl group, N-ethyl-N-dodecylsulfamoyl group, N-ethyl-N-phenylsulfamoyl group, N-cyclohexylsulfamoyl group), the sulfo group, a phosphonyl group (preferably, the phosphonyl group the number of carbon atoms of which is 1 to 32, more preferably, the number of carbon atoms is 1 to 24, for example, phenoxyphosphonyl group, octyloxyphosphonyl group, phenylphosphonyl group), and a phosphinoylamino group (preferably, the phosphinoylamino group the number of carbon atoms of which is 1 to 32, more preferably, the number of carbon atoms is 1 to 24, for example, diethoxyphosphinoylamino group, dioctyloxyphosphinoylamino group).

When the univalent groups described above are those that can be further substituted, it may also be further substituted by any of the groups described above. Further, when the univalent groups have two or more substituents, these substituents may be the same or different.

In General Formula (I), $R^1$ and $R^2$, $R^2$ and $R^3$, $R^4$ and $R^5$, and $R^5$ and $R^6$ may be bonded to each other independently to form a five-membered, six-membered, or seven-membered ring. As a ring to be formed, there is a saturated or unsaturated ring. Examples of the five-membered, six-membered, or seven-membered saturated or unsaturated ring include a pyrrole ring, furan ring, thiophene ring, pyrazole ring, imidazole ring, triazole ring, oxazole ring, thiazole ring, pyrrolidine ring, piperidine ring, cyclopentene ring, cyclohexene ring, benzene ring, pyridine ring, pyrazine ring, and pyridazine ring. Among these, the benzene ring and pyridine ring are particularly preferable.

When the five-membered, six-membered, and seven-membered rings are groups that can be further substituted, they may be substituted by any of the substituents R described above. When they are substituted by two or more substituents, those substituents may be the same or different.

—Metal Atoms or Metal Compounds—

Next, metal atoms or metal compounds constituting a specific complex will be explained.

The metal atoms or metal compounds used here may be any as long as they can form a complex, and include a divalent metal atom, divalent metal oxide, divalent metal hydroxide, and divalent metal chloride.

Examples of the metal atoms or metal compounds described above include metal chlorides such as AlCl, InCl, FeCl, $TiCl_2$, $SnCl_2$, $SiCl_2$, and $GeCl_2$, metal oxides such as TiO and VO, and a metal hydroxide such as $Si(OH)_2$, in addition to Zn, Mg, Si, Sn, Rh, Pt, Pd, Mo, Mn, Pb, Cu, Ni, Co, and Fe. Among these, from the viewpoint of the stability of complexes, spectral characteristics, heat resistance, light resistance, and manufacturing suitability, Fe, Zn, Mg, Si, Pt, Pd, Mo, Mn, Cu, Ni, Co, TiO, or VO is preferable, Fe, Zn, Mg, Si, Pt, Pd, Cu, Ni, Co, or VO is more preferable, and Fe, Zn, Cu, Co, or VO (V=O) is most preferable.

Preferable aspects in a complex including the compounds represented by General Formula (I) and metal atoms or metal compounds are shown as below.

That is, mention is made of aspects in which $R^1$ and $R^6$ respectively represent independently in General Formula (I) a hydrogen atom, alkyl group, alkenyl group, aryl group, heterocyclic group, silyl group, hydroxyl group, cyano group, alkoxy group, aryloxy group, heterocyclic oxy group, acyl group, alkoxycarbonyl group, carbamoyl group, amino group, anilino group, heterocyclic amino group, carbonamide group, ureide group, imide group, alkoxycarbonylamino group, aryloxycarbonylamino group, sulfonamide group, azo group, alkylthio group, arylthio group, heterocyclic thio group, alkylsulfonyl group, arylsulfonyl group, or phosphinoylamino group, $R^2$ and $R^5$ respectively represent independently a hydrogen atom, halogen atom, alkyl group, alkenyl group, aryl group, heterocyclic group, hydroxyl group, cyano group, nitro group, alkoxyl group, aryloxy group, heterocyclic oxy group, acyl group, alkoxycarbonyl group, aryloxycarbonyl group, carbamoyl group, imide group, alkoxycarbonylamino group, sulfonamide group, azo group, alkylthio group, arylthio group, heterocyclic thio group, alkylsulfonyl group, arylsulfonyl group, or sulfamoyl group, $R^3$ and $R^4$ respectively represent independently a hydrogen atom, halogen atom, alkyl group, alkenyl group, aryl group, heterocyclic group, silyl group, hydroxyl group, cyano group, alkoxy group, aryloxy group, heterocyclic oxy group, acyl group, alkoxycarbonyl group, carbamoyl group, anilino group, carbonamide group, ureide group, imide group, alkoxycarbonyl group, sulfonamide group, azo group, alkylthio group, arylthio group, heterocyclic thio group, alkylsulfonyl group, arylsulfonyl group, sulfamoyl group, or phosphinoylamino group, $R^7$ represents a hydrogen atom, halogen atom, alkyl group, aryl group, or heterocyclic group, and the metal atom or metal compound represents Zn, Mg, Si, Pt, Pd, Mo, Mn, Cu, Ni, Co, TiO, or VO.

More preferable aspects in a complex including the compounds represented by General Formula (I) and metal atoms or metal compounds are shown as below.

That is, mention is made of aspects in which $R^1$ and $R^6$ respectively represent independently in General Formula (I) a hydrogen atom, alkyl group, alkenyl group, aryl group, heterocyclic group, cyano group, acyl group, alkoxycarbonyl group, carbamoyl group, amino group, heterocyclic amino group, carbonamide group, ureide group, imide group, alkoxycarbonylamino group, aryloxycarbonylamino group, sulfonamide group, azo group, alkylsulfonyl group, arylsulfonyl group, or phosphinoylamino group, $R^2$ and $R^5$ respectively represent independently an alkyl group, alkenyl group, aryl group, heterocyclic group, cyano group, nitro group, acyl group, alkoxycarbonyl group, aryloxycarbonyl group, carbamoyl group, imide group, alkylsulfonyl group, arylsulfonyl group, or sulfamoyl group, $R^3$ and $R^4$ respectively represent independently a hydrogen atom, alkyl group, alkenyl group, aryl group, heterocyclic group, cyano group, acyl group, alkoxycarbonyl group, carbamoyl group, carbonamide group, ureide group, imide group, alkoxycarbonylamino group, sulfonamide group, alkylthio group, arylthio group, heterocyclic thio group, alkylsulfonyl group, arylsulfonyl group, or sulfamoyl group, $R^7$ represents a hydrogen atom, halogen atom, alkyl group, aryl group, or heterocyclic group, and the metal atom or metal compound represents Zn, Mg, Si, Pt, Pd, Cu, Ni, Co, or VO.

Most preferable aspects in a complex including the compounds represented by General Formula (I) and metal atoms or metal compounds are shown as below.

That is, mention is made of aspects in which $R^1$ and $R^6$ respectively represent independently in General Formula (I) a hydrogen atom, alkyl group, aryl group, heterocyclic group, amino group, heterocyclic amino group, carbonamide group, ureide group, imide group, alkoxycarbonylamino group, sulfonamide group, azo group, alkylsulfonyl group, arylsulfonyl group, or phosphinoylamino group, $R^2$ and $R^5$ respectively represent independently the alkyl group, aryl group, heterocyclic group, cyano group, acyl group, alkoxycarbonyl group, carbamoyl group, alkylsulfonyl group, or arylsulfonyl group, $R^3$ and $R^4$ respectively represent independently a hydrogen atom, alkyl group, aryl group, or heterocyclic group, $R^7$ represents a hydrogen atom, alkyl group, aryl group, or heterocyclic group, and the metal atom or metal compound represents Zn, Cu, Co, or VO.

In particular, it is preferable that both $R^3$ and $R^4$ are phenyl groups respectively, in General Formula (I) from the standpoint of the excellent durability. The reason for that can be considered that (1) both $R^3$ and $R^4$ are phenyl groups, and therefore, the spectra of the compound become longer in wavelength and the overlapping (near 550 nm) with the spectra of the phthalocyanine-based pigment to be simultaneously used becomes greater and the energy becomes easy to be transferred, and therefore, that (2) the durability of the compound itself is increased because of the presence of the substituent that is sterically bulky.

Furthermore, it is preferable that $R^2$ and/or $R^5$ are/is 2,6-di-tert-butyl-4-methylcyclohexyloxycarbonyl groups in General Formula (I) from the standpoint of the excellent solvent solubility.

—Compounds Represented by General Formula (II-1)—

As a specific complex in the present invention, one of preferable examples is a compound represented by the following General Formula (II-1).

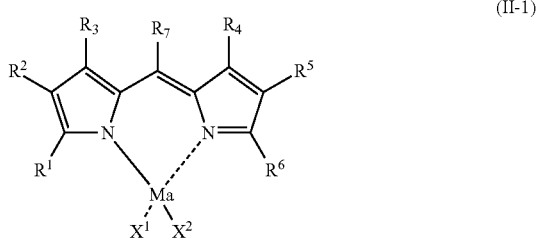

(II-1)

In General Formula (II-1), $R^1$ to $R^6$ respectively represent a hydrogen atom or substituent independently. $R^7$ represents a hydrogen atom, halogen atom, alkyl group, aryl group, or heterocyclic group. Ma represents a metal atom or metal compound, $X^2$ represents a group required to neutralize charges of Ma, and $X^1$ represents a group that can be bonded to Ma. $X^1$ and $X^2$ may be bonded to each other to form a five-membered, six-membered, or seven-membered ring.

$R^1$ to $R^6$ in General Formula (II-1) have the same meanings as those of $R^1$ to $R^6$ in General Formula (I), and the preferable aspects are also the same.

Ma in General Formula (II-1) represents a metal atom or metal compound and has the same meaning as that of the metal atom or metal compound constituting the specific complex described above, and the preferable range thereof is also the same.

$R^7$ in General Formula (II-1) has the same meaning as that of $R^7$ in General Formula (I), and the preferable aspects are also the same.

$X^1$ in General Formula (II-1) may be any group that can be bonded to Ma and mention is made, for example, of water, alcohols (for example, methanol, ethanol, propanol) etc., and further, mention is made of groups originating from the compounds described in "Metal chelate" [1] Takekazu Sakaguchi and Keihei Ueno (1995, Nankodo), "Metal chelate" [2] (1996), [3] "Metal chelate" (1997), etc.

$X^2$ in General Formula (II-1) represents a group required to neutralize charges of Ma and mention is made, for example, of a halogen atom, hydroxyl group, carboxylic acid group, phosphoric acid group, sulfonic acid group, etc.

$X^1$ and $X^2$ in General Formula (II-1) may be bonded to each other to form a five-membered, six-membered, and seven-membered ring together with Ma. The five-membered, six-membered, and seven-membered ring to be formed may be a saturated or unsaturated ring. Furthermore, the five-membered, six-membered, and seven-membered ring may be constituted only by carbon atoms and hydrogen atoms or may be a heterocyclic ring having at least one kind of atom selected from the group consisting of a nitrogen atom, oxygen atom, and sulfur atom.

—Compounds Represented by General Formula (II-2)—

As a specific complex in the present invention, one of preferable examples is a compound represented by the following General Formula (II-2).

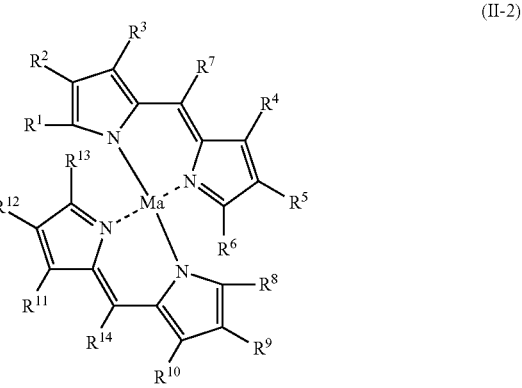

(II-2)

In General Formula (II-2), $R^1$ to $R^6$ and $R^8$ to $R^{13}$ respectively represent a hydrogen atom or substituent independently. $R^7$ and $R^{14}$ respectively represent a hydrogen atom, halogen atom, alkyl group, aryl group, or heterocyclic group independently. Ma represents a metal atom or metal compound.

$R^1$ to $R^6$ in General Formula (II-2) have the same meanings as those of $R^1$ to $R^6$ in General Formula (I), and the preferable aspects are also the same.

Substituents represented by $R^8$ to $R^{13}$ in General Formula (II-2) have the same meanings as those of the substituents represented by $R^1$ to $R^6$ of the compound represented by General Formula (I), and the preferable aspects thereof are also the same.

When the substituents represented by $R^8$ to $R^{13}$ of the compound represented by General Formula (II-2) are groups that can be further substituted, they may be substituted by any of the substituents R described above, and when they are substituted by two or more substituents, those substituents may be the same or different.

$R^7$ in General Formula (II-2) has the same meaning as that of $R^7$ in General Formula (I), and the preferable aspects are also the same.

$R^{14}$ in General Formula (II-2) represents a hydrogen atom, halogen atom, alkyl group, aryl group, or heterocyclic group, and the preferable range of $R^{14}$ is the same as the preferable range of $R^7$. When $R^{14}$ is a group that can be further substituted, it may be substituted by any of the substituents R described above and when it is substituted by two or more substituents, those substituents may be the same or different.

Ma in General Formula (II-2) represents a metal atom or metal compound and has the same meaning as that of the metal atom or metal compound constituting the specific complex described above, and the preferable range thereof is also the same.

$R^8$ and $R^9$, $R^9$ and $R^{10}$, $R^{11}$ and $R^{12}$, and $R^{12}$ and $R^{13}$ in General Formula (II-2) may be bonded respectively to each other independently to form a five-membered, six-membered, or seven-membered saturated or unsaturated ring. The saturated or unsaturated ring to be formed has the same meaning as that of the saturated or unsaturated ring to be formed by $R^1$ and $R^2$, $R^2$ and $R^3$, $R^4$ and $R^5$, and $R^5$ and $R^6$, and the preferable examples are also the same.

—Compounds Represented by General Formula (III)—

As a specific complex in the present invention, one of preferable examples is a compound represented by the following General Formula (III).

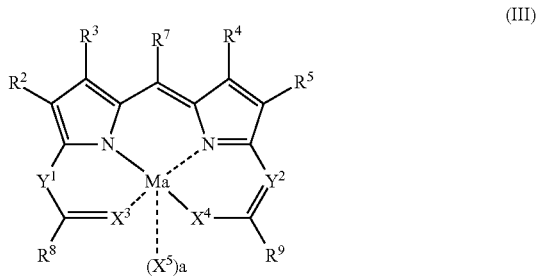

(III)

In General Formula (III), $R^2$ to $R^5$ respectively represent a hydrogen atom or substituent independently. $R^7$ represents a hydrogen atom, halogen atom, alkyl group, aryl group, or heterocyclic group. Ma represents a metal atom or metal compound, $X^3$ represents NR(R represents a hydrogen atom, alkyl group, alkenyl group, aryl group, heterocyclic group, acyl group, alkylsulfonyl group, arylsulfonyl group), nitrogen atom, oxygen atom, or sulfur atom, $X^4$ represents NRa (Ra represents a hydrogen atom, alkyl group, alkenyl group, aryl group, heterocyclic group, acyl group, alkylsulfonyl group, or arylsulfonyl group), oxygen atom, or sulfur atom, $Y^1$ represents NRc (Rc represents a hydrogen atom, alkyl group, alkenyl group, aryl group, heterocyclic group, acyl group, alkylsulfonyl group, or arylsulfonyl group), nitrogen atom, or carbon atom, $Y^2$ represents a nitrogen atom or carbon atom, and $R^8$ and $R^9$ respectively represent an alkyl group, alkenyl group, aryl group, heterocyclic group, alkoxy group, aryloxy group, alkylamino group, arylamino group, or heterocyclic amino group independently. $R^8$ and $Y^1$ may be bonded to each other to form a five-membered, six-membered, or seven-membered ring, and $R^9$ and $Y^2$ may be bonded to each other to form a five-membered, six-membered, or seven-membered ring. $X^5$ represents a group that can be bonded to Ma, and a represents 0, 1 or 2.

$R^2$ to $R^5$ and $R^7$ in General Formula (III) have the same meanings as those of $R^1$ to $R^6$ and $R^7$ in General Formula (I), and the preferable aspects are also the same.

Ma in General Formula (III) represents a metal atom or metal compound and has the same meaning as that of the metal atom or metal compound constituting the specific complex described above, and the preferable range thereof is also the same.

In General Formula (III), $R^8$ and $R^9$ respectively represent independently an alkyl group (preferably, the straight chain, branched chain, or cyclic alkyl group the number of carbon atoms of which is 1 to 36, more preferably, 1 to 12, for example, methyl group, ethyl group, propyl group, isopropyl group, butyl group, isobutyl group, t-butyl group, hexyl group, 2-ethylhexyl group, dodecyl group, cyclopropyl group, cyclopentyl group, cyclohexyl group, 1-adamantyl group), an alkenyl group (preferably, the alkenyl group the number of carbon atoms of which is 2 to 24, more preferably, 2 to 12, for example, vinyl group, allyl group, 3-butene-1-yl group), an aryl group (preferably, the aryl group the number of carbon atoms is 6 to 36, more preferably, 6 to 18, for example, phenyl group, naphthyl group), a heterocyclic group (preferably, the heterocyclic group the number of carbon atoms of which is 1 to 24, more preferably, 1 to 12, for example, 2-thienyl group, 4-pyridyl group, 2-furyl group, 2-pyrimidinyl group, 1-pyridyl group, 2-benzothiazolyl group, 1-imidazolyl group, 1-pyrazolyl group, benzotriazole-1-yl group), an alkoxyl group (preferably, the alkoxyl group the number of carbon atoms of which is 1 to 36, more preferably, 1 to 18, for example, methoxy group, ethoxy group, propyloxy group, butoxy group, hexyloxy group, 2-ethylhexyloxy group, dodecyloxy group, cyclohexyloxy group), an aryloxy group (preferably, the aryloxy group the number of carbon atoms of which is 6 to 24, more preferably, 1 to 18, for example, phenoxy group, naphthyloxy group), an alkylamino group (preferably, the alkylamino group the number of carbon atoms of which is 1 to 36, more preferably, 1 to 18, for example, methylamino group, ethylamino group, propylamino group, butylamino group, hexylamino group, 2-ethylhexylamino group, isopropylamino group, t-butylamino group, t-octylamino group, cyclohexylamino group, N,N-diethylamino group, N,N-dipropylamino group, N,N-dibutylamino group, N-methyl-N-ethylamino group), an arylamino group (preferably, the arylamino group the number of carbon atoms of which is 6 to 36, more preferably, 6 to 18, for example, phenylamino group, naphthylamino group, N,N-diphenylamino group, N-ethyl-N-phenylamino group), or a heterocyclic amino group (preferably, the heterocyclic amino group the number of carbon atoms of which is 1 to 24, more preferably, 1 to 12, for example, 2-aminopyrrole group, 3-aminopyrazole group, 2-aminopyridine group, 3-aminopyridine group).

When the alkyl group, alkenyl group, aryl group, heterocyclic group, alkoxy group, aryloxy group, alkylamino group, arylamino group, or heterocyclic amino group represented by $R^8$ and $R^9$ in General Formula (III) are groups that can be further substituted, they may be substituted by any of the substituents R described above, and when they are substituted by two or more substituent, those substituents may be the same or different.

In General Formula (III), $X^3$ represents a nitrogen atom, oxygen atom, or sulfur atom, and $X^4$ represents NRa, an oxygen atom or sulfur atom, and R and Ra respectively represent independently a hydrogen atom, an alkyl group (preferably, the straight chain, branched chain, or cyclic alkyl group the number of carbon atoms of which is 1 to 36, more preferably, 1 to 12, for example, methyl group, ethyl group, propyl group, isopropyl group, butyl group, isobutyl group, t-butyl group, hexyl group, 2-ethylhexyl group, dodecyl group, cyclopropyl group, cyclopentyl group, cyclohexyl group, 1-adamantyl group), an alkenyl group (preferably, the alkenyl group the number of carbon atoms of which is 2 to 24, more preferably, 2 to 12, for example, vinyl group, allyl group, 3-butene-1-yl group), an aryl group (preferably, the aryl group the number of carbon atoms is 6 to 36, more preferably, 6 to 18, for example, phenyl group, naphthyl group), a heterocyclic group (preferably, the heterocyclic group the number of carbon atoms of which is 1 to 24, more preferably, 1 to 12, for example, 2-thienyl group, 4-pyridyl group, 2-furyl group, 2-pyrimidinyl group, 1-pyridyl group, 2-benzothiazolyl group, 1-imidazolyl group, 1-pyrazolyl group, benzotriazole-1-yl group), an acyl group (preferably, the acyl group the number of carbon atoms of which is 1 to 24, more preferably, 2 to 18, for example, acetyl group, pivaloyl group, 2-ethylhexyl group, benzoyl group, cyclohexanoyl group), an alkylsulfonyl group (preferably, the alkylsulfonyl group the number of carbon atoms of which is 1 to 24, more preferably, 1 to 18, for example, methylsulfonyl group, ethylsulfonyl group, isopropylsulfonyl group, cyclohexylsulfonyl group), and an arylsulfonyl group (preferably, the arylsulfonyl group the number of carbon atoms of which is 6 to 24, more preferably, 6 to 18, for example, phenylsulfonyl group, naphthylsulfonyl group).

The alkyl group, alkenyl group, aryl group, heterocyclic group, acyl group, alkylsulfonyl group, and the arylsulfonyl group of R and Ra described above may be further substituted by any of the substituents R, and when substituted by two or more substituents, those substituents may be the same or different.

In General Formula (III), $Y^1$ represents NRc, a nitrogen atom or carbon atom, $Y^2$ represents a nitrogen atom or carbon atom, and Rc has the same meaning as that of R in $X^3$ described above.

In General Formula (III), $R^8$ and $Y^1$ may be bonded to each other to form a five-membered ring (for example, cyclopentane, pyrrolidine, tetrahydrofuran, dioxolane, tetrahydrothiophene, pyrrole, furan, thiophene, indole, benzofuran, benzothiophene), a six-membered ring (for example, cyclohexane, piperidine, piperadine, morpholine, tetrahydropyran, dioxane, pentamethylenesulfid, diathin, benzene, piperidine, piperadine, pyridazine, quinoline, quinazoline) or a seven-membered ring (for example, cycloheptane, hexamethyleneimine) along with $R^8$, $Y^1$, and a carbon atom.

In General Formula (III), $R^9$ and $Y^2$ may be bonded to each other to form a five-membered, six-membered, or seven-membered ring along with $R^8$, $Y^1$, and a carbon atom. The five-membered, six-membered, and seven-membered ring to be formed include a ring in which one of the bonds in the ring formed by the $R^8$, $Y^1$, and the carbon atom described above has changed to a double bond.

In General Formula (III), when the five-membered, six-membered, and seven-membered rings formed by $R^8$ and $Y^1$ or $R^9$ and $Y^2$ being bonded to each other are rings that can be further substituted, they may be substituted by any of the substituents R described above, and when they are substituted by two or more substituents, those substituents may be the same or different.

In General Formula (III), $X^5$ represents a group that can be bonded to Ma and includes a group which is similar to $X^1$ in General Formula (II-1).

a represents 0, 1, or 2.

Preferable aspects of the compound represented by General Formula (III) are shown below.

That is, $R^2$ to $R^5$, $R^7$ and Ma are preferable aspects, respectively, of the complex that includes the compound represented by General Formula (I) and the metal atom or metal compound, and $X^3$ represents NR(R is a hydrogen atom, alkyl group), a nitrogen atom, or oxygen atom, $X^4$ represents NRa (Ra is a hydrogen atom, alkyl group, heterocyclic group), or an oxygen atom, $Y^1$ represents NRc (Rc is a hydrogen atom or alkyl group), a nitrogen atom, or carbon atom, $Y^2$ represents a nitrogen atom or carbon atom, $X^5$ represents a group that is bonded via an oxygen atom, $R^8$ and $R^9$ respectively represent an alkyl group, aryl group, heterocyclic group, alkoxy group, or amino group independently, or $R^8$ and $Y^1$ are bonded to each other to form a five-membered or six-membered ring, and $R^9$ and $Y^2$ are bonded to each other to form a five-membered or six-membered ring, and a is represented by 0 or 1.

More preferable aspects of the compound represented by General Formula (III) are shown below.

That is, $R^2$ to $R^5$, $R^7$ and Ma are preferable aspects, respectively, of the complex that includes the compound represented by General Formula (I) and the metal atom or metal compound, and $X^3$ and $X^4$ represent an oxygen atom, $Y^1$ represents NH, $Y^2$ represents a nitrogen atom, $X^5$ represents a group that is bonded via an oxygen atom, $R^8$ and $R^9$ respectively represent an alkyl group, aryl group, heterocyclic group, alkoxy group, or alkylamino group independently, or $R^8$ and $Y^1$ are bonded to each other to form a five-membered or six-membered ring, and $R^9$ and $Y^2$ are bonded to each other to form a five-membered or six-membered ring, and a is represented by 0 or 1.

Specific examples of the specific complex in the present invention are shown below, but the present invention is not limited to those.

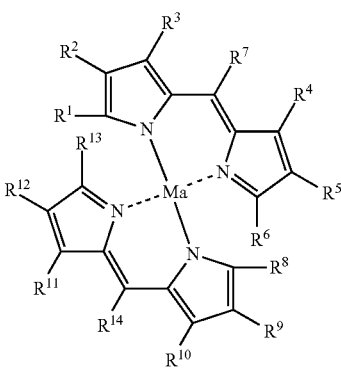

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-3 | —NH$_2$ | C$_4$H$_9$(t), —COO—⟨cyclohexyl with C$_4$H$_9$(t)⟩—CH$_3$ | —CH$_3$ | —H | Zn |

-continued
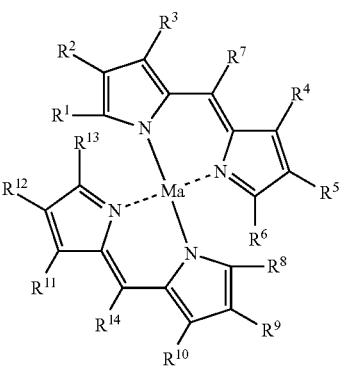
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-4 | " | —COO—⟨C$_4$H$_9$(t), CH$_3$, C$_4$H$_9$(t)⟩ | " | " | V=O |
| Ia-5 | —NHCOCH$_3$ | —COO—⟨C$_4$H$_9$(t), CH$_3$, C$_4$H$_9$(t)⟩ | " | " | Zn |
| Ia-6 | " | —COO—⟨C$_4$H$_9$(t), CH$_3$, C$_4$H$_9$(t)⟩ | " | " | Cu |
| Ia-7 | " | —COO—⟨C$_4$H$_9$(t), CH$_3$, C$_4$H$_9$(t)⟩ | " | —CH$_3$ | Zn |
| Ia-8 | —NHCOCH$_2$OCH$_2$COOH | —COO—⟨C$_4$H$_9$(t), CH$_3$, C$_4$H$_9$(t)⟩ | " | " | Zn |
| Ia-9 | " | —COO—⟨C$_4$H$_9$(t), CH$_3$, C$_4$H$_9$(t)⟩ | " | " | Zn |

-continued
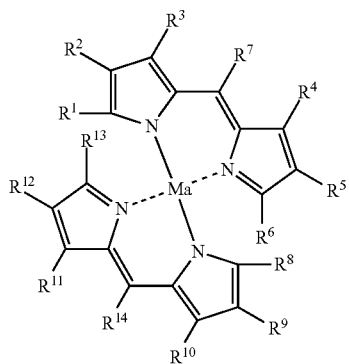
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-10 | " | 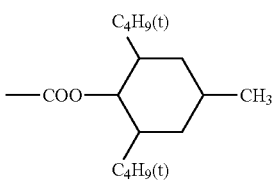 | —C$_3$H$_7$(iso) | —H | Zn |
| Ia-11 | " | 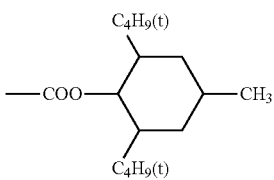 | " | —CH$_3$ | Zn |
| Ia-12 | " | 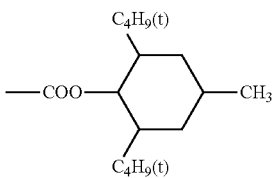 | —C$_4$H$_9$(t) | —H | Cu |
| Ia-13 | —NH$_2$ | 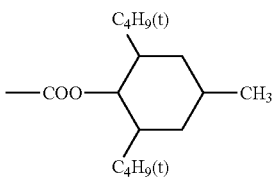 | " | —CH$_3$ | Zn |
| Ia-14 | " | 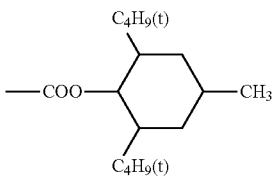 | " | —H | Zn |
| Ia-15 | " | " | 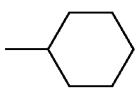 | " | Zn |

-continued

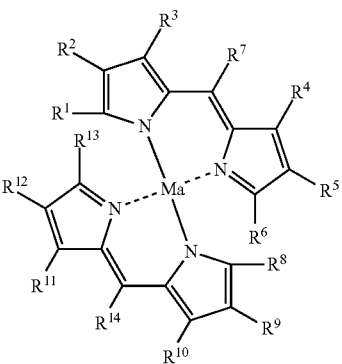

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-16 | —NHCOCH$_3$ | —COO—[2,6-di-C$_4$H$_9$(t)-4-CH$_3$-cyclohexyl] | —CH$_2$S—CH(CH$_3$)COOH | —CH$_3$ | Cu |
| Ia-17 | —NH$_2$ | —COO—[2,6-di-C$_4$H$_9$(t)-4-CH$_3$-cyclohexyl] | —C$_6$H$_5$ | —H | Zn |
| Ia-18 | " | —COO—[2,6-di-C$_4$H$_9$(t)-4-CH$_3$-cyclohexyl] | —C$_6$H$_5$ | " | Cu |
| Ia-19 | " | —COO—[2,6-di-C$_4$H$_9$(t)-4-CH$_3$-cyclohexyl] | —C$_6$H$_5$ | " | V=O |
| Ia-20 | " | —COO—[2,6-di-C$_4$H$_9$(t)-4-CH$_3$-cyclohexyl] | —C$_6$H$_5$ | —CH$_3$ | Zn |
| Ia-21 | —NHCOCH$_3$ | —COO—[2,6-di-C$_4$H$_9$(t)-4-CH$_3$-cyclohexyl] | —C$_6$H$_5$ | " | Zn |

-continued
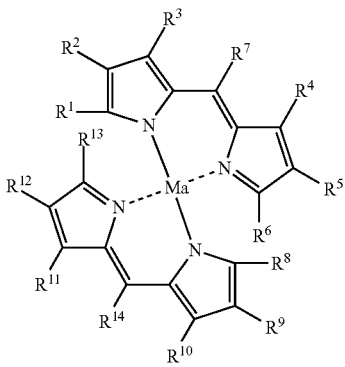
| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-22 | —NHCOCH$_2$OCH$_2$COOH |  |  | —H | Zn |
| Ia-23 | " | (same as above) | (same as above) | —CH$_3$ | Zn |
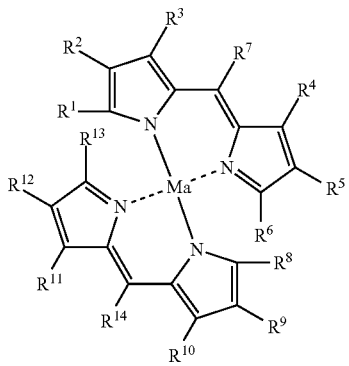
| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-24 | —NHCOCH$_2$OCH$_2$COOH | (2,6-di-t-butyl-4-methylcyclohexyl ester) | phenyl | —CH$_3$ | Cu |

-continued

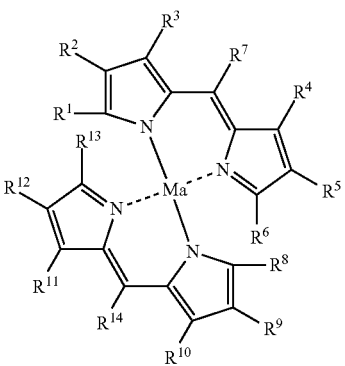

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-25 | " | —COO—[cyclohexyl with 2,6-di-C₄H₉(t), 4-CH₃] | 4-Cl-C₆H₄— | " | Zn |
| Ia-26 | " | —COO—[cyclohexyl with 2,6-di-C₄H₉(t), 4-CH₃] | 2-CH₃-C₆H₄— | " | Zn |
| Ia-27 | —NHCO—C₆H₄(2-COOH) | —COO—[cyclohexyl with 2,6-di-C₄H₉(t), 4-CH₃] | —CH₃ | —H | Cu |
| Ia-28 | —NHCO—C₆H₄(2-COOH) | —COO—[cyclohexyl with 2,6-di-C₄H₉(t), 4-CH₃] | " | —CH₃ | Zn |
| Ia-29 | —NHCO—C₆H₄(3-SO₃H) | —COO—[cyclohexyl with 2,6-di-C₄H₉(t), 4-CH₃] | " | " | Cu |
| Ia-30 | —NHCO—C₆H₄(3-SO₃H) | —COO—[cyclohexyl with 2,6-di-C₄H₉(t), 4-CH₃] | " | —CH₂—CH(C₂H₅)C₄H₉ | Cu |

-continued
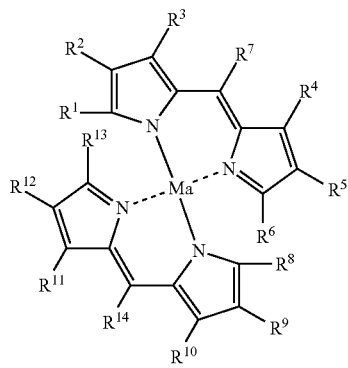
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-31 | ![N-maleimidyl] | —COO-(2,6-di-t-Bu-4-Me-cyclohexyl) | —C6H4— (phenyl) | " | Zn |
| Ia-32 | ![3-methyl-N-maleimidyl] | —COO-(2,6-di-t-Bu-4-Me-cyclohexyl) | —C6H4— (phenyl) | " | Zn |
| Ia-33 | —NHSO$_2$CH$_3$ | —COO-(2,6-di-t-Bu-4-Me-cyclohexyl) | —CH$_3$ | " | Zn |
| Ia-34 | —CH$_2$O—C$_6$H$_4$—N(SO$_2$-morpholinyl) | —COO-(2,6-di-t-Bu-4-Me-cyclohexyl) | " | " | Zn |

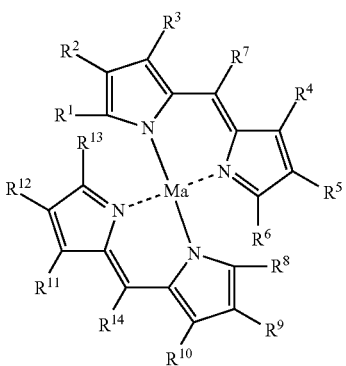
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-35 | —CH₂O—⟨C₆H₄⟩—OCH₃ | —COO—(2,6-di-C₄H₉(t)-4-CH₃-cyclohexyl) | —C₆H₅ | —CH₃ | Zn |
| Ia-36 | —N(CH₃)—SO₂CH₃ | —COO—(2,6-di-C₄H₉(t)-4-CH₃-cyclohexyl) | —C₆H₅ | " | Zn |
| Ia-37 | —N(CH₂COOH)—SO₂CH₃ | —COO—(2,6-di-C₄H₉(t)-4-CH₃-cyclohexyl) | —C₆H₅ | " | Zn |
| Ia-38 | —Cl | —COO—(2,6-di-C₄H₉(t)-4-CH₃-cyclohexyl) | —C₆H₅ | " | Cu |
| Ia-39 | —S—CH₂COOH | —COO—(2,6-di-C₄H₉(t)-4-CH₃-cyclohexyl) | —C₆H₅ | " | Cu |
| Ia-40 | —S—CH(CH₃)COOH | —COO—(2,6-di-C₄H₉(t)-4-CH₃-cyclohexyl) | —CH₃ | " | Cu |

-continued

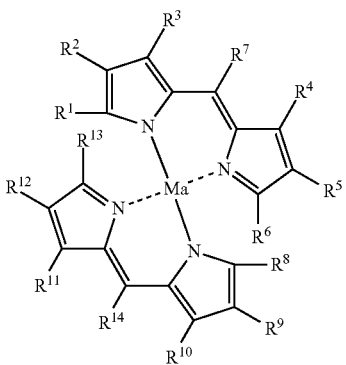

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-41 | —S—CH(CH₃)COOH | C₄H₉(t), —COO-(2,6-di-t-Bu-4-Me-cyclohexyl) | " | " | V=O |
| Ia-42 | —SO₂CH₃ | | " | " | V=O |
| Ia-43 | " | | phenyl (tolyl) | " | Cu |
| Ia-44 | 1,3,5-trimethylpyrazol-1-yl | C₄H₉(t), —COO-(2,6-di-t-Bu-4-Me-cyclohexyl) | phenyl (tolyl) | " | Cu |
| Ia-45 | —CH₃ | C₄H₉(t), —COO-(2,6-di-t-Bu-4-Me-cyclohexyl) | —CH₃ | —H | Cu |
| Ia-46 | " | C₄H₉(t), —COO-(2,6-di-t-Bu-4-Me-cyclohexyl) | " | —CH₃ | Zn |
| Ia-47 | " | C₄H₉(t), —COO-(2,6-di-t-Bu-4-Me-cyclohexyl) | " | " | Cu |
| Ia-48 | " | C₄H₉(t), —COO-(2,6-di-t-Bu-4-Me-cyclohexyl) | " | " | Ni |

-continued
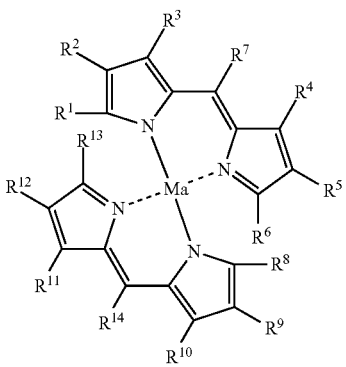
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-49 | —C$_4$H$_9$(t) | , —COO-cyclohexyl-CH$_3$, C$_4$H$_9$(t)) | " | " | Zn |
| Ia-50 | " | , —COO-cyclohexyl-CH$_3$, C$_4$H$_9$(t)) | " | " | Pd |
| Ia-51 | —CH$_2$CH$_2$COOH | , —COO-cyclohexyl-CH$_3$, C$_4$H$_9$(t)) | " | " | Zn |
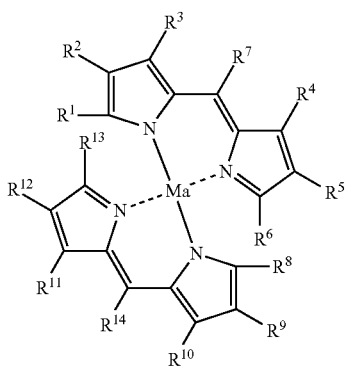
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-52 | —CH$_2$CH$_2$COOH | , —COO-cyclohexyl-CH$_3$, C$_4$H$_9$(t)) | ![phenyl] | —CH$_3$ | Zn |

-continued

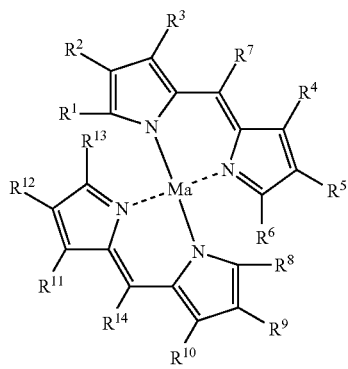

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-53 | —CH$_3$ | —COO—(cyclohexyl with C$_4$H$_9$(t), C$_4$H$_9$(t), CH$_3$) | phenyl | " | Zn |
| Ia-54 | " | —COO—(cyclohexyl with C$_4$H$_9$(t), C$_4$H$_9$(t), CH$_3$) | —C$_6$H$_4$—COOH | " | Zn |
| Ia-55 | " | —COO—(cyclohexyl with C$_4$H$_9$(t), C$_4$H$_9$(t), CH$_3$) | —C$_6$H$_4$—COOH | " | Cu |
| Ia-56 | " | —COO—(cyclohexyl with C$_4$H$_9$(t), C$_4$H$_9$(t), CH$_3$) | —C$_6$H$_4$—COOH | phenyl | Zn |
| Ia-57 | phenyl | —COO—(cyclohexyl with C$_4$H$_9$(t), C$_4$H$_9$(t), CH$_3$) | —CH$_3$ | —H | Zn |
| Ia-58 | phenyl | —COO—(cyclohexyl with C$_4$H$_9$(t), C$_4$H$_9$(t), CH$_3$) | " | —CH$_3$ | Zn |
| Ia-59 | —C$_6$H$_4$—COOH | —COO—(cyclohexyl with C$_4$H$_9$(t), C$_4$H$_9$(t), CH$_3$) | —CH$_2$O—C$_6$H$_4$—N(SO$_2$)cyclic | " | Zn |
| Ia-60 | —C$_6$H$_4$—COOH | —COOCH$_2$—CH(C$_6$H$_{13}$)(C$_8$H$_{17}$) | —CH$_2$CH$_2$—O—C$_6$H$_4$—OCH$_3$ | " | Zn |

-continued
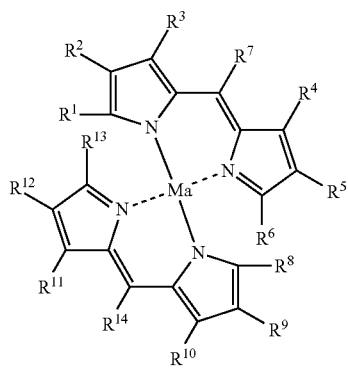
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-61 | 3-(NHCOCH₂CH₂COOH)-phenyl | —COOCH₂—CH(C₂H₅)C₄H₉ | —CH₂CH₂—O—C₆H₄—OCH₃ | " | Zn |
| Ia-62 | 2-pyridyl | —COO—(2,4-di-t-C₄H₉-5-CH₃-cyclohexyl) | —CH₂CH₂—O—C₆H₄—OCH₃ | " | Zn |
| Ia-63 | —CH₃ | —COO—(2,4-di-t-C₄H₉-5-CH₃-cyclohexyl) | —CH₂CH₂—O—C₆H₄—OCH₃ | " | Cu |
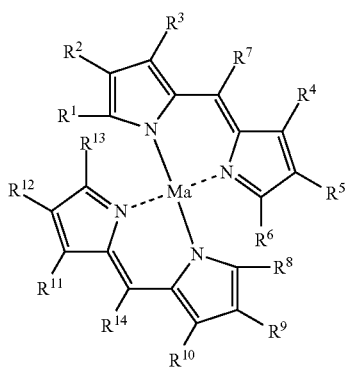
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-67 | —NH₂ | —CN | —CH₃ | —H | Zn |
| Ia-68 | —NHCOCH₃ | " | " | —CH₃ | Zn |
| Ia-69 | —CH₃ | " | " | " | Zn |
| Ia-70 | " | " | —C₆H₄—CH₃ | " | Zn |

-continued

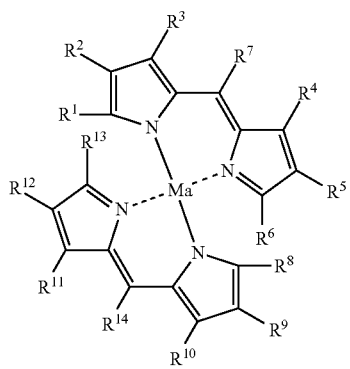

| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-71 | —C₁₃H₂₇ | " | —CH₃ | ⟨phenyl⟩ | Cu |
| Ia-72 | —NH₂ | " | —CF₃ | ⟨phenyl⟩ | Cu |
| Ia-73 | —NHCOCH₂OCH₂COOH | " | " | ⟨phenyl⟩ | Cu |
| Ia-74 | —NHCO—CH(C₄H₉)O—⟨C₆H₄⟩—N(thiomorpholine-SO₂) | " | " | —CH₃ | Zn |
| Ia-75 | ⟨C₆H₄⟩—CO—N(CH₂CH₂OCH₃)₂ | " | —C₃H₇(iso) | " | Zn |
| Ia-76 | ⟨C₆H₄⟩—CO—N(CH₂CH₂OCH₃)₂ | " | ⟨phenyl⟩ | " | Zn |
| Ia-77 | ⟨C₆H₄⟩—CO—N(CH₂CH₂OCH₃)₂ | " | —CF₃ | " | Zn |
| Ia-78 | —NHCOCH₂OCH₂COOH | " | ⟨C₆H₄⟩—CO—N(CH₂CH₂OCH₃)₂ | " | Zn |
| Ia-79 | ⟨2-pyridyl⟩ | —COO—⟨2,6-di-t-Bu-4-Me-cyclohexyl⟩ | ⟨2,4,6-trimethylphenyl⟩ | —H | Zn |
| Ia-80 | ⟨2-pyridyl⟩ | —COO—⟨2,6-di-t-Bu-4-Me-cyclohexyl⟩ | —C₄H₉(t) | " | Zn |
| Ia-81 | —C₁₃H₂₇ | —COO—⟨2,6-di-t-Bu-4-Me-cyclohexyl⟩ | ⟨2-pyridyl⟩ | " | Zn |

-continued
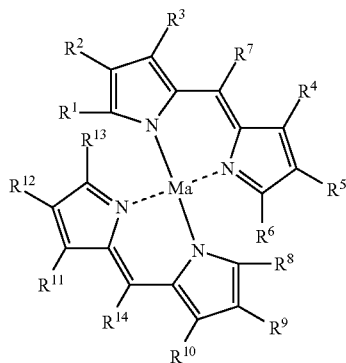
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-82 | —NHCOCH$_2$OCH$_2$COOH | —COOC$_2$H$_5$ | ![m-tolyl-SO$_2$N(CH$_2$CH$_2$OC$_2$H$_5$)$_2$] | " | Cu |
| Ia-83 | ![m-tolyl-SO$_2$-N(CH$_2$COOH)$_2$] | ![-COO-2,4-di-t-Bu-5-Me-cyclohexyl] | | —CH$_3$ | " | Zn |
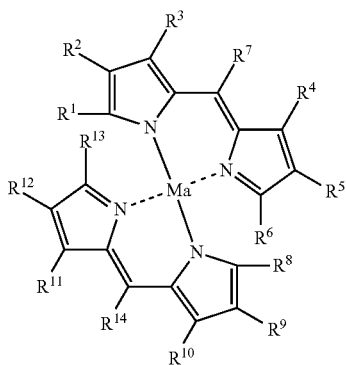
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-A | —NHCOCH$_3$ | ![-COO-2,4-di-t-Bu-5-Me-cyclohexyl] | —CH$_3$ | ![N-CH$_2$COOH-2-methylpyrrole] | Zn |

IIa-1
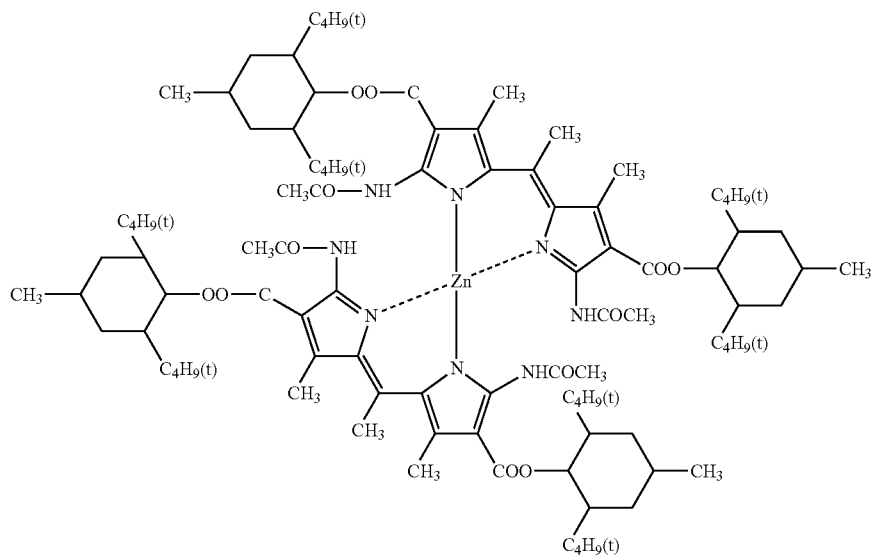
IIa-2
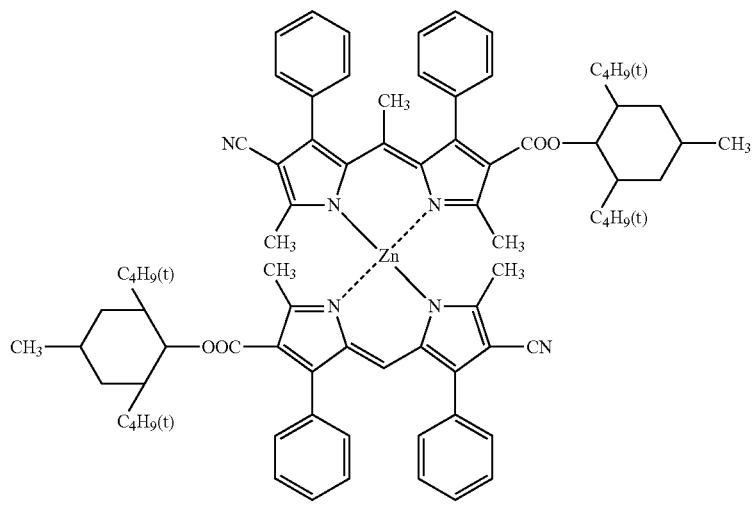
IIa-3
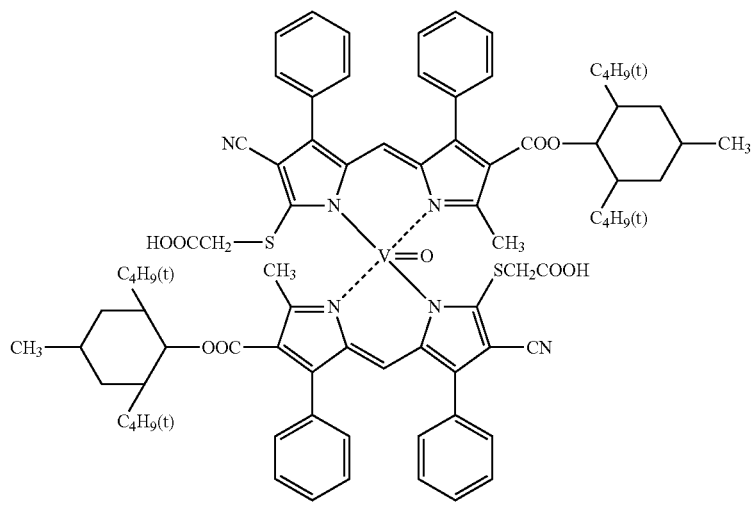

-continued
IIa-4
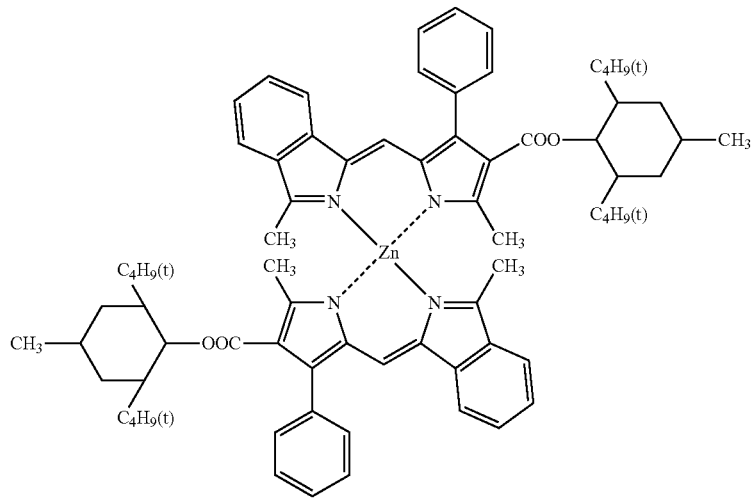
IIa-5
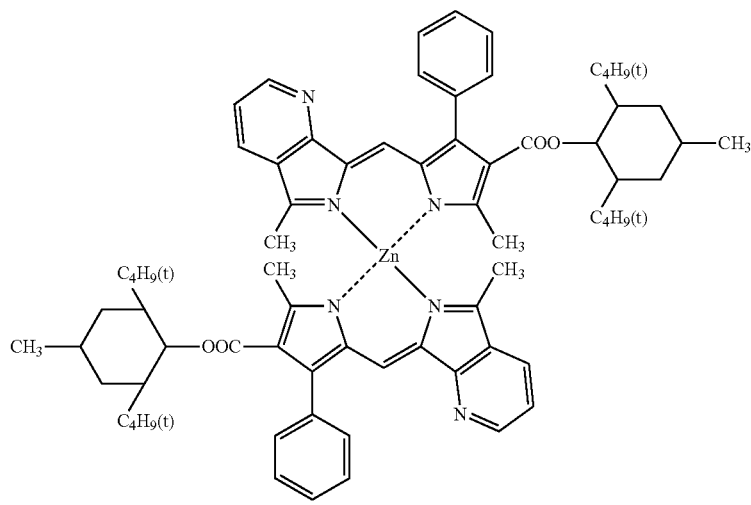
IIa-6
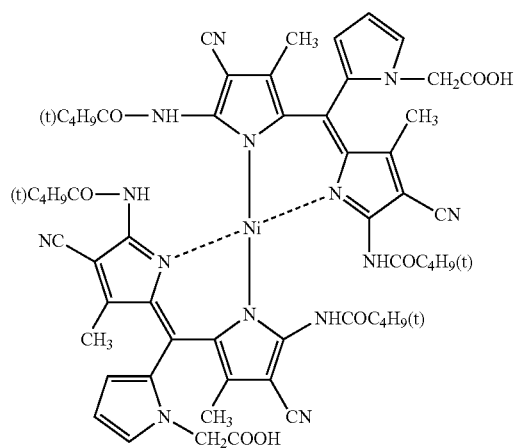

IIa-7
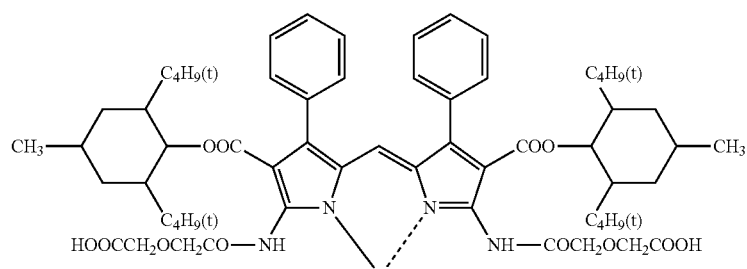
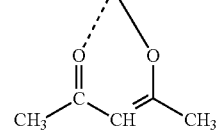
IIa-8
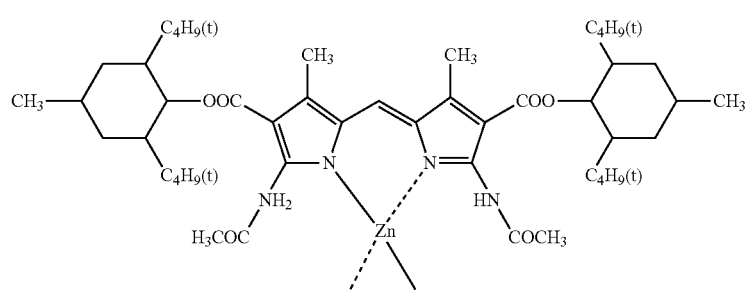
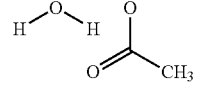
IIa-10
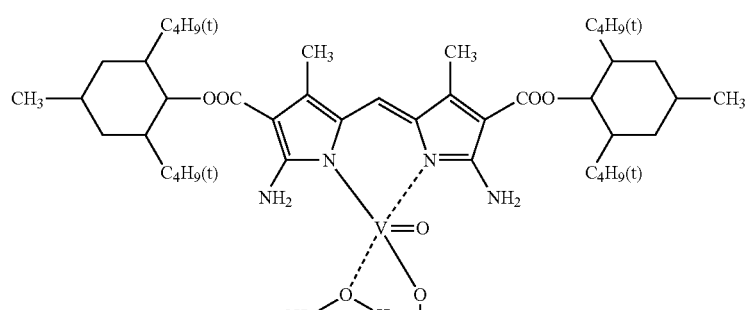
IIa-11
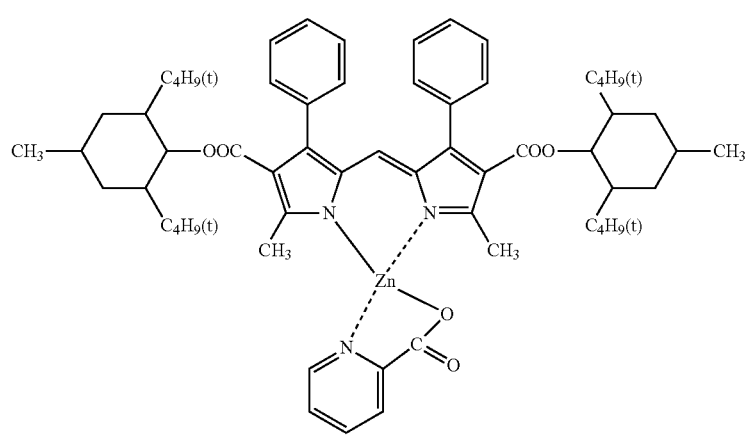

-continued
IIa-12
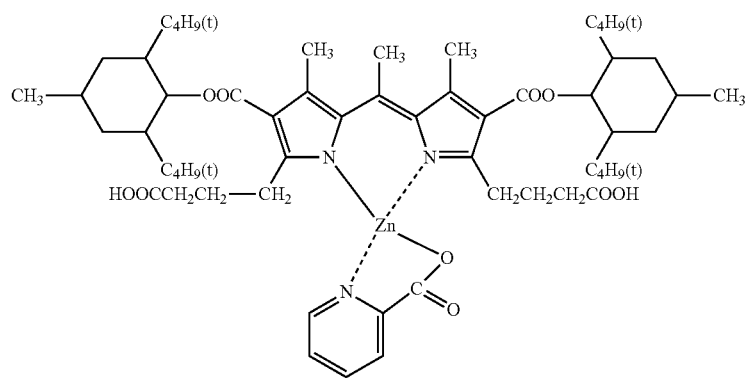
IIa-13
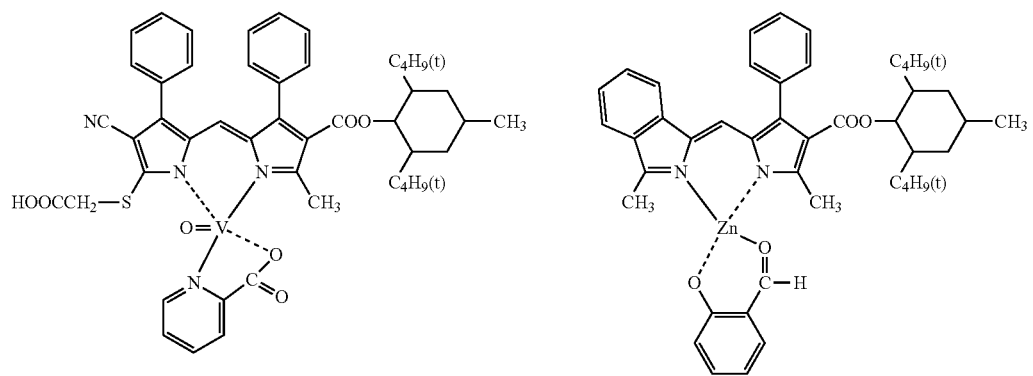
IIa-14
IIa-15
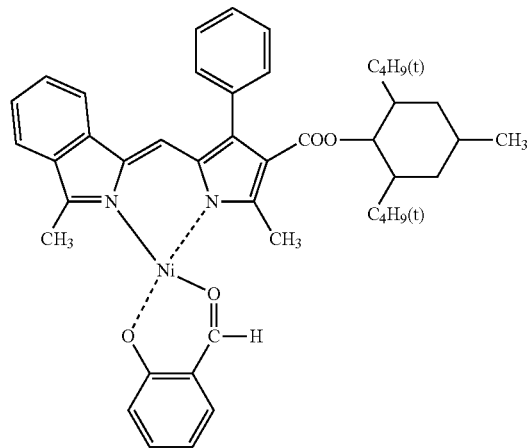
IIa-16
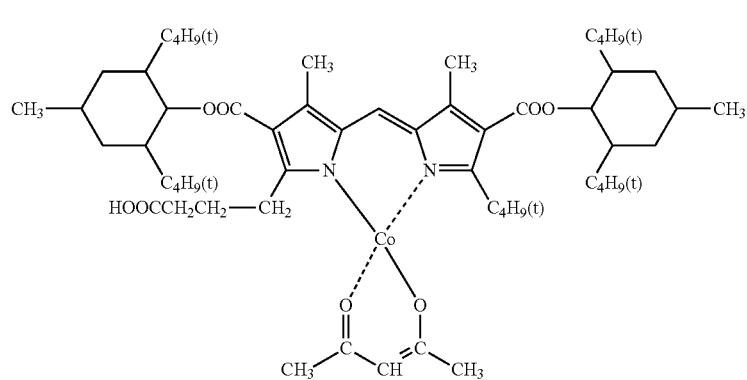

-continued
IIa-17
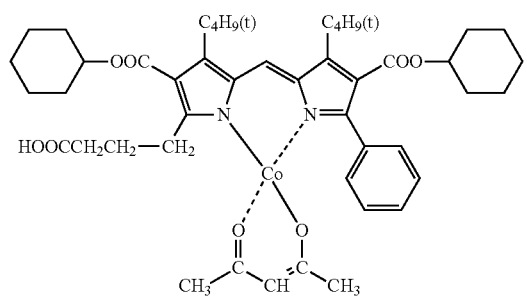
IIa-18
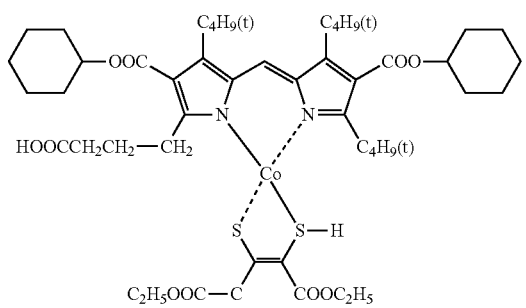
IIa-19
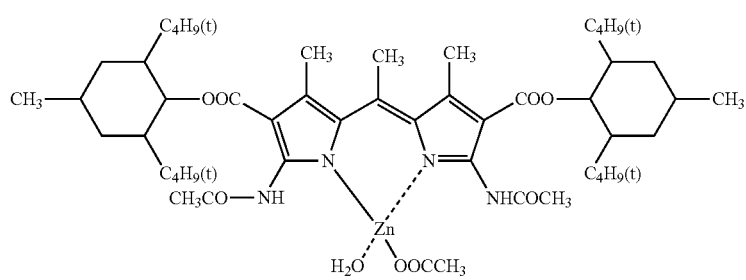
IIa-20
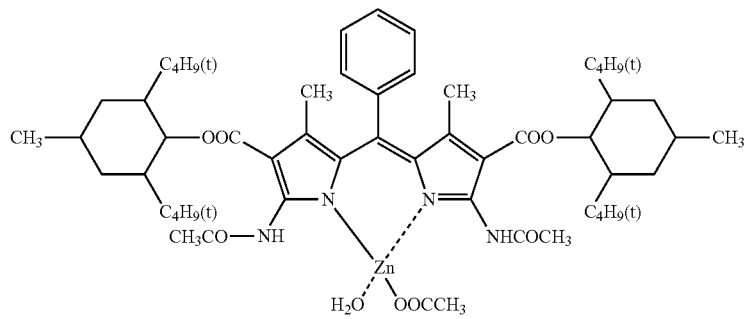
I-1
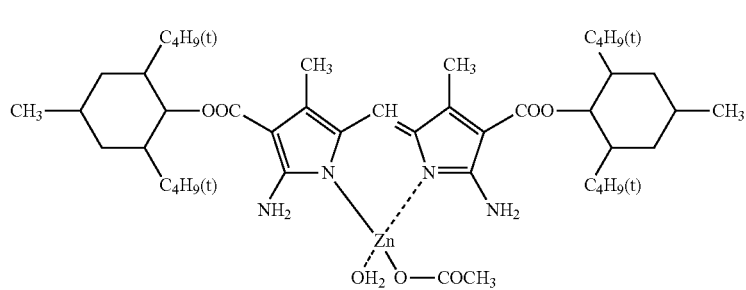
I-2
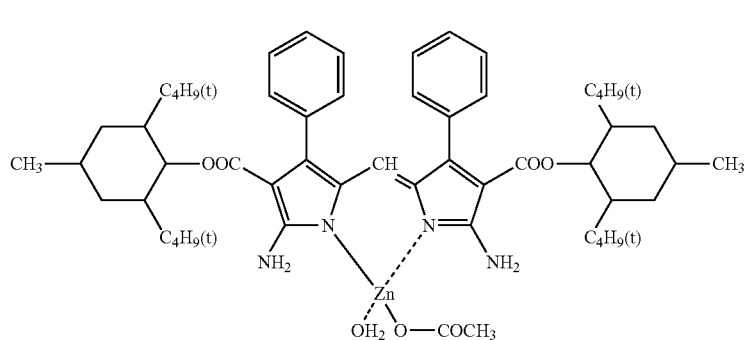

I-3
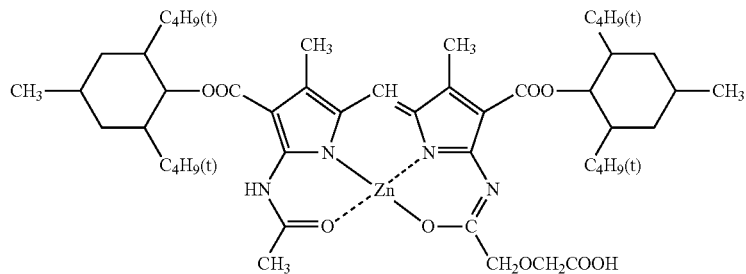
I-4
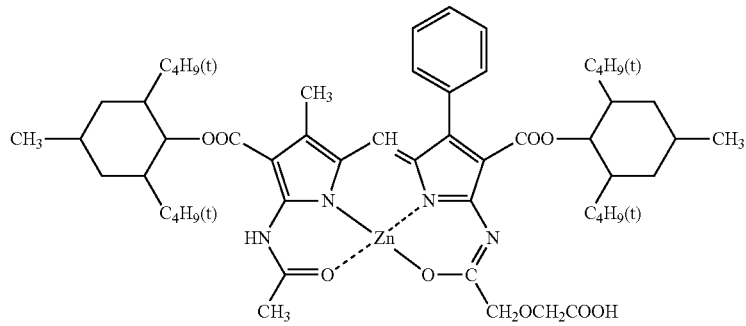
I-5
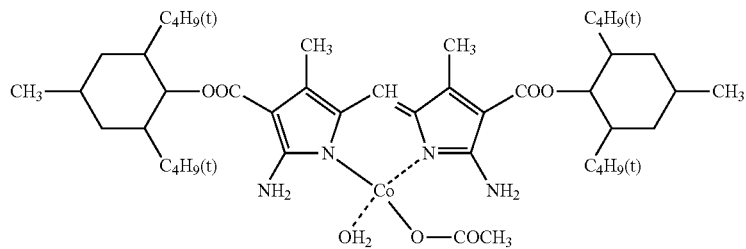
I-6
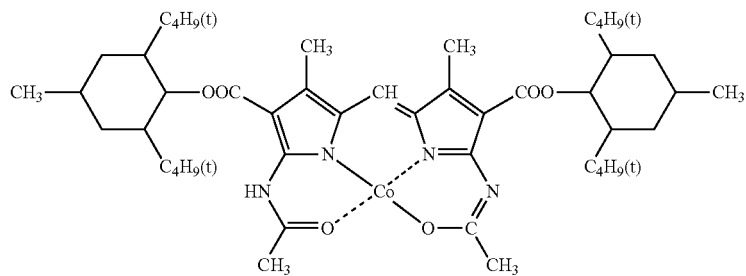
I-7
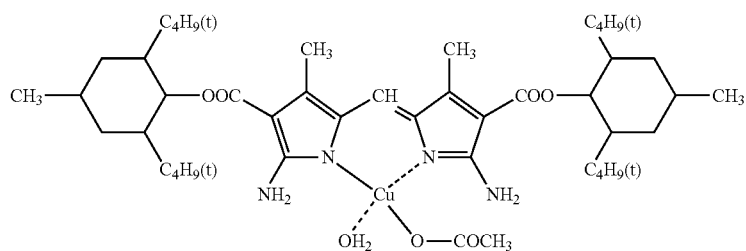

-continued
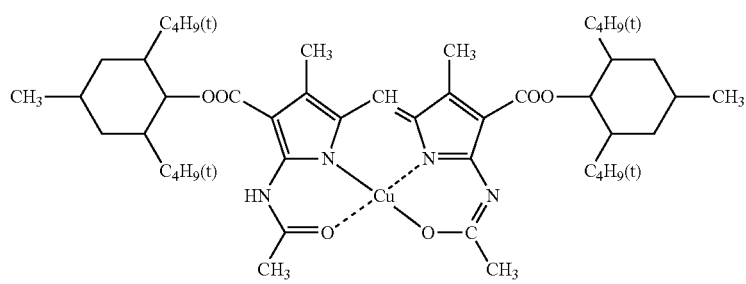
I-8
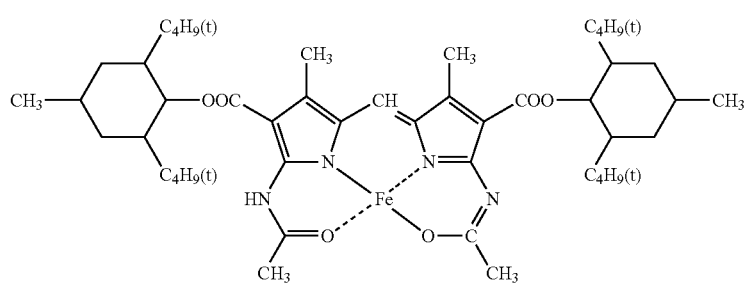
I-9
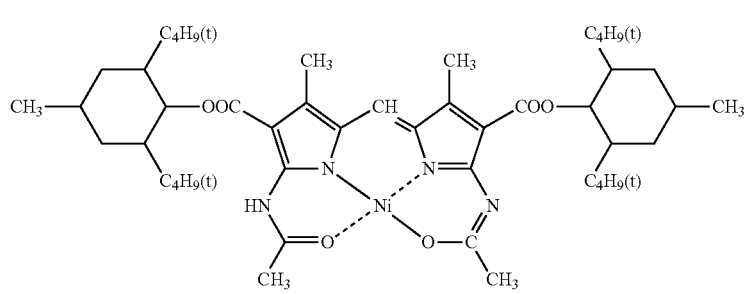
I-10
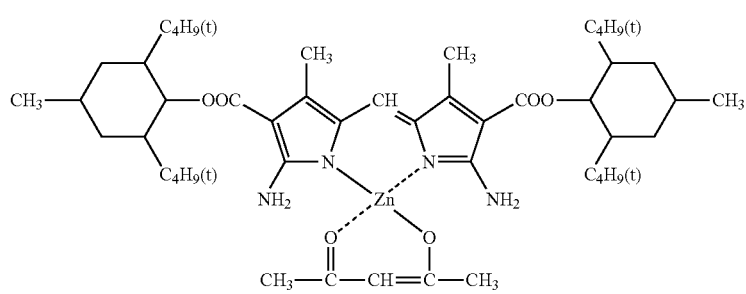
I-11
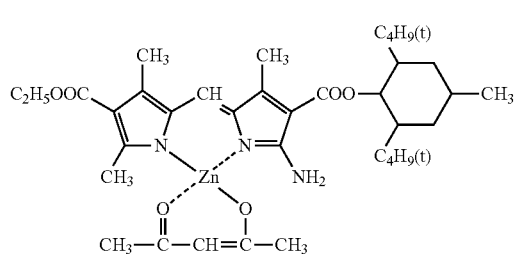
I-12

-continued
I-13
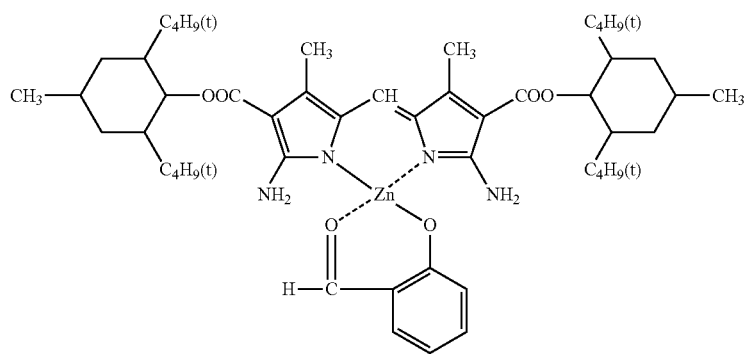
I-14
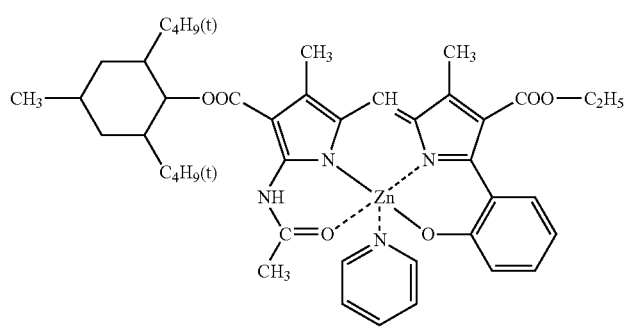
I-15
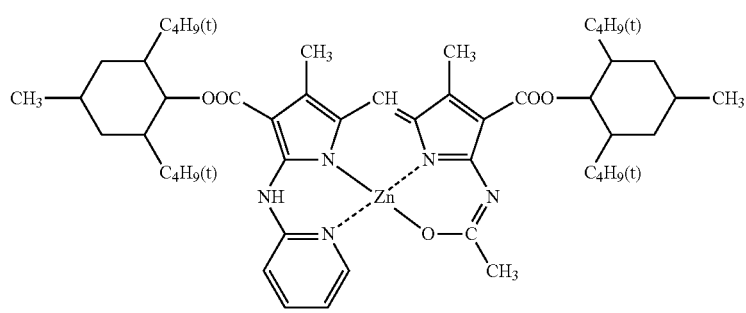
I-16
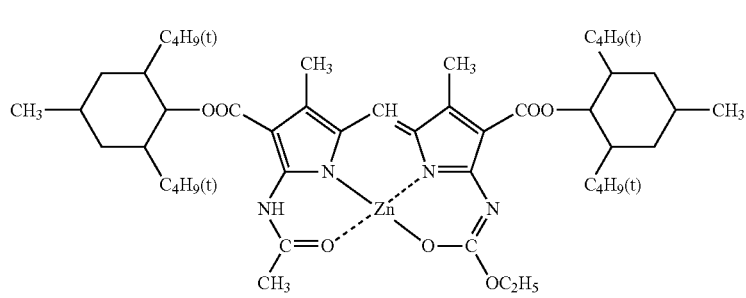
I-17
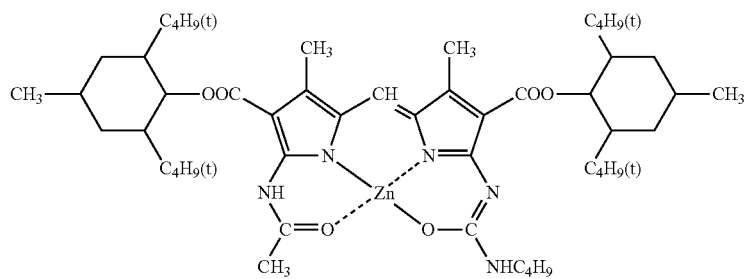

-continued
I-18
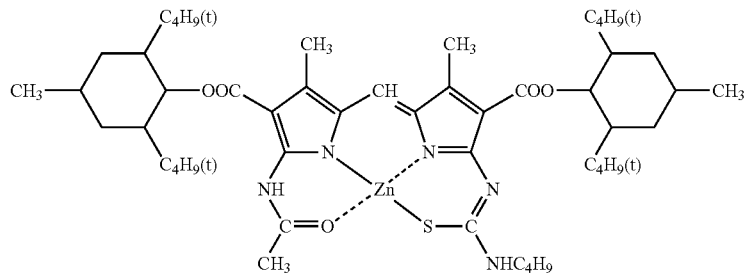
I-19
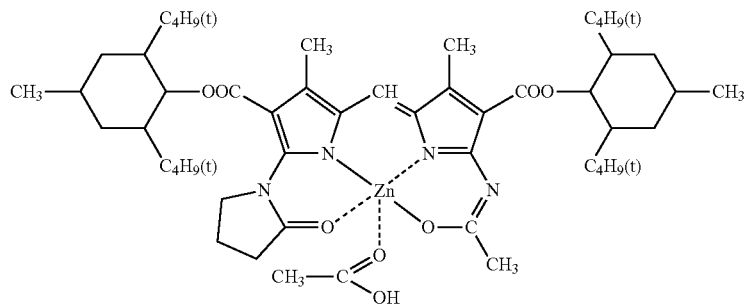
I-20
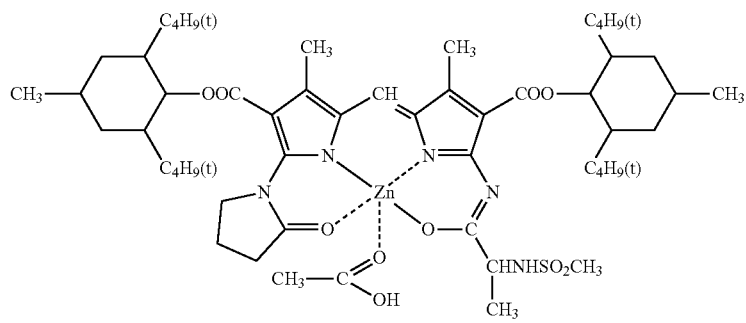
I-21
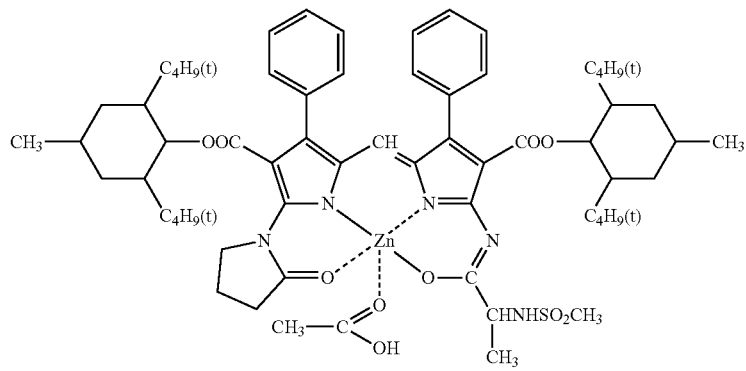
I-22
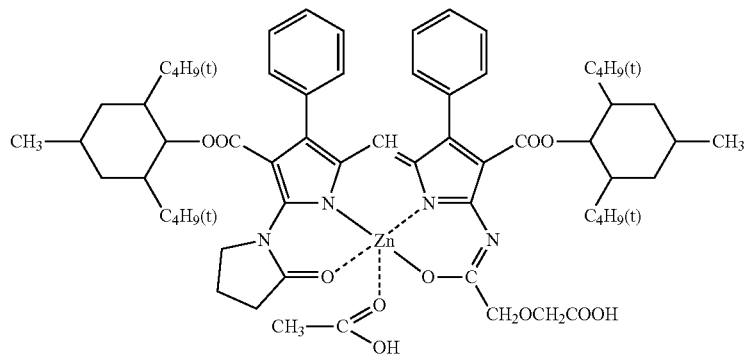

-continued
I-23
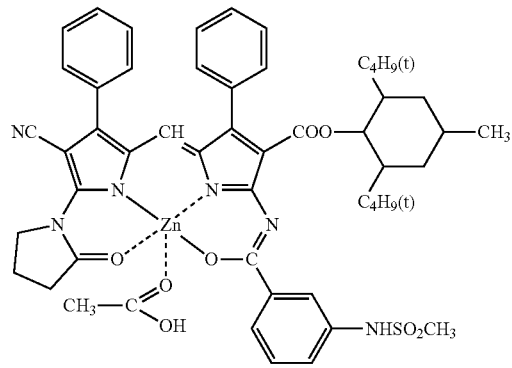
I-24
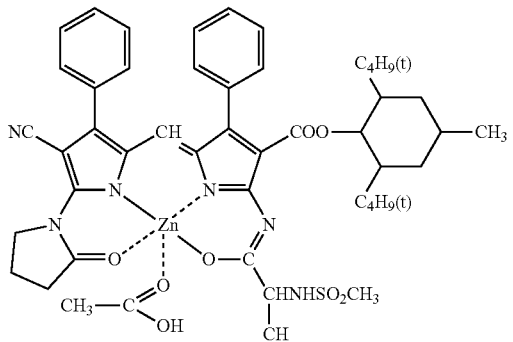
I-25
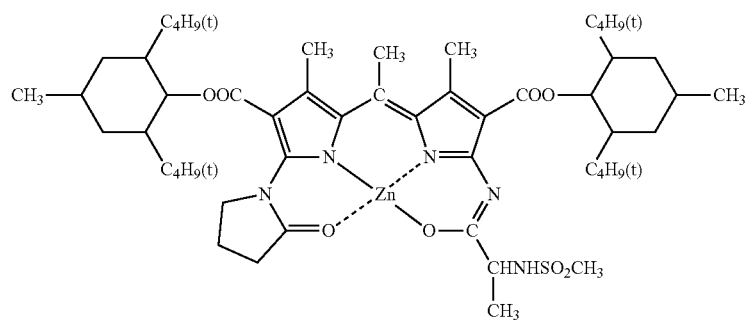
I-26
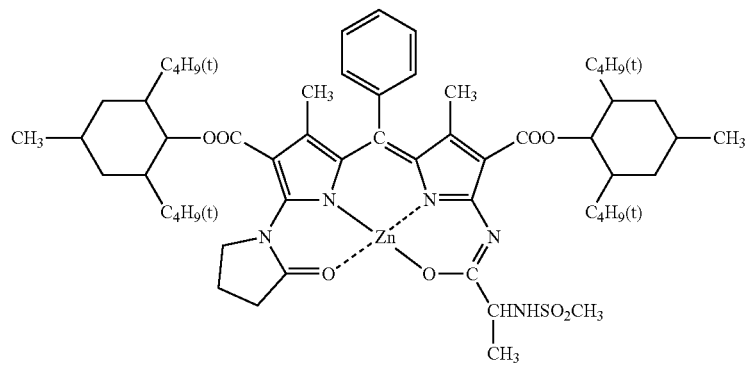
I-27
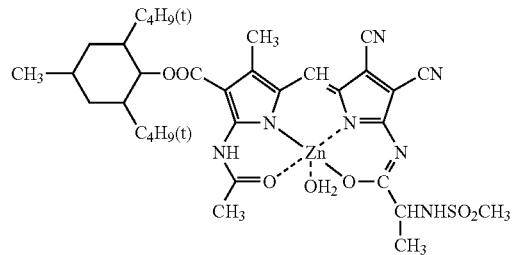
I-28
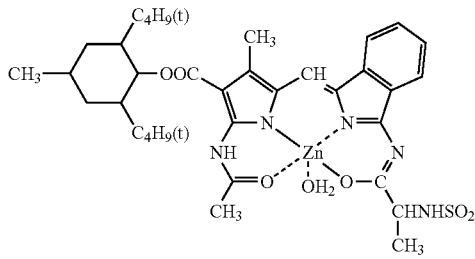
I-29
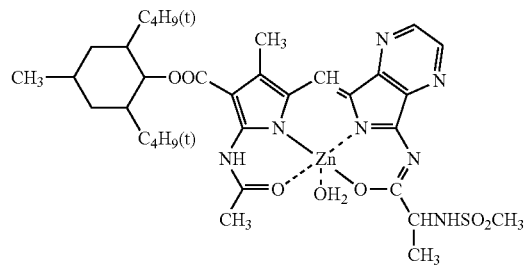

-continued
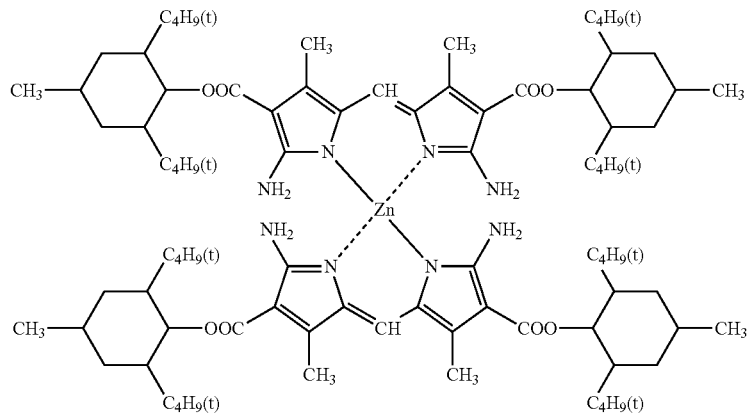
I-30
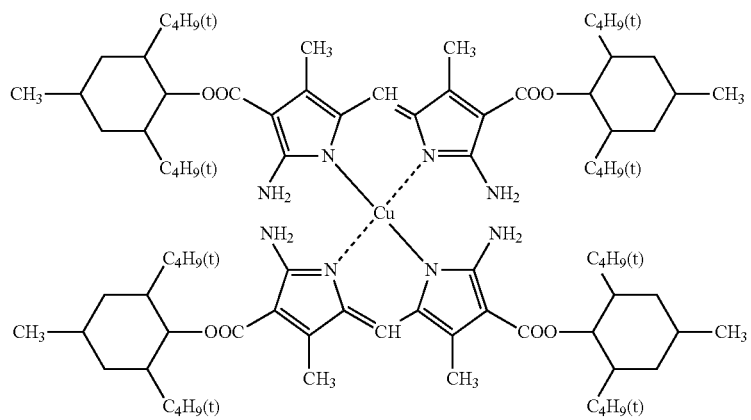
I-31
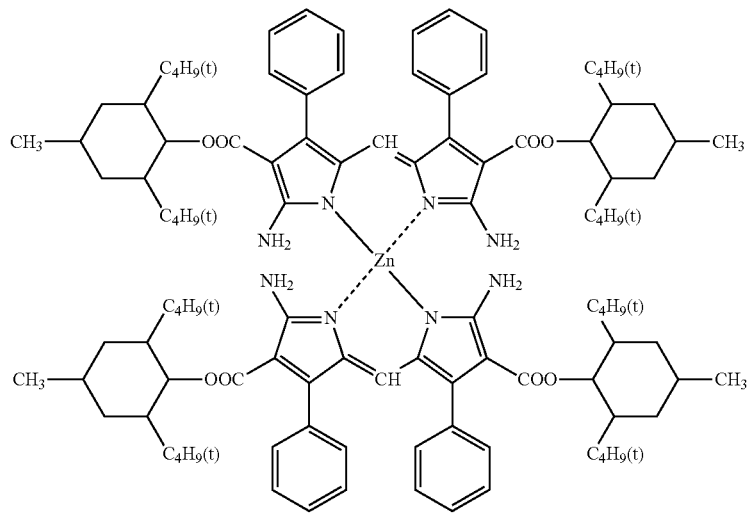
I-32

-continued
I-33
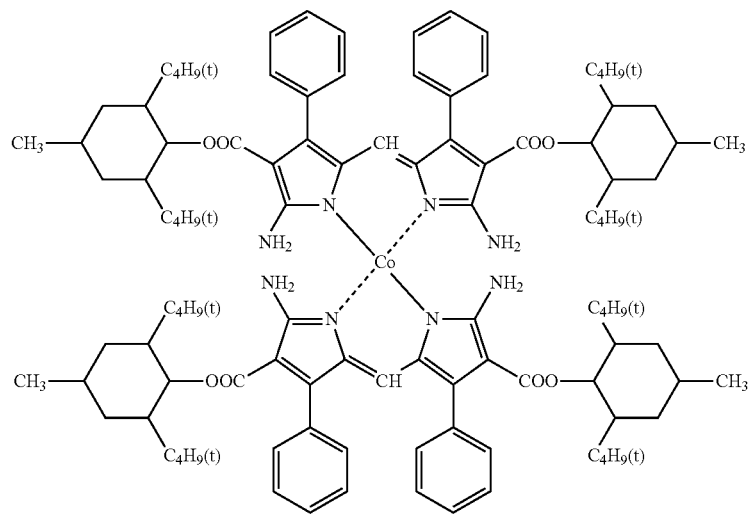
I-34
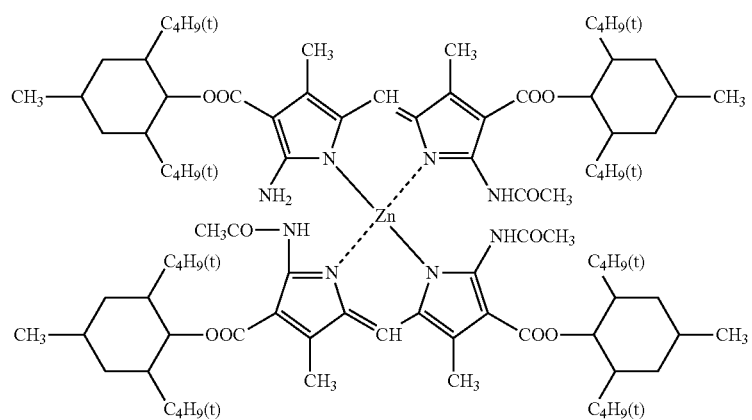
I-35
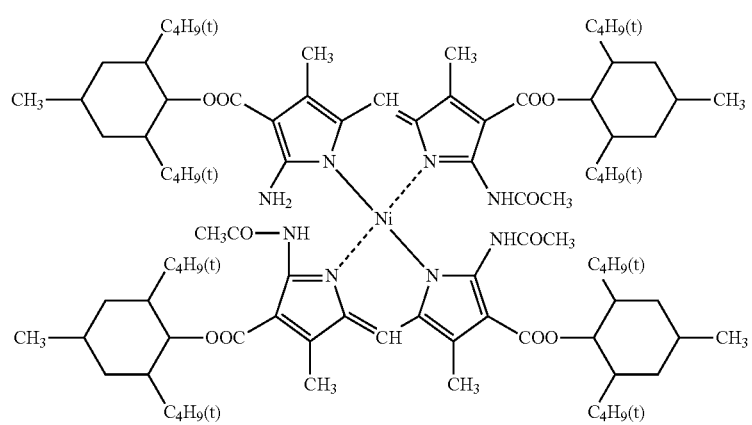

I-36
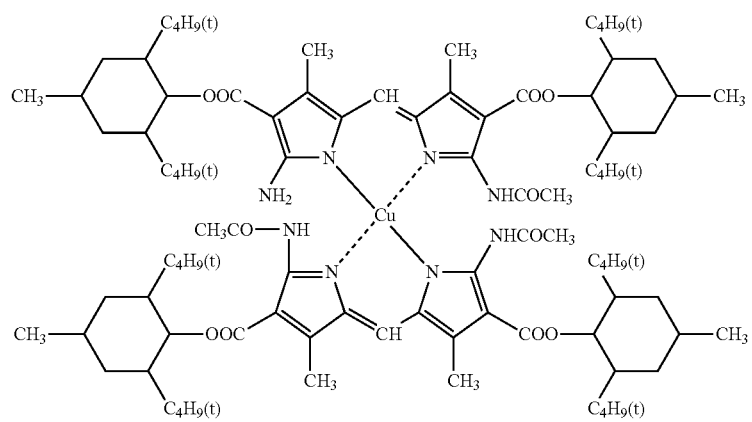
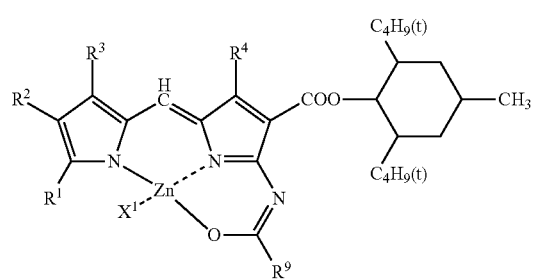
| No. | R¹ | R² | R³ | R⁴ | R⁹ | X¹ |
|---|---|---|---|---|---|---|
| II-1 | —CH₃ | —COOC₂H₅ | —CH₃ | —CH₃ | —CH₃ | H₂O |
| II-2 | " | " | " | " | —CHNHSO₂CH₃ with CH₃ | " |
| II-3 | " | " | " | " | m-(NHSO₂CH₃)phenyl | " |
| II-4 | m-(NHSO₂CH₃)phenyl | —COOCH₃ | " | " | phenyl | —CH₃ | " |
| II-5 | m-(NHSO₂CH₃)phenyl | —COOC₂H₅ | " | " | —CH₂OCH₂COOH | " |
| II-6 | " | " | " | " | —CH₃ | " |

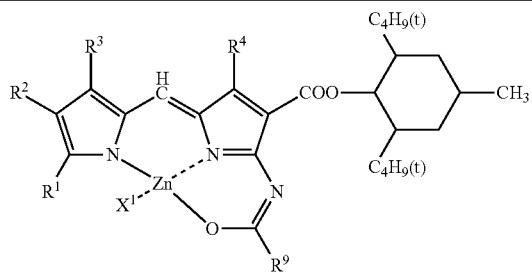
| No. | R¹ | R² | R³ | R⁴ | R⁹ | X¹ |
|---|---|---|---|---|---|---|
| II-7 | —CH₃ | —COOC₂H₅ | (phenyl) | (phenyl) | —CH₃ | H₂O |
| II-8 | (3-pyridyl) | " | " | " | " | " |
| II-9 | (3-NHSO₂CH₃-phenyl) | —CN | —CH₃ | —CH₃ | " | " |
| II-10 | (3-NHSO₂CH₃-phenyl) | " | " | " | (3-NHSO₂CH₃-phenyl) | " |
| II-11 | " | " | (phenyl) | (phenyl) | —CH₃ | " |
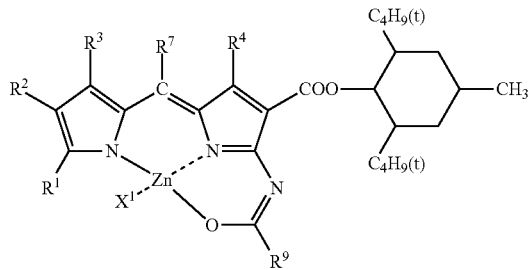
| No. | R¹ | R² | R³ | R⁴ | R⁷ | R⁹ | X¹ |
|---|---|---|---|---|---|---|---|
| II-A | —CH₃ | —COOC₂H₅ | —CH₃ | —CH₃ | (1-CH₂COOH-pyrrol-2-yl) | —CH₃ | H₂O |

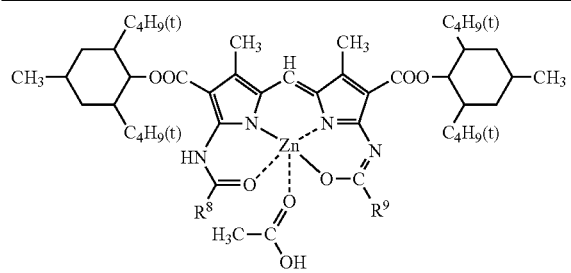
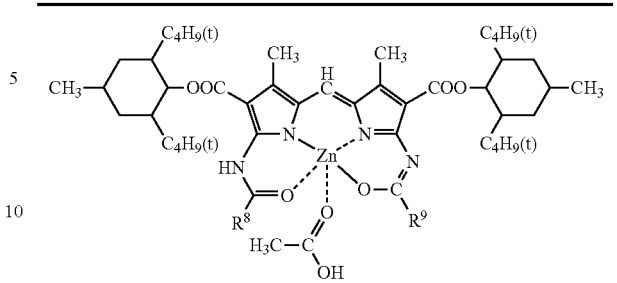

| No. | R⁸ | R⁹ |
|---|---|---|
| III-1 | —CH₃ | —CH₃ |
| III-2 | —CH(C₂H₅)C₄H₉ | —CH₃ |
| III-3 | —C₄H₉(t) | " |
| III-4 | —CH(C₂H₅)C₄H₉ | —CH(C₂H₅)C₄H₉ |
| III-5 | —C₄H₉(t) | —C₄H₉(t) |
| III-6 | —C₆H₁₁ (cyclohexyl) | —CH₃ |
| III-7 | —CH(CH₃)S—C₄H₉ | —CH₃ |
| III-8 | —CH₂OCH₃ | " |
| III-9 | —CH(C₂H₅)O—C₆H₄—OCH₃ | " |
| III-10 | —CH(C₂H₅)O—C₆H₄—N(thiomorpholine-SO₂) | " |
| III-11 | —CH(CH₃)—S—CH₂COOC₂H₅ | " |
| III-12 | —C(CH₃)=CH₂ | " |
| III-13 | —C(CH₃)₂COOCH₃ | " |
| III-14 | —CO—CH(CH₃)—COCH₃ | " |
| III-15 | —CH₂OCH₂COOC₂H₅ | " |
| III-16 | —CH₂NHSO₂CH₃ | " |
| III-17 | —CH(CH₃)NHSO₂CH₃ | " |
| III-18 | —CH(C₂H₅)NHSO₂CH₃ | " |
| III-19 | —CH(C₄H₉)NHSO₂CH₃ | " |
| III-20 | —CH(CH(CH₃)₂)NHSO₂CH₃ | " |
| III-21 | —CH(CH₃)NHSO₂—C₄H₉ | " |
| III-22 | —CH(CH₃)NHSO₂—C₆H₄—CH₃ | " |
| III-23 | —CH(CH₃)NHSO₂—C₆H₄—NHSO₂CH₃ | " |
| III-24 | —CH(CH₃)NHSO₂—N(C₂H₅)₂ | " |

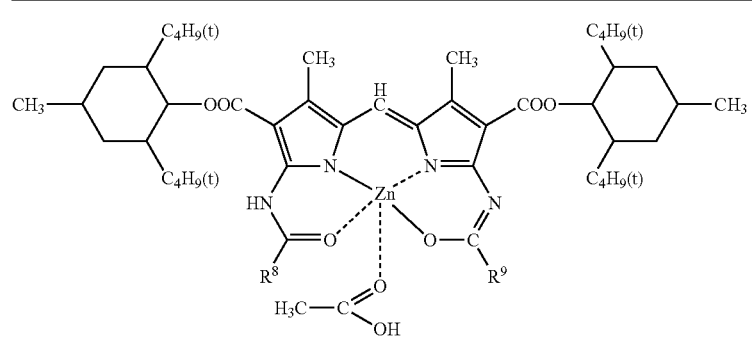
| No. | R⁸ | R⁹ |
|---|---|---|
| III-25 | ![structure: -CH(CH₃)-N-phthalimide] | —CH₃ |
| III-26 | —CH₂CH₂COOC₂H₅ | —CH₃ |
| III-27 | ![structure: -CH(CH₃)-S-(2-COOCH₃-phenyl)] | " |
| III-28 | ![structure: -CH(CH₃)-S-(2-pyridyl)] | " |
| III-29 | —CH₂NHSO₂CH₃ | —CH₂NHSO₂CH₃ |
| III-30 | —CH₂—CH(CH₃)NHSO₂CH₃ | —CH₂—CH(CH₃)NHSO₂CH₃ |
| III-31 | —CH₂NHSO₂CH₃ | —CH(C₂H₅)C₄H₉ |
| III-32 | —CH₂—CH(CH₃)NHSO₂CH₃ | —C₄H₉(t) |
| III-33 | ![phenyl] | —CH₃ |
| III-34 | ![phenyl] | —CH₂—CH(CH₃)NHSO₂CH₃ |

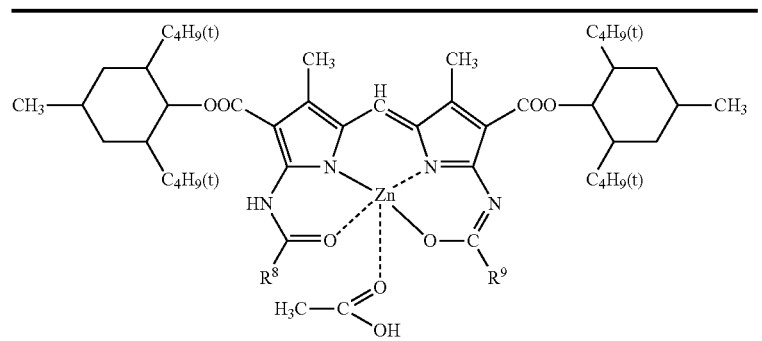
| No. | R⁸ | R⁹ |
|---|---|---|
| III-35 | —⟨C₆H₄⟩—C₄H₉(t) | —CH₃ |
| III-36 | —⟨C₆H₄⟩—NHSO₂CH₃ (meta) | —CH₃ |
| III-37 | —⟨C₆H₄⟩—NHSO₂CH₃ (ortho) | " |
| III-38 | —⟨C₆H₄⟩—NHSO₂C₆H₅ (meta) | " |
| III-39 | —⟨C₆H₄⟩—OH (ortho) | " |
| III-40 | —⟨C₆H₄⟩—OCH₃ (ortho) | " |
| III-41 | —⟨C₆H₄⟩—SO₂NH₂ (meta) | " |
| III-42 | —⟨C₆H₄⟩—SO₂N(CH₃)₂ (meta) | " |
| III-43 | —⟨C₆H₄⟩—SCH₃ (para) | " |

-continued
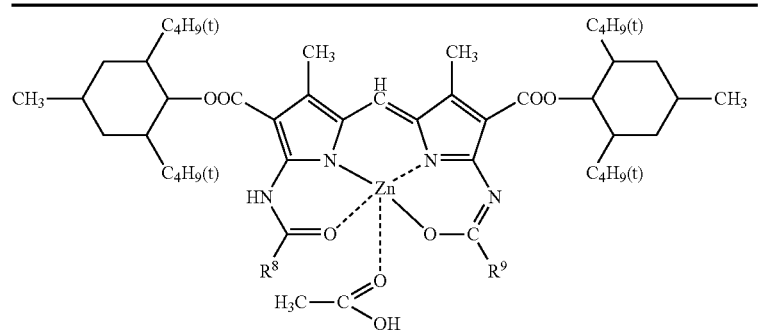
| No. | R⁸ | R⁹ |
|---|---|---|
| III-44 | —⟨C₆H₄⟩—SO₂CH₃ | " |
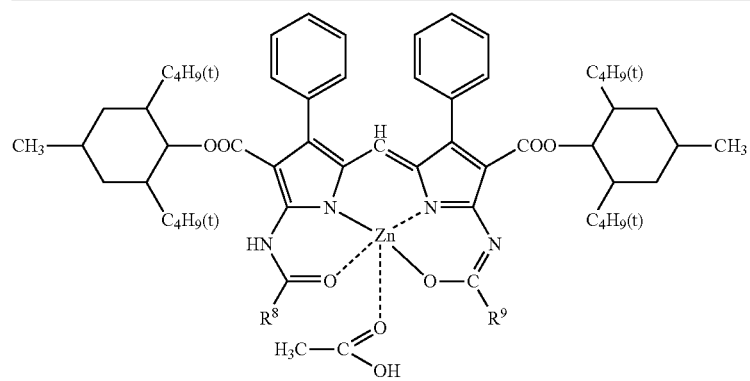
| No. | R⁸ | R⁹ |
|---|---|---|
| III-45 | —CH₃ | —CH₃ |
| III-46 | —CH(C₂H₅)C₄H₉ | —CH(C₂H₅)C₄H₉ |
| III-47 | —C₄H₉(t) | —C₄H₉(t) |
| III-48 | —C₆H₁₁ (cyclohexyl) | —C₆H₁₁ (cyclohexyl) |
| III-49 | —CH₂NHSO₂CH₃ | —CH₃ |
| III-50 | —CH₂NHSO₂CH₃ | —CH₂NHSO₂CH₃ |
| III-51 | —CH(CH₃)NHSO₂CH₃ | " |
| III-52 | —CH(CH₃)NHSO₂CH₃ | —CH(CH₃)NHSO₂CH₃ |
| III-53 | —CH(C₄H₉)NHSO₂CH₃ | " |

-continued
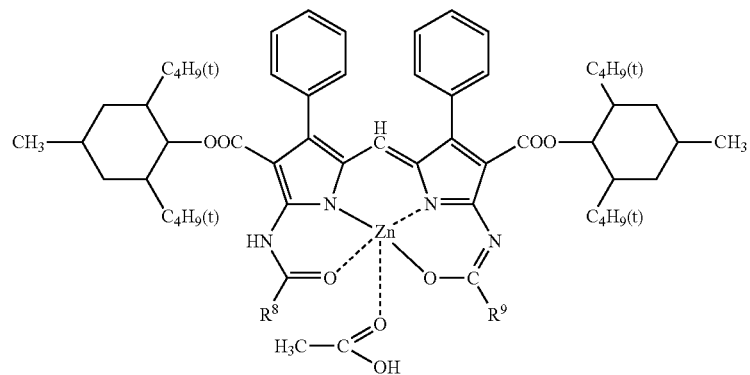
| No. | R⁸ | R⁹ |
|---|---|---|
| III-54 | 3-(NHSO₂CH₃)-phenyl | —CH₃ |
| III-55 | 3-(NHSO₂CH₃)-phenyl | 3-(NHSO₂CH₃)-phenyl |
| III-56 | 3-(SO₂NHCOCH₃)-phenyl | " |
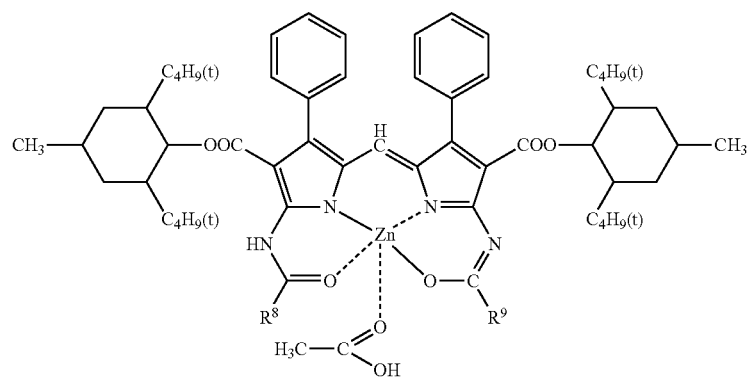
| No. | R⁸ | R⁹ |
|---|---|---|
| III-57 | 2,3,5-trimethylphenyl | —CH₃ |

-continued
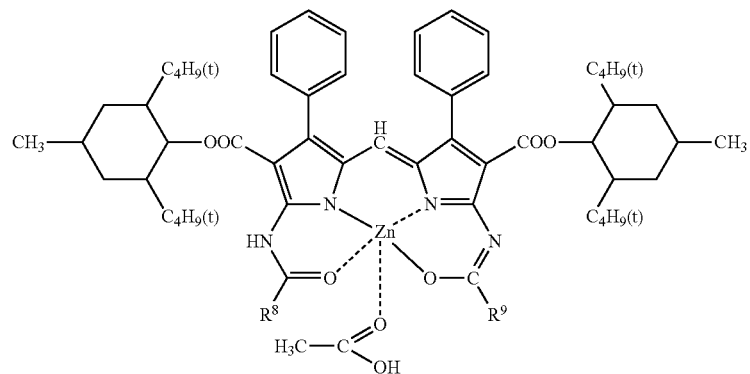
| No. | R⁸ | R⁹ |
|---|---|---|
| III-58 | 2,4,6-trimethylphenyl | 2,4,6-trimethylphenyl |
| III-59 | 2-(OCH₂CH₂OH)phenyl | " |
| III-60 | 3-(COOCH₃)phenyl | —CH₃ |
| III-61 | 2,5-dimethoxy-3-methylphenyl | " |
| III-62 | 2-(NHSO₂CH₃)phenyl | " |
| III-63 | 2-pyridyl | " |
| III-64 | 2-pyridyl | 2-pyridyl |

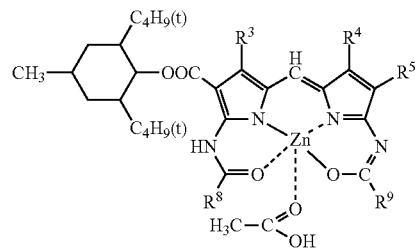
| No. | R³ | R⁴ | R⁵ | R⁸ | R⁹ |
|---|---|---|---|---|---|
| III-65 | —CH₃ | —CH₃ | —COOC₂H₅ | —CH₃ | —CH₃ |
| III-66 | " | " | " | —CH(CH₃)NHSO₂CH₃ | —CH(CH₃)NHSO₂CH₃ |
| III-67 | " | " | " | -m-C₆H₄-NHSO₂CH₃ | -m-C₆H₄-NHSO₂CH₃ |
| III-68 | —C₆H₅ | " | " | —CH₃ | —CH₃ |
| III-69 | —C₆H₅ | —C₆H₅ | " | " | " |
| III-70 | —CH₃ | —C₆H₅ | —COO-(2,6-di-t-C₄H₉-4-CH₃-C₆H₂) | " | —CH₂NHSO₂-p-C₆H₄-CH₃ |
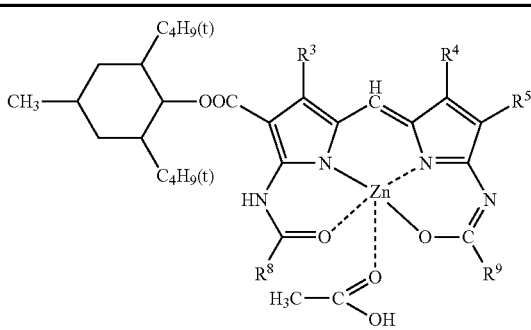
| No. | R³ | R⁴ | R⁵ | R⁸ | R⁹ |
|---|---|---|---|---|---|
| III-71 | —C₆H₅ | —C₆H₅ | —CON(CH₃)₂ | —CH₃ | —CH₂NHSO₂-p-C₆H₄-CH₃ |
| III-72 | " | " | —CON(iso-C₃H₇)₂ | " | " |
| III-73 | " | " | —CONH-C₆H₁₁ | " | " |

-continued
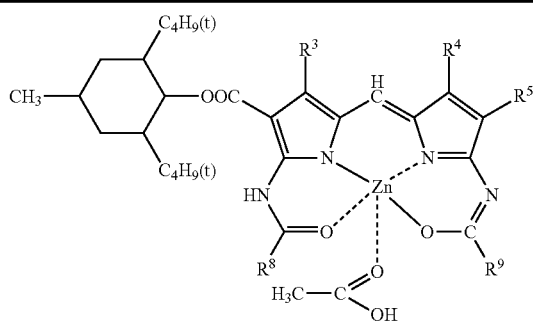
| No. | R³ | R⁴ | R⁵ | R⁸ | R⁹ |
|---|---|---|---|---|---|
| III-74 | " | " | —CONH-(2,4,6-trimethylphenyl) | " | " |
| III-75 | " | " | —CON(CH₃)(phenyl) | " | " |
-continued
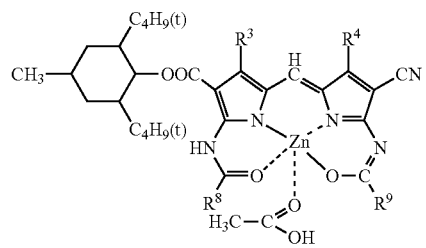
| No. | R³ | R⁴ | R⁸ | R⁹ |
|---|---|---|---|---|
| III-76 | —CH₃ | —CH₃ | —CH₃ | —CH₃ |
| III-77 | " | " | —CH(CH₃)NHSO₂CH₃ | " |
| III-78 | " | " | " | —CH(CH₃)NHSO₂CH₃ |
| III-79 | " | " | —CH(CH₃)NHSO₂CH₃ | —CH(CH₃)NHSO₂CH₃ |
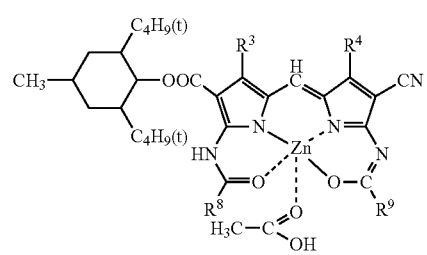
| No. | R³ | R⁴ | R⁸ | R⁹ |
|---|---|---|---|---|
| III-80 | " | —C₆H₅ | —CH₃ | —CH₃ |
| III-81 | " | " | " | —CH(CH₃)NHSO₂CH₃ |
| III-82 | " | " | —CH(CH₃)NHSO₂CH₃ | " |

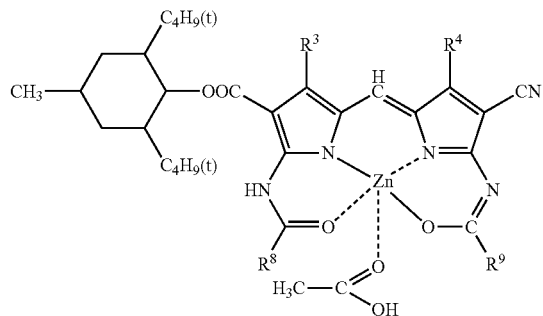
| No. | R³ | R⁴ | R⁸ | R⁹ |
|---|---|---|---|---|
| III-83 | —CH₃ | —C₆H₅ (phenyl) | —CHNHSO₂CH₃<br>   \|<br>  CH₃ | —CHNHSO₂CH₃<br>   \|<br>  CH₃ |
| III-84 | " | " | " | 3-(NHSO₂CH₃)-C₆H₄— |
| III-85 | " | " | —C₄H₉(t) | " |
| III-86 | —C₆H₅ | —CH₃ | —CH₃ | —CH₃ |
| III-87 | " | " | —CH₂NHSO₂CH₃ | —CH₂NHSO₂CH₃ |
| III-88 | —C₆H₅ | —C₆H₅ | —CH₃ | —CH₃ |
| III-89 | —CH₃ | 3-(NHSO₂CH₃)-C₆H₄— | " | " |
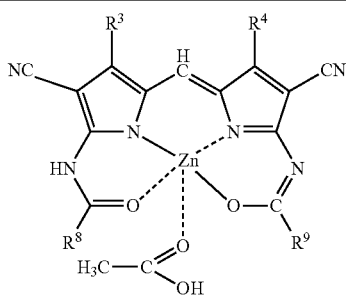
| No. | R³ | R⁴ | R⁸ | R⁹ |
|---|---|---|---|---|
| III-90 | —CH₃ | —CH₃ | —CH₃ | —CH₃ |
| III-91 | " | " | " | —CHNHSO₂CH₃<br>   \|<br>  C₄H₉ |

-continued
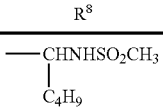
| No. | R³ | R⁴ | R⁸ | R⁹ |
|---|---|---|---|---|
| III-92 | " | " | —CH(C₄H₉)NHSO₂CH₃ | " |
| III-93 | 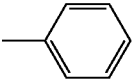 | 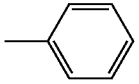 | —CH₃ | —CH₃ |
| III-94 | " | " | —C₄H₉(t) | —C₄H₉(t) |
| III-95 | " | " | —CH(C₄H₉)NHSO₂CH₃ | " |
| III-96 | " | " | 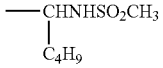 3-NHSO₂C₈H₁₇-C₆H₄— | —CH₃ |
| III-97 |  3-NHSO₂CH₃-C₆H₄— | 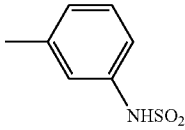 3-NHSO₂CH₃-C₆H₄— | —CH₃ | —CH₃ |
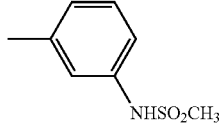
| No. | R³ | R⁴ | R⁸ | R⁹ |
|---|---|---|---|---|
| III-98 | 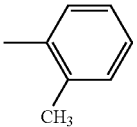 2-CH₃-C₆H₄— | 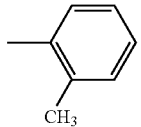 2-CH₃-C₆H₄— | —CH₃ | —CH₃ |

-continued

[Structure: Zn complex with two pyrrole rings bearing R³, R⁴, CN groups, linked by CH; HN-C(=O)-R⁸ and N=C(O)-R⁹ coordinating to Zn; acetic acid (H₃C-C(=O)OH) also coordinated]

| No. | R³ | R⁴ | R⁸ | R⁹ |
|---|---|---|---|---|
| III-99 | 2,4-dichlorophenyl | 2,4-dichlorophenyl | " | " |
| III-100 | 4-methoxyphenyl | 4-methoxyphenyl | " | " |
| III-101 | 2-pyridyl | 2-pyridyl | " | " |
| III-102 | —CH(CH₃)C₂H₅ | —CH(CH₃)C₂H₅ | —CH(C₄H₉)NHSO₂CH₃ | —CH(C₄H₉)NHSO₂CH₃ |
| III-103 | 3-pyridyl | 3-pyridyl | 3-(NHSO₂C₈H₁₇)phenyl | 3-(NHSO₂C₈H₁₇)phenyl |

[Structure: Zn complex with two pyrrole rings bearing methyl and ester (—C(=O)O— to 2,4-di-tert-butyl-5-methylcyclohexyl) groups, linked by =CR⁷–; HN-C(=O)-R⁸ and N=C(O)-R⁹ coordinating to Zn; acetic acid coordinated]

| No. | R⁷ | R⁸ | R⁹ |
|---|---|---|---|
| III-A | 1-(CH₂COOH)-pyrrol-2-yl | —C₄H₉(t) | —C₄H₉(t) |

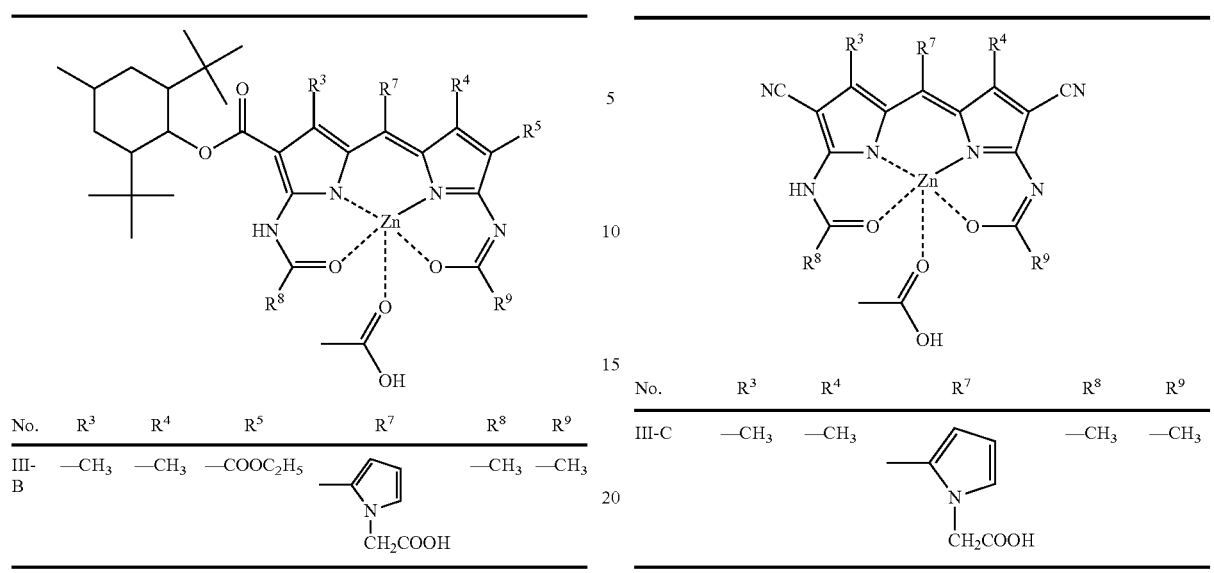

| No. | $R^3$ | $R^4$ | $R^5$ | $R^7$ | $R^8$ | $R^9$ |
|---|---|---|---|---|---|---|
| III-B | —$CH_3$ | —$CH_3$ | —$COOC_2H_5$ | ![pyrrole-CH2COOH] | —$CH_3$ | —$CH_3$ |

| No. | $R^3$ | $R^4$ | $R^7$ | $R^8$ | $R^9$ |
|---|---|---|---|---|---|
| III-C | —$CH_3$ | —$CH_3$ | ![pyrrole-CH2COOH] | —$CH_3$ | —$CH_3$ |

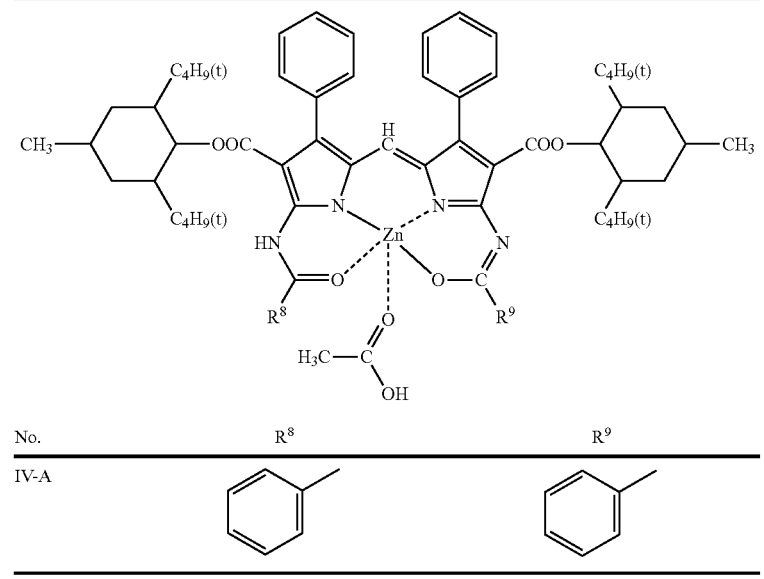

| No. | $R^8$ | $R^9$ |
|---|---|---|
| IV-A | phenyl | phenyl |

From the viewpoint of the film thickness, it is preferable that the mol absorption coefficient of the specific complex in the present invention is as high as possible. Further, from the standpoint of the improvement in color purity, it is preferable that the maximum absorption wavelength λmax is from 520 nm to 580, and more preferably, from 530 nm to 570 nm. Meanwhile, the maximum absorption wavelength and the mol absorption coefficient are measured by the spectrophotometer (UV-2400PC, made by Shimadzu Corporation).

From the viewpoint of the solubility, the melting point of the specific complex should not be too high.

It is possible to synthesize the specific complex by the methods described in the specifications of U.S. Pat. Nos. 4,774,339 and 5,433,896, JP-A No. 2001-240761, JP-A No. 2002-155052, JP-B No. 3614586, Aust. J. Chem, 1965, 11, 1835-1845, J. H. Boger et al, Heteroatom Chemistry, Vol. 1, No. 5,389 (1990), etc.

As the method of synthesizing the specific complex, specifically, the method described in paragraphs [0131] to [0157] in JP-A No. 2008-292970 can be applied.

The blue curable composition may make use of one kind of specific complex or two or more kinds at the same time.

The specific complex content in the blue curable composition in the present invention differs depending on the molecular weight and the mol absorption coefficient, but preferably 10% by mass to 70% by mass, more preferably 10% by mass to 50% by mass, and further more preferably 15% by mass to 30% by mass relative to all the solid components of the blue curable composition.

[(A-2) Phthalocyanine-Based Pigment]

As the phthalocyanine-based pigment, there are no restrictions in particular as long as a phthalocyanine skeleton is included. Furthermore, as central metals included in the phthalocyanine-based pigment, any metal can be used as long as it can constitute a phthalocyanine skeleton and there are no restrictions in particular. Among them, as central metals included, magnesium, titanium, iron, cobalt, nickel, copper, zinc, and aluminum are used preferably.

Specifically, examples of the phthalocyanine-based pigment include C. I. Pigment Blue-15, C. I. Pigment Blue-15:1, C. I. Pigment Blue-15:2, C. I. Pigment Blue-15:3, C. I. Pigment Blue-15:4, C. I. Pigment Blue-15:5, C. I. Pigment Blue-15:6, C. I. Pigment Blue-16, C. I. Pigment Blue-17:1, C. I. Pigment Blue-75, C. I. Pigment blue-79, C. I. Pigment Green 7, C. I. Pigment Green 36, C. I. Pigment Green 37, chloroaluminum phthalocyanine, hydroxy aluminum phthalocyanine, aluminum phthalocyanine oxide, and zinc phthalocyanine. Among them, from the point of light resistance and coloring force, C. I. Pigment Blue-15, C. I. Pigment Blue-15:6, Pigment Blue-15:1, and C. I. Pigment Blue-15:2 are preferable and C. I. Pigment Blue-15:6 is most preferable.

The phthalocyanine based pigment content in the blue curable composition in the present invention is preferably 10% by mass to 70% by mass, more preferably 20% by mass to 60% by mass, and further more preferably 35% by mass to 50% by mass relative to all the solid components of the blue curable composition.

Furthermore, the mass content ratio of the phthalocyanine-based pigment to the specific complex is preferably phthalocyanine-based pigment:specific complex=100:5 to 100:100, more preferably 100:15 to 100:75, and further more preferably 100:25 to 100:50.

[(B) Dispersant]

As the dispersant of the (B) component, there are no restrictions in particular, and the publicly-known pigment dispersant or surfactant is used.

As the dispersant, many types of compounds may be used. Examples thereof include: a phthalocyanine derivatives (a commercially available product EFKA-745 (manufactured by EFKA Chemicals BV)), SOLSPERSE 5000 (manufactured by Lubrizol Japan Ltd.); cationic surfactants such as an organosiloxane polymer KP341 (manufactured by Shin-Etsu Chemical Co., Ltd.) and (meth)acrylic (co)polymers POLYFLOW No. 75, No. 90 and No. 95 (manufactured by KYOEISHA CHEMICAL Co., Ltd.) and W001 (manufactured by Yusho Co., Ltd.); nonionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethyleneglycol dilaurate, polyethyleneglycol distearate and sorbitan fatty acid ester; anionic surfactants such as W004, W005 and W017 (manufactured by Yusho Co., Ltd.); polymer dispersants such as EFKA-46, EFKA-47, EFKA-47EA, EFKA POLYMER 100, EFKA POLYMER 400, EFKA POLYMER 401 and EFKA POLYMER 450 (product of Morishita & Co., Ltd.) and DISPERSE AID 6, DISPERSE AID 8, DISPERSE AID 15 and DISPERSE AID 9100 (manufactured by SAN NOPCO LIMITED); various SOLSPERSE dispersants such as SOLSPERSE 3000, 5000, 9000, 12000, 13240, 13940, 17000, 24000, 26000 and 28000 (manufactured by Lubrizol Japan Ltd.); and ADEKA PLURONIC L31, F38, L42, L44, L61, L64, F68, L72, P95, F77, P84, F87, P94, L101, P103, F108, L121 and P-123 (manufactured by ADEKA Corporation), and IONET S-20 (manufactured by Sanyou Chemical Industries Co., Ltd.).

The dispersant (B) content in the blue curable composition in the present invention is preferably 1% by mass to 80% by mass, more preferably 5% by mass to 70% by mass, and further more preferably 10% by mass to 60% by mass relative to the pigment.

[(C) Polymerizable Compound]

The blue curable compound contains the (C) polymerizable compound. An example of the polymerizable compound includes an addition polymerizable compound having at least one ethylene unsaturated double bond. Specifically, the polymerizable compound is selected from among compounds having at least one terminal ethylene unsaturated bond, preferably, two or more bonds. Such a compound group is widely known in the relevant industrial field and these can be used in the present invention without any particular restrictions. These may be a monomer, prepolymer, that is, a dimer, trimer, and oligomer, or a chemical form, such as their mixture and (co)polymer.

Examples of the monomer and its (co)polymer include an unsaturated carboxylic acid (for example, acrylic acid, methacrylic acid, tectonic acid, crotonic acid, isocrotonic acid, maleic acid, etc.) and esters thereof, amides thereof, and (co)polymers thereof and preferably esters of unsaturated carboxylic acid and aliphatic multivalent alcohol compound, amides of unsaturated carboxylic acid and aliphatic multivalent amine compound, and (co)polymers thereof. Furthermore, an additional reactant of unsaturated carboxylic acid esters having a nucleophilic substituent such as hydroxyl group, amino group, and mercapto group or amides with unifunctional or multifunctional isocyanates or epoxies; or a dehydrated condensation reactant with unifunctional or multifunctional carboxylic acids, etc., are used preferably. Moreover, an addition reactant of unsaturated carboxylic acid esters having an electrophilic substituent such as isocyanate group and epoxy group or amides with unifunctional or multifunctional alcohols, amines, and thiols; and still furthermore, a substitution reactant of unsaturated carboxylic acid esters having an eliminative substituent such as halogen group and tosyloxy group or amides with unifunctional or multifunctional alcohols, amines, and thiols are also preferable. In addition, as another example, it is also possible to use a group of compounds substituted by unsaturated phosphonic acid, styrene, vinyl ether, etc., instead of the unsaturated carboxylic acid.

Specific examples of ester monomers of aliphatic multivalent compounds and unsaturated carboxylic acids include ethylene glycol diacrylate, triethylene glycol diacrylate, 1,3-butane diol acrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexane diol diacrylate, 1,4-cyclohexane diol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, isocyanuric acid EO-denatured triacrylate, etc.

Furthermore, examples of methacrylic acid esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butane diol dimethacrylate, hexane diol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy 2-hydroxypropoxy)phenyl]dimethylmethane, bis-[p-(methacryloxyethoxy)phenyl]dimethylmethane, etc.

Moreover, examples of itaconic acid esters include ethylene glycol diitaconate, propylene glycol diitaconate, 1,3-butane diol diitaconate, 1,4-butane diol diitaconate, tetramethylene glycol diitaconate, pentaerythritol diitaconate, sorbitol tetraitaconate, etc., examples of crotonic acid esters include ethylene glycol dicrotonate, tetramethylene glycol dicrotonate, pentaerythritol dicrotonate, sorbitol tetradicrotonate, etc., examples of isocrotonic acid esters include ethylene glycol diisocrotonate, pentaerythritol diisocrotonate, sorbitol tetraisocrotonate, etc., and examples of maleic acid esters include ethylene glycol dimalate, triethylene glycol dimalate, pentaerythritol dimalate, sorbitol tetramalate, etc.

As examples of other esters, for example, aliphatic alcohol ester described in JP-B No. 51-47334, and JP-A No. 57-196231, those having an aromatic-based skeleton described in JP-A No. 59-5240, JP-A No. 59-5241, and JP-A No. 02-226149, and those containing the amino group described JP-A No. 01-165613, etc., are also used preferably. Further, the above-described ester monomers can be used as a mixture.

Specific examples of amide monomers of aliphatic multivalent amine compounds and unsaturated carboxylic acids include methylenebis-acrylamide, methylenebis-methacrylamide, 1,6-hexamethylenebis-acrylamide, 1,6-hexamethylenebis-methacrylamide, diethylenetriaminetrisacrylamide, xylylene bisacrylamide, xylylene bismethacrylamide, etc.

Examples of other preferable amide-based monomers can include those having a cyclohexylene structure described in JP-B No. 54-21726.

Furthermore, an urethane-based addition polymerizable compound manufactured by using the addition reaction of isocyanate and hydroxyl group is also preferable, and specific examples of such a compounds include vinyl urethane compounds containing two or more polymerizable vinyl groups in one molecule obtained by adding vinyl monomers containing a hydroxyl group represented by the following General Formula (A) to polyisocyanate compounds having two or more isocyanate groups in one molecule, described in JP-B No. 48-41708.

$$CH_2=C(R)COOCH_2CH(R')OH \quad (A)$$

[In General Formula (A), R and R' respectively represent H or $CH_3$ independently.]

As to these polymerizable compounds, it is possible to arbitrarily set the details of its use method such as its structure, single use or combined use, and the addition amount, in accordance with the final performance design of the blue curable composition. For example, from the viewpoint of the sensitivity, compounds having a structure in which the unsaturated group content per one molecule is high are preferable, and in many cases, bifunctional or multifunctional compounds are preferable. Furthermore, from the viewpoint of the increase in the strength of a colored curable film, trifunctional or multifunctional compounds are preferable and further, it is also effective to use a method of adjusting both sensitivity and strength by simultaneously using compounds having different number of functions and different polymerizable groups (for example, acrylic acid ester, methacrylic acid ester, styrene-based compound, vinylether-based compound). Moreover, the selection/use methods of the polymerizable compounds are important factors for compatibility and dispersibility with other components (for example, photopolymerization initiator, coloring agent (pigment), binder polymer, etc.) contained in the blue curable composition, and for example, there may be a case where the compatibility can be improved by using a low-purity compound or simultaneously using two or more kinds of compounds. In addition, there may also be a case where a specific structure is selected from the viewpoint of the improvement of adhesion with a hard surface of a support etc.

As to the content (total content when there are two or more kinds of compounds) of the polymerizable compound in all the solid components in the blue curable composition, there are no restrictions in particular, and from the viewpoint of the more effective acquisition of the effects of the present invention, 10% by mass to 80% by mass is preferable, 15% by mass to 75% by mass is more preferable, and 20% by mass to 60% by mass is most preferable.

[(D) Photopolymerization Initiator]

The blue curable composition contains (D) a photopolymerization initiator.

As to the photopolymerization initiator, there are no restrictions in particular and any one may be accepted as long as it can polymerize the above-described (C) polymerizable compound, and it is preferable to select the initiator from the viewpoint of the characteristics, initiation efficiency, absorption wavelengths, availability, cost, etc.

Examples of the above-mentioned photopolymerization initiators include at least one active halogen compound selected from halomethyloxadiazole compounds and halomethyl-s-triazine compounds, 3-aryl substituted cumarin compound, rophin dimer, benzophenone compound, acetophenone or derivatives thereof, cyclopentadiene-benzene-iron complex or salts thereof, oxime-based compound, etc. Specific examples of the photochemical polymerization initiators include the initiators described in paragraphs [0070] to [0077] in JP-A No. 2004-295116. Among those, the oxime-based compound is preferable from the point of the rapid polymerization reaction.

The oxime-based compound (hereinafter, also referred to as an "oxime-based photochemical polymerization initiator") are not limited in particular and include the oxime-based compound described in JP-A No. 2000-80068, International Publication No. WO02/100903A1, JP-A No. 2001-233842, etc.

Specific examples include 2-(O-benzoyloxime)-1-[4-(phenylthio)phenyl]-1,2-butanedione, 2-(O-benzoyloxime)-1-[4-(phenylthio)phenyl]-1,2-pentanedione, 2-(O-benzoyloxime)-1-[4-(phenylthio)phenyl]-1,2-hexanedione, 2-(O-benzoyloxime)-1-[4-(phenylthio)phenyl]-1,2-heptanedione, 2-(O-benzoyloxime)-1-[4-(phenylthio)phenyl]-1,2-octanedione, 2-(O-benzoyloxime)-1-[4-(methylphenylthio)phenyl]-1,2-butanedione, 2-(O-benzoyloxime)-1-[4-(ethylphenylthio)phenyl]-1,2-butanedione, 2-(O-benzoyloxime)-1-[4-(butylphenylthio)phenyl]-1,2-butanedione, 1-(O-acetyloxime)-1-[9-ethyl-6-(2-methylbenzoyl)-9H-carbazole-3-yl]ethanone, 1-(O-acetyloxime)-1-[9-methyl-6-(2-methylbenzoyl)-9H-carbazole-3-yl]ethanone, 1-(O-acetyloxime)-1-[9-propyl-6-

(2-methylbenzoyl)-9H-carbazole-3-yl]ethanone, 1-(O-acetyloxime)-1-[9-ethyl-6-(2-ethylbenzoyl)-9H-carbazole-3-yl]ethanone, 1-(O-acetyloxime)-1-[9-ethyl-6-(2-butylbenzoyl)-9H-carbazole-3-yl]ethanone, etc. However, these are not limited.

Among these, from the point of being able to obtaining a pattern excellent in shape at a small amount of exposure (in particular, in the case of a solid-state imaging device, the rectangularity), an oxime-O-acyl based compound such as 2-(O-benzoyloxime)-1-[4-(phenylthio)phenyl]-1,2-octadion, and 1-(O-acetyloxime)-1-[9-ethyl-6-(2-methylbenzoyl)-9H-carbazoyl-3-yl]ethanone, is most preferable, and specifically, mention is made of CGI-124, CGI-242 (made by Chiba Specialty Chemicals Limited), etc.

In the present invention, from the viewpoint of the sensitivity, stability over time, and coloring at the time of post-heating, as the oxime-based compound, a compound represented by the following General Formula (1) is more preferable.

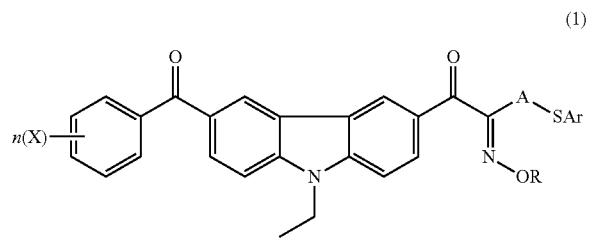

(1)

In General Formula (1), R and X respectively represent a univalent substituent independently, A represents a divalent organic group, and Ar represents the aryl group. n is an integer from 1 to 5.

As R, the acyl group is preferable form the point of high sensitivity, and specifically, the acetyl group, propionyl group, benzoyl group and tolyl group are preferable.

As A, from the viewpoint of the enhancement of the sensitivity and the suppression of coloring at the time of heating over time, an unsubstituted alkylene group, alkylene group substituted by an alkyl group (for example, methyl group, ethyl group, tert-butyl group, dodecyl group), an alkylene group substituted by the alkenyl group (for example, vinyl group, allyl group), and an alkylene group substituted by an aryl group (for example, phenyl group, p-tolyl group, xylyl group, coumenyl group, naphthyl group, anthryl group, phenantolyl group, styryl group) are preferable.

As Ar, from the point of the increase in sensitivity and the suppression of coloring at the time of heating over time, a saturated or unsaturated phenyl group is preferable. In the case of the substituted phenyl group, as its substituent, for example, a halogen group such as a fluorine atom, chlorine atom, bromine atom, or iodine atom, is preferable.

From the viewpoint of the improvement in the solvent solubility and the absorption efficiency in a long wavelength region, an alkyl group that may have a substituent, an aryl group that may have a substituent, an alkenyl group that may have a substituent, an alkynyl group that may have a substituent, an alkoxy group that may have a substituent, an aryloxy group that may have a substituent, an alkylthioxy group that may have a substituent, an arylthioxy group that may have a substituent, and an e amino group that may have a substituent are preferable.

Furthermore, it is preferable that n in General Formula (1) is an integer of 1 or 2.

Specific examples of the compound represented by General Formula (1) are shown below, but the present invention is not limited to these.

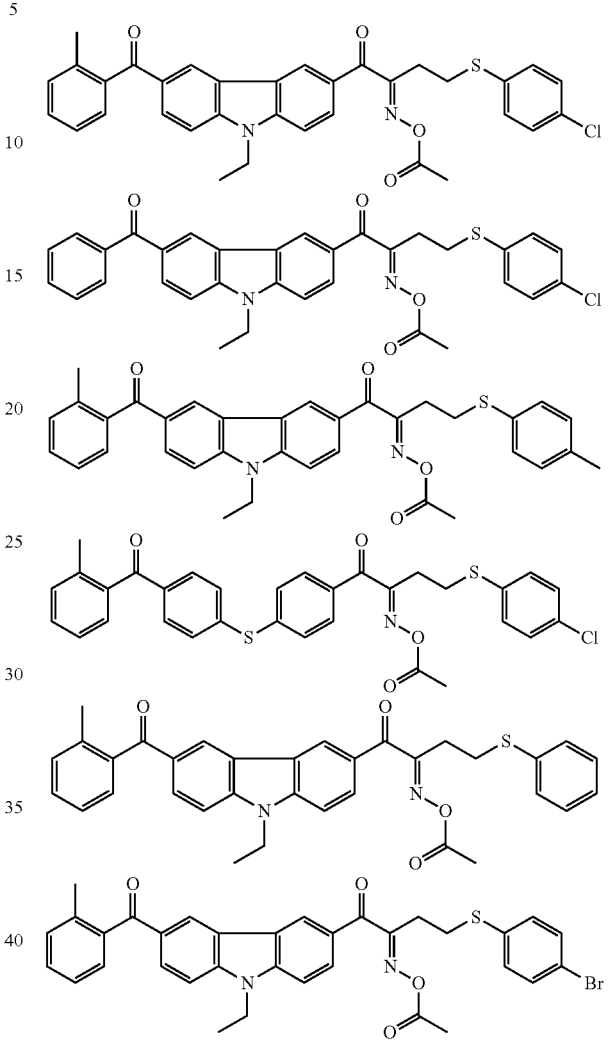

Moreover, the blue curable composition may make use of other publicly-known photopolymerization initiators described in paragraph [0079] in JP-A No. 2004-29511 in addition to the above-mentioned photopolymerization initiators.

It is possible to contain one kind of the photopolymerization initiator alone or a combination of two or more kinds of the photopolymerization initiators.

From the viewpoint of the more effective acquisition of the effects of the present invention, the photopolymerization initiator content (total content when two or more kinds of the photopolymerization initiators are contained) in all the solid components of the blue curable composition is preferably 3% by mass to 20% by mass, more preferably 4% by mass to 19% by mass, and further more preferably 5% by mass to 18% by mass.

[(E) Organic Solvent]

The blue curable composition contains (E) an organic solvent.

Basically, the organic solvent is not limited in particular as long as the solubility of each component present simultaneously and the application properties of the blue curable composition are satisfied, and it is preferable to select one in consideration of the solubility, application properties, and safety of the binder, in particular.

Examples of the organic solvents as esters include ethyl acetate, n-butyl-acetate, isobutyl acetate, amyl formate, isoamyl acetate, isobutyl acetate, butyl propionate, isopropyl butyrate, ethyl butyrate, butyl butyrate, methyl lactate, ethyl lactate, alkyl oxyacetate esters (for example, methyl oxyacetate, ethyl oxyacetate, butyl oxyacetate (specifically, mention is made of methyl methoxyacetate, ethyl methoxyacetate, butyl methoxyacetate, methyl ethoxyacetate, ethyl ethoxyacetate, etc.)), 3-oxypropionic acid alkyl esters (for example, 3-oxypropionic acid methyl ester, 3-oxypropionic acid ethyl ester, etc. (specifically, mention is made of 3-methoxypropionic acid methyl ester, 3-methoxypropionic acid ethyl ester, 3-ethoxypropionic acid methyl ester, 3-ethoxypropionic acid ethyl ester, etc.)), 2-oxypropionic acid alkyl esters (for example, 2-oxypropionic acid methyl ester, 2-oxypropinic acid ethyl ester, 2-oxypropionic acid propyl ester etc. (specifically, mention is made of 2-methoxypropionic acid methyl ester, 2-methoxypropionic acid ethyl ester, 2-methoxypropionic acid propyl ester, 2-ethoxypropionic acid methyl ester, 2-ethoxypropionic acid ethyl ester, etc.)), 2-oxy-2-methylpropionic acid methyl ester, 2-oxy-2-methylpropionic acid ethyl ester (specifically, mention is made of 2-methoxy-2-methylpropionic acid methyl ester, 2-ethoxy-2-methylpropionic acid ethyl ester, etc.)), methyl pyruvate, ethyl pyruvate, propyl pyruvate, methyl acetoacetate, ethyl acetoacetate, 2-oxobutanoic acid methyl ester, 2-oxobutanoic acid ethyl ester, etc.

Furthermore, examples of ethers include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether acetate, propylene glycol monomethyl ether acetate, propylene glycol monoethyl ether acetate, propylene glycol monopropyl ether acetate, etc.

Examples of ketones include methylethylketone, cyclohexane, 2-heptanone, 3-heptanone, etc.

Examples of aromatic carbohydrates include preferably toluene, xylene, etc.

It is also preferable to mix two or more kinds of these organic solvents from the viewpoint of the improvement in the solubility of each component described above, and when an alkali soluble binder is included, from the viewpoint of its solubility and the coating surface condition. In this case, a mixture solution is most preferable, which includes two or more kinds selected from 3-ethoxypropionic acid methyl ester, 3-ethoxypropionic acid ethyl ester, ethyl cellosolve acetate, ethyl lactate, diethylene glycol dimethyl ether, butyl acetate, 3-methoxypropionic acid methyl ester, 2-heptanone, cyclohexanone, ethylcarbitol acetate, butylcarbitol acetate, propylene glycol methyl ether, and propylene glycol methyl ether acetate.

The organic solvent content in the blue curable composition is preferably an amount when the total solid component concentration in the composition is 10% by mass to 80% by mass, and more preferably, 15% by mass to 60% by mass.

[(F) Other Components]

The blue curable composition may further include other components such as an alkali soluble binder and a cross-linking agent, in addition to the respective components described above within the range not impairing the effects of the present invention.

—Alkali Soluble Binder—

The alkali soluble binder is not limited in particular except that it has alkali solubility, and preferably can be selected from the viewpoint of heat resistance, developability, availability, etc.

The alkali soluble binder is a linear organic polymer, and the one that is soluble in an organic solvent and can be developed in a dilute alkali solution is preferable. The linear organic high-molecular polymer is preferably a polymer having carboxylic acid at a side chain thereof. Examples thereof include methacrylic acid copolymers, acrylic acid copolymers, itaconic acid copolymers, crotonic acid copolymers, maleic acid copolymers and partially-esterified maleic acid copolymers such as those described in JP-A No. 59-44615, JP-B No. 54-34327, JP-B No. 58-12577, JP-B No. 54-25957, JP-A No. 59-53836 and JP-A No. 59-71048. Similarly, acidic cellulose derivatives having carboxylic acid at a side chain thereof are useful.

In addition to those described above, as the alkali soluble binder, a polymer having a hydroxyl group to which an acid anhydride is added etc., polyhydroxystyrene-based resin, polysiloxane-based resin, poly(2-hydroxyethyl(meth)acrylate), polyvinyl pyrrolidone, polyethyleneoxide, polyvinyl alcohol, etc. are also useful. Furthermore, the linear organic polymer may be one in which a monomer having hydrophilic property is copolymerized. Examples of the linear organic polymers include alkoxyalkyl(meth)acrylate, hydroxyalkyl (meth)acrylate, glycerol(meth)acrylate, (meth)acryl amide, N-methylolacryl amide, secondary or tertiary alkyl acrylamide, dialkylaminoalkyl(meth)acrylate, morpholine(meth)acrylate, N-vinyl pyrrolidone, N-vinyl caprolactam, vinyl imidazole, vinyl triazole, methyl(meth)acrylate, ethyl(meth)acrylate, branched or straight chain propyl(meth)acrylate, branched or straight chain butyl(meth)acrylate, or phenoxyhydroxypropyl(meth)acrylate, etc. Furthermore, as a monomer having hydrophilic property, monomers containing tetrahydrofurfuryl group, phosphate group, phosphoester group, quaternary ammonium salt group, ethyleneoxy chain, propyleneoxy chain, sulfonic group, other groups resulting from the salt thereof, morpholinoethyl group etc. are also useful.

Furthermore, the alkali soluble binder may have a polymerizable group on the chain side to improve the cross-linking effect and, for example, a polymer containing an allyl group, (meth)acryl group, allyloxyalkyl group, etc., on the chain side is also useful. Examples of the polymers containing the above-mentioned polymerizable group include KS resist-106 commercially available (manufactured by OSAKA ORGANIC CHEMICAL INDUSTRY LTD.), Cyclomer-P series (manufactured by DAICEL CHEMICAL INDUSTRIES, LTD.), etc. Furthermore, in order to increase the strength of a cured film, alcohol soluble nylon, polyether of 2,2-bis-(4-hydroxyphenyl)-propane and epichlorohydrin, etc., are also useful.

In these various kinds of alkali soluble binders, from the viewpoint of heat resistance, polyhydroxystyrene-based resin, polysiloxane-based resin, acryl-based resin, acrylamide-based resin, acryl/acrylamide copolymer resin are preferable and from the viewpoint of the suppression of developability, acryl-based resin, acrylamide-based resin, acryl/acrylamide copolymer resin are preferable.

As the acryl-based resin, for example, a copolymer including a monomer selected from benzyl(meth)acrylate, (meth) acrylic acid, hydroxyethyl(meth)acrylate, (meth)acrylamide, etc, or KS resist-106 commercially available (manufactured by OSAKA ORGANIC CHEMICAL INDUSTRY LTD.), and Cyclomer-P series (manufactured by DAICEL CHEMICAL INDUSTRIES, LTD.), etc., are preferable.

From the viewpoint of the developability, liquid viscosity, etc., as the alkali soluble binder, a polymer having a weight average molecular weight (polystyrene-converted value measured by the GPC method) of 1,000 to $2 \times 10^5$ is preferable, a polymer having that of 2,000 to $1 \times 10^5$ is more preferable, and a polymer having that of 5,000 to $5 \times 10^4$ is most preferable.

—Cross-Linking Agent—

It is also possible to further increase the strength of the colored cured film obtained by curing the blue curable composition through the auxiliary use of a cross-linking agent in the blue curable composition.

Examples of the cross-linking agents are not limited in particular as long as they can cure a film by cross-linking reaction, and include (a) an epoxy resin, (b) a melamine compound, a guanamine compound, a glycol uril compound, or a urea compound substituted by at least one substituent selected from methylol groups, alkoxymethyl groups, and acyloxymethyl groups, (c) a phenol compound, a naphthol compound, or a hydroxyanthracene compound substituted by at least one substituent selected from methylol groups, alkoxymethyl groups, and acyloxymethyl groups. Among those, the multifunctional epoxy resin is preferable.

As to the details of specific examples of the cross-linking agents etc., the description in paragraphs [0134] to [0147] in JP-A No. 2004-295116 can be referred to.

—Other Additives—

With the blue curable composition, it is possible to blend as necessary, various additives such as a filler, polymer compounds other than those described above, nonion-based, cation-based, anion-based surfactants etc., adhesion promoter, anti-oxidizing agent, ultraviolet absorber, aggregation inhibitor, etc. As these additives, mention is made of those described in paragraphs [0155] to [0156] in JP-A No. 2004-295116.

The blue curable composition can contain the sensitizer and photo stabilizer described in paragraph [0078] in JP-A No. 2004-295116 and the thermal polymerization inhibitor described in paragraph [0081] in JP-A No. 2004-295116.

Furthermore, when an attempt is made to further promote the alkali solubility in the non-exposed region and the developability of the blue curable composition, it is preferable to add an organic carboxylic acid, preferably an organic carboxylic acid having a low molecular weight of 1,000 or less to the composition.

Specifically, examples of the organic carboxylic acids include aliphatic monocarboxylic acids such as the formic acid, acetic acid, propionic acid, butyric acid, valeric acid, pivalic acid, caproic acid, diethyl acetate, enanthic acid, and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid, and citraconic acid; aliphatic tricarboxylic acids such as the tricaballylic acid, aconitic acid, and camphoronic acid; aromatic monocarboxylic acids such as the benzoic acid, toluic acid, cuminic acid, hemellitic acid, and mesitylenic acid; aromatic polycarboxylic acids such as phthalic acid, isophthalic acid, terephthalic acid, trimellitic acid, trimesic acid, mellophanic acid, and pyromellitic acid; and other carboxylic acids such as phenyl acetate, hydroatropic acid, hydrocinnamic acid, mandelic acid, phenylsuccinic acid, atropic acid, cinnamic acid, cinnamic acid methyl, cinnamic acid benzyl, cinnamylidene acetate, coumaric acid, and umbellic acid.

[Preparing Method of Blue Curable Composition]

The blue curable composition is prepared by blending the essential components described above and arbitrary components as necessary.

When preparing the blue curable composition, it may be possible to blend the respective components constituting the blue curable composition altogether or blend respective components sequentially after dissolving or dispersing each component in the solvent. There are no restrictions on the blending order or the operation conditions. For example, it may also be possible to dissolve or disperse all the components at the same time in the solvent to prepare the composition, or as necessary, it may also be possible to appropriately create two or more solutions or dispersion liquids of each component and then prepare the composition by blending them when using it (at the time of application).

The blue curable composition prepared in this manner can be used after filtering it by using a filter having a hole diameter of preferably 0.01 µm to 3.0 µm, more preferably about 0.05 µm to about 0.5 µm.

[Red Curable Composition Containing Dye and Pigment in Red (R) Pixel]

The red curable composition contains (A-1) a specific organic metal complex, (A-2) a pigment as the red pigment, (B) a dispersant, (C), a polymerizable compound, and (D) an organic agent, and further has contains components as necessary.

The red curable composition contains (A-1) a complex including a compound residue represented by the following General Formula (I) that serves as a ligand and metal atom or metal compound (hereinafter, referred to appropriately as a "specific organic metal complex").

—Dipyrromethene-Based Compounds—

First, the compound represented by General Formula (I) constituting the specific complex will be explained.

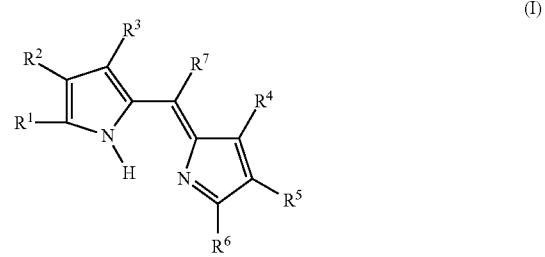

(I)

In General Formula (I), $R^1$ to $R^6$ respectively represent a hydrogen atom or substituent independently. $R^7$ represents a hydrogen atom, halogen atom, alkyl group, aryl group, or heterocyclic group.

In General Formula (I), the substituents represented by $R^1$ to $R^6$ include univalent groups as shown below (hereinafter, the enumerated univalent groups may be collectively referred to as a "substituent T").

When the univalent groups described above are those that can be further substituted, it may also be further substituted by any of the groups described above. Further, when the univalent groups have two or more substituents, these substituents may be the same or different.

In General Formula (I), $R^1$ and $R^2$, $R^2$ and $R^3$, $R^4$ and $R^5$, and $R^5$ and $R^6$ may be bonded to each other independently to form a five-membered, six-membered, or seven-membered ring. As a ring to be formed, there is a saturated or unsaturated ring. Examples of the five-membered, six-membered, or seven-membered saturated or unsaturated ring include a pyrrole ring, furan ring, thiophene ring, pyrazole ring, imidazole ring, triazole ring, oxazole ring, thiazole ring, pyrrolidine ring, piperidine ring, cyclopentene ring, cyclohexene ring, benzene ring, pyridine ring, pyrazine ring, and pyridazine ring. Among these, the benzene ring and pyridine ring are preferable.

When the five-membered, six-membered, and seven-membered rings are groups that can be further substituted, they may be substituted by any of the substituents T described above. When they are substituted by two or more substituents, those substituents may be the same or different.

—Metal Atoms or Metal Compounds—

The metal atoms or metal compounds may be any as long as they can form a complex, and include a divalent metal atom, divalent metal oxide, divalent metal hydroxide, and divalent metal chloride. Examples of the metal atoms or metal compounds described above include metal chlorides such as AlCl, InCl, FeCl, $TiCl_2$, $SnCl_2$, $SiCl_2$, and $GeCl_2$, metal oxides such as TiO and VO, and a metal hydroxide such as $Si(OH)_2$, in addition to Zn, Mg, Si, Sn, Rh, Pt, Pd, Mo, Mn, Pb, Cu, Ni, Co, and Fe.

Among these, from the viewpoint of the stability of complexes, spectral characteristics, heat resistance, light resistance, and manufacturing suitability, Fe, Zn, Mg, Si, Pt, Pd, Mo, Mn, Cu, Ni, Co, TiO, or VO is preferable, Fe, Zn, Mg, Si, Pt, Pd, Cu, Ni, Co, or VO is more preferable, and Fe, Zn, Cu, Co, or VO (V=O) is most preferable.

Preferable aspects in the above specific organic metal complex are shown as below.

That is, mention is made of aspects in which $R^1$ and $R^6$ respectively represent independently in General Formula (I) a hydrogen atom, alkyl group, alkenyl group, aryl group, heterocyclic group, silyl group, hydroxyl group, cyano group, alkoxy group, aryloxy group, heterocyclic oxy group, acyl group, alkoxycarbonyl group, carbamoyl group, amino group, anilino group, heterocyclic amino group, carbonamide group, ureide group, imide group, alkoxycarbonylamino group, aryloxycarbonylamino group, sulfonamide group, azo group, alkylthio group, arylthio group, heterocyclic thio group, alkylsulfonyl group, arylsulfonyl group, or phosphinoylamino group, $R^2$ and $R^5$ respectively represent independently a hydrogen atom, halogen atom, alkyl group, alkenyl group, aryl group, heterocyclic group, hydroxyl group, cyano group, nitro group, alkoxyl group, aryloxy group, heterocyclic oxy group, acyl group, alkoxycarbonyl group, aryloxycarbonyl group, carbamoyl group, imide group, alkoxycarbonylamino group, sulfonamide group, azo group, alkylthio group, arylthio group, heterocyclic thio group, alkylsulfonyl group, arylsulfonyl group, or sulfamoyl group, $R^3$ and $R^4$ respectively represent independently a hydrogen atom, halogen atom, alkyl group, alkenyl group, aryl group, heterocyclic group, silyl group, hydroxyl group, cyano group, alkoxy group, aryloxy group, heterocyclic oxy group, acyl group, alkoxycarbonyl group, carbamoyl group, anilino group, carbonamide group, ureide group, imide group, alkoxycarbonyl group, sulfonamide group, azo group, alkylthio group, arylthio group, heterocyclic thio group, alkylsulfonyl group, arylsulfonyl group, sulfamoyl group, or phosphinoylamino group, $R^7$ represents a hydrogen atom, halogen atom, alkyl group, aryl group, or heterocyclic group, and the metal atom or metal compound represents Zn, Mg, Si, Pt, Pd, Mo, Mn, Cu, Ni, Co, TiO, or VO.

More preferable aspects in the above organic metal complex are shown as below.

That is, mention is made of aspects in which $R^1$ and $R^6$ respectively represent independently in General Formula (I) a hydrogen atom, alkyl group, alkenyl group, aryl group, heterocyclic group, cyano group, acyl group, alkoxycarbonyl group, carbamoyl group, amino group, heterocyclic amino group, carbonamide group, ureide group, imide group, alkoxycarbonylamino group, aryloxycarbonylamino group, sulfonamide group, azo group, alkylsulfonyl group, arylsulfonyl group, or phosphinoylamino group, $R^2$ and $R^5$ respectively represent independently an alkyl group, alkenyl group, aryl group, heterocyclic group, cyano group, nitro group, acyl group, alkoxycarbonyl group, aryloxycarbonyl group, carbamoyl group, imide group, alkylsulfonyl group, arylsulfonyl group, or sulfamoyl group, $R^3$ and $R^4$ respectively represent independently a hydrogen atom, alkyl group, alkenyl group, aryl group, heterocyclic group, cyano group, acyl group, alkoxycarbonyl group, carbamoyl group, carbonamide group, ureide group, imide group, alkoxycarbonylamino group, sulfonamide group, alkylthio group, arylthio group, heterocyclic thio group, alkylsulfonyl group, arylsulfonyl group, or sulfamoyl group, $R^7$ represents a hydrogen atom, halogen atom, alkyl group, aryl group, or heterocyclic group, and the metal atom or metal compound represents Zn, Mg, Si, Pt, Pd, Cu, Ni, Co, or VO.

Most preferable aspects in the above organic metal complex are shown as below.

That is, mention is made of aspects in which $R^1$ and $R^6$ respectively represent independently in General Formula (I) a hydrogen atom, alkyl group, aryl group, heterocyclic group, amino group, heterocyclic amino group, carbonamide group, ureide group, imide group, alkoxycarbonylamino group, sulfonamide group, azo group, alkylsulfonyl group, arylsulfonyl group, or phosphinoylamino group, $R^2$ and $R^5$ respectively represent independently the alkyl group, aryl group, heterocyclic group, cyano group, acyl group, alkoxycarbonyl group, carbamoyl group, alkylsulfonyl group, or arylsulfonyl group, $R^3$ and $R^4$ respectively represent independently a hydrogen atom, alkyl group, aryl group, or heterocyclic group, $R^7$ represents a hydrogen atom, alkyl group, aryl group, or heterocyclic group, and the metal atom or metal compound represents Zn, Cu, Co, or VO.

In particular, it is preferable that both $R^3$ and $R^4$ are respectively phenyl groups which may have a substituent, in General Formula (I) from the standpoint of the excellent durability. The reason for that can be considered that (1) both $R^3$ and $R^4$ are phenyl groups, and therefore, the spectra of the compound become longer in wavelength and the overlapping (near 550 nm) with the spectra of the phthalocyanine-based pigment to be simultaneously used becomes greater and the energy becomes easy to be transferred, and therefore, that (2) the durability of the compound itself is increased because of the presence of the substituent that is sterically bulky. Furthermore, it is preferable that $R^2$ and/or $R^5$ are/is 2,6-di-tert-butyl-4-methylcyclohexyloxycarbonyl groups in General Formula (I) from the standpoint of the excellent solvent solubility.

—Compounds Represented by General Formula (II-1)—

As the above specific organic metal complex in the present invention, one of preferable examples is a compound represented by the following General Formula (II-1).

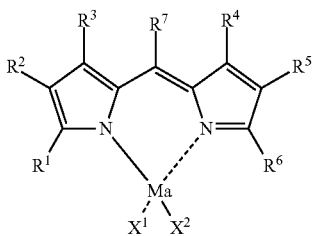

(II-1)

$R^1$ to $R^7$ and Ma in General Formula (II-1) have the same meanings as those of $R^1$ to $R^6$ and Ma in General Formula (I), and the preferable aspects are also the same. $X^2$ represents a group required to neutralize charges of Ma, and $X^1$ represents a group that can be bonded to Ma. $X^1$ and $X^2$ may be bonded to each other to form a five-membered, six-membered, or seven-membered ring.

$X^1$ in General Formula (II-1) may be any group that can be bonded to Ma and mention is made, for example, of water, alcohols (for example, methanol, ethanol, propanol) etc., and further, mention is made of groups originating from the compounds described in "Metal chelate" [1] Takekazu Sakaguchi and Keihei Ueno (1995, Nankodo), "Metal chelate" [2] (1996), [3] "Metal chelate" (1997), etc.

$X^2$ in General Formula (II-1) represents a group required to neutralize charges of Ma and mention is made, for example, of a halogen atom, hydroxyl group, carboxylic acid group, phosphoric acid group, sulfonic acid group, etc.

$X^1$ and $X^2$ in General Formula (II-1) may be bonded to each other to form a five-membered, six-membered, and seven-membered ring together with Ma. The five-membered, six-membered, and seven-membered ring to be formed may be a saturated or unsaturated ring. Furthermore, the five-membered, six-membered, and seven-membered ring may be constituted only by carbon atoms and hydrogen atoms or may be a heterocyclic ring having at least one kind of atom selected from the group consisting of a nitrogen atom, oxygen atom, and sulfur atom.

—Compounds Represented by General Formula (II-2)—

As the above specific organic metal complex in the present invention, one of preferable examples is a compound represented by the following General Formula (II-2).

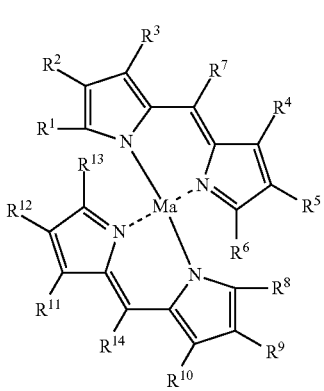

(II-2)

$R^1$ to $R^6$ and $R^8$ to $R^{13}$Ma in General Formula (II-2) have the same meanings as those of $R^1$ to $R^6$ and $R^8$ to $R^{13}$ in General Formula (I), and the preferable aspects are also the same.

When the substituents represented by $R^8$ to $R^{13}$ of the compound represented by General Formula (II-2) are groups that can be further substituted, they may be substituted by any of the substituents T described above, and when they are substituted by two or more substituents, those substituents may be the same or different.

$R^7$ in General Formula (II-2) has the same meaning as that of $R^7$ in General Formula (I), and the preferable aspects are also the same. $R^{14}$ in General Formula (II-2) represents a hydrogen atom, halogen atom, alkyl group, aryl group, or heterocyclic group, and the preferable range of $R^{14}$ is the same as the preferable range of $R^7$. When $R^{14}$ is a group that can be further substituted, it may be substituted by any of the substituents T described above and when it is substituted by two or more substituents, those substituents may be the same or different.

Ma in General Formula (II-2) represents a metal atom or metal compound and has the same meaning as that of the metal atom or metal compound constituting the specific organic metal complex described above, and the preferable range thereof is also the same.

$R^8$ and $R^9$, $R^9$ and $R^{10}$, $R^{11}$ and $R^{12}$, and $R^{12}$ and $R^{13}$ in General Formula (II-2) may be bonded respectively to each other to form a five-membered, six-membered, or seven-membered saturated or unsaturated ring. The saturated or unsaturated ring to be formed has the same meaning as that of the saturated or unsaturated ring to be formed by $R^1$ and $R^2$, $R^2$ and $R^3$, $R^4$ and $R^5$, and $R^5$ and $R^6$, and the preferable examples are also the same.

—Compounds Represented by General Formula (III)—

As the above specific organic metal complex, one of preferable examples is a compound represented by the following General Formula (III).

$R^2$ to $R^5$ and $R^7$ in General Formula (III) have the same meanings as those of $R^1$ to $R^6$ and $R^7$ in General Formula (I), and the preferable aspects are also the same.

Ma in General Formula (II-2) represents a metal atom or metal compound and has the same meaning as that of the metal atom or metal compound constituting the specific complex described above, and the preferable range thereof is also the same.

$X^3$ represents NR(R represents a hydrogen atom, alkyl group, alkenyl group, aryl group, heterocyclic group, acyl group, alkylsulfonyl group, arylsulfonyl group), nitrogen atom, oxygen atom, or sulfur atom.

$X^4$ represents NRa (Ra represents a hydrogen atom, alkyl group, alkenyl group, aryl group, heterocyclic group, acyl group, alkylsulfonyl group, or arylsulfonyl group), oxygen atom, or sulfur atom.

$Y^1$ represents NRc (Rc represents a hydrogen atom, alkyl group, alkenyl group, aryl group, heterocyclic group, acyl group, alkylsulfonyl group, or arylsulfonyl group), nitrogen atom, or carbon atom.

$Y^2$ represents a nitrogen atom or carbon atom.

$R^8$ and $R^9$ respectively represent an alkyl group, alkenyl group, aryl group, heterocyclic group, alkoxy group, aryloxy group, alkylamino group, arylamino group, or heterocyclic amino group independently. $R^8$ and $Y^1$ may be bonded to each other to form a five-membered, six-membered, or seven-membered ring, and $R^9$ and $Y^2$ may be bonded to each other to form a five-membered, six-membered, or seven-membered ring. When the above-listed groups are groups that can be further substituted, they may be substituted by any of the substituents T described above, and when they are substituted by two or more substituent, those substituents may be the same or different.

$X^5$ represents a group that can be bonded to Ma and includes a group which is similar to $X^1$ in General Formula (II-1).

a represents 0, 1, or 2.

In General Formula (III), $R^8$ and $R^9$ respectively represent independently an alkyl group (preferably, the straight chain, branched chain, or cyclic alkyl group the number of carbon atoms of which is 1 to 36, more preferably, 1 to 12, for example, methyl group, ethyl group, propyl group, isopropyl group, butyl group, isobutyl group, t-butyl group, hexyl group, 2-ethylhexyl group, dodecyl group, cyclopropyl group, cyclopentyl group, cyclohexyl group, 1-adamantyl group), an alkenyl group (preferably, the alkenyl group the number of carbon atoms of which is 2 to 24, more preferably, 2 to 12, for example, vinyl group, allyl group, 3-butene-1-yl group), an aryl group (preferably, the aryl group the number of carbon atoms is 6 to 36, more preferably, 6 to 18, for example, phenyl group, naphthyl group), a heterocyclic group (preferably, the heterocyclic group the number of carbon atoms of which is 1 to 24, more preferably, 1 to 12, for example, 2-thienyl group, 4-pyridyl group, 2-furyl group, 2-pyrimidinyl group, 1-pyridyl group, 2-benzothiazolyl group, 1-imidazolyl group, 1-pyrazolyl group, benzotriazole-1-yl group), an alkoxyl group (preferably, the alkoxyl group the number of carbon atoms of which is 1 to 36, more preferably, 1 to 18, for example, methoxy group, ethoxy group, propyloxy group, butoxy group, hexyloxy group, 2-ethylhexyloxy group, dodecyloxy group, cyclohexyloxy group), an aryloxy group (preferably, the aryloxy group the number of carbon atoms of which is 6 to 24, more preferably, 1 to 18, for example, phenoxy group, naphthyloxy group), an alkylamino group (preferably, the alkylamino group the number of carbon atoms of which is 1 to 36, more preferably, 1 to 18, for example, methylamino group, ethylamino group, propylamino group, butylamino group, hexylamino group, 2-ethylhexylamino group, isopropylamino group, t-butylamino group, t-octylamino group, cyclohexylamino group, N,N-diethylamino group, N,N-dipropylamino group, N,N-dibutylamino group, N-methyl-N-ethylamino group), an arylamino group (preferably, the arylamino group the number of carbon atoms of which is 6 to 36, more preferably, 6 to 18, for example, phenylamino group, naphthylamino group, N,N-diphenylamino group, N-ethyl-N-phenylamino group), or a heterocyclic amino group (preferably, the heterocyclic amino group the number of carbon atoms of which is 1 to 24, more preferably, 1 to 12, for example, 2-aminopyrrole group, 3-aminopyrazole group, 2-aminopyridine group, 3-aminopyridine group).

In General Formula (III), $X^3$ represents a nitrogen atom, oxygen atom, or sulfur atom, and $X^4$ represents NRa, an oxygen atom or sulfur atom, and R and Ra respectively represent independently a hydrogen atom, an alkyl group (preferably, the straight chain, branched chain, or cyclic alkyl group the number of carbon atoms of which is 1 to 36, more preferably, 1 to 12, for example, methyl group, ethyl group, propyl group, isopropyl group, butyl group, isobutyl group, t-butyl group, hexyl group, 2-ethylhexyl group, dodecyl group, cyclopropyl group, cyclopentyl group, cyclohexyl group, 1-adamantyl group), an alkenyl group (preferably, the alkenyl group the number of carbon atoms of which is 2 to 24, more preferably, 2 to 12, for example, vinyl group, allyl group, 3-butene-1-yl group), an aryl group (preferably, the aryl group the number of carbon atoms is 6 to 36, more preferably, 6 to 18, for example, phenyl group, naphthyl group), a heterocyclic group (preferably, the heterocyclic group the number of carbon atoms of which is 1 to 24, more preferably, 1 to 12, for example, 2-thienyl group, 4-pyridyl group, 2-furyl group, 2-pyrimidinyl group, 1-pyridyl group, 2-benzothiazolyl group, 1-imidazolyl group, 1-pyrazolyl group, benzotriazole-1-yl group), an acyl group (preferably, the acyl group the number of carbon atoms of which is 1 to 24, more preferably, 2 to 18, for example, acetyl group, pivaloyl group, 2-ethylhexyl group, benzoyl group, cyclohexanoyl group), an alkylsulfonyl group (preferably, the alkylsulfonyl group the number of carbon atoms of which is 1 to 24, more preferably, 1 to 18, for example, methylsulfonyl group, ethylsulfonyl group, isopropylsulfonyl group, cyclohexylsulfonyl group), and an arylsulfonyl group (preferably, the arylsulfonyl group the number of carbon atoms of which is 6 to 24, more preferably, 6 to 18, for example, phenylsulfonyl group, naphthylsulfonyl group).

The alkyl group, alkenyl group, aryl group, heterocyclic group, acyl group, alkylsulfonyl group, and the arylsulfonyl group of R and Ra described above may be further substituted by any of the substituents T, and when substituted by two or more substituents, those substituents may be the same or different.

In General Formula (III), $R^8$ and $Y^1$ may be bonded to each other to form a five-membered ring (for example, cyclopentane, pyrrolidine, tetrahydrofuran, dioxolane, tetrahydrothiophene, pyrrole, furan, thiophene, indole, benzofuran, benzothiophene), a six-membered ring (for example, cyclohexane, piperidine, piperadine, morpholine, tetrahydropyran, dioxane, pentamethylenesulfid, diathin, benzene, piperidine, piperadine, pyridazine, quinoline, quinazoline) or a seven-membered ring (for example, cycloheptane, hexamethyleneimine) along with $R^8$, $Y^1$, and a carbon atom.

In General Formula (III), $R^9$ and $Y^2$ may be bonded to each other to form a five-membered, six-membered, or seven-membered ring along with $R^8$, $Y^1$, and a carbon atom. The five-membered, six-membered, and seven-membered ring to be formed include a ring in which one of the bonds in the ring formed by the $R^8$, $Y^1$, and the carbon atom described above has changed to a double bond.

In General Formula (III), when the five-membered, six-membered, and seven-membered rings formed by $R^8$ and $Y^1$ or $R^9$ and $Y^2$ being bonded to each other are rings that can be further substituted, they may be substituted by any of the substituents T described above, and when they are substituted by two or more substituents, those substituents may be the same or different.

Preferable aspects of the compound represented by General Formula (III) are shown below.

That is, $R^2$ to $R^5$, $R^7$ and Ma are preferable aspects, respectively, of the complex that includes the compound represented by General Formula (I) and the metal atom or metal compound, and $X^3$ represents NR(R is a hydrogen atom, alkyl group), a nitrogen atom, or oxygen atom, $X^4$ represents NRa (Ra is a hydrogen atom, alkyl group, heterocyclic group), or an oxygen atom, $Y^1$ represents NRc (Rc is a hydrogen atom or alkyl group), a nitrogen atom, or carbon atom, $Y^2$ represents a nitrogen atom or carbon atom, $X^5$ represents a group that is bonded via an oxygen atom, $R^8$ and $R^9$ respectively represent an alkyl group, aryl group, heterocyclic group, alkoxy group, or amino group independently, or $R^8$ and $Y^1$ are bonded to each other to form a five-membered or six-membered ring, and $R^9$ and $Y^2$ are bonded to each other to form a five-membered or six-membered ring, and a is represented by 0 or 1.

More preferable aspects of the compound represented by General Formula (III) are shown below.

That is, $R^2$ to $R^5$, $R^7$ and Ma are preferable aspects, respectively, of the complex that includes the compound represented by General Formula (I) and the metal atom or metal compound, and $X^3$ and $X^4$ represent an oxygen atom, $Y^1$ represents NH, $Y^2$ represents a nitrogen atom, $X^5$ represents a group that is bonded via an oxygen atom, $R^8$ and $R^9$ respectively represent an alkyl group, aryl group, heterocyclic group, alkoxy group, or alkylamino group independently, or $R^8$ and $Y^1$ are bonded to each other to form a five-membered or six-membered ring, and $R^9$ and $Y^2$ are bonded to each other to form a five-membered or six-membered ring, and a is represented by 0 or 1.

Specific examples of the specific complex in the present invention are shown below, but the present invention is not limited to those.

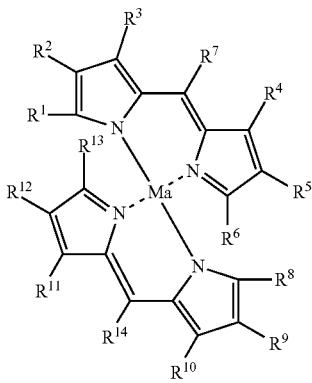

| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-3 | —NH₂ | C₄H₉(t)<br>—COO—⟨cyclohexyl with C₄H₉(t), C₄H₉(t), CH₃⟩—CH₃ | —CH₃ | —H | Zn |
| Ia-4 | " | " | " | " | V=O |
| Ia-5 | —NHCOCH₃ | " | " | " | Zn |
| Ia-6 | " | " | " | " | Cu |
| Ia-7 | " | " | " | —CH₃ | Zn |
| Ia-8 | —NHCOCH₂OCH₂COOH | " | " | " | Zn |
| Ia-9 | " | " | " | " | Zn |
| Ia-10 | " | " | —C₃H₇(iso) | —H | Zn |
| Ia-11 | " | " | " | —CH₃ | Zn |
| Ia-12 | " | " | —C₄H₉(t) | —H | Cu |
| Ia-13 | —NH₂ | " | " | —CH₃ | Zn |
| Ia-14 | " | " | " | —H | Zn |
| Ia-15 | " | " | ⟨cyclohexyl⟩ | " | Zn |
| Ia-16 | —NHCOCH₃ | " | —CH₂S—CH(CH₃)CHCOOH | —CH₃ | Cu |
| Ia-17 | —NH₂ | " | ⟨phenyl⟩ | —H | Zn |
| Ia-18 | " | " | " | " | Cu |
| Ia-19 | " | " | " | " | V=O |
| Ia-20 | " | " | " | —CH₃ | Zn |
| Ia-21 | —NHCOCH₃ | " | " | " | Zn |
| Ia-22 | —NHCOCH₂OCH₂COOH | " | " | —H | Zn |
| Ia-23 | " | " | " | —CH₃ | Zn |

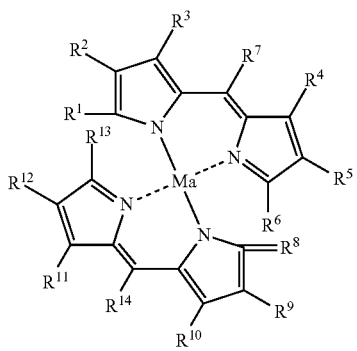

| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-24 | —NHCOCH$_2$OCH$_2$COOH | —COO-cyclohexyl with 2,6-di-C$_4$H$_9$(t) and 4-CH$_3$ | phenyl | —CH$_3$ | Cu |
| Ia-25 | " | —COO-cyclohexyl with 2,6-di-C$_4$H$_9$(t) and 4-CH$_3$ | 4-Cl-phenyl | " | Zn |
| Ia-26 | " | —COO-cyclohexyl with 2,6-di-C$_4$H$_9$(t) and 4-CH$_3$ | 2-CH$_3$-phenyl | " | Zn |
| Ia-27 | —NHCO-(2-COOH-phenyl) | —COO-cyclohexyl with 2,6-di-C$_4$H$_9$(t) and 4-CH$_3$ | —CH$_3$ | —H | Cu |
| Ia-28 | —NHCO-(2-COOH-phenyl) | —COO-cyclohexyl with 2,6-di-C$_4$H$_9$(t) and 4-CH$_3$ | " | —CH$_3$ | Zn |
| Ia-29 | —NHCO-(3-SO$_3$H-phenyl) | —COO-cyclohexyl with 2,6-di-C$_4$H$_9$(t) and 4-CH$_3$ | " | " | Cu |

-continued

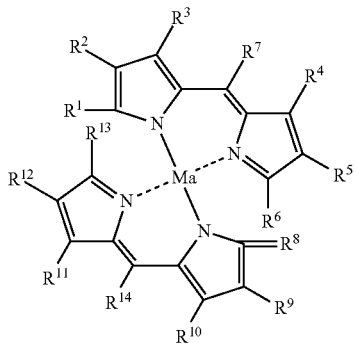

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-30 | —NHCO—⟨C₆H₄⟩—SO₃H | —COO—⟨cyclohexyl with 2,6-di-C₄H₉(t), 4-CH₃⟩ | —CH₂—CH(C₂H₅)C₄H₉ | " | Cu |
| Ia-31 | —N(maleimidyl) | —COO—⟨cyclohexyl with 2,6-di-C₄H₉(t), 4-CH₃⟩ | —C₆H₅ | " | Zn |
| Ia-32 | —N(3-methylmaleimidyl) | —COO—⟨cyclohexyl with 2,6-di-C₄H₉(t), 4-CH₃⟩ | —C₆H₅ | " | Zn |
| Ia-33 | —NHSO₂CH₃ | —COO—⟨cyclohexyl with 2,6-di-C₄H₉(t), 4-CH₃⟩ | —CH₃ | " | Zn |
| Ia-34 | —CH₂O—⟨C₆H₄⟩—N(thiomorpholine-S,S-dioxide) | —COO—⟨cyclohexyl with 2,6-di-C₄H₉(t), 4-CH₃⟩ | " | " | Zn |

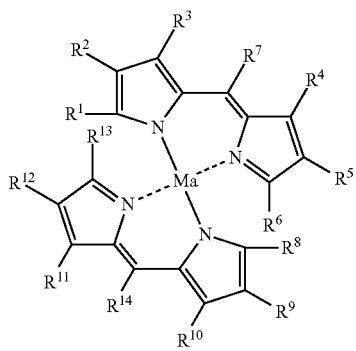

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-35 | —CH₂O—⟨C₆H₄⟩—OCH₃ | —COO—(cyclohexyl with 2,6-di-C₄H₉(t), 4-CH₃) | —C₆H₅ (phenyl) | —CH₃ | Zn |
| Ia-36 | —N(CH₃)—SO₂CH₃ | —COO—(cyclohexyl with 2,6-di-C₄H₉(t), 4-CH₃) | —C₆H₅ | " | Zn |
| Ia-37 | —N(CH₂COOH)—SO₂CH₃ | —COO—(cyclohexyl with 2,6-di-C₄H₉(t), 4-CH₃) | —C₆H₅ | " | Zn |
| Ia-38 | —Cl | —COO—(cyclohexyl with 2,6-di-C₄H₉(t), 4-CH₃) | —C₆H₅ | " | Cu |
| Ia-39 | —S—CH₂COOH | —COO—(cyclohexyl with 2,6-di-C₄H₉(t), 4-CH₃) | —C₆H₅ | " | Cu |
| Ia-40 | —S—CH(CH₃)COOH | —COO—(cyclohexyl with 2,6-di-C₄H₉(t), 4-CH₃) | —CH₃ | " | Cu |

-continued
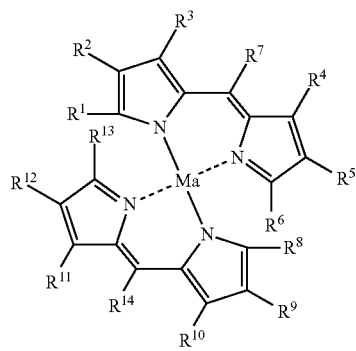
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-41 | —S—CH(CH₃)COOH | —COO-(2,6-di-t-C₄H₉-4-CH₃-cyclohexyl) | " | " | V=O |
| Ia-42 | —SO₂CH₃ | —COO-(2,6-di-t-C₄H₉-4-CH₃-cyclohexyl) | " | " | V=O |
| Ia-43 | " | —COO-(2,6-di-t-C₄H₉-4-CH₃-cyclohexyl) | —C₆H₅ (phenyl) | " | Cu |
| Ia-44 | 3,5-dimethylpyrazol-1-yl | —COO-(2,6-di-t-C₄H₉-4-CH₃-cyclohexyl) | —C₆H₅ (phenyl) | " | Cu |
| Ia-45 | —CH₃ | —COO-(2,6-di-t-C₄H₉-4-CH₃-cyclohexyl) | —CH₃ | —H | Cu |
| Ia-46 | " | —COO-(2,6-di-t-C₄H₉-4-CH₃-cyclohexyl) | " | —CH₃ | Zn |

-continued
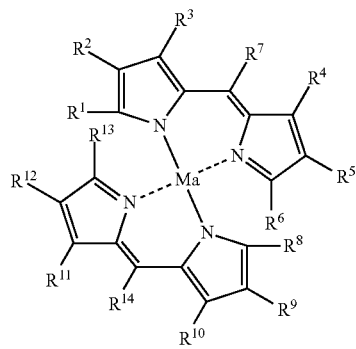
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-47 | " | 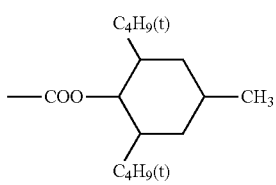 | " | " | Cu |
| Ia-48 | " | 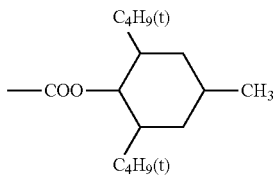 | " | " | Ni |
| Ia-49 | —C$_4$H$_9$(t) | 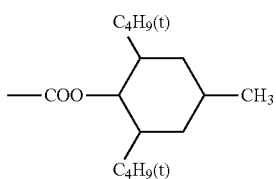 | " | " | Zn |
| Ia-50 | " | 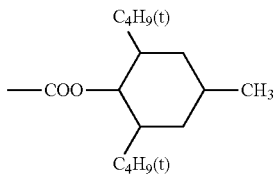 | " | " | Pd |
| Ia-51 | —CH$_2$CH$_2$COOH | 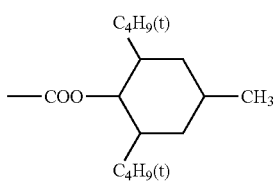 | " | " | Zn |

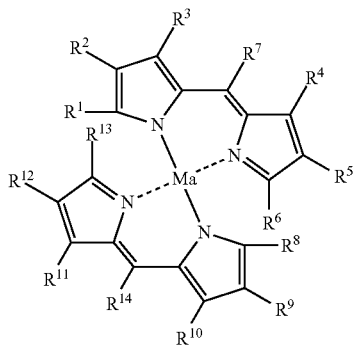
| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-52 | —CH₂CH₂COOH | —COO-(2,6-di-$C_4H_9(t)$-4-$CH_3$-cyclohexyl) | phenyl | —CH₃ | Zn |
| Ia-53 | —CH₃ | —COO-(2,6-di-$C_4H_9(t)$-4-$CH_3$-cyclohexyl) | phenyl | " | Zn |
| Ia-54 | " | —COO-(2,6-di-$C_4H_9(t)$-4-$CH_3$-cyclohexyl) | 4-COOH-phenyl | " | Zn |
| Ia-55 | " | —COO-(2,6-di-$C_4H_9(t)$-4-$CH_3$-cyclohexyl) | 4-COOH-phenyl | " | Cu |
| Ia-56 | " | —COO-(2,6-di-$C_4H_9(t)$-4-$CH_3$-cyclohexyl) | 4-COOH-phenyl | phenyl | Zn |
| Ia-57 | phenyl | —COO-(2,6-di-$C_4H_9(t)$-4-$CH_3$-cyclohexyl) | —CH₃ | —H | Zn |

-continued

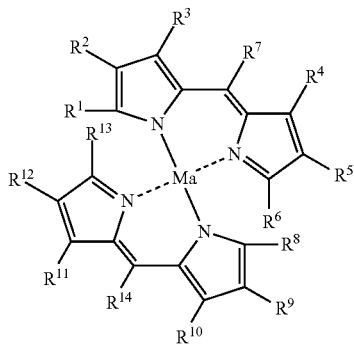

| No. | R¹, R⁶, R⁸, R¹³ | R², R⁵, R⁹, R¹² | R³, R⁴, R¹⁰, R¹¹ | R⁷, R¹⁴ | Ma |
|---|---|---|---|---|---|
| Ia-58 | ![phenyl] | —COO-(2,6-di-t-Bu-4-methylcyclohexyl) C₄H₉(t), C₄H₉(t), CH₃ | " | —CH₃ | Zn |
| Ia-59 | 4-COOH-phenyl | —COO-(2,6-di-t-Bu-4-methylcyclohexyl) | —CH₂O—C₆H₄—N(SO₂)(morpholine-sulfone) | " | Zn |
| Ia-60 | 4-COOH-phenyl | —COOCH₂—CH(C₆H₁₃)C₈H₁₇ | —CH₂CH₂—O—C₆H₄—OCH₃ | " | Zn |
| Ia-61 | 3-(NHCOCH₂CH₂COOH)-phenyl | —COOCH₂—CH(C₂H₅)C₄H₉ | —CH₂CH₂—O—C₆H₄—OCH₃ | " | Zn |
| Ia-62 | 2-pyridyl | —COO-(2,6-di-t-Bu-4-methylcyclohexyl) | —CH₂CH₂—O—C₆H₄—OCH₃ | " | Zn |
| Ia-63 | —CH₃ | —COO-(2,6-di-t-Bu-4-methylcyclohexyl) | —CH₂CH₂—O—C₆H₄—OCH₃ | " | Cu |

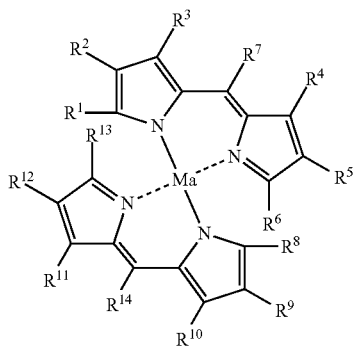

| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-67 | —NH₂ | —CN | —CH₃ | —H | Zn |
| Ia-68 | —NHCOCH₃ | " | " | —CH₃ | Zn |
| Ia-69 | —CH₃ | " | " | " | Zn |
| Ia-70 | " | " | —C₆H₅ (phenyl) | " | Zn |
| Ia-71 | —C₁₃H₂₇ | " | —CH₃ | —C₆H₅ (phenyl) | Cu |
| Ia-72 | —NH₂ | " | —CF₃ | —C₆H₅ (phenyl) | Cu |
| Ia-73 | —NHCOCH₂OCH₂COOH | " | " | —C₆H₅ (phenyl) | Cu |
| Ia-74 | —NHCO—CH(C₄H₉)—O—C₆H₄—N(morpholine-SO₂) | " | " | —CH₃ | Zn |
| Ia-75 | —C₆H₄—CO—N(CH₂CH₂OCH₃)₂ | " | —C₃H₇(iso) | " | Zn |
| Ia-76 | —C₆H₄—CO—N(CH₂CH₂OCH₃)₂ | " | —C₆H₅ (phenyl) | " | Zn |
| Ia-77 | —C₆H₄—CO—N(CH₂CH₂OCH₃)₂ | " | —CF₃ | " | Zn |
| Ia-78 | —NHCOCH₂OCH₂COOH | " | —C₆H₄—CO—N(CH₂CH₂OCH₃)₂ | " | Zn |
| Ia-79 | 2-pyridyl | —COO—(2,4-di-t-C₄H₉-5-CH₃-cyclohexyl) | mesityl (2,4,6-tri-CH₃-C₆H₂) | —H | Zn |

-continued
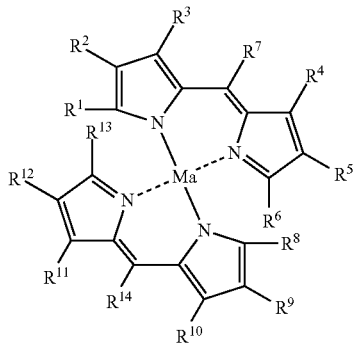
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-80 | 2-pyridyl | —COO-(2,4-di-t-Bu-5-methylcyclohexyl) | —C$_4$H$_9$(t) | " | Zn |
| Ia-81 | —C$_{13}$H$_{27}$ | —COO-(2,4-di-t-Bu-5-methylcyclohexyl) | 2-pyridyl | " | Zn |
| Ia-82 | —NHCOCH$_2$OCH$_2$COOH | —COOC$_2$H$_5$ | 3-methylphenyl-SO$_2$N(CH$_3$CH$_2$OC$_2$H$_5$)$_2$ | " | Cu |
| Ia-83 | 3-methylphenyl-SO$_2$—N(CH$_2$COOH)$_2$ | —COO-(2,4-di-t-Bu-5-methylcyclohexyl) | —CH$_3$ | " | Zn |

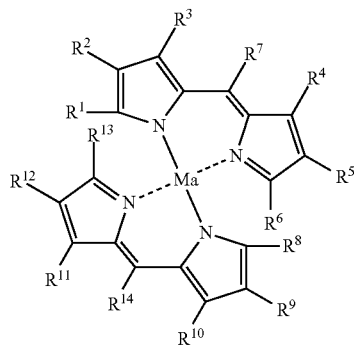
| No. | $R^1, R^6, R^8, R^{13}$ | $R^2, R^5, R^9, R^{12}$ | $R^3, R^4, R^{10}, R^{11}$ | $R^7, R^{14}$ | Ma |
|---|---|---|---|---|---|
| Ia-A | —NHCOCH$_3$ | C$_4$H$_9$(t) ... —COO— ... CH$_3$ ... C$_4$H$_9$(t) | —CH$_3$ | (pyrrole-CH$_2$COOH) | Zn |
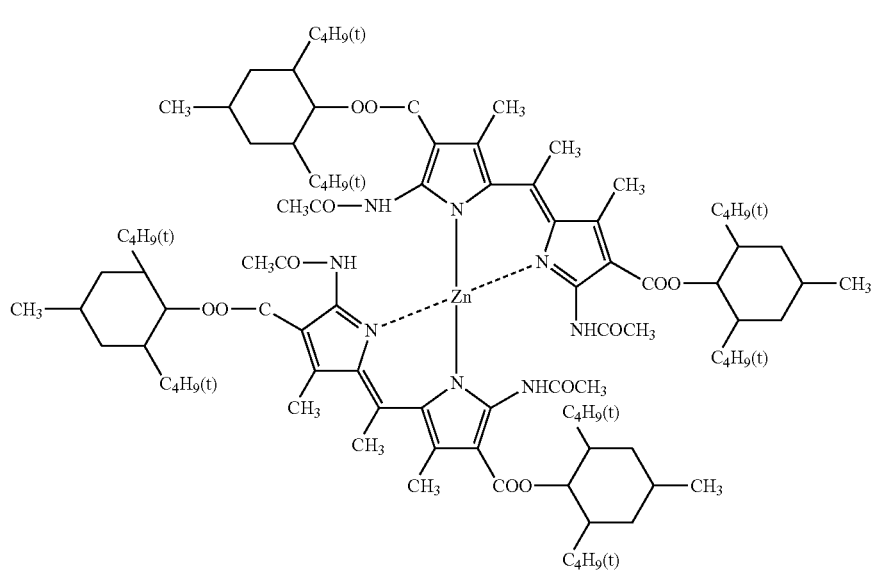
IIa-1

IIa-2
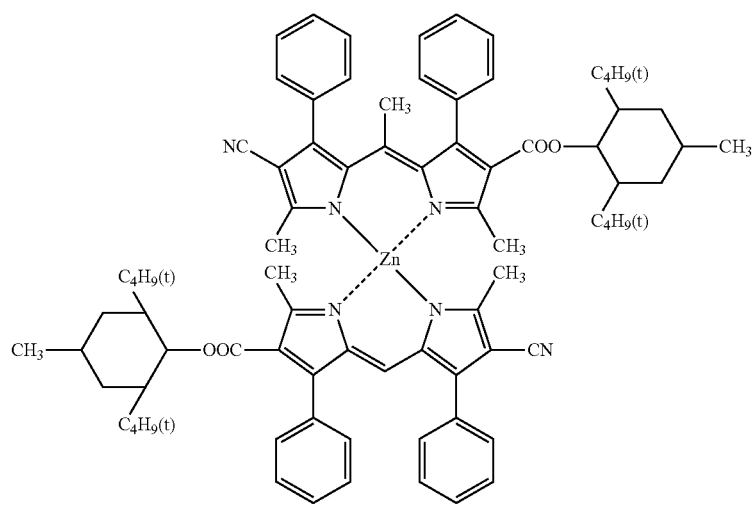
IIa-3
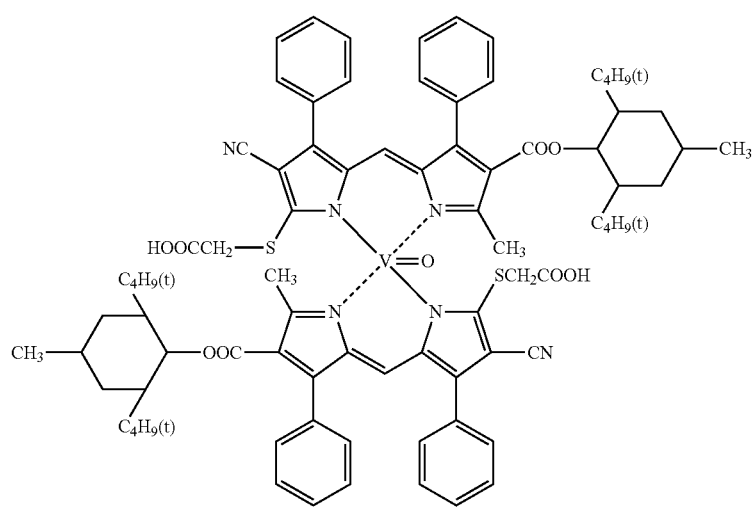
IIa-4
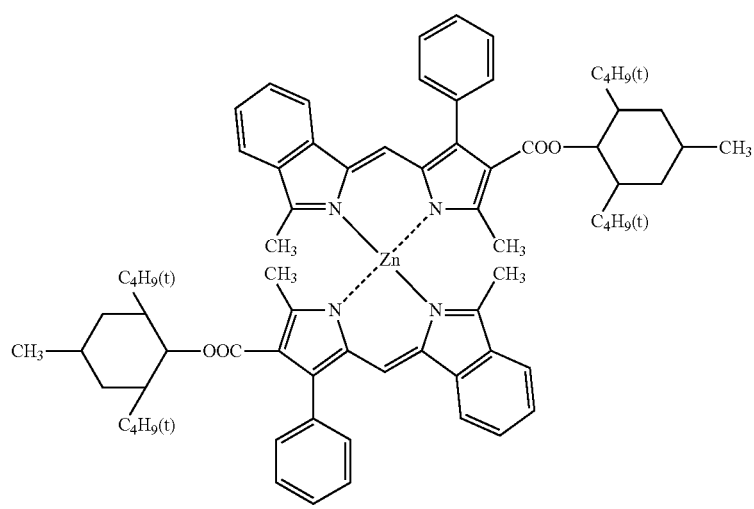

IIa-5
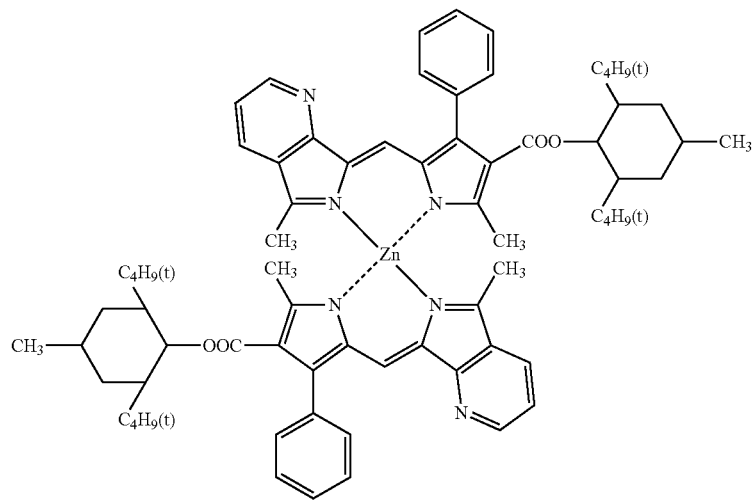
IIa-6
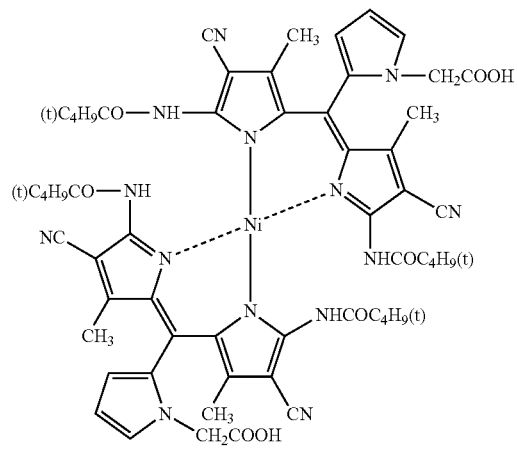
IIa-7
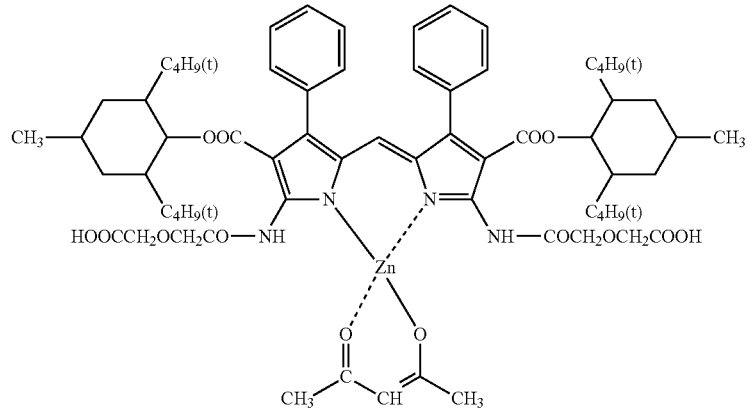

-continued
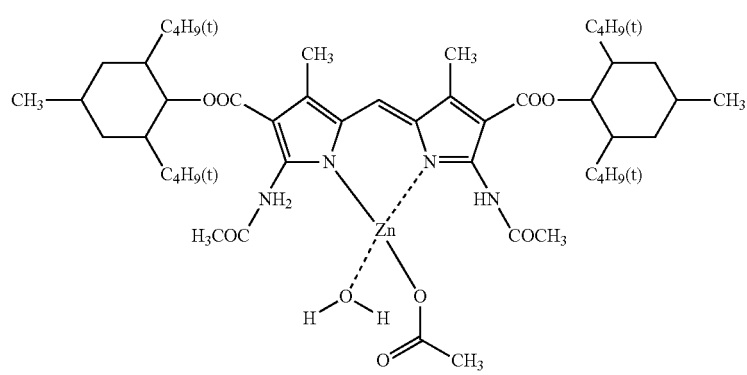
IIa-8
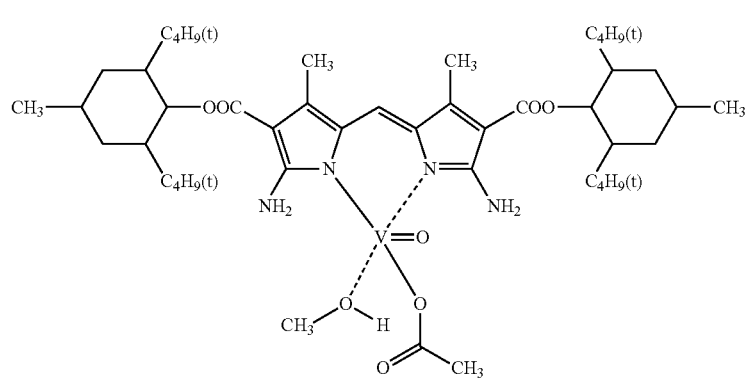
IIa-10
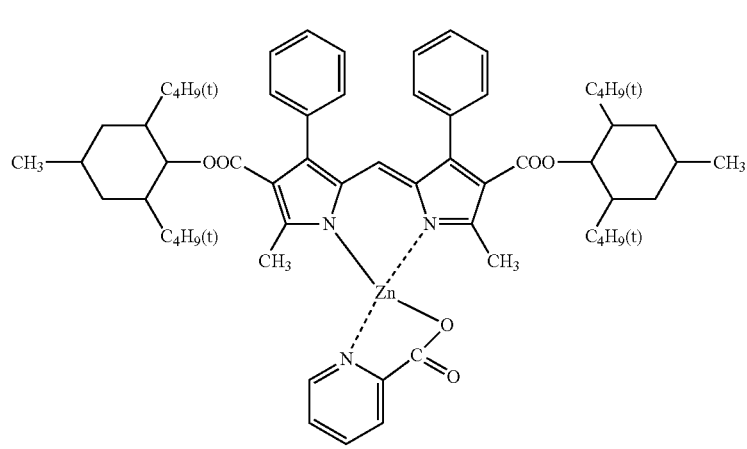
IIa-11
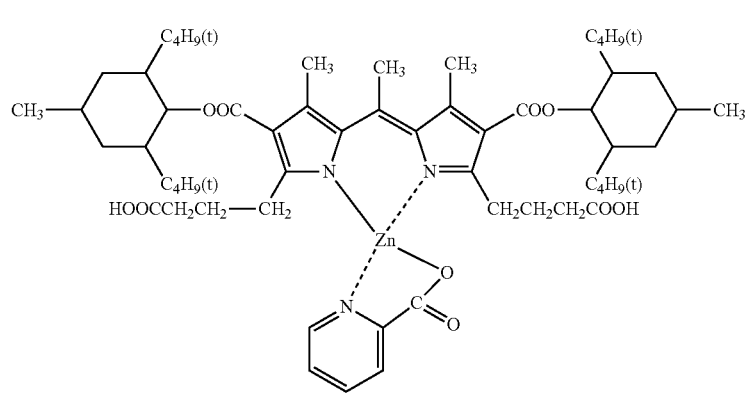
IIa-12

-continued
IIa-13
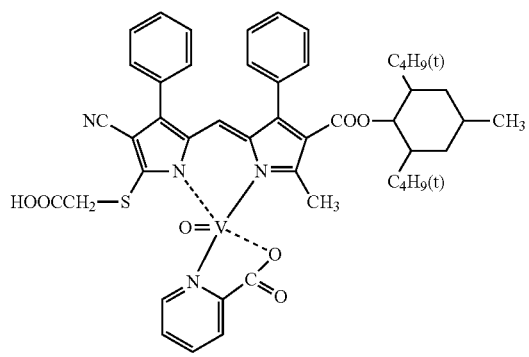
IIa-14
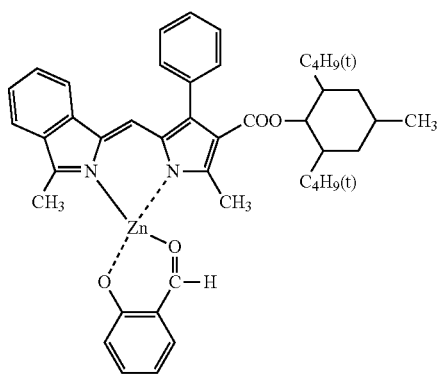
IIa-15
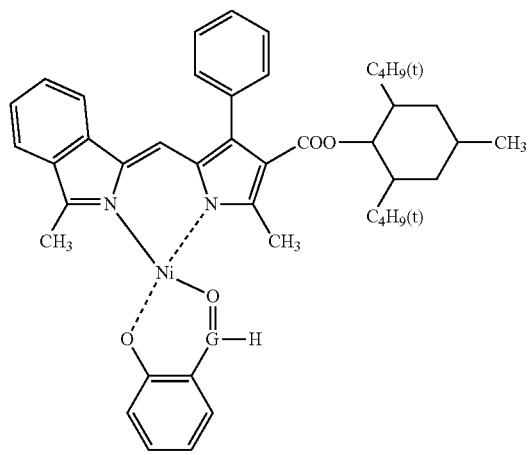
IIa-16
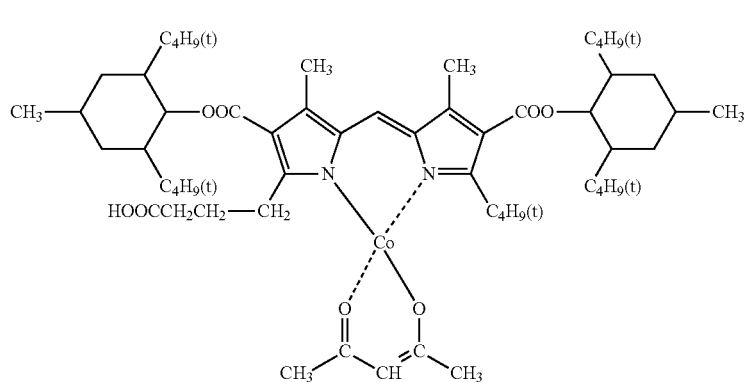
IIa-17
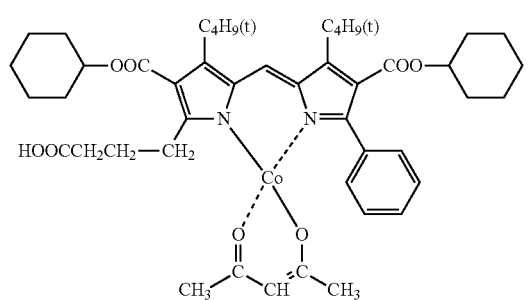
IIa-18
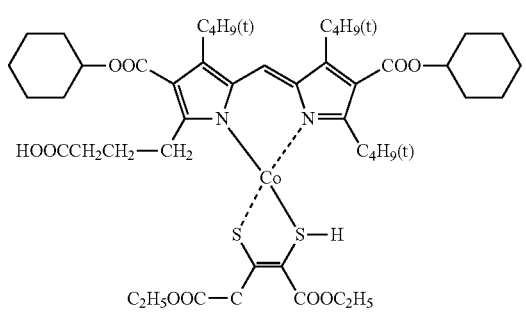

-continued
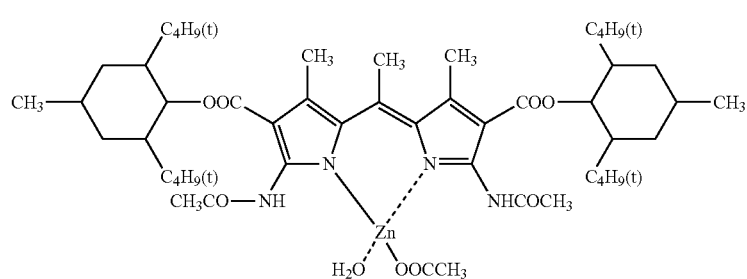
IIa-19
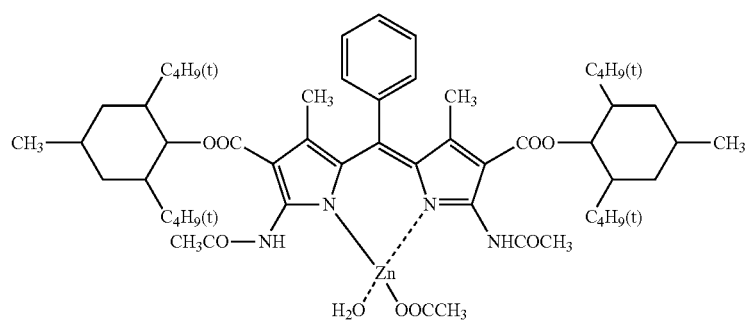
IIa-20
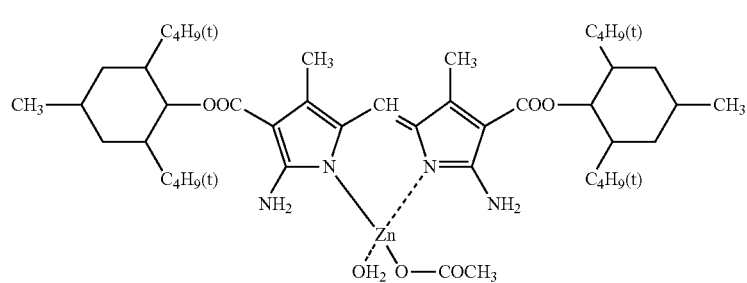
I-1
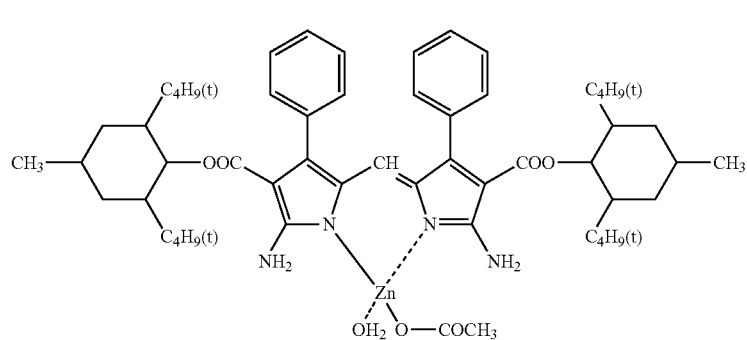
I-2
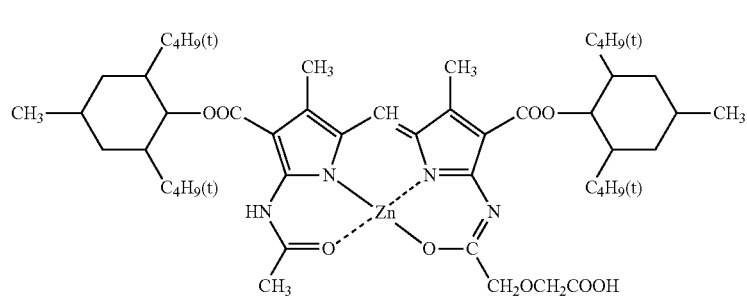
I-3

-continued
I-4
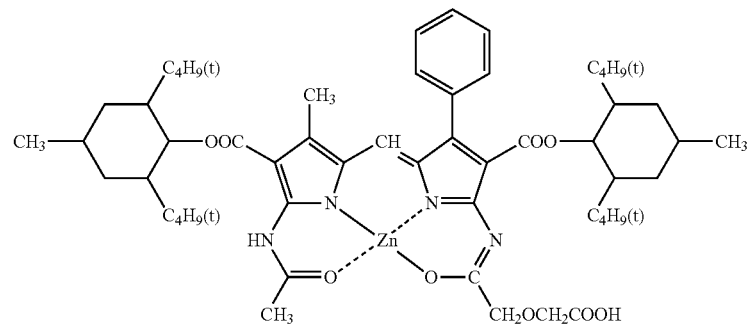
I-5
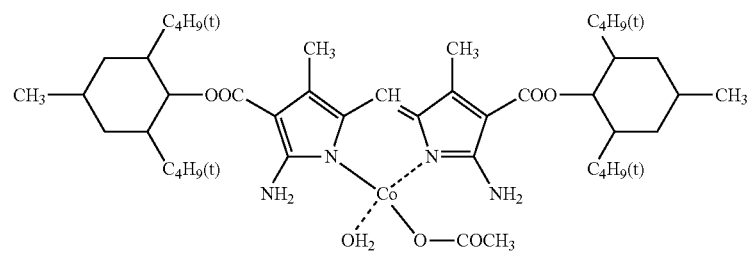
I-6
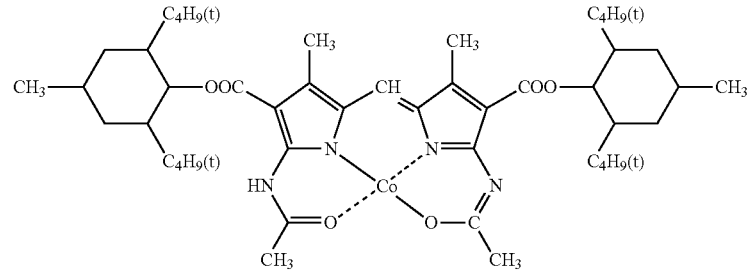
I-7
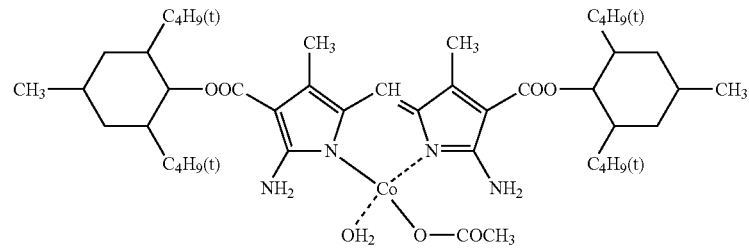
I-8
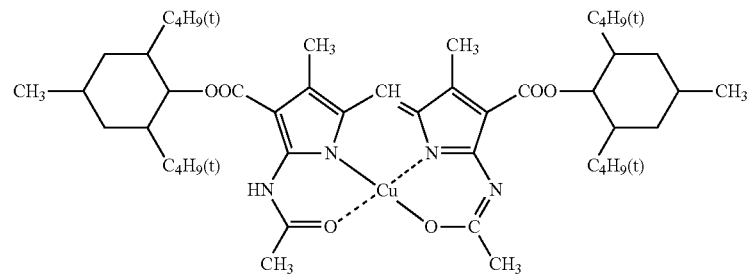

-continued
I-9
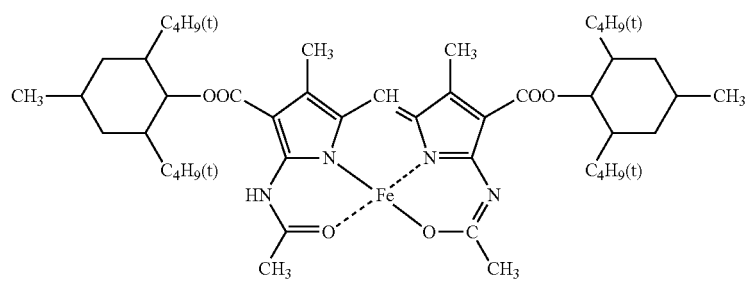
I-10
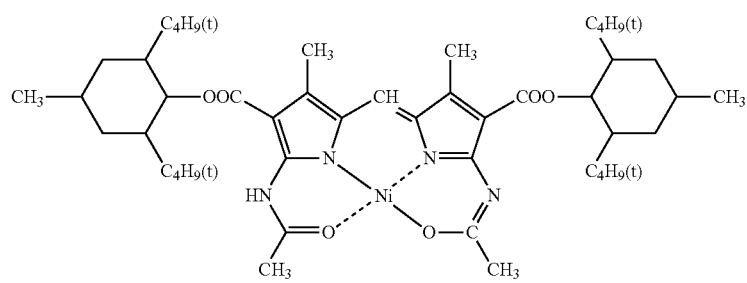
I-11
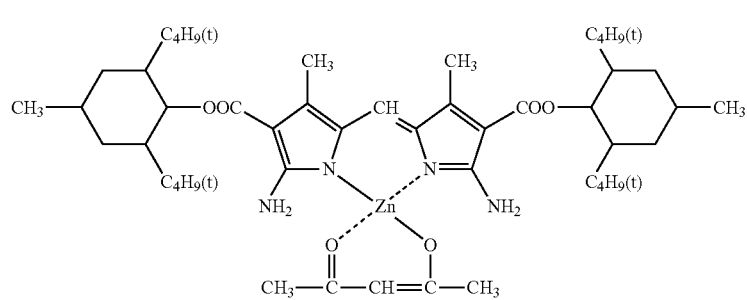
I-12
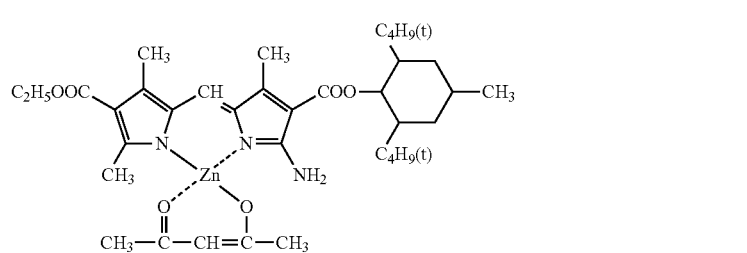
I-13
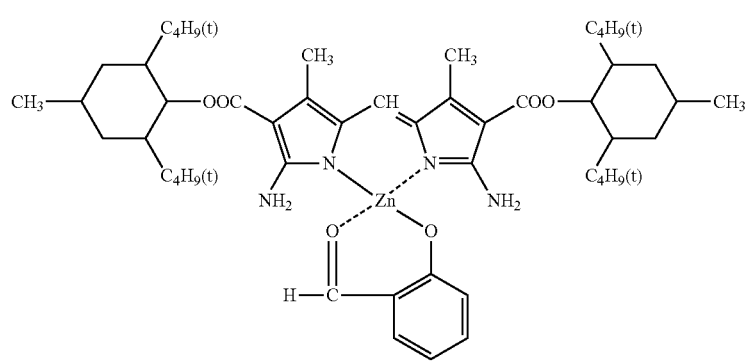

-continued
I-14
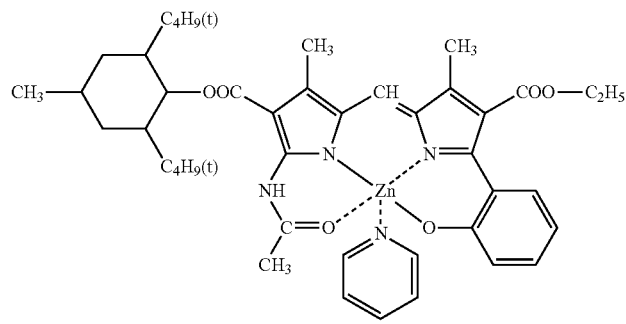
I-15
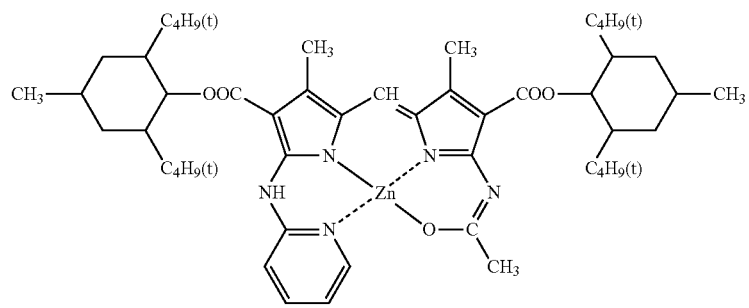
I-16
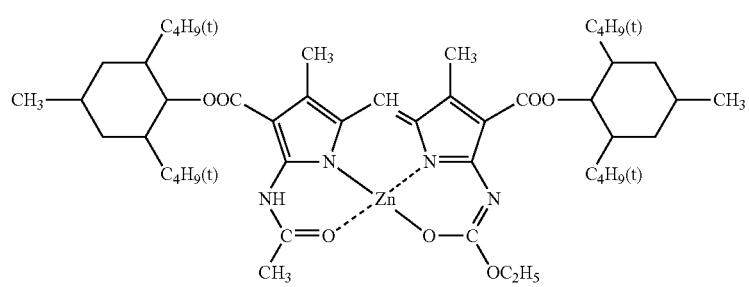
I-17
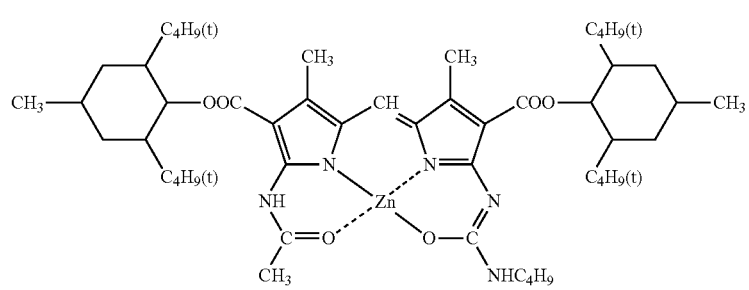
I-18
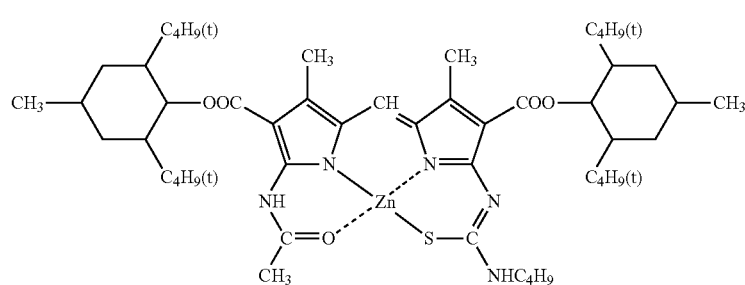

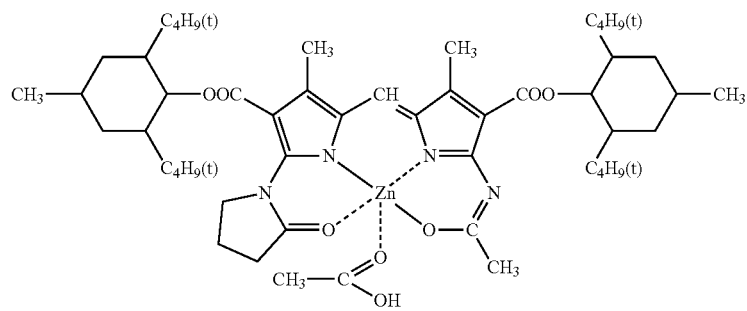
I-19
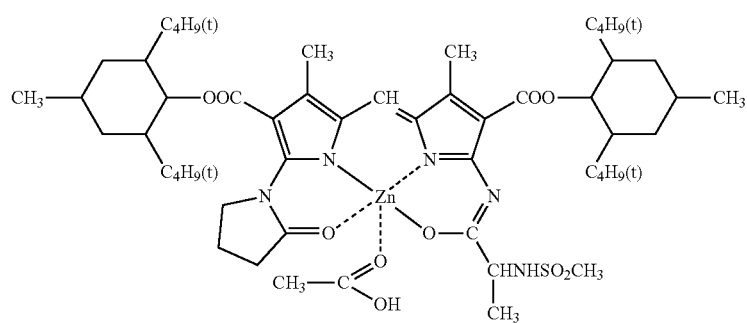
I-20
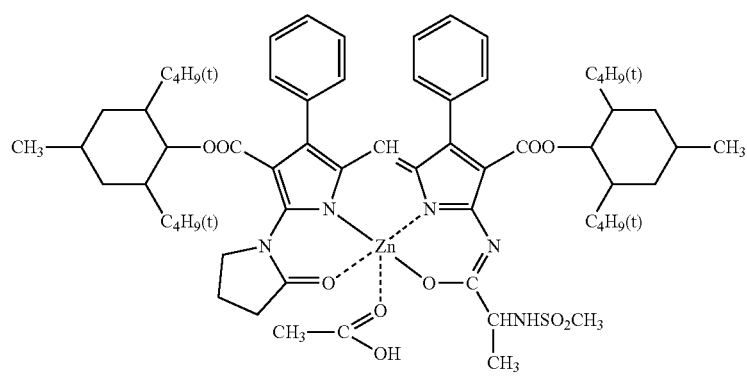
I-21
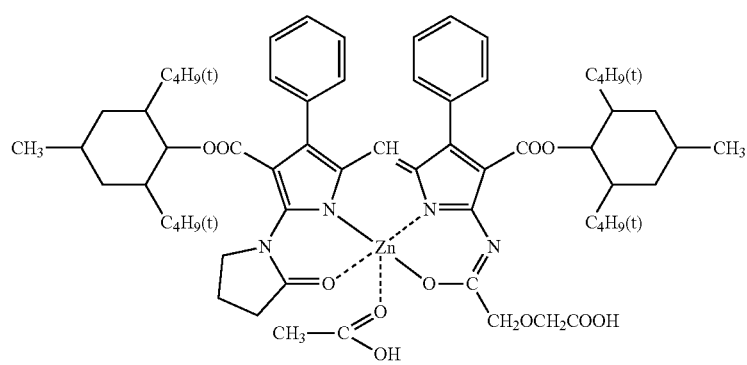
I-22

-continued
I-23
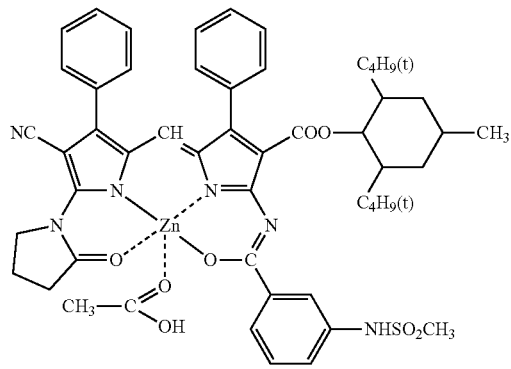
I-24
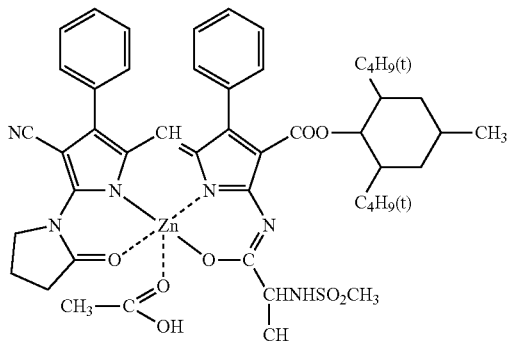
I-25
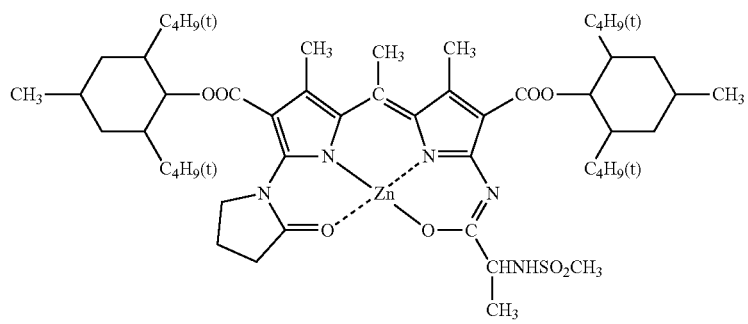
I-26
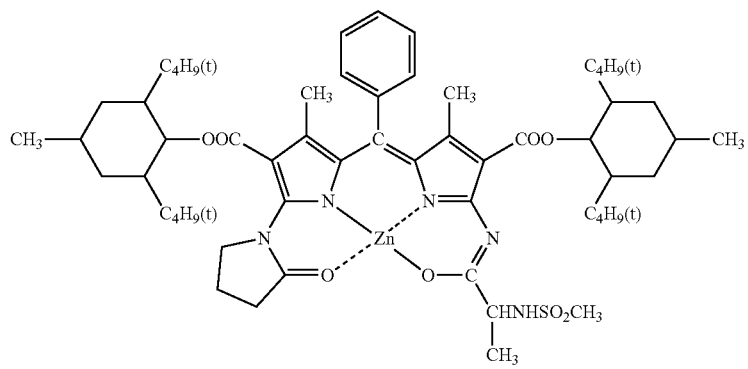
I-27
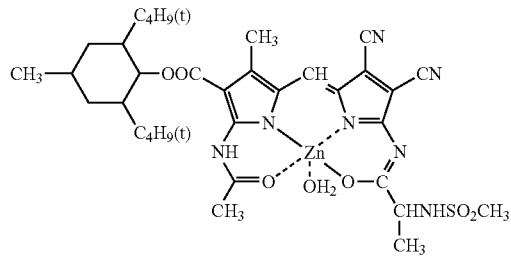
I-28
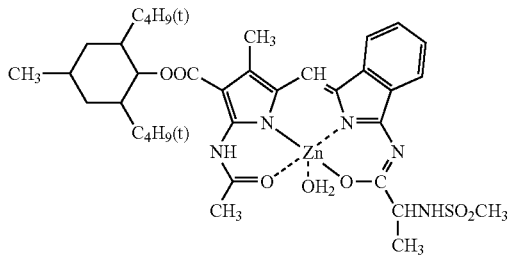
I-29
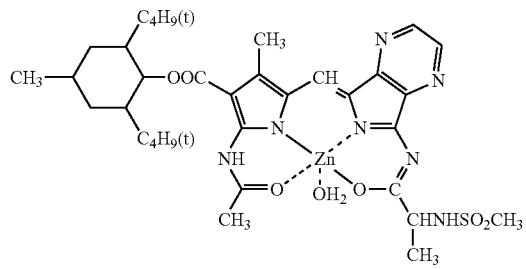

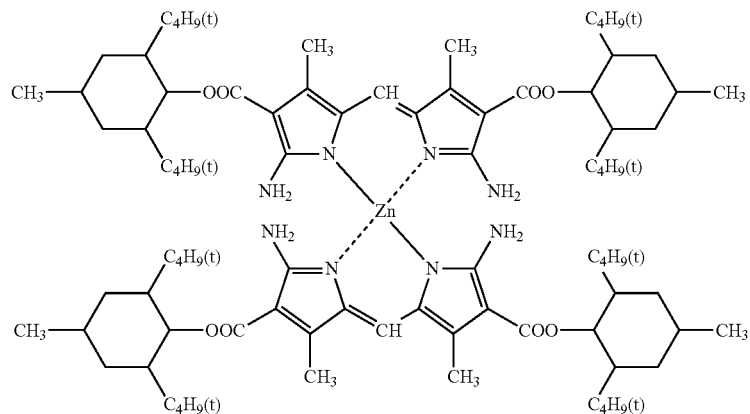
I-30
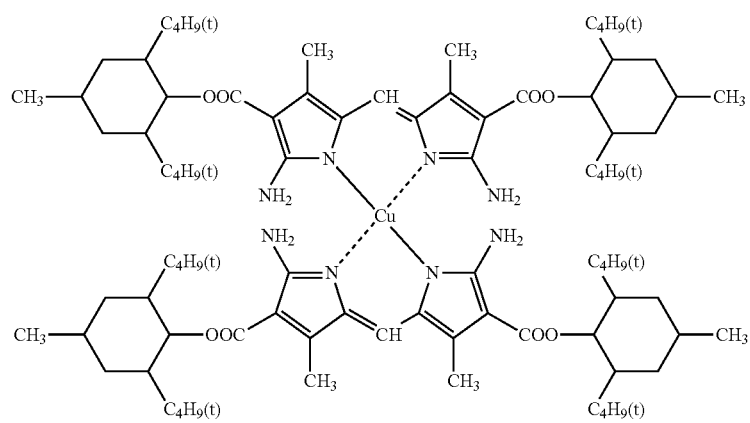
I-31
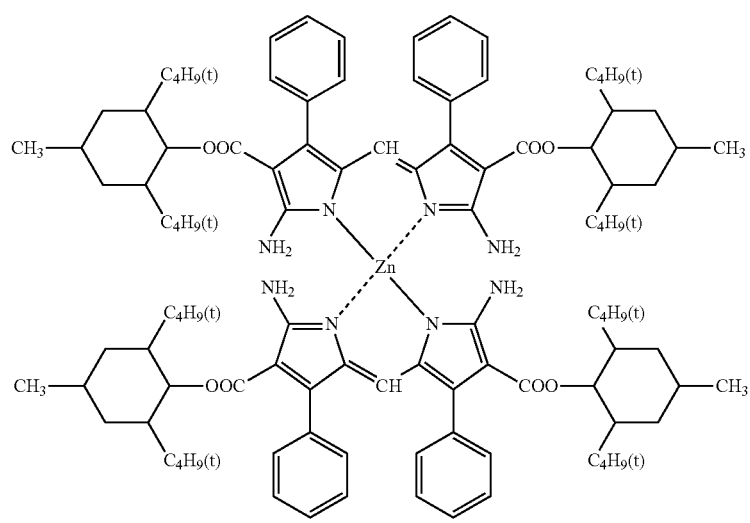
I-32

I-33
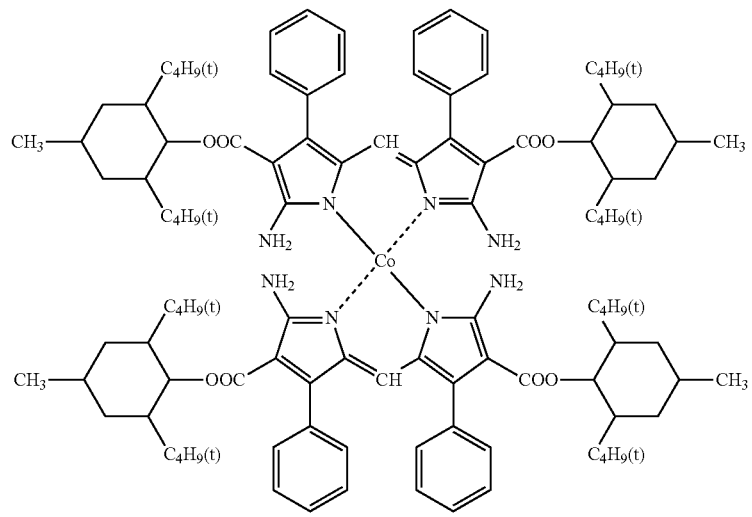
I-34
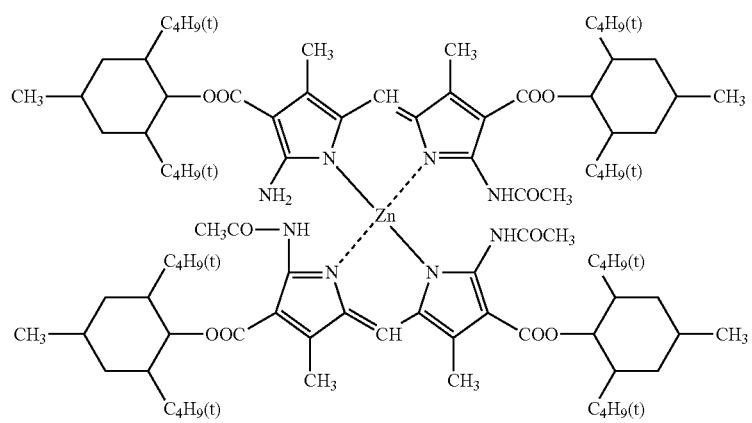
I-35
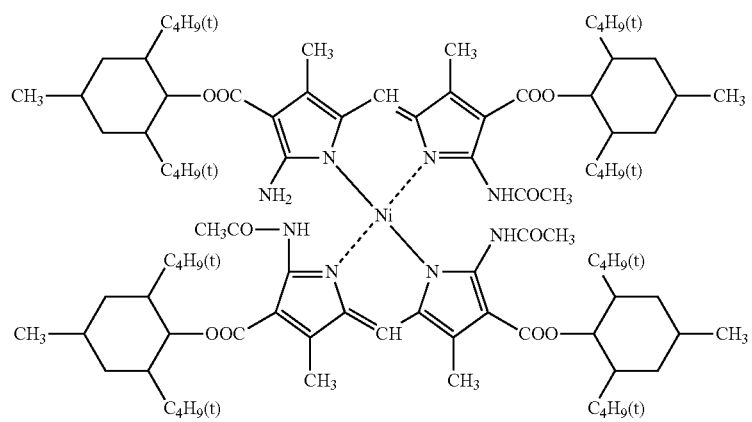

I-36
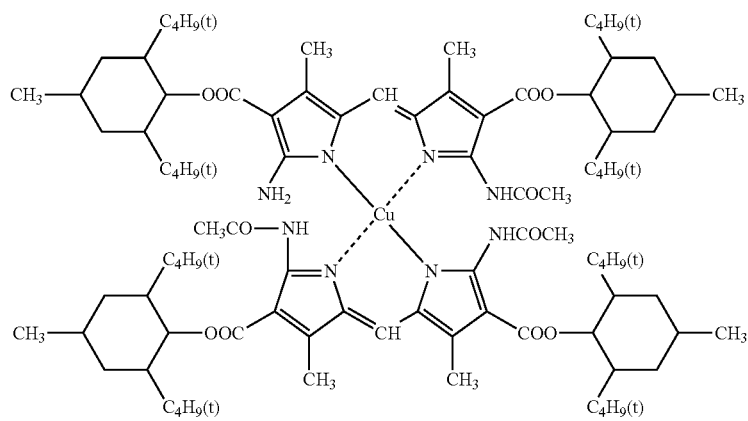
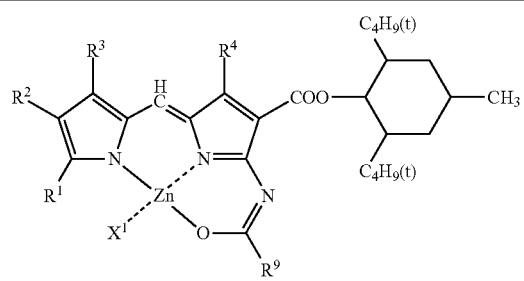
| No. | R¹ | R² | R³ | R⁴ | R⁹ | X¹ |
|---|---|---|---|---|---|---|
| II-1 | —CH₃ | —COOC₂H₅ | —CH₃ | —CH₃ | —CH₃ | H₂O |
| II-2 | " | " | " | " | —CH(CH₃)NHSO₂CH₃ | " |
| II-3 | " | " | " | " | 3-(NHSO₂CH₃)C₆H₄— | " |
| II-4 | 3-(NHSO₂CH₃)C₆H₄— | —COOCH₃ | " | —C₆H₅ | —CH₃ | " |
| II-5 | 3-(NHSO₂CH₃)C₆H₄— | —COOC₂H₅ | " | —C₆H₅ | —CH₂OCH₂COOH | " |
| II-6 | 3-(NHSO₂CH₃)C₆H₄— | " | " | —C₆H₅ | —CH₃ | " |

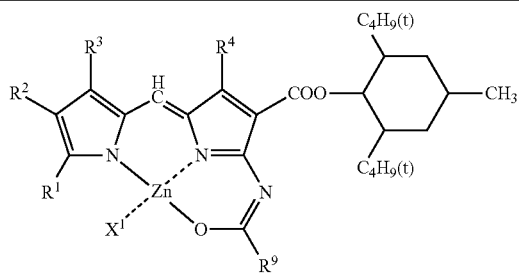
| No. | R¹ | R² | R³ | R⁴ | R⁹ | X¹ |
|---|---|---|---|---|---|---|
| II-7 | —CH₃ | —COOC₂H₅ | phenyl | phenyl | —CH₃ | H₂O |
| II-8 | 3-pyridyl | " | phenyl | phenyl | " | " |
| II-9 | 3-(NHSO₂CH₃)phenyl | —CN | —CH₃ | —CH₃ | " | " |
| II-10 | 3-(NHSO₂CH₃)phenyl | " | " | " | 3-(NHSO₂CH₃)phenyl | " |
| II-11 | 3-(NHSO₂CH₃)phenyl | " | phenyl | phenyl | —CH₃ | " |
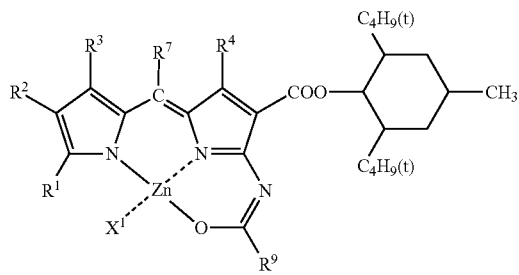
| No. | R¹ | R² | R³ | R⁴ | R⁷ | R⁹ | X¹ |
|---|---|---|---|---|---|---|---|
| II-A | —CH₃ | —COOC₂H₅ | —CH₃ | —CH₃ | 1-(CH₂COOH)-2-pyrrolyl | —CH₃ | H₂O |

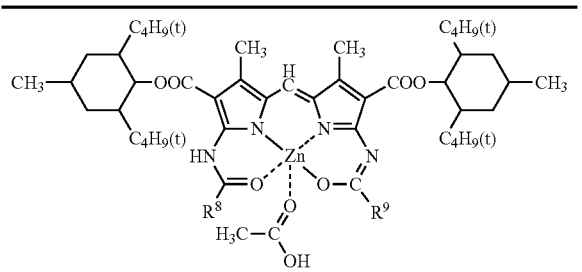
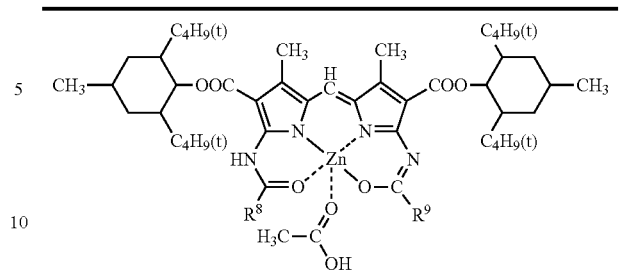

| No. | R⁸ | R⁹ |
|---|---|---|
| III-1 | —$CH_3$ | —$CH_3$ |
| III-2 | —CH($C_2H_5$)$C_4H_9$ | " |
| III-3 | —$C_4H_9(t)$ | " |
| III-4 | —CH($C_2H_5$)$C_4H_9$ | —CH($C_2H_5$)$C_4H_9$ |
| III-5 | —$C_4H_9(t)$ | —$C_4H_9(t)$ |
| III-6 | —CH₂-cyclohexyl | —$CH_3$ |
| III-7 | —CH($CH_3$)S—$C_4H_9$ | " |
| III-8 | —$CH_2OCH_3$ | " |
| III-9 | —CH($C_2H_5$)—O—C₆H₄—$OCH_3$ | " |
| III-10 | —CH($C_2H_5$)—O—C₆H₄—N(morpholine-SO₂) | " |
| III-11 | —CH($CH_3$)—S—$CH_2COOC_2H_5$ | " |
| III-12 | —CH=C($CH_3$)$CH_2$... —C(=CH₂)$CH_3$ | " |
| III-13 | —C($CH_3$)($CH_3$)—$COOCH_3$ | " |
| III-14 | —CO—CH($CH_3$)—$COCH_3$ | " |
| III-15 | —$CH_2OCH_2COOC_2H_5$ | " |
| III-16 | —$CH_2NHSO_2CH_3$ | " |
| III-17 | —CH($CH_3$)$NHSO_2CH_3$ | " |
| III-18 | —CH($C_2H_5$)$NHSO_2CH_3$ | " |
| III-19 | —CH($C_4H_9$)$NHSO_2CH_3$ | " |
| III-20 | —CH(CH($CH_3$)$_2$)$NHSO_2CH_3$ | " |
| III-21 | —CH($CH_3$)$NHSO_2$—$C_4H_9$ | " |
| III-22 | —CH($CH_3$)$NHSO_2$—C₆H₄—$CH_3$ | " |
| III-23 | —CH($CH_3$)$NHSO_2$—C₆H₄—$NHSO_2CH_3$ | " |
| III-24 | —CH($CH_3$)$NHSO_2$—N($C_2H_5$)$_2$ | " |
| III-25 | —CH($CH_3$)-phthalimidyl | —$CH_3$ |
| III-26 | —$CH_2CH_2COOC_2H_5$ | " |

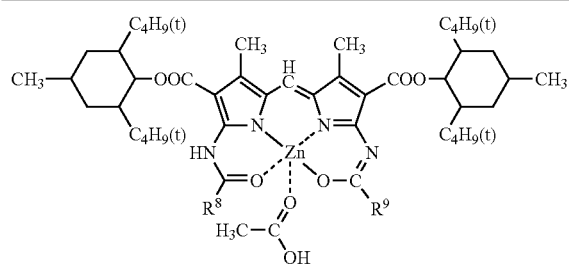

| No. | R⁸ | R⁹ |
|---|---|---|
| III-27 | (isopropyl-S-phenyl with COOCH₃) | " |
| III-28 | (CH₃)CH—S-(2-pyridyl) | " |
| III-29 | —CH₂NHSO₂CH₃ | —CH₂NHSO₂CH₃ |
| III-30 | —CH₂—CH(CH₃)NHSO₂CH₃ | —CH₂—CH(CH₃)NHSO₂CH₃ |
| III-31 | —CH₂NHSO₂CH₃ | —CH(C₂H₅)C₄H₉ |
| III-32 | —CH₂—CH(CH₃)NHSO₂CH₃ | —C₄H₉(t) |
| III-33 | phenyl | —CH₃ |
| III-34 | phenyl | —CH₂—CH(CH₃)NHSO₂CH₃ |

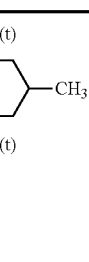

| No. | R⁸ | R⁹ |
|---|---|---|
| III-35 | 4-(t-C₄H₉)phenyl | —CH₃ |

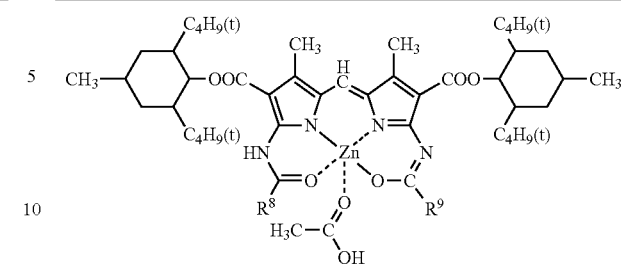

| No. | R⁸ | R⁹ |
|---|---|---|
| III-36 | 3-(NHSO₂CH₃)phenyl | " |
| III-37 | 2-(NHSO₂CH₃)phenyl | " |
| III-38 | 3-(NHSO₂Ph)phenyl | " |
| III-39 | 2-(OH)phenyl | " |
| III-40 | 2-(OCH₃)phenyl | " |
| III-41 | 3-(SO₂NH₂)phenyl | " |
| III-42 | 3-(SO₂N(CH₃)₂)phenyl | " |
| III-43 | 4-(SCH₃)phenyl | " |
| III-44 | 4-(SO₂CH₃)phenyl | " |

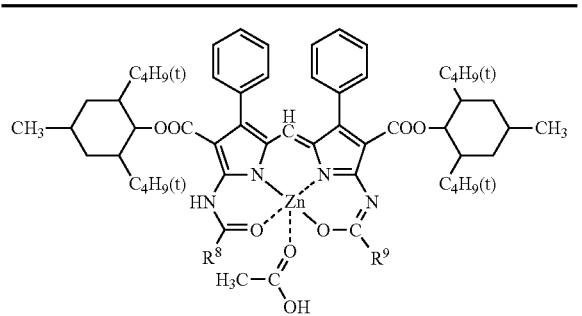
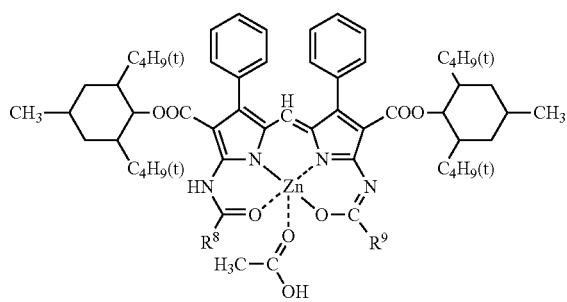

| No. | R⁸ | R⁹ |
|---|---|---|
| III-45 | —CH₃ | —CH₃ |
| III-46 | —CH(C₂H₅)C₄H₉ | —CH(C₂H₅)C₄H₉ |
| III-47 | —C₄H₉(t) | —C₄H₉(t) |
| III-48 | cyclohexyl | cyclohexyl |
| III-49 | —CH₂NHSO₂CH₃ | —CH₃ |
| III-50 | —CH₂NHSO₂CH₃ | —CH₂NHSO₂CH₃ |
| III-51 | —CH(CH₃)NHSO₂CH₃ | " |
| III-52 | —CH(CH₃)NHSO₂CH₃ | —CH(CH₃)NHSO₂CH₃ |
| III-53 | —CH(C₄H₉)NHSO₂CH₃ | " |
| III-54 | 3-(NHSO₂CH₃)C₆H₄— | —CH₃ |
| III-55 | 3-(NHSO₂CH₃)C₆H₄— | 3-(NHSO₂CH₃)C₆H₄— |
| III-56 | 3-(SO₂NHCOCH₃)C₆H₄— | 3-(NHSO₂CH₃)C₆H₄— |

| No. | R⁸ | R⁹ |
|---|---|---|
| III-57 | 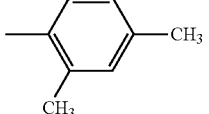 (mesityl) | —CH₃ |
| III-58 | 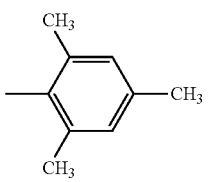 (mesityl) | mesityl |
| III-59 | 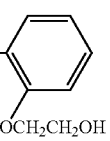 2-(OCH₂CH₂OH)C₆H₄— | mesityl |
| III-60 | 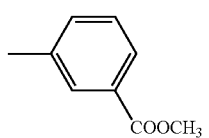 3-(COOCH₃)C₆H₄— | —CH₃ |
| III-61 | 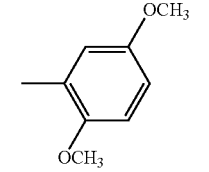 3,4-(OCH₃)₂C₆H₃— | " |
| III-62 | 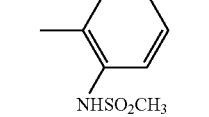 2-(NHSO₂CH₃)C₆H₄— | " |
| III-63 | 2-pyridyl | " |
| III-64 | 2-pyridyl | 2-pyridyl |

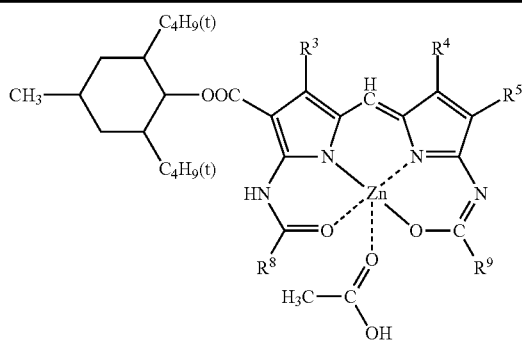
| No. | R³ | R⁴ | R⁵ | R⁸ | R⁹ |
|---|---|---|---|---|---|
| III-65 | —CH₃ | —CH₃ | —COOC₂H₅ | —CH₃ | —CH₃ |
| III-66 | " | " | " | —CH(CH₃)NHSO₂CH₃ | —CH(CH₃)NHSO₂CH₃ |
| III-67 | " | " | " | —C₆H₄(m-NHSO₂CH₃) | —C₆H₄(m-NHSO₂CH₃) |
| III-68 | —C₆H₅ | " | " | —CH₃ | —CH₃ |
| III-69 | —C₆H₅ | —C₆H₅ | " | " | " |
| III-70 | —CH₃ | —C₆H₅ | —COO-(2,6-di-t-Bu-4-Me-cyclohexyl) | " | —CH₂NHSO₂-C₆H₄(p-CH₃) |
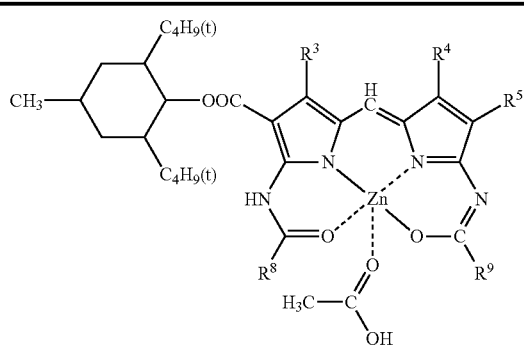
| No. | R³ | R⁴ | R⁵ | R⁸ | R⁹ |
|---|---|---|---|---|---|
| III-71 | —C₆H₅ | —C₆H₅ | —CON(CH₃)₂ | —CH₃ | —CH₂NHSO₂-C₆H₄(p-CH₃) |

-continued
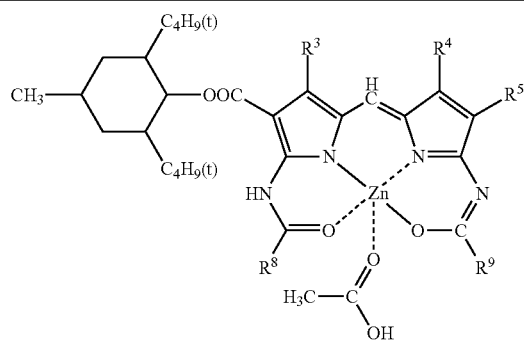
| No. | R³ | R⁴ | R⁵ | R⁸ | R⁹ |
|---|---|---|---|---|---|
| III-72 | —C₆H₅ | —C₆H₅ | —CO—N(C₃H₇(iso))₂ | " | —CH₂NHSO₂—C₆H₄—CH₃ |
| III-73 | —C₆H₅ | —C₆H₅ | —CONH—C₆H₁₁ | " | —CH₂NHSO₂—C₆H₄—CH₃ |
| III-74 | —C₆H₅ | —C₆H₅ | —CONH—(2,4,6-tri-CH₃-C₆H₂) | " | —CH₂NHSO₂—C₆H₄—CH₃ |
| III-75 | —C₆H₅ | —C₆H₅ | —CON(CH₃)(C₆H₅) | " | —CH₂NHSO₂—C₆H₄—CH₃ |
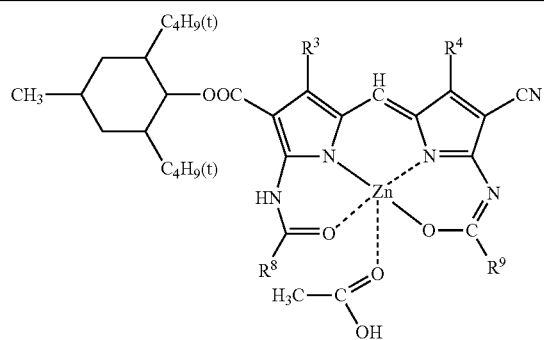
| No. | R³ | R⁴ | R⁸ | R⁹ |
|---|---|---|---|---|
| III-76 | —CH₃ | —CH₃ | —CH₃ | —CH₃ |
| III-77 | " | " | —CH(CH₃)NHSO₂CH₃ | " |
| III-78 | " | " | —CH(CH₃)NHSO₂CH₃ | —CH(CH₃)NHSO₂CH₃ |

-continued
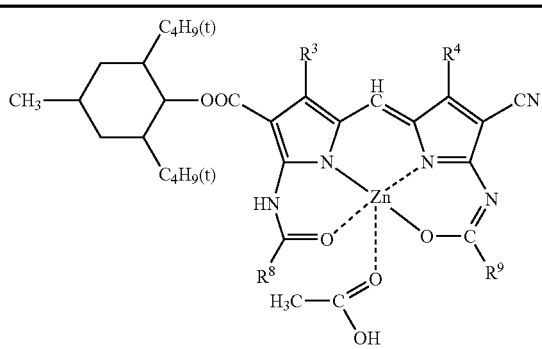
| No. | R³ | R⁴ | R⁸ | R⁹ |
|---|---|---|---|---|
| III-79 | " | " | —CH(CH₃)NHSO₂CH₃ | —CH(CH₃)NHSO₂CH₃ |
| III-80 | " | —C₆H₅ | —CH₃ | —CH₃ |
| III-81 | " | —C₆H₅ | " | —CH(CH₃)NHSO₂CH₃ |
| III-82 | " | —C₆H₅ | —CH(CH₃)NHSO₂CH₃ | —CH(CH₃)NHSO₂CH₃ |
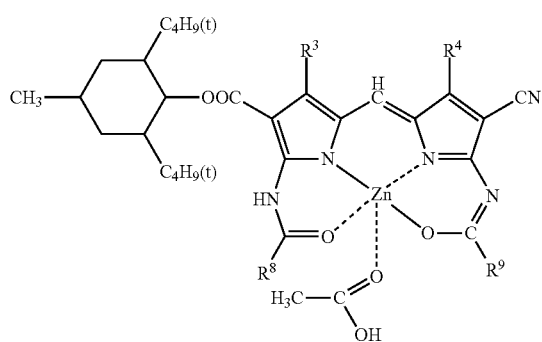
| No. | R³ | R⁴ | R⁸ | R⁹ |
|---|---|---|---|---|
| III-83 | —CH₃ | —C₆H₅ | —CH(CH₃)NHSO₂CH₃ | —CH(CH₃)NHSO₂CH₃ |
| III-84 | " | —C₆H₅ | —CH(CH₃)NHSO₂CH₃ | —C₆H₄-NHSO₂CH₃ |

-continued
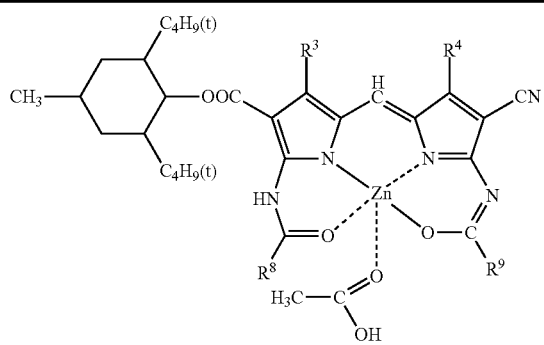
| No. | R³ | R⁴ | R⁸ | R⁹ |
|---|---|---|---|---|
| III-85 | " | ―C₆H₄― (para-methyl phenyl) | ―C₄H₉(t) | ―C₆H₄―NHSO₂CH₃ (meta) |
| III-86 | ―C₆H₅ | ―CH₃ | ―CH₃ | ―CH₃ |
| III-87 | ―C₆H₅ | " | ―CH₂NHSO₂CH₃ | ―CH₂NHSO₂CH₃ |
| III-88 | ―C₆H₅ | ―C₆H₄―CH₃ | ―CH₃ | ―CH₃ |
| III-89 | ―CH₃ | ―C₆H₄―NHSO₂CH₃ (meta) | " | " |
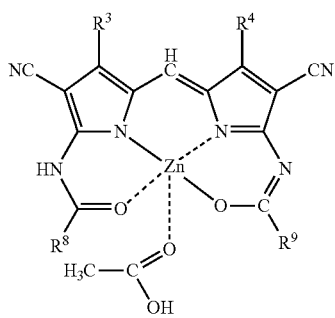
| No. | R³ | R⁴ | R⁸ | R⁹ |
|---|---|---|---|---|
| III-90 | ―CH₃ | ―CH₃ | ―CH₃ | ―CH₃ |
| III-91 | " | " | " | ―CH(C₄H₉)NHSO₂CH₃ |

-continued
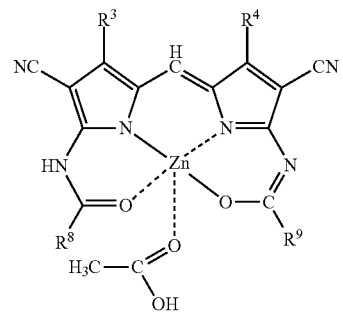
| No. | R³ | R⁴ | R⁸ | R⁹ |
|---|---|---|---|---|
| III-92 | " | " | —CH(C₄H₉)NHSO₂CH₃ | —CH(C₄H₉)NHSO₂CH₃ |
| III-93 | —C₆H₅ | —C₆H₅ | —CH₃ | —CH₃ |
| III-94 | —C₆H₅ | —C₆H₅ | —C₄H₉(t) | —C₄H₉(t) |
| III-95 | —C₆H₅ | —C₆H₅ | —CH(C₄H₉)NHSO₂CH₃ | " |
| III-96 | —C₆H₅ | —C₆H₅ | —C₆H₄(NHSO₂C₈H₁₇) | —CH₃ |
| III-97 | —C₆H₄(NHSO₂CH₃) | —C₆H₄(NHSO₂CH₃) | —CH₃ | —CH₃ |

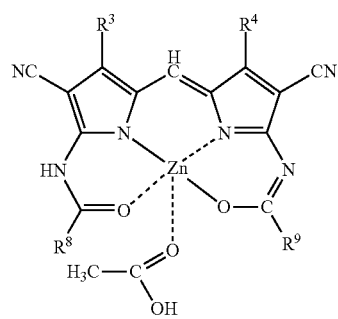
| No. | R³ | R⁴ | R⁸ | R⁹ |
|---|---|---|---|---|
| III-98 | 2-methylphenyl | 2-methylphenyl | —CH₃ | —CH₃ |
| III-99 | 2,4-dichlorophenyl | 2,4-dichlorophenyl | " | " |
| III-100 | 4-methoxyphenyl | 4-methoxyphenyl | " | " |
| III-101 | 2-pyridyl | 2-pyridyl | " | " |
| III-102 | —CH(CH₃)C₂H₅ | —CH(CH₃)C₂H₅ | —CH(C₄H₉)NHSO₂CH₃ | —CH(C₄H₉)NHSO₂CH₃ |
| III-103 | 3-pyridyl | 3-pyridyl | 3-(NHSO₂C₈H₁₇)phenyl | 3-(NHSO₂C₈H₁₇)phenyl |

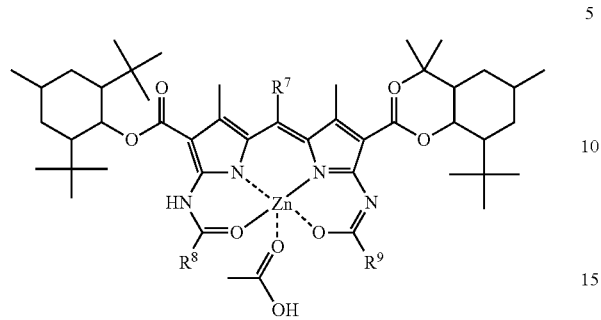
| No. | R⁷ | R⁸ | R⁹ |
|---|---|---|---|
| III-A | (2-methylpyrrol-1-yl)CH₂COOH | —C₄H₉(t) | —C₄H₉(t) |
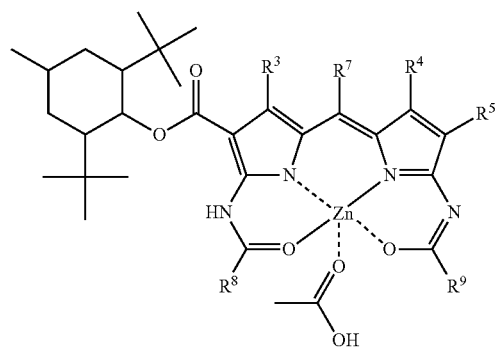
| No. | R³ | R⁴ | R⁵ | R⁷ | R⁸ | R⁹ |
|---|---|---|---|---|---|---|
| III-B | —CH₃ | —CH₃ | —COOC₂H₅ | (2-methylpyrrol-1-yl)CH₂COOH | —CH₃ | —CH₃ |

| No. | R³ | R⁴ | R⁷ | R⁸ | R⁹ |
|---|---|---|---|---|---|
| III-C | —CH₃ | —CH₃ | (2-pyrrolyl-CH₂COOH) | —CH₃ | —CH₃ |

| | Ma |
|---|---|
| IIIa-1 | Zn |
| IIIa-2 | Fe |
| IIIa-3 | Co |
| IIIa-4 | Cu |
| IIIa-5 | Ni |

| | Ma |
|---|---|
| IIIb-1 | Zn |
| IIIb-2 | Fe |
| IIIb-3 | Co |
| IIIb-4 | Cu |
| IIIb-5 | Ni |

From the viewpoint of the film thickness, it is preferable that the mol absorption coefficient of the specific organic metal complex is as high as possible. Further, from the standpoint of the improvement in color purity, it is preferable that the maximum absorption wavelength λmax is from 520 nm to 580 nm, and more preferably, from 530 nm to 570 nm. Meanwhile, the maximum absorption wavelength and the mol absorption coefficient are measured by the spectrophotometer UV-2400PC (made by Shimadzu Corporation). From the viewpoint of the solubility, the melting point of the specific organic metal complex in the present invention should not be too high.

It is possible to synthesize the specific complex by the methods described in the specifications of U.S. Pat. Nos. 4,774,339 and 5,433,896, JP-A No. 2001-240761, JP-A No. 2002-155052, JP-B No. 3614586, Aust. J. Chem, 1965, 11, 1835-1845, J. H. Boger et al, Heteroatom Chemistry, Vol. 1, No. 5,389 (1990), etc. As the method of synthesizing the specific complex in the present invention, specifically, the method described in paragraphs [0131] to [0157] in JP-A No. 2008-292970 can be applied.

In the red curable composition, the specific organic metal complexes may be used alone or in combination. In the present invention, the amount of the specific organic metal complex contained in the red curable composition varies depending on the molecular weight and mol absorption coefficient, but preferably 1% by mass to 70% by mass, more preferably 3% by mass to 50% by mass, most preferably 6% by mass to 30% by mass, relative to the total solid content of the red curable composition. The amount of the specific organic metal complex is preferably 3 parts by mass to 150 parts by mass, more preferably 10 parts by mass to 100 parts by mass, per 100 parts by mass of the pigment. When the amount of the specific organic metal complex is set to be equal to or more than the above lower limit, fine pigment particles, which are micronized to have enlarged surface area, can be stably dispersed. Whereas when the amount of the specific organic metal complex is set to be lower than the above upper limit, the color valency of the pigment can be prevented being decreased.

[Substituent T]

In the red curable composition, the specific organic metal complexes may be used alone or in combination. The amount of the specific organic metal complex contained in the red curable composition in the present invention varies with its molecular weight and mol absorption coefficient. The amount of the specific organic metal complex is preferably 1% by mass to 70% by mass, more preferably 3% by mass to 50% by mass, most preferably 6% by mass to 30% by mass, relative to the total solid content of the red curable composition. Also, the amount of the specific organic metal complex is preferably 3 parts by mass to 150 parts by mass, more preferably 10 parts by mass to 100 parts by mass, per 100 parts by mass of the pigment. When the amount thereof is set to be equal to or greater than the above lower limit, fine pigment particles, which are micronized to have enlarged surface areas, can be stably dispersed. Whereas when the amount thereof is set to be equal to or lower than the above upper limit, the color valency of the pigment can be prevented from being decreased.

Examples of the substituents include a halogen atom (for example, fluorine atom, chlorine atom, bromine atom), alkyl group (preferably, a straight chain, branched chain, or a cyclic alkyl group the number of carbon atoms of which is 1 to 48, more preferably, the number of carbon atoms is 1 to 24, for example, methyl group, ethyl group, propyl group, isopropyl group, butyl group, t-butyl group, pentyl group, hexyl group, heptyl group, octyl group, 2-ethylhexyl group, dodecyl group, hexadecyl group, cyclopropyl group, cyclopentyl group, cyclohexyl group, 1-norbornyl group, 1-adamantyl group), an alkenyl group (preferably, the alkenyl group the number of carbon atoms of which is 2 to 48, more preferably, the number of carbon atoms is 2 to 18, for example, vinyl group, allyl group, 3-butene-1-yl group), an aryl group (preferably, the aryl group the number of carbon atoms of which is 6 to 48, more preferably, the number of carbon atoms is 6 to 24, for example, phenyl group, naphthyl group), a heterocyclic group (preferably, the heterocyclic group the number of carbon atoms of which is 1 to 32, more preferably, the number of carbon atoms is 1 to 18, for example, 2-thienyl group, 4-pyridyl group, 2-furyl group, 2-pyrimidinyl group, 1-pyridyl group, 2-benzothiazolyl group, 1-imidazolyl group, 1-pyrazolyl group, benzotriazole-1-yl group), a silyl group (preferably, the silyl group the number of carbon atoms of which is 3 to 38, more preferably, the number of carbon atoms is 3 to 18, for example, trimethylsilyl group, triethylsilyl group, tributylsilyl group, t-butyldimethylsilyl group, t-hexyldimethylsilyl group), a hydroxyl group, a cyano group, a nitro group, an alkoxyl group (preferably, the alkoxyl group the number of carbon atoms of which is 1 to 48, more preferably, the number of carbon atoms is 1 to 24, for example, methoxy group, ethoxy group, 1-butoxy group, 2-butoxy group, isopropoxy group, t-butoxy group, dodecyloxy group, or as a cycloalkyloxy group, for example, cyclopentyloxy group, cyclohexyloxy group), an aryloxy group (preferably, the aryloxy group the number of carbon atoms of which is 6 to 48, more preferably, the number of carbon atoms is 6 to 24, for example, phenoxy group, 1-naphtoxy group), a heterocyclic oxy group (preferably, the heterocyclic oxy group the number of carbon atoms of which is 1 to 32, more preferably, the number of carbon atoms is 1 to 18, for example, 1-phenyltetrazole-5-oxy group, 2-tetrahydropyranyloxy group), a silyloxy group (preferably, the silyloxy group the number of carbon atoms of which is 1 to 32, more preferably, the number of carbon atoms is 1 to 18, for example, trimethylsilyloxy group, t-butyldimethylsilyloxy group, diphenylmethylsilyloxy group), an acyloxy group (preferably, the acyloxy group the number of carbon atoms of which is 2 to 48, more preferably, the number of carbon atoms is 2 to 24, for example, acetoxy group, pivaloyloxy group, benzoyloxy group, dodecanoyloxy group), an alkoxylcarbonyloxy group (preferably, the alkoxylcarbonyloxy group the number of carbon atoms of which is 2 to 48, more preferably, the number of carbon atoms is 2 to 24, for example, ethoxycarbonyloxy group, t-butoxycarbonyloxy group, or as the cycloalkyloxycarbonyloxy group, for example, cyclohexyloxycarbonyloxy group), an aryloxycarbonyloxy group (preferably, the aryloxycarbonyloxy group the number of carbon atoms of which is 7 to 32, more preferably, the number of carbon atoms is 7 to 24, for example, phenoxycarbonyloxy group), a carbamoyloxy group (preferably, the carbamoyloxy group the number of carbon atoms of which is 1 to 48, more preferably, the number of carbon atoms is 1 to 24, for example, N,N-dimethylcarbamoyloxy group, N-butylcarbamoyloxy group, N-phenylcarbamoyloxy group, N-ethyl-N-phenylcarbamoyloxy group), a sulfamoyloxy group (preferably, the sulfamoyloxy group the number of carbon atoms of which is 1 to 32, more preferably, the number of carbon atoms is 1 to 24, for example, N,N-diethylsulfamoyloxy group, N-propylsulfamoyloxy group), and an alkylsulfonyloxy group (preferably, the alkylsulfonyloxy group the number of carbon atoms of which is 1 to 38, more preferably, the number of carbon atoms is 1 to 24, for example, methylsulfonyloxy group, hexadecylsulfonyloxy group, cyclohexylsulfonyloxy group).

An arylsulfonyloxy group (preferably, the arylsulfonyloxy group the number of carbon atoms of which is 6 to 32, more preferably, the number of carbon atoms is 6 to 24, for example, phenylsulfonyloxy group), an acyl group (preferably, the acyl group the number of carbon atoms of which is 1 to 48, more preferably, the number of carbon atoms is 1 to 24, for example, formyl group, acetyl group, pivaloyl group, benzoyl group, tetradecanoyl group, cyclohexanoyl group), an alkoxycarbonyl group (preferably, the alkoxycarbonyl group the number of carbon atoms of which is 2 to 48, more preferably, the number of carbon atoms is 2 to 24, for example, methoxycarbonyl group, ethoxycarbonyl group, oxtadecyloxycarbonyl group, cyclohexyloxycarbonyl group, 2,6-di-tert-butyl-4-methylcyclohexyloxycarbonyl group), an aryloxycarbonyl group (preferably, the aryloxycarbonyl group the number of carbon atoms of which is 7 to 32, more preferably, the number of carbon atoms is 7 to 24, for example, phenoxycarbonyl group), a carbamoyl (preferably, the carbamoyl group the number of carbon atoms of which is 1 to 48, more preferably, the number of carbon atoms is 1 to 24, for example, carbamoyl group, N,N-diethylcarbamoyl group, N-ethyl-N-octylcarbamoyl group, N,N-dibutylcarbamoyl group, N-propylcarbamoyl group, N-phenylcarbamoyl group, N-methyl-N-phenylcarbamoyl group, N, N-dicyclohexylcarbamoyl group), an amino group (preferably, the amino group the number of carbon atoms of which is 32 or less, more preferably, the number of carbon atoms is 24 or less, for example, amino group, methylamino group, N,N-dibutylamino group, tetradecylamino group, 2-ethylhexylamino group, cyclohexylamino group), an anilino group (preferably, the anilino group the number of carbon atoms of which is 6 to 32, more preferably, 6 to 24, for example, anilino group, N-methylanilino group), a heterocyclic amino group (preferably, the heterocyclic amino group the number of carbon atoms of which is 1 to 32, more preferably, 1 to 18, for example, 4-pyridylamino group), a carbonamide group (preferably, the carbonamide group the number of carbon atoms of which is 2 to 48, more preferably, 2 to 24, for example, acetoamide group, benzamide group, tetradecanamide group, pyvaloylamide group, cyclohexanamide group), an ureide group (preferably, the ureide group the number of carbon atoms of which is 1 to 32, more preferably, the number of carbon atoms is 1 to 24, for example, ureide group, N,N-dimethylureide group, N-phenylureide group), an imide group (preferably, the imide group the number of carbon atoms of which is 36 or less, more preferably, the number of carbon atoms is 24 or less, for example, N-succinimide group, N-phthalimide group), an alkoxycarbonylamino group (preferably, the alkoxycarbonylamino group the number of carbon atoms of which is 2 to 48, more preferably, the number of carbon atoms is 2 to 24, for example, methoxycarbonylamino group, ethoxycarbonylamino group, t-butoxycarbonylamino group, oxtadecyloxycarbonylamino group, cyclohexyloxycarbonylamino group), an aryloxycarbonylamino group (preferably, the aryloxycarbonylamino group the number of carbon atoms of which is 7 to 32, more preferably, the number of carbon atoms is 7 to 24, for example, phenoxycarbonylamino group), a sulfonamide group (preferably, the sulfonamide group the number of carbon atoms of which is 1 to 48, more preferably, the number of carbon atoms is 1 to 24, for example, methane sulfonamide group, butane sulfonamide group, benzene sulfonamide group, hexadecane sulfonamide group, cyclohexane sulfonamide group), a sulfamoylamino group (preferably, the sulfamoylamino group the number of carbon atoms of which is 1 to 48, more preferably, the number of carbon atoms is 1 to 24, for example, N,N-dipropylsulfamoylamino group, N-ethyl-N-dodecylsulfamoylamino group), and an azo group (preferably, the azo group the number of carbon atoms of which is 1 to 32, more preferably, the number of carbon atoms is 1 to 24, for example, phenylazo group, 3-pyrazolylazo group).

An alkylthio group (preferably, the alkylthio group the number of carbon atoms of which is 1 to 48, more preferably, the number of carbon atoms is 1 to 24, for example, methylthio group, ethylthio group, octylthio group, cyclohexylthio group), an arylthio group (preferably, the arylthio group the number of carbon atoms of which is 6 to 48, more preferably, the number of carbon atoms is 6 to 24, for example, phenylthio group), a heterocyclicthio group (preferably, the heterocyclicthio group the number of carbon atoms of which is 1 to 32, more preferably, the number of carbon atoms is 1 to 18, for example, 2-benzothiazolylthio group, 2-pyridylthio group, 1-phenyltetrazolylthio group), an alkylsulfinyl group (preferably, the alkylsulfinyl group the number of carbon atoms of which is 1 to 32, more preferably, the number of carbon atoms is 1 to 24, for example, dodecane sulfinyl group), the arylsulfinyl group (preferably, the arylsulfinyl group the number of carbon atoms of which is 6 to 32, more preferably, the number of carbon atoms is 6 to 24, for example, phenylsulfinyl group), an alkylsulfonyl group (preferably, the alkylsulfonyl group the number of carbon atoms of which is 1 to 48, more preferably, the number of carbon atoms is 1 to 24, for example, methylsulfonyl group, ethylsulfonyl group, propylsulfonyl group, butylsulfonyl group, isopropylsulfonyl group, 2-ethylhexylsulfonyl group, hexadecylsulfonyl group, octylsulfonyl group, cyclohexylsulfonyl group), an arylsulfonyl group (preferably, the arylsulfonyl group the number of carbon atoms of which is 6 to 48, more preferably, the number of carbon atoms is 6 to 24, for example, phenylsulfonyl group, 1-naphthylsulfonyl group), a sulfamoyl group (preferably, the sulfamoyl group, the number of carbon atoms of which is 32 or less, more preferably, the number of carbon atoms is 24 or less, for example, sulfamoyl group, N,N-dipropylsulfamoyl group, N-ethyl-N-dodecylsulfamoyl group, N-ethyl-N-phenylsulfamoyl group, N-cyclohexylsulfamoyl group), the sulfo group, a phosphonyl group (preferably, the phosphonyl group the number of carbon atoms of which is 1 to 32, more preferably, the number of carbon atoms is 1 to 24, for example, phenoxyphosphonyl group, octyloxyphosphonyl group, phenylphosphonyl group), and a phosphinoylamino group (preferably, the phosphinoylamino group the number of carbon atoms of which is 1 to 32, more preferably, the number of carbon atoms is 1 to 24, for example, diethoxyphosphinoylamino group, dioctyloxyphosphinoylamino group).

[(A-2) Pigment]

The red pigment used in the present invention is preferably at least one selected from diketopyrrolopyrrole pigments, condensed azo pigments and anthraquinone pigments. Specific examples thereof include C. I. Pigment Red 254, C. I. Pigment Red 209 and C. I. Pigment Red 177.

The pigment content in the red curable composition differs depending on the molecular weight and the mol absorption coefficient, but preferably 10% by mass to 70% by mass, more preferably 20% by mass to 60% by mass, most preferably 35% by mass to 50% by mass, relative to the total solid content of the red curable composition.

[(B) Dispersant]

The red curable composition contains (B) dispersant. The dispersant of the (B) component may be a publicly-known pigment dispersant or surfactant. As the dispersant, many types of compounds may be used. Examples thereof include: a phthalocyanine derivatives (a commercially available product EFKA-745 (manufactured by EFKA Chemicals BV)), SOLSPERSE 5000 (manufactured by Lubrizol Japan Ltd.); cationic surfactants such as an organosiloxane polymer KP341 (manufactured by Shin-Etsu Chemical Co., Ltd.) and (meth)acrylic (co)polymers POLYFLOW No. 75, No. 90 and No. 95 (manufactured by KYOEISHA CHEMICAL Co., Ltd.) and W001 (manufactured by Yusho Co., Ltd.); nonionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethyleneglycol dilaurate, polyethyleneglycol distearate and sorbitan fatty acid ester; anionic surfactants such as W004, W005 and W017 (manufactured by Yusho Co., Ltd.); polymer dispersants such as EFKA-46, EFKA-47, EFKA-47EA, EFKA POLYMER 100, EFKA POLYMER 400, EFKA POLYMER 401 and EFKA POLYMER 450 (product of Morishita & Co., Ltd.) and DISPERSE AID 6, DISPERSE AID 8, DISPERSE AID 15 and DISPERSE AID 9100 (manufactured by SAN NOPCO LIMITED); various SOLSPERSE dispersants such as SOLSPERSE 3000, 5000, 9000, 12000, 13240, 13940, 17000, 24000, 26000 and 28000 (manufactured by Lubrizol Japan Ltd.); and ADEKA PLURONIC L31, F38, L42, L44, L61, L64, F68, L72, P95, F77, P84, F87, P94, L101, P103, F108, L121 and P-123 (manufactured by ADEKA Corporation), and IONET S-20 (manufactured by Sanyou Chemical Industries Co., Ltd.).

The dispersant (B) content of the red curable composition is preferably 1% by mass to 80% by mass, more preferably 5% by mass to 70% by mass, most preferably 10% by mass to 60% by mass, relative to the amount of the pigment.

[(C) Polymerizable Compound]

The red curable compound contains the (C) polymerizable compound. An example of the polymerizable compound includes an addition polymerizable compound having at least one ethylene unsaturated double bond. Specifically, the polymerizable compound is selected from among compounds having at least one terminal ethylene unsaturated bond, preferably, two or more bonds. Such a compound group is widely known in the relevant industrial field and these can be used in the present invention without any particular restrictions. These may be a monomer, prepolymer, that is, a dimer, trimer, and oligomer, or a chemical form, such as their mixture and (co)polymer.

Examples of the monomer and its (co)polymer include an unsaturated carboxylic acid (for example, acrylic acid, methacrylic acid, tectonic acid, crotonic acid, isocrotonic acid, maleic acid, etc.) and esters thereof, amides thereof, and (co)polymers thereof and preferably esters of unsaturated carboxylic acid and aliphatic multivalent alcohol compound, amides of unsaturated carboxylic acid and aliphatic multivalent amine compound, and (co)polymers thereof. Furthermore, an additional reactant of unsaturated carboxylic acid esters having a nucleophilic substituent such as hydroxyl group, amino group, and mercapto group or amides with unifunctional or multifunctional isocyanates or epoxies; or a dehydrated condensation reactant with unifunctional or multifunctional carboxylic acids, etc., are used preferably. Moreover, an addition reactant of unsaturated carboxylic acid esters having an electrophilic substituent such as isocyanate group and epoxy group or amides with unifunctional or multifunctional alcohols, amines, and thiols; and still furthermore, a substitution reactant of unsaturated carboxylic acid esters having an eliminative substituent such as halogen group and tosyloxy group or amides with unifunctional or multifunctional alcohols, amines, and thiols are also preferable. In addition, as another example, it is also possible to use a group of compounds substituted by unsaturated phosphonic acid, styrene, vinyl ether, etc., instead of the unsaturated carboxylic acid.

Specific examples of ester monomers of aliphatic multivalent compounds and unsaturated carboxylic acids include ethylene glycol diacrylate, triethylene glycol diacrylate, 1,3-butane diol acrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexane diol diacrylate, 1,4-cyclohexane diol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, isocyanuric acid EO-denatured triacrylate, etc.

Furthermore, examples of methacrylic acid esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butane diol dimethacrylate, hexane diol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy 2-hydroxypropoxy)phenyl]dimethylmethane, bis-[p-(methacryloxyethoxy)phenyl]dimethylmethane, etc.

Moreover, examples of itaconic acid esters include ethylene glycol diitaconate, propylene glycol diitaconate, 1,3-butane diol diitaconate, 1,4-butane diol diitaconate, tetramethylene glycol diitaconate, pentaerythritol diitaconate, sorbitol tetraitaconate, etc., examples of crotonic acid esters include ethylene glycol dicrotonate, tetramethylene glycol dicrotonate, pentaerythritol dicrotonate, sorbitol tetradicrotonate, etc., examples of isocrotonic acid esters include ethylene glycol diisocrotonate, pentaerythritol diisocrotonate, sorbitol tetraisocrotonate, etc., and examples of maleic acid esters include ethylene glycol dimalate, triethylene glycol dimalate, pentaerythritol dimalate, sorbitol tetramalate, etc.

As examples of other esters, for example, aliphatic alcohol ester described in JP-B No. 51-47334, and JP-A No. 57-196231, those having an aromatic-based skeleton described in JP-A No. 59-5240, JP-A No. 59-5241, and JP-A No. 02-226149, and those containing the amino group described JP-A No. 01-165613, etc., are also used preferably. Further, the above-described ester monomers can be used as a mixture.

Specific examples of amide monomers of aliphatic multivalent amine compounds and unsaturated carboxylic acids include methylenebis-acrylamide, methylenebis-methacrylamide, 1,6-hexamethylenebis-acrylamide, 1,6-hexamethylenebis-methacrylamide, diethylenetriaminetrisacrylamide, xylylene bisacrylamide, xylylene bismethacrylamide, etc.

Examples of other preferable amide-based monomers can include those having a cyclohexylene structure described in JP-B No. 54-21726.

Furthermore, an urethane-based addition polymerizable compound manufactured by using the addition reaction of isocyanate and hydroxyl group is also preferable, and specific examples of such a compounds include vinyl urethane compounds containing two or more polymerizable vinyl groups in one molecule obtained by adding vinyl monomers containing a hydroxyl group represented by the following General Formula (A) to polyisocyanate compounds having two or more isocyanate groups in one molecule, described in JP-B No. 48-41708.

$$CH_2=C(R)COOCH_2CH(R')OH \quad (A)$$

[In General Formula (A), R and R' respectively represent H or $CH_3$ independently.]

As to these polymerizable compounds, it is possible to arbitrarily set the details of its use method such as its structure, single use or combined use, and the addition amount, in accordance with the final performance design of the red curable composition. For example, from the viewpoint of the sensitivity, compounds having a structure in which the unsaturated group content per one molecule is high are preferable, and in many cases, bifunctional or multifunctional compounds are preferable. Furthermore, from the viewpoint of the increase in the strength of a colored curable film, trifunctional or multifunctional compounds are preferable and further, it is also effective to use a method of adjusting both sensitivity and strength by simultaneously using compounds having different number of functions and different polymerizable groups (for example, acrylic acid ester, methacrylic acid ester, styrene-based compound, vinylether-based compound). Moreover, the selection/use methods of the polymerizable compounds are important factors for compatibility and dispersibility with other components (for example, photopolymerization initiator, coloring agent (pigment), binder polymer, etc.) contained in the red curable composition, and for example, there may be a case where the compatibility can be improved by using a low-purity compound or simultaneously using two or more kinds of compounds. In addition, there may also be a case where a specific structure is selected from the viewpoint of the improvement of adhesion with a hard surface of a support etc.

As to the content (total content when there are two or more kinds of compounds) of the polymerizable compound in all the solid components in the red curable composition, there are no restrictions in particular, and from the viewpoint of the more effective acquisition of the effects of the present invention, 10% by mass to 80% by mass is preferable, 15% by mass to 75% by mass is more preferable, and 20% by mass to 60% by mass is most preferable.

[(D) Photopolymerization Initiator]

The red curable composition preferably contains (D) a photopolymerization initiator. The photopolymerization initiator is not necessarily contained in the red curable composition used for a color resist which is used for an inkjet ink. Preferably, the photopolymerization initiator is incorporated into the color resist by the below-described coating method. As to the photopolymerization initiator, there are no restrictions in particular and any one may be accepted as long as it can polymerize the above-described (C) polymerizable compound, and it is preferable to select the initiator from the viewpoint of the characteristics, initiation efficiency, absorption wavelengths, availability, cost, etc.

Examples of the above-mentioned photopolymerization initiators include at least one active halogen compound selected from halomethyloxadiazole compounds and halomethyl-s-triazine compounds, 3-aryl substituted cumarin compound, rophin dimer, benzophenone compound, acetophenone or derivatives thereof, cyclopentadiene-benzene-iron complex or salts thereof, oxime-based compound, etc. Specific examples of the photochemical polymerization initiators include the initiators described in paragraphs [0070] to [0077] in JP-A No. 2004-295116. Among those, the oxime-based compound is preferable from the point of the rapid polymerization reaction.

The oxime-based compound (hereinafter, also referred to as an "oxime-based photochemical polymerization initiator") are not limited in particular and include the oxime-based compound described in JP-A No. 2000-80068, International Publication No. WO02/100903A1, JP-A No. 2001-233842, etc.

Specific examples include 2-(O-benzoyloxime)-1-[4-(phenylthio)phenyl]-1,2-butanedione, 2-(O-benzoyloxime)-1-[4-(phenylthio)phenyl]-1,2-pentanedione, 2-(O-benzoyloxime)-1-[4-(phenylthio)phenyl]-1,2-hexanedione, 2-(O-benzoyloxime)-1-[4(phenylthio)phenyl]-1,2-heptanedione, 2-(O-benzoyloxime)-1-[4-(phenylthio)phenyl]-1,2-octanedione, 2-(O-benzoyloxime)-1-[4-(methylphenylthio)phenyl]-1,2-butanedione, 2-(O-benzoyloxime)-1-[4-(ethylphenylthio)phenyl]-1,2-butanedione, 2-(O-benzoyloxime)-1-[4-(butylphenylthio)phenyl]-1,2-butanedion, 1-(O-acetyloxime)-1-[9-ethyl-6-(2-methylbenzoyl)-9H-carbazole-3-yl]ethanone, 1-(O-acetyloxime)-1-[9-methyl-6-(2-methylbenzoyl)-9H-carbazole-3-yl]ethanone, 1-(O-acetyloxime)-1-[9-propyl-6-(2-methylbenzoyl)-9H-carbazole-3-yl]ethanone, 1-(O-acetyloxime)-1-[9-ethyl-6-(2-ethylbenzoyl)-9H-carbazole-3-yl]ethanone, 1-(O-acetyloxime)-1-[9-ethyl-6-(2-butylbenzoyl)-9H-carbazole-3-yl]ethanone, etc.

Among these, from the point of being able to obtaining a pattern excellent in shape at a small amount of exposure (in particular, in the case of a solid-state imaging device, the rectangularity), an oxime-O-acyl based compound such as 2-(O-benzoyloxime)-1-[4-(phenylthio)phenyl]-1,2-octadion, and 1-(O-acetyloxime)-1-[9-ethyl-6-(2-methylbenzoyl)-9H-carbazoyl-3-yl]ethanone, is most preferable, and specifically, mention is made of CGI-124, CGI-242 (made by Chiba Specialty Chemicals Limited), etc.

In the present invention, from the viewpoint of the sensitivity, stability over time, and coloring at the time of post-heating, as the oxime-based compound, a compound represented by the following General Formula (1) is more preferable.

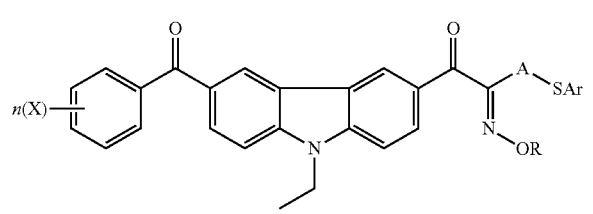

(1)

In General Formula (1), R and X respectively represent a univalent substituent independently, A represents a divalent organic group, and Ar represents the aryl group. n is an integer from 1 to 5.

As R, the acyl group is preferable form the point of high sensitivity, and specifically, the acetyl group, propionyl group, benzoyl group and tolyl group are preferable.

As A, from the viewpoint of the enhancement of the sensitivity and the suppression of coloring at the time of heating over time, an unsubstituted alkylene group, alkylene group substituted by an alkyl group (for example, methyl group, ethyl group, tert-butyl group, dodecyl group), an alkylene group substituted by the alkenyl group (for example, vinyl group, allyl group), and an alkylene group substituted by an aryl group (for example, phenyl group, p-tolyl group, xylyl group, coumenyl group, naphthyl group, anthryl group, phenantolyl group, styryl group) are preferable.

As Ar, from the point of the increase in sensitivity and the suppression of coloring at the time of heating over time, a saturated or unsaturated phenyl group is preferable. In the case of the substituted phenyl group, as its substituent, for example, a halogen group such as a fluorine atom, chlorine atom, bromine atom, or iodine atom, is preferable.

From the viewpoint of the improvement in the solvent solubility and the absorption efficiency in a long wavelength region, an alkyl group that may have a substituent, an aryl group that may have a substituent, an alkenyl group that may have a substituent, an alkynyl group that may have a substituent, an alkoxy group that may have a substituent, an aryloxy group that may have a substituent, an alkylthioxy group that may have a substituent, an arylthioxy group that may have a substituent, and an e amino group that may have a substituent are preferable.

Furthermore, it is preferable that n in General Formula (1) is an integer of 1 or 2.

Specific examples of the compound represented by General Formula (1) are shown below, but the present invention is not limited to these.

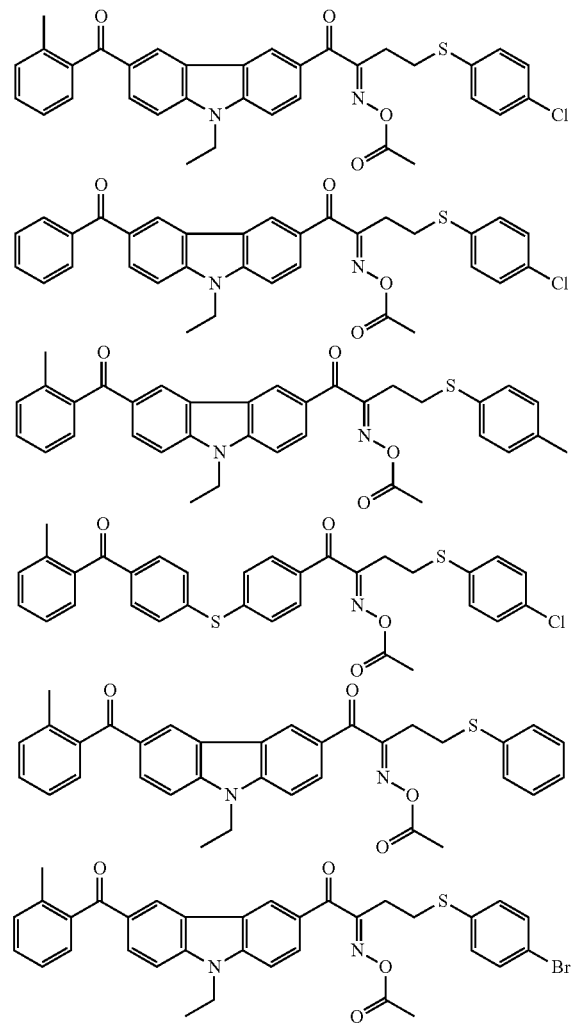

Moreover, the red curable composition may make use of other publicly-known photopolymerization initiators described in paragraph [0079] in JP-A No. 200429511 in addition to the above-mentioned photopolymerization initiators.

It is possible to contain one kind of the photopolymerization initiator alone or a combination of two or more kinds of the photopolymerization initiators.

From the viewpoint of the more effective acquisition of the effects of the present invention, the photopolymerization initiator content (total content when two or more kinds of the photopolymerization initiators are contained) in all the solid components of the red curable composition is preferably 3% by mass to 20% by mass, more preferably 4% by mass to 19% by mass, and further more preferably 5% by mass to 18% by mass.

[(E) Organic Solvent]

The red curable composition contains (E) an organic solvent. Basically, the organic solvent is not limited in particular as long as the solubility of each component present simultaneously and the application properties of the red curable composition are satisfied (continuous phase can be formed), and it is preferable to select one in consideration of the solubility, application properties, and safety of the binder, in particular.

Examples of the organic solvents as esters include ethyl acetate, n-butyl-acetate, isobutyl acetate, amyl formate, isoamyl acetate, isobutyl acetate, butyl propionate, isopropyl butyrate, ethyl butyrate, butyl butyrate, methyl lactate, ethyl lactate, alkyl oxyacetate esters (for example, methyl oxyacetate, ethyl oxyacetate, butyl oxyacetate (specifically, mention is made of methyl methoxyacetate, ethyl methoxyacetate, butyl methoxyacetate, methyl ethoxyacetate, ethyl ethoxyacetate, etc.)), 3-oxypropionic acid alkyl esters (for example, 3-oxypropionic acid methyl ester, 3-oxypropionic acid ethyl ester, etc. (specifically, mention is made of 3-methoxypropionic acid methyl ester, 3-methoxypropionic acid ethyl ester, 3-ethoxypropionic acid methyl ester, 3-ethoxypropionic acid ethyl ester, etc.)), 2-oxypropionic acid alkyl esters (for example, 2-oxypropionic acid methyl ester, 2-oxypropinic acid ethyl ester, 2-oxypropionic acid propyl ester etc. (specifically, mention is made of 2-methoxypropionic acid methyl ester, 2-methoxypropionic acid ethyl ester, 2-methoxypropionic acid propyl ester, 2-ethoxypropionic acid methyl ester, 2-ethoxypropionic acid ethyl ester, etc.)), 2-oxy-2-methylpropionic acid methyl ester, 2-oxy-2-methylpropionic acid ethyl ester (specifically, mention is made of 2-methoxy-2-methylpropionic acid methyl ester, 2-ethoxy-2-methylpropionic acid ethyl ester, etc.)), methyl pyruvate, ethyl pyruvate, propyl pyruvate, methyl acetoacetate, ethyl acetoacetate, 2-oxobutanoic acid methyl ester, 2-oxobutanoic acid ethyl ester, etc.

Furthermore, examples of ethers include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether acetate, propylene glycol monomethyl ether acetate, propylene glycol monoethyl ether acetate, propylene glycol monopropyl ether acetate, etc.

Examples of ketones include methylethylketone, cyclohexane, 2-heptanone, 3-heptanone, etc.

Examples of aromatic carbohydrates include preferably toluene, xylene, etc.

It is also preferable to mix two or more kinds of these organic solvents from the viewpoint of the improvement in the solubility of each component described above, and when an alkali soluble binder is included, from the viewpoint of its solubility and the coating surface condition. In this case, a mixture solution is most preferable, which includes two or more kinds selected from 3-ethoxypropionic acid methyl ester, 3-ethoxypropionic acid ethyl ester, ethyl cellosolve acetate, ethyl lactate, diethylene glycol dimethyl ether, butyl acetate, 3-methoxypropionic acid methyl ester, 2-heptanone, cyclohexanone, ethylcarbitol acetate, butylcarbitol acetate, propylene glycol methyl ether, and propylene glycol methyl ether acetate.

The organic solvent content in the red curable composition is preferably an amount when the total solid component concentration in the composition is 10% by mass to 80% by mass, more preferably, 15% by mass to 60% by mass.

<Green Curable Composition Containing Dye and Pigment in Green (G) Pixel>

The green (G) pixel contains a green pigment or cyan pigment and at least one kind of yellow dye (hereinafter, referred to appropriately as a "specific yellow dye") selected from a group containing the following (1) to (3).

(1) A methine dye having a pyrazolotriazole ring in its structure (2) An azo dye having a pyridone ring in its structure (3) An azo dye having a pyrazole ring in its structure

[Specific Yellow Dye]

—(1) A Methine Dye Having a Pyrazolotriazole Ring in its Structure (Hereinafter, Referred to as "Pyrazolotriazole Methine Dye")—

The pyrazolotriazole methine dye is a yellow dye including a partial structure in which the pyrazolotriazole group and the methine group (methine chain) are directly bonded.

The pyrazolotriazole methine dye includes one or more pyrazolotriazole rings in a molecule, but it is preferable to contain two pyrazolotriazole rings in total each sandwiching the methine chain. Furthermore, having a methine chain containing odd-numbered methine groups is also a preferable aspect. From the viewpoint of color reproduction that is an object of the present invention, the number of methine groups is preferably one.

The pyrazolotriazole methine dye is preferably a compound represented by the following General Formula (Ia) or (Ib) from the point of the coexistence of color reproduction and luminance.

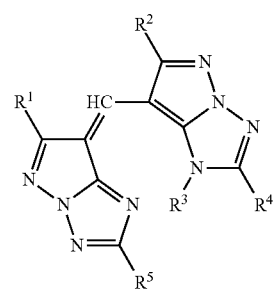

(Ia)

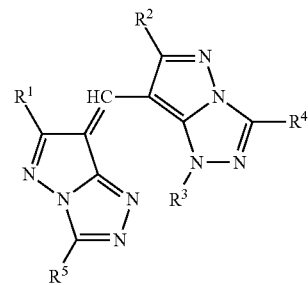

(Ib)

In General Formulas (Ia) and (Ib), $R^1$ to $R^5$ respectively represent a hydrogen atom or univalent substituent independently.

Here, examples of univalent substituents represented by $R^1$ to $R^5$ include, specifically, an alkyl group, an aryl group, a perfluoroalkylcarbonyl group, an alkylsulfonyl group, an alkenylsulfonyl group, an arylsulfonyl group, a heterocyclic sulfonyl group, a sulfamoyl group, an alkylsulfamoyl, an arylsulfamoyl group, a heterocyclic sulfamoyl group, etc. Each of these groups may further have a substituent.

In particular, the compound represented by General Formulas (Ia) and (Ib) preferably has the following aspect.

That is, the aspect in which $R^1$ and $R^2$ are straight chain or branched alkyl group, $R^4$ and $R^5$ are alkyl group or aryl group, and $R^3$ is hydrogen atom, alkyl group, or aryl group.

Specific examples of the pyrazolotriazole methine dyes will be shown below, but the present invention is not limited to these.

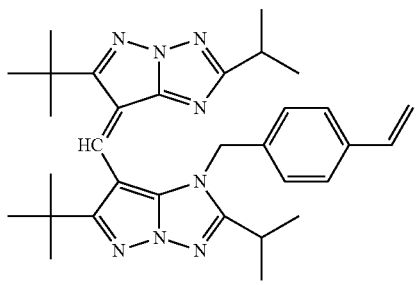

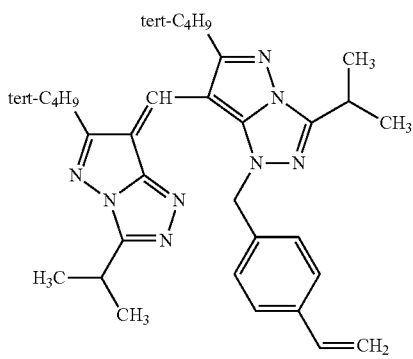

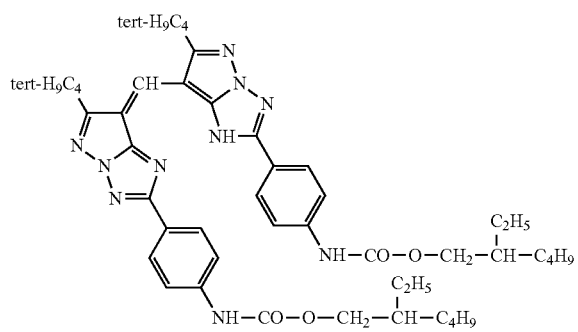

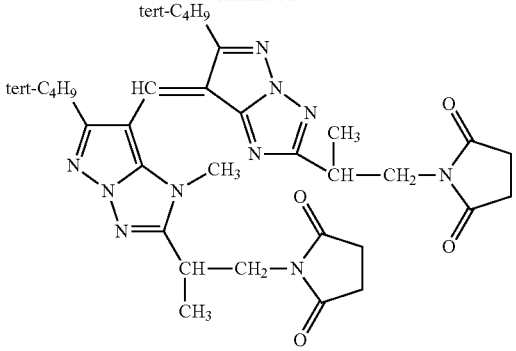

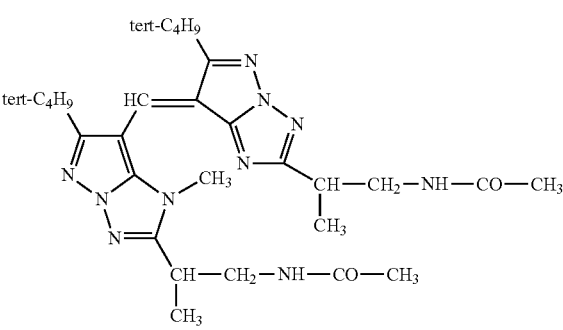

—(2) An Azo Dye Having a Pyridone Ring in its Structure (Hereinafter, Referred to as "Pyridone Azo Dye")—

The pyridone azo dye is a yellow dye containing a partial structure in which the pyridone ring and the azo group are directly bonded.

The pyridone azo dye is preferably a compound represented by the following General Formula (II) from the viewpoint of color reproduction and luminance.

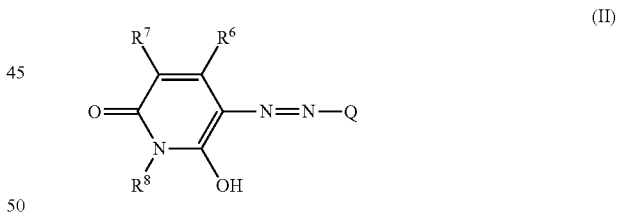

(II)

In General Formula (II), $R^6$ and $R^7$ respectively represent a hydrogen atom or univalent substituent independently. $R^8$ represents a hydrogen atom, an aliphatic group, an aryl group, a heterocyclic group, a carbamoyl group, an alkoxycarbonyl group, an aryloxycarbonyl group, an acyl group, an alkylsulfonyl group, an arylsulfonyl group, or a sulfamoyl group. Q represents a diazo component residue. The coloring matter represented by General Formula (II) may form a dimer or multimer in an arbitrary position.

Specifically, the univalent substituent represented by $R^6$ to $R^7$ respectively represents independently a halogen atom, an aliphatic group, an aryl group, a heterocyclic group, a cyano group, a carboxyl group, a carbamoyl group, an aliphatic oxycarbonyl group, an aryloxycarbonyl group, an acyl group, a hydroxy group, an aliphatic oxy group, an aryloxy group, an acyloxy group, a carbamoyloxy group, a heterocyclic oxy group, an amino group, an aliphatic amino group, an arylamino a sulfamoylamino group, an aliphatic oxycarbonylamino group, an aryloxycarbonylamino group, an aliphatic sulfonylamino group, an arylsulfonylamino group, a nitro group, an aliphatic thio group, an arylthio group, an aliphatic sulfonyl group, an arylsulfonyl group, a sulfamoyl group, a sulfo group, an imide group, or a heterocyclic thio group, and mainly from the viewpoint of imparting solubility, the substituent is preferably an aliphatic group, an aryl group, a heterocyclic group, a cyano group, an carbamoyl group, an aliphatic oxycarbonyl group, an aryloxycarbonyl group, an acyl group, an aliphatic oxy group, an aryloxy group, an aliphatic amino group, or an arylamino group. Each of these groups may further be substituted.

The aliphatic group represented by $R^6$ to $R^8$ may have a substituent and may be saturated or unsaturated, or cyclic. Examples of the aliphatic groups represented by $R^6$ to $R^8$ include an alkyl group, a substituted alkyl group, an alkenyl group, a substituted alkenyl group, an alkynyl group, a substituted alkynyl group, an aralkyl group, a substituted aralkyl group, etc. The total number of carbon atoms of the aliphatic group is preferably 1 to 30 and more preferably 1 to 16. Specific examples of the aliphatic groups include a methyl group, an ethyl group, a butyl group, isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group, an allyl group, etc.

The aryl group represented by $R^6$ to $R^8$ may have a substituent, the aryl group having a total number of carbon atoms of 6 to 30 is preferable, and the aryl group having that of 6 to 16 is more preferable. Specifically, examples of the aryl groups represented by $R^6$ to $R^8$ include a phenyl group, a 4-tolyl group, a 4-methoxyphenyl group, a 2-chlorophenyl group, a 3-(3-sulfopropylamino) phenyl group, a 4-sulfamoyl group, a 4-ethoxyethylsulfamoyl, 3-dimethylcarbamoyl group, etc.

The heterocyclic group represented by $R^6$ to $R^8$ may be saturated or unsaturated, and mention is made of one that includes the following aromatic heterocyclic group and includes any of hetero atoms such as a nitrogen atom, a sulfur atom, and an oxygen atom, and further it may have a substituent and a heterocyclic group having a total number of carbon atoms of 1 to 30 is preferable and a heterocyclic group having that of 1 to 15 is more preferable. Specifically, examples of the heterocyclic groups represented by $R^6$ to $R^8$ include a 2-pyridyl group, a 2-thienyl group, a 2-thiazolyl group, a 2-benzothiazolyl group, a 2-benzoxazolyl group, a 2-furyl group, etc.

The carbamoyl group represented by $R^6$ to $R^8$ may have a substituent, the carbamoyl group having a total number of carbon atoms of 1 to 30 is preferable, and the carbamoyl group having a number of carbon atoms of 1 to 16 is more preferable. Specifically, examples of the carbamoyl groups include a methylcarbamoyl group, a dimethylcarbamoyl group, a phenylcarbamoyl, a N-methyl-N-phenylcarbamoyl group, etc.

The aliphatic oxycarbonyl group represented by $R^6$ to $R^8$ may have a substituent and may be saturated or unsaturated and cyclic, the aliphatic oxycarbonyl group having a total number of carbon atoms of 2 to 30 is preferable, and the aliphatic oxycarbonyl group having a total number of carbon atoms of 2 to 16 is more preferable. Specifically, examples of aliphatic oxycarbonyl groups include a methoxycarbonyl group, an ethoxycarbonyl group, a 2-methoxyethoxycarbonyl group, etc.

The aryloxycarbonyl group represented by $R^6$ to $R^8$ may have a substituent, the aryloxycarbonyl group having a total number of carbon atoms of 7 to 30 is preferable, and the aryloxycarbonyl group having a number of carbon atoms of 7 to 16 is more preferable. Specifically, examples of the aryloxycarbonyl groups include a phenoxycarbonyl group, a 4-methylphenoxycarbonyl group, a 3-chlorophenoxycarbonyl group, etc.

The acyl group represented by $R^6$ to $R^8$ includes an aliphatic carbonyl group, an arylcarbonyl group, and a heterocyclic carbonyl group, an aspect having a total number of carbon, atoms of 1 to 30 is preferable, and an aspect having a total number of carbon atoms of 1 to 16 is more preferable. Specifically, examples of the acyl groups include an acetyl group, a methoxyacetyl group, a thienoyl group, a benzoyl group, etc.

The aliphatic sulfonyl group represented by $R^6$ to $R^8$ may have a substituent and may be saturated or unsaturated and cyclic, aspect having a total number of carbon atoms of 1 to 30 is preferable, and an aspect having a total number of carbon atoms of 1 to 16 is more preferable. Specifically, examples of the aliphatic sulfonyl groups include a methanesulfonyl group, a methoxymethanesulfonyl group, an ethoxyethanesulfonyl group, etc.

The arylsulfonyl group represented by $R^6$ to $R^8$ may have a substituent, an aspect having a total number of carbon atoms of 6 to 30 is preferable, and an aspect having a total number of carbon atoms of 6 to 18 is more preferable. Specifically, examples of the arylsulfonyl groups include a benzenesulfonyl group, a toluenesulfonyl group, etc.

The sulfamoyl group represented by $R^6$ to $R^8$ may have a substituent, an aspect having a total number of carbon atoms of 0 to 30 is preferable, and an aspect having a total number of carbon atoms of 0 to 16 is more preferable. Specifically, examples of the sulfamoyl groups include a sulfamoyl group, a dimethylsulfamoyl group, a di-(2-hydroxyethyl)sulfamoyl group, etc.

The imide group represented by $R^6$ to $R^8$ may have a substituent and the five- to six-membered imide group is preferable. Further an aspect in which the total number of carbon atoms of the imide group is 4 to 30 is preferable and an aspect having that of 4 to 20 is more preferable. Specifically, examples of the imide groups include a succinic imide group, a phthalic imide group, etc.

The diazo component residue represented by Q means that it is the residue of the diazo component "A-$NH_2$". In particular, from the viewpoint of color reproduction aimed at, it is preferable that Q is an aryl group or an aromatic heterocyclic group.

Here, the aromatic heterocyclic group is an aromatic ring that contains a hetero atom such as a nitrogen atom, a sulfur atom, or an oxygen atom in the ring, and a five- to six-membered ring is preferable. As the number of carbon atoms of the aromatic heterocyclic group, 1 to 25 is preferable and 1 to 15 is more preferable. Specifically, examples of the aromatic heterocyclic groups include a pyrazole group, a 1,2,4-triazole group, an isothiazole group, a benzoisothiazole group, a thiazole group, a benzothiazole group, an oxazole group, a 1,2,4-thiadiazole group, etc.

In particular, the compound represented by General Formula (II) preferably has the following aspect.

That is, the aspect in which $R^6$ is a cyano group, an aliphatic oxycarbonyl group, or a carbamoyl group, $R^7$ is an aliphatic group, $R^8$ is an aliphatic group, an acyl group, an aryl group, an aliphatic carbonyl group, an aliphatic sulfonyl group, or an arylsulfonyl group, and Q is an aryl group.

Specific examples of the pyridone azo dye will be shown below, but the present invention is not limited to these.

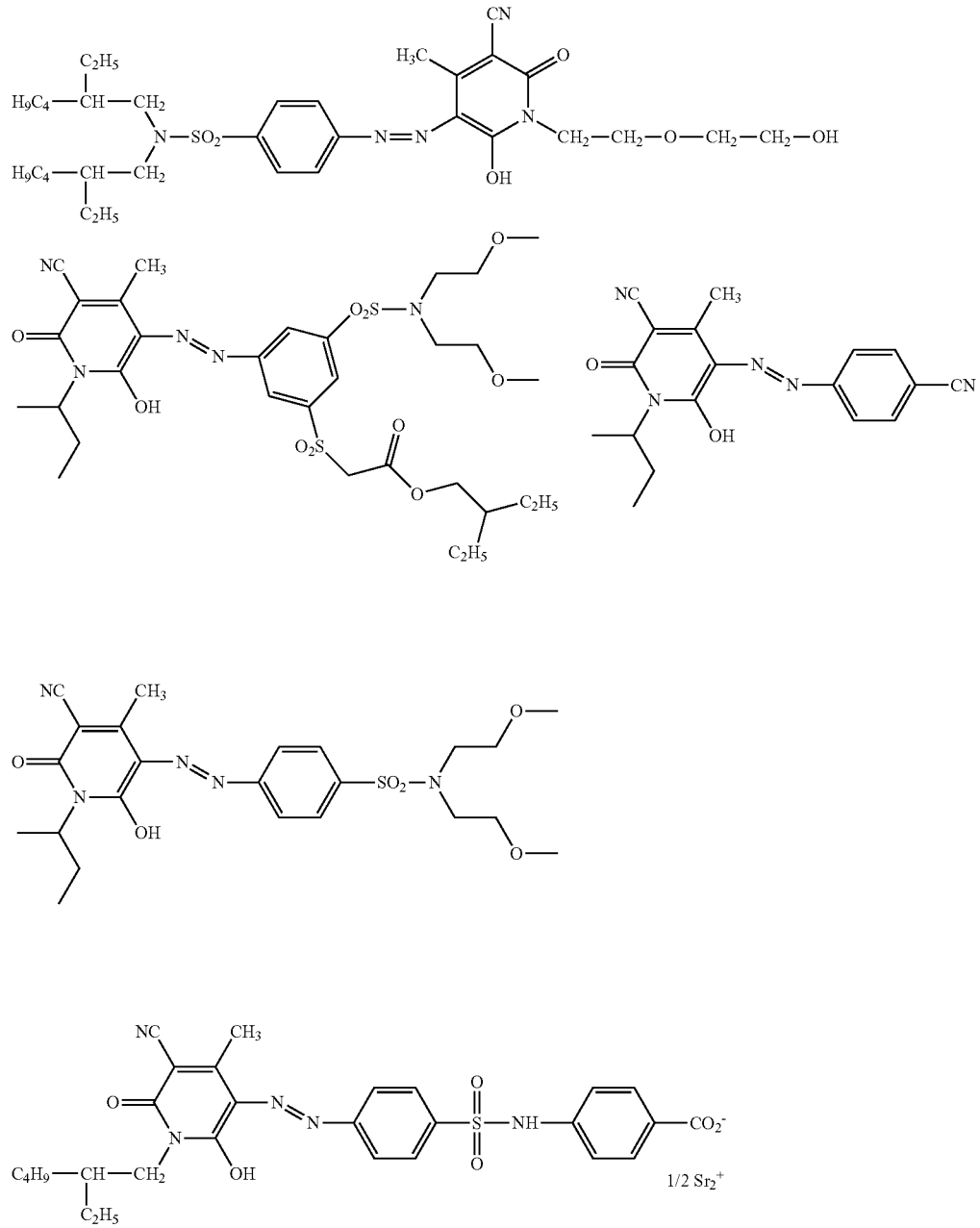

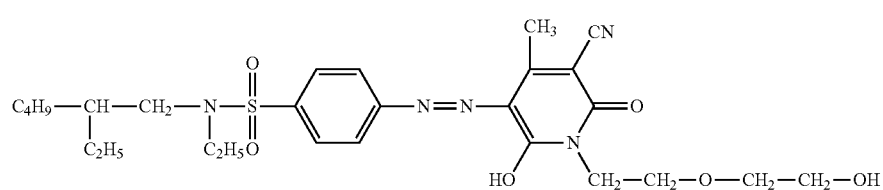

—(3) An Azo Dye Having a Pyrazole Ring in its Structure (Hereinafter, Referred to as "Pyrazole Azo Dye")—

The pyrazole azo dye is a yellow dye including a partial structure in which a pyrazole ring and an azo group are directly bonded.

It is preferable that this pyrazole azo dye is a diazo component residue bonded via the pyrazole ring and the azo group, that is, an aryl group or an aromatic heterocyclic group as the residue of the diazo component "A-$NH_2$" from the viewpoint of color reproduction and luminance.

Specific examples of the pyrazole azo dye will be shown below, but the present invention is not limited to these.

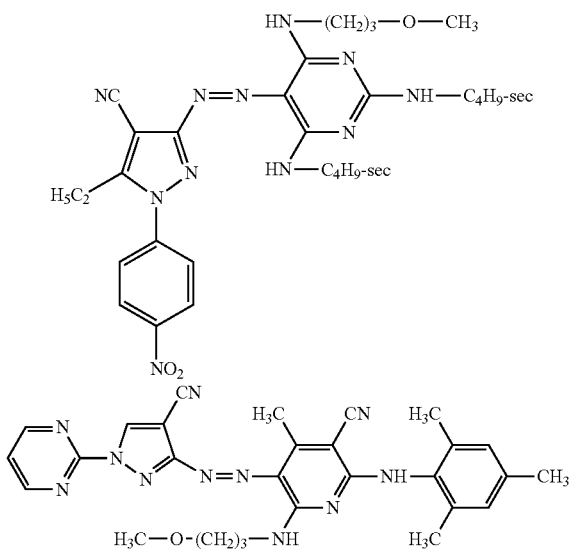

[Green Pigment or Cyan Pigment]

In the green pixel region, the specific yellow dye described above and the green pigment or cyan pigment coexist.

As the green pigment or cyan pigment, publicly-known pigments (for example, the green pigment or cyan pigment enumerated in other pigments to be described later) can be used, but the phthalocyanine based pigment is preferable from the viewpoint of heat resistance.

Specifically, examples of the green pigments or cyan pigments include a C. I. Pigment Green 7, 36, 58; a C. I. Pigment Blue 15:3, and an aluminum phthalocyanine pigment. However, in the present invention, pigment is not limited to these.

As the aluminum phthalocyanine pigment, the aluminum phthalocyanine pigment described in JP-A No. 2004-333817 is used preferably.

As a combination of the green pigment or cyan pigment and the specific yellow dye, one that satisfies the following conditions is preferable.

That is, a combination of the green pigment or cyan pigment and the specific yellow dye in which a difference between the spectral absorption maximum peak wavelengths in the visible light region is 130 nm or more, is preferable, a combination in which the difference is 140 nm or more is more preferable, and a combination in which the difference is 150 nm or more is most preferable. When the difference is less than 130 nm, there may be a case where it is difficult to increase luminance.

Further, a combination of the green pigment or cyan pigment and the specific yellow dye in which a difference between the spectral absorption maximum peak wavelengths in the visible light region is 240 nm or less, is preferable and a combination in which the difference is 220 nm or less more, is more preferable. When the difference is more than 240 nm, there may be a case where it is difficult to secure a sufficient color reproduction region when the combination is applied to an image display device.

In the present invention, a combination of the green pigment or cyan pigment and the specific yellow dye in which a difference between the spectral absorption maximum peak wavelengths in the visible light region is 150 nm to 240 nm, is most preferable.

Here, the spectral absorption maximum peak wavelength of the pigment and dye will be measured as follows.

That is, a monochrome color filter that uses only one of the pigment and dye is manufactured and the spectral absorption spectrum of the monochrome color filter is measured using MCPD-2000 manufactured by OTSUKA ELECTRONICS CO. LTD.

Furthermore, the content ratio (mass ratio) of the specific yellow dye content relative to the green pigment or cyan pigment content in the green region differs depending on the compound to be selected, but 5% by mass to 300% by mass is preferable and 20% by mass to 300% by mass is more preferable.

Meanwhile, the green pigment or cyan pigment content in the green region in the present invention is preferably 1% by mass to 50% by mass, more preferably 10% by mass to 45% by mass, and further more preferably, 15% by mass to 40% by mass from the viewpoint of color reproduction and luminance.

In the range not impairing the effects of the present invention, the green pixel region may contain other dyes and pigments in addition to the green pigment or cyan pigment and the specific yellow dye described above.

When other dyes and pigments are used in the green region in the present invention, it is preferable to set the total content ratio of the green pigment or cyan pigment and the specific yellow dye in the total content of the pigment and dye included in the green region to 60% by mass to 100% by mass, and more preferably, to 80% by mass to 100% by mass.

—Other Dyes—

Other dyes can be used in the present invention without any restrictions in particular and can be selected from the publicly-known solvent-soluble dyes, etc. Examples thereof include dyes described in JP-A No. 64-90403, JP-A No. 64-91102, JP-A No. 01-94301, JP-A No. 06-11614, Japanese Patent (JP-B) No. 2592207, U.S. Pat. No. 4,808,501, U.S. Pat. No. 5,667,920, U.S. Pat. No. 5,059,500, JP-A No. 05-333207, JP-A No. 06-35183, JP-A No. 06-51115, and JP-A. No. 06-194828.

Examples of the dye include an anilino azo compound, an arylazo compound, a pyrazolotriazol azo compound, a triphenylmethane compound, an anthraquinone compound, an anthrapyridone compound, a benzylidene compound, an oxonol compound, a cyanine compound, a phenothiazine compound, a pyrrolopyrazole azomethine compound, a xanthene compound, a phthalocyanine compound, a benzopyrane compound, and an indigo compound.

—Other Pigments—

As other pigments, various conventionally known inorganic pigments or organic pigments may be used.

Considering that either the inorganic pigment or the organic pigment preferably has high transmittance, it is preferable to use a pigment having a minute particle size, i.e.

having a particle diameter as small as possible. When also considering achievement of favorable handling properties of the pigment, the average primary particle diameter of the pigment is preferably 0.01 µm to 0.3 µm, and more preferably 0.01 µm to 0.15 µm. An average particle diameter within the above range allows a color filter to form a color region having high transmittance and excellent color characteristics and to have high contrast. The green pigment and cyan pigment also have the above-described preferable value of the particle size.

Examples of the inorganic pigments include metal compounds such as metal oxides and metal complex salts. Specific examples of the inorganic pigments include oxides of metals such as iron, cobalt, aluminum, cadmium, lead, copper, titanium, magnesium, chromium, zinc and antimony, and complex oxides of the above metals.

Examples of the organic pigments include C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, 279;

C. I. Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214;

C. I. Pigment Orange 2, 5, 13, 16, 17:1, 31, 34, 36, 38, 43, 46, 48, 49, 51, 52, 55, 59, 60, 61, 62, 64, 71, 73;

C. I. Pigment Green 10, 37;

C.I. Pigment Blue 1, 2, 15, 15:1, 15:2, 15:4, 15:6, 16, 22, 60, 64, 66, 79, a product obtained by replacing a CI substituent of C.I. Pigment Blue 79 by OH, 80;

C. I. Pigment Violet 1, 19, 23, 27, 32, 37, 42;

C. I. Pigment Brown 25, 28; and

C. I. Pigment Black 1, 7.

The pigments (green pigments, cyan pigments, other pigments) may be subjected to a process of obtaining a finer pigment, if necessary.

For processing of obtaining a finer organic pigment, a method including a step of grinding an organic pigment with a water-soluble organic solvent and a water-soluble inorganic salt so as to form a liquid composition having high viscosity, is preferably used.

In the present invention, the following method is preferably used to obtain the finer organic pigment.

Firstly, a mixture of an organic pigment, a water-soluble organic solvent and a water-soluble inorganic salt (liquid composition) is processed with a kneader such as a two-roll mill, a three-roll mill, a ball mill, a trommel, a disper, a kneader, a cokneader, a homogenizer, a blender or a uniaxial or biaxial kneader, so as to apply strong shear force to the mixture, and thereby grinding the organic pigment therein. Thereafter, the resultant mixture is added into water, and is formed into a slurry by using an stirrer or the like. Then, the slurry is filtered and washed with water, so as to remove the water-soluble organic solvent and the water-soluble inorganic salt, followed by drying the resultant product, to thereby obtain a finer organic pigment.

Examples of the water-soluble organic solvent, which is used in the process of obtaining a finer pigment, include methanol, ethanol, isopropanol, n-propanol, isobutanol, n-butanol, ethylene glycol, diethylene glycol, diethylene glycol monomethyl ether, diethylene glycol monoethyl ether, diethylene glycol monobutyl ether, propylene glycol, and propylene glycol monomethyl ether acetate.

Provided that by using a small amount of other solvents they adsorb onto the pigment and do not flow into waste water; examples thereof include benzene, toluene, xylene, ethylbenzene, chlorobenzene, nitrobenzene, aniline, pyridine, quinoline, tetrahydrofuran, dioxane, ethyl acetate, isopropyl acetate, butyl acetate, hexane, heptane, octane, nonane, decane, undecane; dodecane, cyclohexane, methylcyclohexane, halogenated hydrocarbon, acetone, methyl ethyl ketone, methyl isobutyl ketone, cyclohexanone, dimethylformamide, dimethylsulfoxide and N-methylpyrrolidone. These may be used alone or in combination, if necessary.

The amount used of the water-soluble organic solvent is preferably 50 parts by mass to 300 parts by mass, more preferably 100 parts by mass to 200 parts by mass, relative to 100 parts by mass of the organic pigment.

In the present invention, examples of the water-soluble inorganic salt include sodium chloride, potassium chloride, calcium chloride, barium chloride and sodium sulfate.

The amount used of the water-soluble inorganic salt is 1 time by mass to 50 times by mass that of the organic pigment. The greater amount of the water-soluble inorganic salt is used, the stronger grinding effect is obtained. However, the amount of the water-soluble inorganic salt is more preferably 1 time by mass to 10 times by mass that of the organic pigment, from the viewpoint of favorable productivity.

In order to prevent the water-soluble inorganic salt from dissolving, the moisture content of the liquid composition to be grinded is preferably 1% by mass or lower.

In the present invention, for grinding the liquid composition containing the organic pigment, the water-soluble organic solvent, and the water-soluble inorganic salt, wet-crushing apparatus such as the above-mentioned kneaders may be used. There are no particular limitations on the operation conditions of the wet-crushing apparatus. In order to perform effective grinding with a grinding medium (water-soluble inorganic salt), the operation conditions when the apparatus is a kneader are such that the rotation number of the blade in the apparatus is preferably 10 rpm to 200 rpm, and the ratio between the rotations of the two axes is preferably relatively high due to greater grinding effects achieved thereby. The total operation time, including dry crushing time, is preferably from 1 hour to 8 hours, and the internal temperature of the apparatus is preferably 50° C. to 150° C. It is preferable that the water-soluble inorganic salt as a crushing medium has a sharp particle diameter distribution in the crushed particle size range of from 5 µm to 50 µm and has a spherical shape.

The grinded mixture is mixed with hot water at 80° C., so as to dissolve the water-soluble organic solvent and the water-soluble inorganic salt, followed by filtering, washing with water, and drying in an oven, to thereby obtain a finer organic pigment.

[Pigment Dispersion Composition]

For formation of the green pixel region, a pigment dispersion composition containing a green pigment or a cyan pigment, if necessary, and other pigments is preferably prepared and used.

The pigment dispersion composition is formed by dispersing a pigment with, a dispersant and/or a pigment derivative in a solvent.

A dispersant used here is used for the purpose of improving dispersibility of the pigment, and for example, known pigment dispersants and/or surfactants may be suitably selected.

—Dispersant—

As the dispersant, many types of compounds may be used. Examples thereof include: cationic surfactants such as an organosiloxane polymer KP341 (manufactured by Shin-Etsu Chemical Co., Ltd.) and (meth)acrylic (co)polymers POLYFLOW No. 75, No. 90 and No. 95 (manufactured by KYOEISHA CHEMICAL Co., Ltd.) and W001 (manufactured by Yusho Co., Ltd.); nonionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethyleneglycol dilaurate, polyethyleneglycol distearate and sorbitan fatty acid ester; anionic surfactants such as W004, W005 and W017 (manufactured by Yusho Co., Ltd.); polymer dispersants such as EFKA-46, EFKA-47, EFKA-47EA, EFKA POLYMER 100, EFKA POLYMER 400, EFKA POLYMER 401 and EFKA POLYMER 450 (manufactured by Ciba Speciality Chemicals) and DISPERSE AID 6, DISPERSE AID 8, DISPERSE AID15 and DISPERSE AID 9100 (manufactured by SAN NOPCO LIMITED); various SOLSPERSE dispersants such as SOLSPERSE 3000, 5000, 9000, 12000, 13240, 13940, 17000, 24000, 26000 and 28000 (manufactured by Lubrizol Japan Ltd.); and ADEKA PLURONIC L31, F38, L42, L44, L61, L64 F68, L72, P95, F77, P84, F87, P94, L101, P103, F108, L121 and P-123 (manufactured by ADEKA Corporation), IONET S-20 (manufactured by Sanyou Chemical Industries Co., Ltd.) and DISPERBYK 101, 103, 106, 108, 109, 111, 112, 116, 130, 140, 142, 161, 162, 163, 164, 166, 167, 170, 171, 174, 176, 180, 182, 2000, 2001, 2050 and 2150 (manufactured by BYK Japan KK). Further examples thereof include an oligomer or polymer having a polar group at a molecular terminal or at a' side chain, such as an acrylic copolymer.

The amount used of the dispersant is preferably 0.5 parts by mass to 100 parts by mass, and more preferably 3 parts by mass to 70 parts by mass, relative to 100 parts by mass of the pigment in total amount contained in the pigment dispersion composition. The amount of the dispersant within the above range provides sufficient effect of pigment dispersion. It is noted that even though 100 parts by mass or more of the dispersant is added, further improvement of the effect of pigment dispersion may not be expected.

—Pigment Derivative—

To the pigment dispersion composition, a pigment derivative is added, if necessary.

In the present invention, by using a portion of the pigment derivative, which portion having affinity to the dispersant, or the pigment derivative, on which a polar group is introduced, as an adsorption point of the dispersant, the pigment in a form of fine particles can be dispersed in the pigment dispersion composition, and moreover reaggregation of the fine particles can be prevented. Namely, the pigment derivative modifies a surface of the pigment, so as to promote the adsorption of the dispersant.

Specifically, the pigment derivative is a compound having an organic pigment as a base skeleton, and an acidic group, a basic group, or an aromatic group as a substituent introduced at a side chain. Specific examples of the organic pigment as a skeleton include quinacridone pigments, phthalocyanine pigments, azo pigments, quinophthalone pigments, isoindoline pigments, isoindolinone pigments, quinoline pigments, diketopyrrolopyrrole pigments and benzoimidazolon pigments. Preferable examples thereof further include pale-yellow aromatic polycyclic compounds such as naphthalene pigments, anthraquinone pigments, triazine pigments and quinoline pigments, which are not called as pigments.

Examples of the pigment derivatives include those described in JP-A Nos. 11-49974, 11-189732, 10-245501, 2006-265528, 08-295810, 11-199796, 2005-234478, 2003-240938, and 2001-356210.

The content of the pigment derivative in the pigment dispersion composition is preferably 1% by mass to 30% by mass, more preferably 3% by mass to 20% by mass, relative to the mass of the pigment. When the content of the pigment derivative is within these ranges, dispersion can be suitably performed and dispersion stability after dispersing can be improved while regulating the viscosity to be low; therefore, the transmittance of the pigment dispersion composition is high, and excellent color characteristics are obtained. Accordingly, use of such a pigment dispersion composition in the production of a color filter enables formation of a color region having excellent color characteristics and allows the color filter to have high contrast.

—Solvent—

A solvent contained in the pigment dispersion composition is the same as that contained in a green curable composition, which will be described below.

The concentration of the organic pigment in the pigment dispersion composition is preferably 30% by mass to 90% by mass, and more preferably 40% by mass to 80% by mass.

The pigment dispersion composition can be prepared by a mixing and dispersing step, in which mixing and dispersing the composition described below using various mixers and dispersers.

The mixing and dispersing step preferably includes kneading and dispersing, followed by a process of obtaining a finer pigment, but the kneading and dispersing step can be omitted.

Specifically, for example, a pigment and if necessary a dispersant are mixed in advance, and further dispersed with a homogenizer or the like in advance. The prepared mixture is finely-dispersed by using a bead disperser using a zirconia beads or the like (for example, DISPERMAT manufactured by GETZMANN Gmbh), to thereby prepare a pigment dispersion composition.

The dispersion time is preferably approximately 3 hours to approximately 6 hours.

The fine-dispersing treatment is conducted using beads that are made of glass, zirconia or the like and that have a particle diameter of 0.01 mm to 1 mm, and using mainly a vertical or horizontal sand grinder, a pin mill, a slit mill, a ultrasonic disperser or the like.

The kneading and dispersing are specifically described in T. C. Patton "Paint Flow and Pigment Dispersion" (John Wiley and Sons Inc., 1964) and the like.

[Green Curable Composition]

The green pixel is preferably formed using a green curable composition containing the pigment dispersion composition.

When the amount of the pigment (pigment content) in the green curable composition is preferably 30% by mass to 60% by mass, more preferably 35% by mass to 60% by mass, still more preferably 40% by mass to 60% by mass.

When the pigment content within these ranges provides sufficient color density, and is effective in ensuring excellent color characteristics.

It is note that in the case where the pigment derivative is used in the pigment dispersion composition, the pigment content of the green curable composition is a value obtained by dividing a total mass of the pigment and the pigment derivative by a total solid contents of the green curable composition.

The green curable composition preferably contains an alkali-soluble resin, a compound having an ethylenically unsaturated double bond in a molecule, a polymerization initiator, a solvent, and the like, in addition to the pigment dispersion composition.

Hereinafter, components constituting the green curable composition will be described.

—Alkali-Soluble Resin—

The alkali-soluble resin that can be used in the invention may be selected suitably from alkali-soluble resins each of which is a liner organic high-molecular polymer and each of which has at least one alkali-solubility enhancing group (such as a carboxyl group, a phosphoric acid group or a sulfonic acid group) in a molecule thereof (preferably a molecule of which main chain is an acrylic copolymer and/or a styrenic copolymer). Of these, resins soluble in an organic solvent and capable of developing with a weak-alkaline aqueous solution are more preferable.

For production of the alkali-soluble resin, for example, a method involving a known radical polymerization method may be used. When producing the alkali-soluble resin according to a radical polymerization method, polymerization conditions such as the temperature, the pressure, the type and amount of a radical initiator and the type of a solvent can be easily set by a person skilled in the art, and can be determined experimentally.

The linear organic high-molecular polymer is preferably a polymer having carboxylic acid at a side chain thereof. Examples thereof include methacrylic acid copolymers, acrylic acid copolymers, itaconic acid copolymers, crotonic acid copolymers, maleic acid copolymers and partially-esterified maleic acid copolymers such as those described in JP-A No. 59-44615, JP-B No. 54-34327, JP-B No. 58-12577, JP-B No. 54-25957, JP-A No. 59-53836 and JP-A No. 59-71048; acidic cellulose derivatives having carboxylic acid at a side chain thereof, and products obtained by addition of an acid anhydride to polymers having a hydroxyl group. Preferable examples also include high-molecular polymers having a (meth)acryloyl group at a side chain thereof.

Of these, benzyl (meth)acrylate/(meth)acrylic acid copolymers and multicomponent copolymers composed of benzyl (meth)acrylate/(meth)acrylic acid/other monomer(s) are particularly preferable.

Further, copolymers obtained by copolymerizing 2-hydroxyethyl methacrylate are also preferable examples. The polymers may be mixed in arbitrary amounts for use.

Further examples of the linear organic high-molecular polymer include a 2-hydroxypropyl (meth)acrylate/polystyrene macromonomer/benzyl methacrylate/methacrylic acid copolymer, a 2-hydroxy-3-phenoxypropyl acrylate/poly(methyl methacrylate) macromonomer/benzyl methacrylate/methacrylic acid copolymer, a 2-hydroxyethyl methacrylate/polystyrene macromonomer/methyl methacrylate/methacrylic acid copolymer and a 2-hydroxyethyl methacrylate/polystyrene macromonomer/benzyl methacrylate/methacrylic acid copolymer, which are described in JP-A No. 07-140654.

In regard to the specific structural units of the alkali-soluble resin, a copolymer of (meth)acrylic acid and other monomer(s) copolymerizable therewith is preferable.

Examples of the other monomers copolymerizable with (meth)acrylic acid include alkyl (meth)acrylates, aryl (meth)acrylates and vinyl compounds. Here, a hydrogen atom of the alkyl group and a hydrogen atom of the aryl group may be replaced by a substituent.

Specific examples of the alkyl (meth)acrylates and the aryl (meth)acrylates include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl (meth)acrylate, tolyl (meth)acrylate, naphthyl (meth)acrylate and cyclohexyl (meth)acrylate.

Examples of the vinyl compounds include styrene, α-methylstyrene, vinyltoluene, glycidyl methacrylate, acrylonitrile, vinyl acetate, N-vinylpyrrolidone, tetrahydrofurfuryl methacrylate, polystyrene macromonomer, poly(methyl methacrylate) macromonomer, $CH_2=CR^1R^2$, $CH_2=C(R^1)(COOR^3)$, wherein $R^1$ represents a hydrogen atom or an alkyl group having 1 to 5 carbon atoms, $R^2$ represents an aromatic hydrocarbon ring having 6 to 10 carbon atoms and $R^3$ represents an alkyl group having 1 to 8 carbon atoms or an aralkyl group having 6 to 12 carbon atoms.

The above-described other copolymerizable monomers may be used singly, or in combination of two or more thereof. The other copolymerizable monomer is preferably at least one selected from $CH_2=CR^1R^2$, $CH_2=C(R^1)(COOR^3)$, phenyl (meth)acrylate, benzyl (meth)acrylate and styrene, and are particularly preferably $CH_2=CR^1R^2$ and/or $CH_2=C(R^1)(COOR^3)$.

The content of the alkali-soluble resin as a binder in the green curable composition is preferably 1 to 15% by mass, more preferably 2% by mass to 12% by mass, and particularly preferably 3 to 10% by mass, relative to the total solid contents of the composition.

—Polymerizable Compound Having an Ethylenically Unsaturated Double Bond in a Molecule—

The green curable composition preferably contains a polymerizable compound having an ethylenic unsaturated double bond in a molecule (hereinafter, simply referred to as "polymerizable compound").

An exemplary polymerizable compound is a polymerizable monomer or oligomer having at least one ethylenic unsaturated double bond. Of these, a compound having at least one ethylenic unsaturated double bond, and a boiling point of 100° C. or higher at normal pressure is preferable.

Examples of the compound having at least one ethylenic unsaturated double bond and a boiling point of 100° C. or higher at normal pressure include: monofunctional acrylates or methacrylates, such as polyethyleneglycol mono(meth)acrylate, polypropyleneglycol mono(meth)acrylate and phenoxyethyl (meth)acrylate; and polyfunctional acrylates or methacrylates such as polyethyleneglycol di(meth)acrylate, trimethylolethane tri(meth)acrylate, neopentylglycol di(meth)acrylate, pentaerythritol tri(meth)acrylate, pentaerythritol tetra(meth)acrylate, dipentaerythritol hexa(meth)acrylate, hexanediol (meth)acrylate, trimethylolpropane tri(acryloyloxypropyl)ether, tri(acryloyloxyethyl)isocyanurate, compounds in which ethylene oxide or propylene oxide is added to polyfunctional alcohols such as glycerin or trimethylolethane and then (meth)acrylated, poly(meth)acrylated pentaerythritol or poly(meth)acrylated dipentaerythritol, urethane acrylates described in JP-B Nos. 48-41708 and 50-6034 and JP-A No. 51-37193, polyester acrylates described in JP-A No. 48-64183 and JP-B Nos. 49-43191 and 52-30490 and epoxy acrylates as reaction products of epoxy resins and (meth)acrylic acid.

Moreover, photocurable monomers and oligomers described in Nihon Secchaku Kyoukaishi (Journal of the Adhesion Society of Japan), Vol. 20, No. 7, pp. 300 to 308 are also usable.

The compounds in which ethylene oxide or propylene oxide is added to polyfunctional alcohols and then (meth)

acrylated, and which are described as General Formulas (1) and (2) together with specific examples thereof in JP-A No. 10-62986, are also usable.

In particular, dipentaerythritol penta(meth)acrylate, dipentaerythritol hexa(meth)acrylate and structures in which acryloyl groups of either of these compounds are linked to the dipentaerythritol via ethylene glycol or propylene glycol residues, are preferable. Oligomers thereof are also usable.

The polymerizable compound may be used alone or in combination.

The content of the polymerizable compound in the green curable composition is preferably 2% by mass to 30% by mass, and more preferably 3% by mass to 25% by mass, still more preferably 5% by mass to 20% by mass, relative to the total solid contents of the composition. When the content of the polymerizable compound is within the above range, curing reaction can proceed sufficiently.

—Photopolymerization Initiator—

There are no restrictions in particular on the polymerization initiator and any polymerization initiator can be selected appropriately according to the purpose. Examples of photopolymerization initiators include: the halomethyl oxadiazoles described in JP-A No. 57-6096; active halogen compounds such as halomethyl-s-triazines such as those described in JP-B No. 59-1281 and JP-A No. 53.133428; aromatic carbonyl compounds such as the ketals, acetals or benzoin alkyl ethers described in U.S. Pat. No. 4,318,791 and European Patent Application Publication No. 88050A; aromatic ketone compounds such as the benzophenones described in U.S. Pat. No. 4,199,420; the (thio)xanthone or acridine compounds described in French Patent No. 2456741; the coumarin compounds, including the lophine dimers, described in JP-A No. 10-62986; and sulfonium organic boron complexes such as those described in JP-A No. 08-015521.

Examples of the photopolymerization initiators include acetophenone polymerization initiators, ketal polymerization initiators, benzophenone polymerization initiators, benzoin polymerization initiators, benzoyl polymerization initiators, xanthone polymerization initiators, triazine polymerization initiators, halomethyloxadiazole polymerization initiators, acridine polymerization initiators, coumarin polymerization initiators, biimidazole polymerization initiators, and oxime ester polymerization initiators.

Examples of the acetophenone photopolymerization initiators include 2,2-diethoxyacetophenone, p-dimethylaminoacetophenone, 2-hydroxy-2-methyl-1-phenyl-propan-1-one, p-dimethylaminoacetophenone, and 4'-isopropyl-2-hydroxy-2-methyl-propiophenone.

Examples of the ketal photopolymerization initiators include benzil dimethyl ketal and benzil-β-methoxyethylacetal.

Examples of the benzophenone photopolymerization initiators include benzophenone, 4,4'-(bisdimethylamino)benzophenone, 4,4'-(bisdiethylainino)benzophenone, 4,4'-dichlorobenzophenone, 1-hydroxy-cyclohexyl-phenyl-ketone, 2-benzyl-2-dimethylamino-1-(4-morpholinophenyl)-butanone-1,2-tolyl-2-dimethylamino-1-(4-morpholinophenyl)-butanone-1, and 2-methyl-1-[4-(methylthio)phenyl]-2-morpholinopropanane-1.

Examples of the benzoin or benzoyl photopolymerization initiators include benzoin isopropyl ether, benzoin isobutyl ether, benzoin methyl ether and methyl o-benzoyl benzoate.

Examples of the xanthone photopolymerization initiators include diethylthioxanthone, diisopropylthioxanthone, monoisopropylthioxanthone and chlorothioxanthone.

Examples of the triazine photopolymerization initiators include 2,4-bis(trichloromethyl)-6-p-methoxyphenyl-s-triazine, 2,4-bis(trichloromethyl)-6-p-methoxystyryl-s-triazine, 2,4-bis(trichloromethyl)-6-(1-p-dimethylaminophenyl)-1,3-butadienyl-s-triazine, 2,4-bis(trichloromethyl)-6-biphenyls-triazine, 2,4-bis(trichloromethyl)-6-(p-methylbiphenyl)-s-triazine, p-hydroxyethoxystyryl-2,6-di(trichloromethyl)-s-triazine, methoxystyryl-2,6-di(trichloromethyl)-s-triazine, 3,4-dimethoxystyryl-2,6-di(trichloromethyl)-s-triazine, 4-benzoxolan-2,6-di(trichloromethyl)-s-triazine, 4-(o-bromo-p-N,N-(diethoxycarbonylamino)-phenyl)-2,6-di(chloromethyl)-s-triazine and 4-(p-N,N-(diethoxycarbonylamino)-phenyl)-2,6-di(chloromethyl)-s-triazine.

Examples of the halomethyloxadiazole photopolymerization initiators include 2-trichloromethyl-5-styryl-1,3,4-oxodiazole, 2-trichloromethyl-5-(cyanostyryl)-1,3,4-oxodiazole, 2-trichloromethyl-5-(naphth-1-yl)-1,3,4-oxodiazole and 2-trichloromethyl-5-(4-styryl)styryl-1,3,4-oxodiazole.

Examples of the acridine photopolymerization initiators include 9-phenylacridine and 1,7-bis(9-acrydinyl)heptane.

Examples of the coumarin photopolymerization initiators include 3-methyl-5-amino((s-triazin-2-yl)amino)-3-phenylcoumarin, 3-chloro-5-diethylamino-((s-triazin-2-yl)amino)-3-phenylcoumrin and 3-butyl-5-dimethylamino-((s-triazin-2-yl)amino)-3-phenylcoumarin.

Examples of the biimidazole photopolymerization initiators include 2-(o-chlorophenyl)-4,5-diphenylimidazolyl dimer, 2-(o-methoxyphenyl)-4,5-diphenyimidazolyl dimer and 2-(2,4-dimethoxyphenyl)-4,5-diphenylimidazolyl dimer.

Further examples of the photopolymerization initiators include 1-phenyl-1,2-propanedione-2-(o-ethoxycarbonyl)oxime, o-benzoyl-4'-(benzmercapto)benzoyl-hexyl-ketoxime, 2,4,6-trimethylphenylcarbonyl-diphenylphosphonyl oxide and a hexafluorophosphoro-trialkylphenyl phosphonium salt.

In the present invention, photopolymerization initiators are not limited to those listed above, and other known photopolymerization initiators may be used. Examples thereof include vicinal polyketolaldonyl compounds described in U.S. Pat. No. 2,367,660; α-carbonyl compounds described in U.S. Pat. Nos. 2,367,661 and 2,367,670; acyloin ethers described in U.S. Pat. No. 2,448,828; aromatic acyloin compounds substituted by an α-hydrocarbon described in U.S. Pat. No. 2,722,512; polynuclear quinone compounds described in U.S. Pat. Nos. 3,046,127 and 2,951,758; a combination of a triallylimidazole dimer/p-aminophenyl ketone described in U.S. Pat. No. 3,549,367; benzothiazole compounds/trihalomethyl-s-triazine compounds described in JP-B No. 51-48516; and oxime ester compounds described in J.C.S. Perkin II (1979) 1653-1660, J.C.S. Perkin II (1979) 156-162, Journal of Photopolymer Science and Technology (1995) 202-232 and JP-A No. 2000-66385.

These photopolymerization initiators may be used in combination.

The content of the photopolymerization initiator in the green curable composition is preferably 0.1% by mass to 15.0% by mass, and more preferably 0.3% by mass to 10.0% by mass, still more preferably 0.5% by mass to 8.0% by mass, relative to the total solid contents of the composition. When the content of the photopolymerization initiator is within the above range, polymerization reaction favorably progresses, so as to thereby form a film having excellent strength.

—Solvent—

There are no restrictions in particular on a solvent used in the present invention on a substrate and any solvent can be selected appropriately according to the purpose. Examples thereof include esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, alkyl 3-oxypropionates such as methyl 3-oxypropionate and ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropioionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate and ethyl 2-oxobutanoate; ethers such as diethyleneglycol dimethyl ether, tetrahydrofuran, ethylene glycol monomethyl ether, ethylene glycol monoethyl ether, methyl cellosolve acetate, ethyl cellosolve acetate, diethyleneglycol monomethyl ether, diethyleneglycol monoethyl ether, diethyleneglycol monobutyl ether, propylene glycol methyl ether acetate, propylene glycol ethyl ether acetate and propylene glycol propyl ether acetate; ketones such as methyl ethyl ketone, cyclohexanone, 2-heptanone and 3-heptanone; and aromatic hydrocarbons such as toluene and xylene. These may be used alone or in combination.

Of these, methyl 3-ethoxypropionate, ethyl 3-ethoxypropionate, ethyl cellosolve acetate, ethyl lactate, diethyleneglycol dimethyl ether, butyl acetate, methyl 3-methoxypropionate, 2-heptanone, cyclohexanone, ethyl carbitol acetate, butyl carbitol acetate and propylene glycol methyl ether acetate are preferable.

The green curable composition may contain various additives, if necessary, such as sensitizing dyes or pigments, hydrogen donating compounds, fluorine-containing organic compounds, thermal polymerization initiators, thermally-polymerizable components, thermal polymerization inhibitors, fillers, polymer compounds other than the above-described alkali-soluble resins (binder polymers), surfactants, adhesion improvers, antioxidants, UV absorbers and aggregation inhibitors.

[Preparation of Green Curable Compositions]

It is possible to prepare the green curable composition by selecting the respective components described above as necessary and then blending them.

Meanwhile, it is preferable to obtain the green curable composition by using a pigment-dispersed composition after preparing the pigment-dispersed composition as described above.

When using a pigment dispersed composition to prepare the green curable composition, relative to all the solid components (mass) of the green curable composition, the content of the pigment dispersed composition is preferably an amount when the pigment content is in the range of 30% by mass to 60% by mass, more preferably in the range of 35% by mass to 60% by mass, and further more preferably in the range of 40% by mass to 60% by mass.

When the pigment-dispersed composition content is within these ranges, it is effective to secure the excellent color characteristics in which the color concentration is sufficient.

<Yellow Curable Composition in Yellow (Y) Pixel>

The yellow (Y) pixel may contain any of dye and pigment, but it is preferable to contain dye from the viewpoint of the improvement in luminance. Further, it may contain both dye and pigment.

The yellow dye can be used without any restrictions in particular and can be selected from the publicly-known solvent-soluble dye etc. Examples of the yellow dyes include the yellow coloring matter described in JP-A No. 64.90403, JP-A No. 64-91102, JP-A No. 01-94301, JP-A No. 06-11614, Japanese Patent No. 2592207, U.S. Pat. No. 4,808,501, U.S. Pat. No. 5,667,920, U.S. Pat. No. 5,059,500, JP-A No. 05-333207; JP-A No. 06-35183, JP-A No. 06-51115, JP-A No. 06-194828, etc. As the chemical structures, it is possible to use dyes such as, for example, anilino azo, azo including aryl azo, pyrazolotriazole azo, pyridone azo, and pyrazole azo, triphenylmethane, anthraquinone, anthrapyridone, benzylidene, oxonol, cyanine, phenothiazine, pyrazolotriazole methine, pyrrolopyrazole azo methine, xanthene, phthalocyanine, benzopyrane, indigo, etc.

The yellow pigment can be selected appropriately in accordance with the purpose without any restrictions in particular, and examples of the yellow pigments include a C. I. Pigment 11, C. I. a Pigment Yellow 24, a C. I. Pigment Yellow 31, a C. I. Pigment Yellow 53, a C. I. Pigment Yellow 83, a C. I. Pigment Yellow 93, a C. I. Pigment Yellow 99, C. I. Pigment Yellow 108, C. I. Pigment Yellow 109, C. I. Pigment Yellow 110, a C. I. Pigment Yellow 138, a C. I. Pigment Yellow 139, a C. I. Pigment Yellow 147, a C. I. Pigment Yellow 150, a C. I. Pigment Yellow 151, a C. I. Pigment Yellow 154, a C. I. Pigment Yellow 155, a C. I. Pigment Yellow 167, a C. I. Pigment Yellow 180, a C. I. Pigment Yellow 185, a C. I. Pigment Yellow 199, etc.

The yellow (Y) curable composition has the same composition as that of the red (R), green (G), and blue (B) curable compositions except that it contains at least any of the yellow dye and the yellow pigment, and can be prepared by the same preparation method.

<Method of Manufacturing Color Filter>

As the method of manufacturing a color filter, it is preferable to use a method in which a coloring pattern is formed by using at least any of the red (R), green (G), and blue (B) curable compositions, further applying the yellow (Y) curable composition, and repeating prebake, exposure, and development.

The method of manufacturing a color filter suitable for the present invention has processes of application, prebake, exposure, and development as described above. By performing these processes, a monochrome or multicolor (three or four colors) coloring pattern (coloring region) is formed and a color filter can be obtained.

By using the method described above, it is possible to manufacture a color filter of high quality at a low cost, which is used in various kinds of image display device without any difficulties in terms of the process.

Each process will be explained below in detail.

[Application Process]

Examples of substrates used in a color filter of the present invention include no-alkali glass, soda glass, PYREX (registered trademark) glass, quartz glass, the above-mentioned glass to which a transparent conductive film is attached, used in a liquid crystal display element etc., a photoelectric conversion element substrate used in a solid-state imaging device, such as a silicon substrate and plastic substrate.

On these substrates, a black matrix to isolate each pixel may be formed or a transparent resin layer to promote closeness may be provided.

Furthermore, the plastic substrate preferably has a gas barrier layer and/or a solvent resistant layer on the surface thereof.

Besides, it is also possible to manufacture a color filter by using a drive substrate on which a thin film transistor (TFT) of a color liquid crystal display device of thin film transistor (TFT) type (hereinafter, referred to as a "TFT liquid crystal drive substrate") and forming a coloring pattern including the photocurable composition that is used in the present invention also on the drive substrate.

Examples of substrates for the TFT liquid crystal drive substrate include glass, silicon, polycarbonate, polyester, aromatic poylamide, polyamideimide, polyimide, etc. If desired, it is also possible to subject these substrates to appropriate pre-processing such as chemical processing by a silane coupling agent etc., plasma processing, ion plating, sputtering, vapor-phase reaction method, and vacuum deposition. For example, it is possible to use a substrate obtained by forming a passivation film such as a silicon nitride film on the surface of a TFT liquid crystal drive substrate.

In the application process, there are no restrictions in particular on a method of applying the photocurable composition used in the present invention on a substrate and any method can be selected appropriately according to the purpose, but a method using a slit nozzle (hereinafter, referred to as a slit nozzle application method) such as a slit and spin method and spinless applying method is preferable.

In the slit nozzle application method, the conditions are different between the slit and spin method and the spinless applying method, depending on the size of a substrate to be applied and for example, when a five-generation glass substrate (1,100 mm×1,250 mm) is applied by the spinless applying method, normally, the discharge of the photocurable composition from the slit nozzle is 500 μL/s to 2,000 μL/s, preferably 800 μL/s to 1,500 μL/s, and the application speed is normally 50 mm/s to 300 mm/s, preferably, 100 mm/s to 200 mm/s.

The solid component concentration of the photocurable composition used in the application process is preferably 12% by mass to 18% by mass. By setting the solid component concentration of the photocurable composition to the above-mentioned range, the color unevenness and the variations in slit application can be suppressed. Meanwhile, the solid component concentration of the photocurable composition is preferably 13% by mass to 17.5% by mass and more preferably, 14% by mass to 17% by mass.

The adjustment of the solid component concentration is performed by concentration and dilution through the use of the solvent described above if necessary.

Moreover, the viscosity of the curable composition of each color used in the application process is preferably 4.5 mPa·s to 6.5 mPa·s at ambient temperature (25° C.), more preferably 4.0 mPa·s to 7.0 mPa·s, and further more preferably 5.0 mPa·s to 6.0 mPa·s.

By setting the viscosity of the curable composition of each color used in the application process to be in the range described above, it is possible to make uniform the thickness of the application film of the photocurable composition applied.

When forming an application film of the curable composition of each color on the substrate, the thickness of the application film (after the prebake processing) is preferably 0.3 μm to 5.0 μm, more preferably, 0.5 μm to 4.0 μm, and further more preferably, 0.5 μm to 3.0 μm.

[Prebake Process]

After the application process, prebake processing of the application film is performed. If necessary, vacuum processing can be performed before prebake.

As the condition of vacuum drying, the degree of vacuum is preferably 0.1 torr to 1.0 torr and more preferably, 0.2 torr to 0.5 torr.

Furthermore, it is possible to perform the prebake processing by using a hot plate, oven, etc., in a temperature range of 50° C. to 140° C., preferably about 70° C. to about 110° C. for 10 sec to 300 sec. High-frequency processing etc. can be performed at the same time as the prebake processing. The high-frequency processing can be used alone.

[Exposure Process]

In the exposure process, the application film of the photocurable composition formed as described above is exposed via a predetermined mask pattern.

As radiant rays used at the time of exposure, ultraviolet rays such as g-ray, h-ray, i-ray, and j-ray are preferable.

Meanwhile, when manufacturing a color filter for a liquid crystal display device, exposure by a proximity exposure device or mirror projection exposure device, which mainly uses h-ray, i-ray is used preferably.

In addition, when manufacturing a color filter by using a TFT liquid crystal drive substrate, a photomask in which a pattern for forming a through-hole or a reversed C-shaped recess is provided in addition to a pattern for forming a pixel (coloring pattern) is used.

[Development Process]

In the development process, the uncured part of the application film after exposure is eluted into a developer and only the cured part is left.

The development temperature is normally 20° C. to 30° C. and the development time is 20 sec to 90 sec.

As a developer, any developer can be used as long as it dissolves the application film of the photocurable composition at the uncured part, but does not dissolve the cured part.

Specifically, a combination of various organic solvents, or alkali solution can be used.

As an organic solvent used in development, mention is made of the solvent already described that can be used when preparing the curable composition of each color.

Furthermore, examples of alkali solutions include those in which an alkali compound such as sodium hydroxide, potassium hydroxide, sodium carbonate, sodium bicarbonate, sodium silicate, sodium metasilicate, aqueous ammonia, ethylamine, diethylamine, dimethylethanolamine, tetramethylammoniumhydroxide, tetraethylammoniumhydroxide, choline, pyrrole, piperidine, or 1,8-diazabicyclo-[5,4,0]-7-undecene is dissolved so that the concentration is preferably 0.001% by mass to 10% by mass and more preferably, 0.01% by mass to 1% by mass.

It is also possible to add an appropriate amount of water soluble organic solvent, such as methanol and ethanol, surfactant, etc. in the alkali solution.

The development method may be, for example, any of the dip method, shower method, spray method, etc., and it may also be possible to combine the swing method, spin method, ultrasonic wave method, etc., therewith. It is also possible to prevent development unevenness by wetting the surface to be developed in advance before bringing it into contact with the developer. Further, it is also possible to develop the substrate in an inclined state.

Furthermore, when manufacturing a color filter for a solid-state imaging device, the puddle developer is also used.

After the development processing, the application film is subjected to rinse processing to clean and remove excessive developer and then drying processing.

Normally, the rinse processing is performed by using pure water, but for the sake of saving of liquid, it may also be possible to use pure water at the time of final cleaning and use pure water once used for the initial cleaning, clean the substrate in an inclined state, or use ultrasonic wave irradiation at the same time.

After the drying described above, normally, heating processing at the temperature ranging from 100° C. to 250° C. is performed.

This heating processing (postbake) can be performed by the continuous method or batch method by using a heating means such as a hot plate, convention oven (hot air circulation drying machine), and high-frequency heater so that the application film after development meets the above-described conditions.

Such postbake is a process for the purpose of making curing perfect and the purpose of making the pattern shape after development into a forwardly-tapered one by thermal deformation and generally heating (hardbake) at the temperature ranging from 200° C. to 250° C. is performed.

By repeatedly performing each process described above for each color in accordance with a desired number of hues, it is possible to manufacture a color filter in which a cured film (coloring pattern) colored by a plurality of colors is formed.

As the use of the curable composition of each color, the use for the coloring pattern (mainly the green region) of a color filter has been explained mainly, but it is also possible to apply the curable composition to form a black matrix that isolates the coloring pattern (pixel) constituting a color filter.

It is possible to form a black matrix on a substrate by using the curable composition having each color containing processed pigment of black pigment such as carbon black and titanium black, performing each process of application, exposure, and development, and then performing postbake as necessary.

(Electronic Display Device)

An electronic display device of the present invention is a liquid crystal display device, an organic EL display device, an electronic paper display device or other electronic display devices, each having the above-described color filter of the present invention.

(Liquid Crystal Display Device)

The liquid crystal display device of the present invention includes the color filter of the present invention and an LED light source, and further includes other members as necessary.

In the liquid crystal display device, it is possible to prevent a color filter from being deteriorated even by combining it with the color filter of the present invention by using an LED light source as a backlight.

Examples of the LED light sources include an LED light source that combines red (R), green (G), and blue (B) LEDs, an LED light source that uses a blue LED chip and a YAG based phosphor, an LED light source that uses a blue LED chip, a green phosphor, and a red phosphor, an LED light source that combines a blue-green LED that uses a blue LED chip and a green phosphor and a red LED, an LED light source that uses red, green, and blue phosphors in an ultraviolet-emitting LED chip, an organic EL light source (OLED), etc.

By using the color filter of the present invention in a liquid crystal display device, it is possible to provide a liquid crystal display device having high luminance and high color purity and excellent in color reproduction through the use of red, green, and blue LED light source (RGB-LED) as a backlight.

The definition of the liquid crystal display device and the explanation of each display device are described, for example, in "Electronic Display Device" (by Akio Sasaki, Kogyo Chosakai Publishing Co., Ltd., published in 1990), "Display Device" (by Sumiaki Ibuki, Sangyo Tosho Publishing Co., Ltd., published in 1989), etc. Further, the liquid crystal display device is described, for example, in "Next-Generation Liquid Crystal Display Technology" (edited by Tatsuo Uchida, Kogyo Chosakai Publishing Co., Ltd., published in 1994). There are no restrictions in particular on a liquid crystal display device to which the present invention can be applied and for example, the present invention can be applied to liquid crystal display devices using various methods described in the "Next-Generation Liquid Crystal Display Technology".

The color filter of the present invention is useful, among others, for a color TFT liquid crystal display device. The color TFT liquid crystal display device is described, for example, in "Color TFT Liquid Crystal Display" (Kyoritsu Shuppann Co., Ltd, published in 1996). Further, the present invention can also be applied to a liquid crystal display device of transverse electric field drive system, such as IPS, or a liquid crystal display device of pixel division system, such as MVA, in which the angle of field is increased, or STN, TN, VA, OCS, FFS, R-OCB, etc.

It is also possible to use the color filter of the present invention in the bright, high-definition COA (Color-filter On Array) system. For a liquid crystal display device of COA system, the characteristics required for a color filter layer need to include the characteristics required for an interlayer insulating film, that is, the low permittivity and remover resistance, in addition to the normally required characteristics described above. It can be considered that the color filter of the present invention improves transparency of an ultraviolet laser, which is an exposure ray, by selecting the hue and film thickness of the pixel specified by the present invention, in addition to the exposure method by the ultraviolet laser. Due to this, the curing properties of the coloring pixel are improved and a pixel without any loss, peeling, or twist can be formed, and therefore, particularly, the remover resistance of the coloring layer provided directly or indirectly on a TFT substrate is improved and effective for a liquid crystal display device of COA system. In order to meet the required characteristics of low permittivity, it may also be possible to provide a resin coating on the color filter layer.

Further, it is necessary to form a conductive path, such as a rectangular through hole with a side about 1 µm to about 15 µm long and a reversed C-shaped recess, in a coloring layer formed by the COA system in order to bring the ITO electrode arranged on the coloring layer and the terminal of the drive substrate under the coloring layer into conduction, and it is preferable to set the dimension of the conductive path (that is, the length of one side) to 5 µm or less particularly, but it is also possible to form a conductive path of 5 µm or less by using the present invention.

These image display systems are described, for example, in "EL, PDP, LCD display-technology and recent market trend- (Toray Research Center Investigation and Research Department, published in 2001)", p. 43, etc.

The liquid crystal display device of the present invention includes various members such as an electrode substrate, polarizing film, phase-difference film, backlight, spacer, and viewing angle compensation film, in addition to the color filter of the present invention. The color filter of the present invention can be applied to a liquid crystal display device including these publicly-known members.

These members are described, for example, in "Market of '94 Liquid Crystal Display Peripheral Materials-Chemicals (Kentarou Shima, CMC Publishing Co., Ltd, published in 1994)", "Present Situation of 2003 Liquid Crystal Related Market and Future Prospect (second volume) (Ryokichi Omote, Fuji Chimera Research Institute, Inc., published in 2003".
(Organic EL Display Device)

An organic EL display device of the present invention is a display device, as described in paragraphs [0283] to [0296] of JP-A No. 2010-44981, having the above-described color filter of the present invention.

EXAMPLES

The present invention will next be described by way of Examples, which should not be construed as limiting the present invention thereto.

Preparation Example 1

<Preparation of Red (R) Curable Composition>

By blending the respective components shown in the following Table A, red curable compositions R1 and R2 were obtained.

TABLE A

|  | Red curable composition | |
|---|---|---|
|  | R1 | R2 |
| C. I. Pigment Red 254 dispersion liquid (solid component concentration 19.6% by mass, pigment concentration 12.3% by mass) | 29.40 | 29.02 |
| C. I. Pigment Red 177 dispersion liquid (solid component concentration 21.0% by mass, pigment concentration 12.0% by mass) | — | 18.41 |
| Illustrated compound (the following structural formula M-1) | 1.95 | — |
| Illustrated compound (the following structural formula Y-1) | — | 1.02 |
| Polymerizable compound: dipentaerythritol hexaacrylate] | 3.64 | 4.45 |
| Photopolymerization initiator (the following structural formula I-1) | 2.25 | 2.75 |
| Alkali soluble resin: benzylmethacrylate/methacrylic acid, mole ratio: 70/30, Mw: 5,000, solid component 44% by mass solution (solvent: PGMEA) | 6.12 | 5.06 |
| Polymerization inhibitor: p-methoxyphenol | 0.00 | 0.002 |
| Epoxy compound: EPICLON 695 DIC Corporation | 0.90 | 1.10 |
| Additive: SOLSPERSE 20000 Avicia Limited | 0.54 | 0.66 |
| Surfactant (product name: Megafac F554 DIC Corporation) | 0.05 | 0.062 |
| Solvent: PGMEA | 55.15 | 37.47 |
| Total (% by mass) | 100.00 | 100.00 |

*Solvent: PGMEA (propylene glycol monomethyl ether acetate)

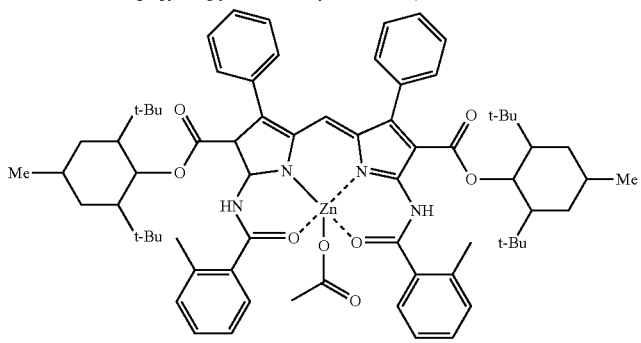

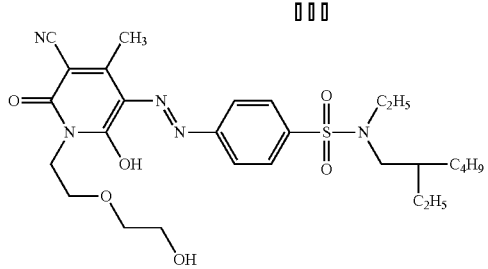

Y-1

TABLE A-continued

|  | Red curable composition | |
|---|---|---|
|  | R1 | R2 |

[Structural formula I-1]

Preparation Example 2

<Preparation of Blue (B) Curable Composition>

By blending the respective components shown in the following Table B, blue curable compositions B1 and B2 were obtained.

TABLE B

|  | Blue curable composition | |
|---|---|---|
|  | B1 | B2 |
| C.I. Pigment Blue 15:6 dispersion liquid (solid component concentration 20.0% by mass, pigment concentration 12.8% by mass) | 35.21 | 20.83 |
| Illustrated compound (the above structural formula M-1) | 1.89 | 2.53 |
| Polymerizable compound: dipentaerythritol hexaacrylate | 5.93 | 6.45 |
| Photopolymerization initiator: the above structural formula I-1, oxime based photochemical polymerization initiator (Irgacure OXE01 CIBA) | 1.42 | 1.55 |
| Alkali soluble resin: benzylmethacrylate/ methacrylic acid, mole ratio: 70/30, Mw: 30,000, solid component 40% by mass solution (solvent: PGMEA) | 9.26 | 13.22 |
| Polymerization inhibitor: p-methoxyphenol | 0.003 | 0.003 |
| Surfactant (product name: Megafac F554 DIC Corporation) | 0.008 | 0.008 |
| Solvent: PGMEA | 46.28 | 55.40 |
| Total (% by mass) | 100.0 | 100.0 |

*Solvent: PGMEA (propylene glycol monomethyl ether acetate)

Preparation Example 3

<Preparation of Green (G) Curable Composition>

By blending the respective components shown in the following Table C, green curable compositions G1 and G2 were obtained.

TABLE C

|  | Green curable composition | |
|---|---|---|
|  | G1 | G2 |
| C. I. Pigment Green 58 dispersion liquid (solid component concentration 23.8% by mass, pigment concentration 14.9% by mass) | 34.64 | 31.96 |
| Illustrated compound: the above structural formula Y-1 | 1.20 | 1.42 |
| Polymerizable compound: dipentaerythritol hexaacrylate | 4.55 | 4.55 |
| Photopolymerization initiator: the following structural formula I-2 | 0.88 | 0.91 |
| Alkali soluble resin: benzylmethacrylate/acrylic acid, mole ratio: 60/40, Mw: 11,000, solid component 45% by mass solution (solvent: PGMEA) | 2.50 | 2.60 |
| Polymerization inhibitor: p-methoxyphenol | 0.00 | 0.002 |
| Surfactant (product name: Megafac F554 DIC Corporation) | 0.03 | 0.033 |
| Additive: 3-(trimethoxysilyl) propylmethacrylate | 0.93 | 0.97 |
| Solvent: PGMEA | 55.36 | 57.57 |
| Total (% by mass) | 100.0 | 100.0 |

*Solvent: PGMEA (propylene glycol monomethyl ether acetate)

TABLE C-continued

|  | Green curable composition | |
|---|---|---|
|  | G1 | G2 |

I-2 (structure)

Preparation Example 4

<Preparation of Yellow (Y) Curable Composition>

By blending the prescription in the following Table D, a yellow curable composition was prepared.

TABLE D

|  | Yellow (Y) curable composition |
|---|---|
| C.I. Pigment Yellow 150 dispersion composition | 186.7 |
| MMPGAC | 262.5 |
| MEK (methylethylketone) | 351.6 |
| Methacrylic acid/methacrylic acid benzyl copolymer (mole ratio 22/78, weight average molecular weight: 30,000, 27% MMPGAC solution, acid number 79) | 136.5 |
| Dipentaerythritol hexaacrylate (containing 500 ppm of polymerization inhibitor MEHQ, product name: KAYARAD DPHA, NIPPON KAYAKU Co., Ltd.) 27% MMPGAC solution | 60.02 |
| 2-trichloromethyl-5-(p-styrylstyryl)-1,3,4-oxadiazole | 1.234 |
| 2,4-bis (trichloromethyl)-6-[4'-N,N-bisethoxycarbonylmethylamino)-3'-bromophenyl)-s-triazine | 0.7932 |
| Phenothiazine | 0.05018 |
| Fluorine based surfactant (DIC Corporation, Megafac F-780-F) | 0.532 |

Units: parts by mass
*Preparation of C.I. Pigment - Yellow 150 dispersed composition
Preparation was carried out in accordance with Example 4 of JP-A No. 2008-216802.
*MMPGAC: Propylene glycol monomethyl ether acetate

Preparation Example 5

<Preparation of Red Pigment (Rp) Curable Composition>

By blending the prescription in the following Table E, a red pigment (Rp) curable composition was prepared.

TABLE E

|  | Red pigment (Rp) curable composition |
|---|---|
| C.I. Pigment Red 254 dispersion liquid (solid component concentration 19.6% by mass, pigment concentration 12.3% by mass) | 29.40 |
| C.I. Pigment Red 177 dispersion liquid (solid component concentration 21.0% by mass, pigment concentration 12.0% by mass) | 26.62 |
| Polymerizable compound: dipentaerythritol hexaacrylate | 3.64 |
| Photopolymerization initiator: the above structural formula I-1 | 2.25 |
| Alkali soluble resin: benzylmethacrylate/methacrylic acid, mole ratio: 70/30, Mw: 5,000, solid component 44% by mass solution (solvent: PGMEA) | 6.12 |
| Polymerization inhibitor: p-methoxyphenol | 0.002 |
| Epoxy compound: EPICLON 695 DIC Corporation | 0.90 |
| Additive: SOLSPERSE 20000 Avicia Limited | 0.54 |
| Surfactant (product name: Megafac F554 DIC Corporation) | 0.05 |
| Solvent: PGMEA | 30.5 |
| Total (% by mass) | 100.0 |

*Solvent: PGMEA (propylene glycol monomethyl ether acetate)

Preparation Example 6

<Preparation of Blue Pigment (Bp) Curable Composition>

By blending the prescription in the following Table F, a blue pigment (Bp) curable composition was prepared.

TABLE F

|  | Blue pigment (Bp) curable composition |
|---|---|
| C.I. Pigment Blue 15:6/Pigment Violet 23 (70/30: mass ratio) dispersion liquid (solid component concentration 20.0% by mass, pigment concentration 13.0% by mass) | 17.66 |
| C.I. Pigment Blue 15:6 dispersion liquid (solid component concentration 20.0% by mass, pigment concentration 12.8% by mass) | 28.94 |
| Polymerizable compound: dipentaerythritol hexaacrylate | 6.10 |
| Photopolymerization initiator: the above structural formula I-1 (Irgacure OXE01 CIBA) | 1.46 |
| Alkali soluble resin: benzylmethacrylate/ methacrylic acid, mole ratio: 70/30, Mw: 30,000, solid component 40% by mass solution (solvent: PGMEA) | 7.76 |
| Polymerization inhibitor: p-methoxyphenol | 0.003 |
| Surfactant (product name: Megafac F554 DIC Corporation) | 0.008 |
| Solvent: PGMEA | 38.06 |
| Total (% by mass) | 100.0 |

*Solvent: PGMEA (propylene glycol monomethyl ether acetate)

Preparation Example 7

<Preparation of Green Pigment (Gp) Curable Composition>
By blending the prescription in the following Table G, a green pigment (Gp) curable composition was prepared.

TABLE G

|  | Green pigment (Gp) curable composition |
|---|---|
| Pigment Green 58 dispersion liquid (solid component concentration 23.8% by mass, pigment concentration 14.9% by mass) | 29.76 |
| Pigment Green 150 dispersion liquid (solid component concentration 24.3% by mass, pigment concentration 15.1% by mass) | 12.44 |
| Polymerizable compound: dipentaerythritol hexaacrylate | 4.48 |
| Photochemical polymerization initiator: the above structural formula I-2 | 0.90 |
| Alkali soluble resin: benzylmethacrylate/methacrylic acid, mole ratio: 60/40, Mw: 11,000, solid component 45% by mass solution (solvent: PGMEA) | 1.73 |
| Polymerization inhibitor: p-methoxyphenol | 0.002 |
| Surfactant (product name: Megafac F554 DIC Corporation) | 0.033 |
| Additive: 3-(trimethoxysilyl) propylmethacrylate | 0.96 |
| Solvent: PGMEA | 49.70 |
| Total (% by mass) | 100.0 |

*Solvent: PGMEA (propylene glycol monomethyl ether acetate)

Comparative Examples 1 to 2 and Examples 1 to 28

—Manufacture of Color Filter—
Color filters in Comparative Examples 1 to 2 and Examples 1 to 28 were manufactured in combinations shown in the following Table H by adjusting the area ratio of each pixel.

Specifically, the colored curable composition prepared in each of Examples and Comparative Examples was applied onto a glass substrate (1737, manufactured by Corning Incorporated) of 550 mm×650 mm by a slit coater and the resultant composition was dried in an oven at 90° C. for 60 seconds (prebake). After that, the entire surface of the application film was exposed at 200 mJ/cm² (illuminance 20 mW/cm²) and after the exposure, the exposed application film was covered with a 1% by mass solution of an alkali developer (CDK-1, manufactured by Fuji Film Electronics Materials Co., Ltd.) and allowed to stand still for 60 seconds. After that, pure water was sprayed to wash away the developer. Then, the application film subjected to the exposure and development processing was heated and processed in an oven at 220° C. for one hour (postbake) and a colored resin coating for constituting a color filter was formed on a glass substrate and a colored filter substrate (color filter) was manufactured. However, the adjustment of the area of each pixel was realized by using a photomask adjusted so that the area of the opening of each pixel was in an area ratio shown in Table H at the time of exposure.

<Evaluation>
Next, each manufactured color filter was evaluated in terms of various characteristics as follows. The result is shown in Table H. Meanwhile, as a light source, an LED light source (the backlight source of KDL-40ZX1, the liquid crystal television manufactured by Sony Corporation) was used.
<Luminance and Chromaticity of Each of R, G, B and Luminance and Chromaticity of White>

The luminance and chromaticity of each pixel of the obtained color film were measured by using a microscopic spectrophotometer (manufactured by OLYMPUS CORPORATION, OSP100). Furthermore, the luminance and chromaticity of white were acquired by multiplying the area of the pixel to the XYZ color coordinate value of each obtained pixel to thereby obtain the XYZ color coordinate value of white.

Meanwhile, when a difference Δxy of the R, G, B, W chromaticity from that in Comparative Example 1 was smaller than 0.005, it was determined to be equivalent to Comparative Example 1 (as before).
<Rate of Improvement in White Luminance>
In Examples 1 to 14, the white luminance (W-Y) obtained by the above-mentioned method was divided by the white luminance (W-Y) in Comparative Example 1 and when the result was 1 or more, the effect of improvement in luminance was determined to be recognized. In Examples 15 to 28, the white luminance (W-Y) was divided by the whiter luminance (W-Y) in Comparative Example 2 and when the result was 1 or more, the effect of improvement in luminance was determined to be recognized.
<Color Reproduction Region (NTSC Ratio)>
The area of a polygon constructed by connecting the chromaticity points of R, G, B, and Y measured by the above-mentioned method on an xy chromaticity chart was divided by the area of a triangle constructed by connecting the three primary color points of the NTSC standard, and thus the NTSC ratio (%) was obtained.

TABLE H-1A

| | Colored curable composition | | | | Area ratio | | | |
|---|---|---|---|---|---|---|---|---|
| | R | G | B | Y | R | G | B | Y |
| Comparative Example 1 | Rp | Gp | Bp | — | 0.333 | 0.333 | 0.333 | — |
| Example 1 | R1 | Gp | Bp | — | 0.328 | 0.337 | 0.355 | — |
| Example 2 | R2 | Gp | Bp | — | 0.322 | 0.339 | 0.339 | — |
| Example 3 | Rp | G1 | Bp | — | 0.377 | 0.325 | 0.337 | — |
| Example 4 | Rp | G2 | Bp | — | 0.340 | 0.325 | 0.335 | — |
| Example 5 | Rp | Gp | B1 | — | 0.344 | 0.348 | 0.308 | — |
| Example 6 | Rp | Gp | B2 | — | 0.343 | 0.355 | 0.302 | — |
| Example 7 | R1 | G1 | Bp | — | 0.334 | 0.327 | 0.339 | — |
| Example 8 | R2 | G2 | Bp | — | 0.331 | 0.328 | 0.341 | — |
| Example 9 | Rp | G1 | B1 | — | 0.351 | 0.337 | 0.312 | — |
| Example 10 | Rp | G2 | B2 | — | 0.353 | 0.343 | 0.304 | — |
| Example 11 | R1 | Gp | B1 | — | 0.340 | 0.349 | 0.310 | — |
| Example 12 | R2 | Gp | B2 | — | 0.334 | 0.358 | 0.308 | — |
| Example 13 | R1 | G1 | B1 | — | 0.347 | 0.339 | 0.314 | — |
| Example 14 | R2 | G2 | B2 | — | 0.343 | 0.347 | 0.310 | — |

TABLE H-1B

| | Colored curable composition | | | | Area ratio | | | |
|---|---|---|---|---|---|---|---|---|
| | R | G | B | Y | R | G | B | Y |
| Comparative Example 2 | Rp | Gp | Bp | Y | 0.300 | 0.301 | 0.351 | 0.048 |
| Example 15 | R1 | Gp | Bp | Y | 0.300 | 0.305 | 0.352 | 0.044 |
| Example 16 | R2 | Gp | Bp | Y | 0.300 | 0.311 | 0.352 | 0.037 |
| Example 17 | Rp | G1 | Bp | Y | 0.307 | 0.300 | 0.353 | 0.039 |
| Example 18 | Rp | G2 | Bp | Y | 0.310 | 0.300 | 0.351 | 0.039 |
| Example 19 | Rp | Gp | B1 | Y | 0.300 | 0.301 | 0.332 | 0.067 |
| Example 20 | Rp | Gp | B2 | Y | 0.300 | 0.308 | 0.326 | 0.066 |
| Example 21 | R1 | G1 | Bp | Y | 0.303 | 0.300 | 0.356 | 0.041 |
| Example 22 | R2 | G2 | Bp | Y | 0.300 | 0.300 | 0.358 | 0.042 |
| Example 23 | Rp | G1 | B1 | Y | 0.307 | 0.300 | 0.335 | 0.059 |

TABLE H-1B-continued

| | Colored curable composition | | | | Area ratio | | | |
|---|---|---|---|---|---|---|---|---|
| | R | G | B | Y | R | G | B | Y |
| Example 24 | Rp | G2 | B2 | Y | 0.301 | 0.300 | 0.330 | 0.069 |
| Example 25 | R1 | Gp | B1 | Y | 0.300 | 0.304 | 0.333 | 0.063 |
| Example 26 | R2 | Gp | B2 | Y | 0.300 | 0.318 | 0.327 | 0.055 |
| Example 27 | R1 | G1 | B1 | Y | 0.302 | 0.300 | 0.337 | 0.061 |
| Example 28 | R2 | G2 | B2 | Y | 0.300 | 0.301 | 0.332 | 0.066 |

TABLE H-2A

| | Performance | | | | | |
|---|---|---|---|---|---|---|
| | R − Δ x y | G − Δ x y | B − Δ x y | W − Δ x y | W − Y | NTSC ratio |
| Comparative Example 1 | — | — | — | — | 29.0 | 84.1% |
| Example 1 | 0.001 | 0.000 | 0.000 | 0.001 | 29.3 | 84.0% |
| Example 2 | 0.005 | 0.000 | 0.000 | 0.001 | 29.6 | 83.9% |
| Example 3 | 0.000 | 0.002 | 0.000 | 0.001 | 29.6 | 84.1% |
| Example 4 | 0.000 | 0.005 | 0.000 | 0.001 | 29.5 | 84.2% |
| Example 5 | 0.000 | 0.000 | 0.000 | 0.001 | 30.2 | 84.2% |
| Example 6 | 0.000 | 0.000 | 0.002 | 0.001 | 30.6 | 83.9% |
| Example 7 | 0.001 | 0.002 | 0.000 | 0.001 | 29.7 | 84.0% |
| Example 8 | 0.005 | 0.005 | 0.000 | 0.001 | 29.9 | 84.0% |
| Example 9 | 0.000 | 0.002 | 0.000 | 0.001 | 30.7 | 84.2% |
| Example 10 | 0.000 | 0.005 | 0.002 | 0.001 | 31.0 | 84.1% |
| Example 11 | 0.001 | 0.000 | 0.000 | 0.001 | 30.4 | 84.1% |
| Example 12 | 0.005 | 0.000 | 0.002 | 0.001 | 31.1 | 83.7% |
| Example 13 | 0.001 | 0.002 | 0.000 | 0.001 | 30.8 | 84.1% |
| Example 14 | 0.005 | 0.005 | 0.002 | 0.001 | 31.5 | 83.8% |

TABLE H-2B

| | Performance | | | | | |
|---|---|---|---|---|---|---|
| | R − Δ x y | G − Δ x y | B − Δ x y | W − Δ x y | W − Y | NTSC ratio |
| Comparative Example 2 | 0.000 | 0.000 | 0.000 | 0.001 | 30.7 | 86.5% |
| Example 15 | 0.001 | 0.000 | 0.000 | 0.001 | 30.7 | 86.3% |
| Example 16 | 0.005 | 0.000 | 0.000 | 0.001 | 30.7 | 85.9% |
| Example 17 | 0.000 | 0.002 | 0.000 | 0.001 | 30.9 | 86.6% |
| Example 18 | 0.000 | 0.005 | 0.000 | 0.001 | 30.8 | 87.0% |
| Example 19 | 0.000 | 0.000 | 0.000 | 0.001 | 32.4 | 86.5% |
| Example 20 | 0.000 | 0.000 | 0.002 | 0.001 | 32.9 | 86.3% |
| Example 21 | 0.001 | 0.002 | 0.000 | 0.001 | 31.1 | 86.5% |
| Example 22 | 0.005 | 0.005 | 0.000 | 0.001 | 31.3 | 86.5% |
| Example 23 | 0.000 | 0.002 | 0.000 | 0.001 | 32.7 | 86.7% |
| Example 24 | 0.000 | 0.005 | 0.002 | 0.001 | 33.4 | 86.8% |
| Example 25 | 0.001 | 0.000 | 0.000 | 0.001 | 32.5 | 86.3% |
| Example 26 | 0.005 | 0.000 | 0.002 | 0.001 | 32.9 | 85.8% |
| Example 27 | 0.001 | 0.002 | 0.000 | 0.001 | 32.9 | 86.5% |
| Example 28 | 0.005 | 0.005 | 0.002 | 0.001 | 33.6 | 86.3% |

From the results of Tables H1-A, H1-B, H2-A and H2-B, in each of Examples 1 to 28, the effect of improvement in white luminance was recognized. Furthermore, in Examples 15 to 28 having the yellow (Y) pixel, the effect of improvement in color reproduction region (NTSC ratio) was also recognized.

It is perceived that a color filter that uses a conventional dye is likely to deteriorate when used in a liquid crystal display device, but, in the color filter of the present invention in which at least one of the red (R) pixel, green (G) pixel, and blue (B) pixel includes one or more kinds of dyes and one or more kinds of pigments, the change in chromaticity that can be considered to be caused by the deterioration of dye was not recognized even after the continuously lit state for three months.

Example 29

—Production of Organic EL Display Device—

An organic EL display device having the color filter of the present invention was produced by the method described in Example 1 of JP-A No. 2010-44981. The color filter was produced in the same manner as in the above Examples. That is, in this color filter, at least one of the red (R) pixel, the green (G) pixel and the blue (B) pixel included one or more kinds of dyes and one or more kinds of pigments, and areas of the red (R) pixel, the green (G) pixel and the blue (B) pixel were not the same. As a result, good results could be obtained.

Example 30

—Production of Electronic Paper Display Device—

An electronic paper display device having the color filter of the present invention was produced by the method described in Examples of JP-A No. 2007-41169. The color filter was produced in the same manner as in the above Examples. That is, in this color filter, at least one of the red (R) pixel, the green (G) pixel and the blue (B) pixel included one or more kinds of dyes and one or more kinds of pigments, and areas of the red (R) pixel, the green (G) pixel and the blue (B) pixel were not the same. In addition, the thickness of the color material layer of the color filter was adjusted to be about 1/2.5 the thickness in Examples 1 to 29. As a result, good results could be obtained.

The color filter of the present invention is used preferably in various kinds of liquid crystal display device that uses, for example, an LED light source, organic EL display devices, electronic paper display devices, etc. because the white luminance can be improved while keeping the same chromaticity of red (R), green (G), and blue (B) and chromaticity of white as before.

What is claimed is:

1. A color filter comprising:
    a red (R) pixel,
    a green (G) pixel, and
    a blue (B) pixel,
    wherein at least one of the red (R) pixel, the green (G) pixel and the blue (B) pixel includes one or more kinds of dyes and one or more kinds of pigments,
    wherein areas of the red (R) pixel, the green (G) pixel and the blue (B) pixel are not the same, and
    wherein the area of the pixel that includes the dye and the pigment is smaller than that of the pixel that includes no dye.

2. The color filter according to claim 1, wherein the blue (B) pixel includes the dye and the pigment, the red (R) pixel and the green (G) pixel include no dye, and an area of the blue (B) pixel is smaller than that of the red (R) pixel and that of the green (G) pixel.

3. The color filter according to claim 1, wherein the red (R) pixel includes the dye and the pigment, the blue (B) pixel and the green (G) pixel include no dye, and an area of the red (R) pixel is smaller than that of the blue (B) pixel and that of the green (G) pixel.

4. The color filter according to claim 1, wherein the green (G) pixel includes the dye and the pigment, the red (R) pixel and the blue (B) pixel include no dye, and an area of the green (G) pixel is smaller than that of the red (R) pixel and that of the blue (B) pixel.

5. The color filter according to claim 1, wherein the blue (B) pixel, the red (R) pixel, and the green (G) pixel each include the dye and the pigment, and an area of the blue (B) pixel is smaller than that of the red (R) pixel and that of the green (G) pixel.

6. The color filter according to claim 1, further comprising a yellow (Y) pixel.

7. The color filter according to claim 6, wherein an area of the yellow (Y) pixel is smaller than that of the blue (B) pixel, that of the red (R) pixel, and that of the green (G) pixel.

8. An electronic display device comprising:
a color filter,
wherein the color filter comprises a red (R) pixel, a green (G) pixel and a blue (B) pixel,
wherein at least one of the red (R) pixel, the green (G) pixel and the blue (B) pixel includes one or more kinds of dyes and one or more kinds of pigments,
wherein areas of the red (R) pixel, the green (G) pixel and the blue (B) pixel are not the same, and
wherein the area of the pixel that includes the dye and the pigment is smaller than that of the pixel that includes no dye.

9. A liquid crystal display device comprising:
a color filter, and
an LED light source,
wherein the color filter comprises a red (R) pixel, a green (G) pixel and a blue (B) pixel,
wherein at least one of the red (R) pixel, the green (G) pixel and the blue (B) pixel includes one or more kinds of dyes and one or more kinds of pigments,
wherein areas of the red (R) pixel, the green (G) pixel and the blue (B) pixel are not the same, and
wherein the area of the pixel that includes the dye and the pigment is smaller than that of the pixel that includes no dye.

10. An organic EL display device comprising:
a color filter,
wherein the color filter comprises a red (R) pixel, a green (G) pixel and a blue (B) pixel,
wherein at least one of the red (R) pixel, the green (G) pixel and the blue (B) pixel includes one or more kinds of dyes and one or more kinds of pigments,
wherein areas of the red (R) pixel, the green (G) pixel and the blue (B) pixel are not the same, and
wherein the area of the pixel that includes the dye and the pigment is smaller than that of the pixel that includes no dye.

11. An electronic paper display device comprising:
a color filter,
wherein the color filter comprises a red (R) pixel, a green (G) pixel and a blue (B) pixel,
wherein at least one of the red (R) pixel, the green (G) pixel and the blue (B) pixel includes one or more kinds of dyes and one or more kinds of pigments,
wherein areas of the red (R) pixel, the green (G) pixel and the blue (B) pixel are not the same, and
wherein the area of the pixel that includes the dye and the pigment is smaller than that of the pixel that includes no dye.

* * * * *